US011074061B2

(12) United States Patent
Franchitti

(10) Patent No.: US 11,074,061 B2
(45) **Date of Patent: *Jul. 27, 2021**

(54) ACTIVE ADAPTATION OF NETWORKED COMPUTE DEVICES USING VETTED REUSABLE SOFTWARE AND HARDWARE COMPONENTS

(71) Applicant: Archemy, Inc., New York, NY (US)

(72) Inventor: Jean-Claude L. Franchitti, New York, NY (US)

(73) Assignee: Archemy, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,903

(22) Filed: Jun. 4, 2019

(65) Prior Publication Data

US 2020/0167145 A1 May 28, 2020

Related U.S. Application Data

(63) Continuation of application No. 16/211,680, filed on Dec. 6, 2018, now Pat. No. 10,338,913.

(Continued)

(51) Int. Cl.
*G06F 8/65* (2018.01)
*H04L 29/08* (2006.01)

(Continued)

(52) U.S. Cl.
CPC .............. *G06F 8/65* (2013.01); *G06F 16/903* (2019.01); *G06F 16/9538* (2019.01); *G06N 3/08* (2013.01);

(Continued)

(58) Field of Classification Search
CPC ......... G06F 8/65; G06F 16/9538; G06N 3/08; H04L 67/34

(Continued)

(56) References Cited

U.S. PATENT DOCUMENTS 7,546,576 B2 6/2009 Egli
7,644,414 B2 1/2010 Smith et al.

(Continued)

FOREIGN PATENT DOCUMENTS

| | | |
|---|---|---|
| CA | 2 723 005 | 10/2001 |
| WO | WO 2017/183983 | 10/2017 |

OTHER PUBLICATIONS

International Search Report and Written Opinion dated Apr. 9, 2019, for International Application No. PCT/US2018/064240, 15 pages.

*Primary Examiner* — John Q Chavis
(74) *Attorney, Agent, or Firm* — Cooley LLP

(57) ABSTRACT

A method includes receiving a text description of a system capability request, and converting the text description into a normalized description of the system capability request. A repository is then queried, based on the normalized description and using a search algorithm, to identify multiple candidate application software units (ASUs). The candidate ASUs are displayed to a user for selection. The user-selected ASU is then deployed, either locally or to at least one remote compute device, in response to receiving the user selection. Deployment can include the user-selected candidate ASU being integrated into a local or remote software package, thus defining a modified software package that is configured to provide the system capability.

20 Claims, 102 Drawing Sheets

Related U.S. Application Data

(60) Provisional application No. 62/594,922, filed on Dec. 5, 2017.

(51) Int. Cl.

| | |
|---|---|
| ***G06F 16/9538*** | (2019.01) |
| ***G06N 3/08*** | (2006.01) |
| ***G06N 5/02*** | (2006.01) |
| ***G06N 20/00*** | (2019.01) |
| ***G06F 16/903*** | (2019.01) |

(52) U.S. Cl.
CPC ............. *G06N 5/022* (2013.01); *G06N 20/00* (2019.01); *H04L 67/34* (2013.01); *H04L 67/10* (2013.01)

(58) Field of Classification Search
USPC .......................................................... 717/172
See application file for complete search history.

(56) References Cited

U.S. PATENT DOCUMENTS

| | | | | |
|---|---|---|---|---|
| 10,338,913 | B2 * | 7/2019 | Franchitti | G06F 16/9538 |
| 2006/0137015 | A1 | 6/2006 | Fahrny et al. | |
| 2007/0220342 | A1 | 9/2007 | Vieira et al. | |
| 2010/0058364 | A1 | 3/2010 | Sherrill et al. | |
| 2011/0060659 | A1 | 3/2011 | King et al. | |
| 2015/0347280 | A1 * | 12/2015 | Bennah | H04L 67/104 714/38.1 |
| 2017/0031676 | A1 | 2/2017 | Cecchetti et al. | |
| 2019/0171438 | A1 | 6/2019 | Franchitti | |

* cited by examiner

| Bus. Sol. Focus | Business Solutions Node Mgmt. Process | Business Solutions Node Mgmt. Activities | Tool/Capability Used | KMP Protocol (runtime) |
|---|---|---|---|---|
| Manage Taxonomy | Apply | (1) Express request using taxonomy available locally. | Node Mgr. Taxonomy Mgmt. Svc. | BSR (incoming) |
| | Match | (2) Find solution match. Note: this process automates KAEAM "Discover" phase 3 | Node Mgr. Taxonomy Mgmt. Svc. ArchNav™ API | ArchNav™ API Protocol |
| | Learn | (3a) React to inability of "Apply" process to understand some keywords used in request.<br>(3b) React to the lack of availability of matching business solutions. | Node Mgr. Taxonomy Mgmt. Svc. | BSR (outgoing to delegate request)<br>SUR (request tax. & sol. upd.)<br>Note: issuing an SUR depends on the extent of demand historically |
| | Evolve | (4) Handle regular taxonomy updates from DKME & global P2P constellation. | Node Mgr. Taxonomy Mgmt. Svc. | SUR (incoming)<br>SUR (outgoing) |
| Manage Business Solutions | Provide | (1) Supply solutions that match request. Note: this process automates KAEAM "Reuse" phase 3 | Node Mgr. Bus. Sol. Mgmt. Svc. ArchNav™ API | ArchNav™ API Protocol |
| | Learn | (2a) React to inability to provide closely matching solutions.<br>(2b) React to inability to provide suitable business solutions. | Node Mgr. Bus. Sol. Mgmt. Svc. | SUR (outgoing to req. tax. & sol. upd.) |
| | Upgrade<br>Note: upgrade is optional & based on quality and availability of bus. sol. matches historically | (3a) Request adaptation of candidate reusable solutions. Note: this process automates KAEAM "Adapt" step 3<br>(3b) (Re-) Deploy bus. sol. update obtained from DKME & global P2P constellation. Note: this process automates KAEAM "Deploy" phase 4 | Node Mgr. Bus. Sol. Mgmt. Svc. EAMTk™ ArchDoc™ ArchViz™ APIs | EAMTk™ ArchDoc™ ArchViz™ Protocol |
| | Evolve | (4) Handle regular bus. sol. updates from DKME & global P2P constellation. | | SUR (incoming)<br>SUR (outgoing) |
| Manage Metrics | Gather | (1) Gather logs from activities related to taxonomy & bus. mgmt. | Node Mgr. Mgmt. Svc. | Node Mgmt. Svc. Internal Error Handling |
| | Analyze | (2) Analyze logs to derive & classify feedback & generate baseline metrics. | Node Mgr. Mgmt. Svc. | Node Mgmt. Svc. Internal Error Handling |
| | Provide | (3a) Log taxonomy performance issues.<br>(3b) Log bus. sol. malfunctions & issues with their availability & suitability. | Node Mgr. Mgmt. Svc. | MUR (outgoing to sync with the metrics svc.) |

FIG. 17

| | Criteria | | | |
|---|---|---|---|---|
| | $C_1$ | $C_2$ | ... | $C_n$ |
| | $(w_1$ | $w_2$ | ... | $w_n)$ |
| **Alternatives** | | | | |
| $A_1$ | $a_{11}$ | $a_{12}$ | ... | $a_{1n}$ |
| $A_2$ | $a_{21}$ | $a_{22}$ | ... | $a_{2n}$ |
| | . | . | | . |
| | . | . | | . |
| | . | . | | . |
| $A_m$ | $a_{m1}$ | $a_{m2}$ | ... | $a_{mn}$ |

FIG. 35

$$P^{*}_{AHP} = \max_i P_i = \max_i \sum_{j}^{n} a_{ij} w_j, \quad \text{for } i = 1, 2, 3, \ldots, m.$$

FIG. 36

$$R\left(\frac{A_K}{A_L}\right) = \prod_{j=1}^{n}\left(\frac{a_{Kj}}{a_{Lj}}\right)^{w_j}$$

FIG. 37

$$P_{i,multi-AHP} = \prod_{j=1}^{n}\left(a_{ij}\right)^{w_j}$$

FIG. 38

$$C(a,b) = \frac{\sum_{i \in Q(a,b)} w_i^*}{\sum_{i=1}^{m} w_i}.$$

FIG. 39

$$D(a,b) = \frac{\max_j [g_j(b) - g_j(a)]}{\delta}$$

$$\delta = \max | g_j(b) - g_j(a)|$$

FIG. 40

$$h_{ji} = 1 - \frac{g_j^{max} - g_{ji}}{g_j^{max} - g_j^{min}}$$

FIG. 41

$$h_{ji} = 1 - \frac{g_{ji} - g_j^{min}}{g_j^{max} - g_j^{min}}$$

FIG. 42

$$c_k(a,b) = \begin{cases} \dfrac{m_{k+1}}{n_{k+1}} & \begin{array}{l} \textit{given:} \\ \quad \textit{a force in hierarchy level } k \geq 1; \\ \quad G_{k+1}, \textit{ set of sub-criteria;} \\ \quad j : g_j \in G_{k+1} \\ \quad m_{k+1} = \left| g_j(a) \geq g_j(b) \right| \\ \quad n_{k+1} = \left| G_{k+1} \right| \end{array} \\ \dfrac{\sum_{\substack{j: g_j \in G_1 \\ g_j(a) \geq g_j(b)}} p_j}{\sum_{j: g_j \in G_1} p_j} & \begin{array}{l} \textit{given:} \\ \quad k = 0; \\ \quad \textit{preference weight, } p_j \textit{, for criteria } j \end{array} \end{cases}$$

FIG. 43

$$d_k(a,b) = \begin{cases} 0 : \forall j(g_j(a) \geq g_j(b)) \\ \textit{otherwise} : \max_j [g_j(b) - g_j(a)] \end{cases}$$

*given:*

*a force in hierarchy level $k \geq 1$;*

$G_{k+1}$, *set of sub-criteria;*

$j : g_j \in G_{k+1}$

FIG. 44 strong out-flow $$c_{ki}^{so} = \sum_{\substack{i,b \in C \\ b \neq i \\ c_k(i,b) \geq \hat{c}_1 \\ c_k(i,b) - c_k(b,i) \geq 0 \\ d_k(i,b) < d}}^{C} c_k(i,b) - c_k(b,i)$$

weak out-flow $$c_{ki}^{wo} = \sum_{\substack{i,b \in C \\ b \neq i \\ \hat{c}_2 \leq c_k(i,b) < \hat{c}_1 \\ c_k(i,b) - c_k(b,i) \geq 0 \\ d_k(i,b) < d}}^{C} c_k(i,b) - c_k(b,i)$$

strong in-flow $$c_{ki}^{si} = \sum_{\substack{i,b \in C \\ b \neq i \\ c_k(b,i) \geq \hat{c}_1 \\ c_k(b,i) - c_k(i,b) \geq 0 \\ d_k(b,i) < d}}^{C} c_k(b,i) - c_k(i,b)$$

weak in-flow $$c_{ki}^{wi} = \sum_{\substack{i,b \in C \\ b \neq i \\ \hat{c}_2 \leq c_k(b,i) < \hat{c}_1 \\ c_k(b,i) - c_k(i,b) \geq 0 \\ d_k(b,i) < d}}^{C} c_k(b,i) - c_k(i,b)$$

FIG. 45

FIG. 46
Ways of Implementing Software Reuse
Software Product Lines
Configurable Vertical Applications
Model-Driven Engineering
Program Generators
Architectural Patterns
COTS Integration
Legacy System Wrapping
ERP Systems
Service-Oriented Systems
Program Libraries
Aspect-Oriented Software Development
Component-Based Software Engineering
Application Frameworks
Design Patterns

| OWL-S Concepts | Fluent Calculus Concepts | Comments |
|---|---|---|
| Atomic Process | Action | |
| Inputs | Inputs and Knowledge preconditions | Input parameters of the actions and action precondition axioms |
| Outputs | Knowledge effects | State update axioms |
| Preconditions | Physical preconditions | Action precondition axioms |
| Effects | Physical effects | State update axioms |

| Service | Inputs | Preconditions |
|---|---|---|
| Login | $loginForm, user$ | $Valid(loginForm, user) \wedge \neg LoggedIn(user)$ |
| CheckRequest | $request, user$ | $FilledIn(request) \wedge LoggedIn(user)$ |
| CheckPayment | $payForm, user$ | $FilledIn(payForm) \wedge LoggedIn(user)$ |
| ExecPayment | $transaction$ | $Approved(transaction, user) \wedge Valid(cCrd, user)$ |
| CreateCertified | $payCConf$ | $PayCompleted(doc, user)$ |
| CreateUncertified | $payCConf$ | $PayCompleted(doc, user)$ |

| Service | Outputs | Postconditions |
|---|---|---|
| Login | $loginConf$ | $LoggedIn(user)$ |
| CheckRequest | $requestConf$ | $Valid(request, user)$ |
| CheckPayment | $payFCnf$ | $Valid(payForm, user)$ |
| ExecPayment | $payCCnf$ | $\exists doc \cdot PayCompleted(doc, user)$ |
| CreateCertified | $certifDoc$ | $CertifCompleted(doc, user) \wedge \exists certifDoc \cdot Delivered(certifDoc)$ |
| CreateUncertified | $doc$ | $Delivered(doc)$ |

FIG. 50

| Service | Inputs |
| --- | --- |
| CheckRequest | $Holds(HasInput(?request), ?z\_in) \wedge$ $Holds(HasInput(?user), ?z\_in)$ |
| CheckPayment | $Holds(HasInput(?payForm), ?z\_in) \wedge$ $Holds(HasInput(?user), ?z\_in)$ |
| ExecPayment | $Holds(HasInput(?payForm), ?z\_in)$ |

| Service | Preconditions |
| --- | --- |
| CheckRequest | $Holds(FilledIn(?request, ?z\_in) \wedge Holds(LoggedIn(?user), ?z\_in)$ |
| CheckPayment | $Holds(FilledIn(?payForm, ?z\_in) \wedge Holds(LoggedIn(?user), ?z\_in)$ |
| ExecPayment | $Holds(Valid(?payForm, ?user), ?z\_in) \wedge$ $Holds(LoggedIn(?user), ?z\_in) \wedge Holds(Valid(?cCrd, ?user), ?z\_in)$ |

| Service | Outputs and Postconditions |
| --- | --- |
| CheckPayment | $?z\_out = ?z\_in + HasOutput(?reqCnf) + Valid(?request, ?user)$ |
| CheckPayment | $?z\_out = ?z\_in + HasOutput(?payFCnf) + Valid(?payForm, ?user)$ |
| ExecPayment | $\exists ?doc \cdot ?z\_out = ?z\_in + HasOutput(?payCCnf) +$ $+ Valid(?payForm, ?user) + PayCompleted(?doc, ?user)$ |

FIG. 51

| WSSL | FLUX |
|---|---|
| $Holds(HasInput(x), z)$<br>$Poss(A(x), z) \equiv \Pi(z)$ | $poss(a(x), Z) :-$<br>$holds(HasInput(x), Z), \hat{\Pi}(z).$ |
| $Holds(HasOutput(x), z)$<br>$Poss(A(x), z_1) \rightarrow \Delta(z_1) \wedge$<br>$State(Do(A(x), z_1)) = State(z_1) - \vartheta^- + \vartheta^+$<br>$= State(z_1) - \vartheta^- + \vartheta^+$ | $state\_update(Z_1, a(x), Z_2) :-$<br>$\hat{\Delta}(Z_1), update(Z_1, [\vartheta^+,$<br>$HasOutput(x)], \vartheta^-, Z_2).$ |
| $Ramify(z_1, \vartheta^+, \vartheta^-, z_2, Do(A(x), s))$ | $ramify(Z_1, \vartheta^+, \vartheta^-, Z_2)$ |
| $\Gamma \rightarrow Causes(z_1, p_1, n_1, z_2, p_2, n_2, s)$ | $causes(Z_1, p_1, n_1, Z_2, p_2, n_2) :- \Gamma.$ |
| $Poss(A(x), z_1) \rightarrow \exists C\, Acc(C, s) \wedge \ldots$ | $ab\_state\_update(Z_1, a(x), Z_2) :- \ldots$ |

FIG. 52

| | Microservice on VMs | Microservice on Containers |
| --- | --- | --- |
| Scalability | With multiple microservices running on the same Linux instance, scaling any of the services requires scaling the entire VM instance, and (possibly) adding unwanted scaling of other services. | Individual business solutions can be scaled independently without affecting other services. |
| Resource Utilization | Services cannot be distributed based on resource utilization (e.g., CPU utilization, memory utilization). | Container orchestration provides better resource utilization and makes the services, based on resources, available to the applicable hosts. |
| Faster Deployment | Spinning up new VMs is slow as it requires a system reboot. Scaling a single service requires launching new VMs, which needs extra time factored in for the reboot. | Containers, by contrast, are faster because they do not require the operating system spin-up time associated with a virtual machine. Containers are more efficient during initialization and start-up in seconds making them faster than VMs. |
| Cost Optimization | Running services on VMs cost more compared to running the same services in containers. | Running microservices in containers highlights the advantages of microservices and their lower costs. |
| Portability | Deploying services on new VMs requires ensuring that the required software is first installed on the machine. | Microservices can run in containers, which means that those containers can be deployed to any container-enabled server. |

FIG. 74

ACTIVE ADAPTATION OF NETWORKED COMPUTE DEVICES USING VETTED REUSABLE SOFTWARE AND HARDWARE COMPONENTS

CROSS-REFERENCE TO RELATED APPLICATIONS

This application is a Continuation of U.S. patent application Ser. No. 16/211,680, filed Dec. 6, 2018 and titled "Active Adaptation of Networked Compute Devices Using Vetted Reusable Software Components," which claims the benefit of U.S. Provisional Patent Application No. 62/594,922, filed Dec. 5, 2017 and titled "An Ecosystem, Framework and Marketplace for Intelligent Autonomous Business Solutions," the entireties of which are incorporated by reference herein in its entirety.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present disclosure relates to system and methods for adaptive modification of networked compute device architectures and associated capabilities, for example by leveraging reusable software components.

BACKGROUND

To be competitive, organizations are increasingly "digital" and provide business solutions to customers through the use of myriad innovative technologies. In some cases, an organization's business decisions are guided by real-time insights related to customer needs and/or by feedback that is derived from or enabled by machine learning. Many business solutions are currently operating in co-existence mode with more modem solutions that will eventually replace them.

SUMMARY

A method of identifying and deploying a curated set of software components includes receiving a text description of a system capability request, and converting the text description into a normalized description of the system capability request. A repository is then queried, based on normalized description of at least one system capability request, and to identify, in response to the query, a plurality of candidate application software units based on a search of a repository operably coupled to the processor. A signal including a representation of each candidate application software unit from the plurality of candidate application software units can be sent, and in response, a signal representing a user selection of a candidate application software unit from the plurality of candidate application software units can be received. The user-selected candidate application software unit can then be sent to at least one remote compute device in response to receiving the user selection, such that the user-selected candidate application software unit is integrated into a software package of the at least one remote compute device to define a modified software package that includes the system capability.

In some implementations, a non-transitory processor-readable medium stores code representing instructions to cause a processor to send, via the processor, a first signal representing a text description of at least one system capability request associated with a system capability. A second signal is then received, at the processor and in response to the first signal, to cause display of a representation of each candidate application software unit from a plurality of candidate application software units. A user selection of a candidate application software unit from the plurality of candidate application software units can be detected, via a graphical user interface (GUI) executed by the processor. In response to a user selection made via the GUI, the user-selected candidate application software unit can be received. The user-selected candidate application software unit can then be integrated, via an agent executed by the processor, into a software package stored in a memory operably coupled to the processor, to define a modified software package that includes the system capability. In some such implementations, the text description of the at least one system capability request associated with a system capability does not specify the user-selected candidate application software unit. In other words, the integration of the user-selected candidate application software unit need not be in response to a direct request for that application software unit.

In some embodiments, a system includes a plurality of compute nodes, each compute node from the plurality of compute nodes in operable communication with each other compute node from the plurality of compute nodes via a communications network (e.g., a peer-to-peer, or "P2P" network). Each compute node from the plurality of compute nodes can include a memory storing code representing instructions to cause a processor to receive, at the processor of that compute node, a signal representing system data associated with at least one system capability request associated with a system capability. A repository is queried, using a search algorithm of the processor of that node and in response to receiving the system data, to identify a plurality of candidate application software units suitable for addressing the at least one system capability request. The query can reference the system data. A candidate application software unit is automatically selected from the plurality of candidate application software units, and that compute node can cause execution of the automatically selected candidate application software on that compute node, in response to automatically selecting the candidate application software unit, such that the automatically selected candidate application software unit is integrated into a software package of that compute node, to define a modified software package that is configured to provide the system capability.

In some embodiments, a system includes a set of multiple compute nodes. Each of the compute nodes is in operable communication with each other compute node of the system via a communications network. Each of the compute nodes includes a memory storing code representing instructions to cause a processor to receive, at a processor of that compute node, a signal representing system data associated with at least one system capability request associated with a system capability. The memory also stores code representing instructions to query a repository, using a search algorithm of the processor of that compute node and in response to receiving the system data, to identify a plurality of candidate application software units suitable for addressing the at least one system capability request, the query referencing the system data. The memory also stores code representing instructions to automatically select a candidate application software unit from the plurality of candidate application software units, and to cause execution of the automatically selected candidate application software on that compute node, in response to automatically selecting the candidate application software unit, such that the automatically selected candidate application software unit is integrated into a software package of that compute node, to define a modified software package that is configured to provide the system capability.

In some embodiments, the set of compute nodes is a first set of compute nodes that is associated with a first domain type. The system can further include a second set of multiple compute nodes, each compute node from the second set of compute nodes being in operable communication with each other compute node from the second set of compute nodes via a communications network, the second set of compute nodes associated with a second domain type different from the first domain type. Each compute node from the second set of compute nodes includes a memory storing code representing instructions to cause a processor to receive, at a processor of that compute node, a signal representing system data associated with at least one system capability request associated with a system capability. The memory of each compute node from the second set of compute nodes also stores code representing instructions to query a repository, using a search algorithm of the processor of that compute node and in response to receiving the system data, to identify a plurality of candidate application software units suitable for addressing the at least one system capability request, the query referencing the system data. The memory of each compute node from the second set of compute nodes also stores code representing instructions to automatically select a candidate application software unit from the plurality of candidate application software units, and to cause execution of the automatically selected candidate application software on that compute node, in response to automatically selecting the candidate application software unit, such that the automatically selected candidate application software unit is integrated into a software package of that compute node, to define a modified software package that is configured to provide the system capability. The instructions to query a repository, stored by each memory of each compute node from the second plurality of compute nodes, can include instructions to query at least one of (1) a local repository of that compute node, (2) a repository of another compute node within the second plurality of compute nodes, and (3) a remote repository of a compute node from the first plurality of compute nodes.

In some embodiments, a non-transitory processor-readable medium stores code representing instructions to cause a processor to send, via a processor, a first signal representing a text description of at least one system capability request associated with a system capability, and to receive, at the processor and in response to the first signal, a second signal to cause display of a representation of each candidate application software unit from a plurality of candidate application software units. The non-transitory processor-readable medium also stores code representing instructions to cause a processor to detect, at a graphical user interface (GUI) executed by the processor, a user selection of a candidate application software unit from the plurality of candidate application software units, and to receive, in response to the user selection, the user-selected candidate application software unit. The non-transitory processor-readable medium also stores code representing instructions to cause a processor to integrate, via an agent executed by the processor, the user-selected candidate application software unit into a software package stored in a memory operably coupled to the processor, to define a modified software package that includes the system capability. The text description of the at least one system capability request associated with a system capability does not, in some embodiments, specify the user-selected candidate application software unit. The non-transitory processor-readable medium also stores code representing instructions to cause a processor to send performance data during execution of the user-selected candidate application software unit, and to receive, in response to sending the performance data, a signal representing actionable feedback data. The performance data can be associated with at least one of applicability, suitability, portability, compatibility, or security.

In some implementations, the non-transitory processor-readable medium can also store code representing instructions to cause a processor to send, prior to sending the first signal, an access token to a remote server for authentication, and to receive, in response to sending the access token, a confirmation message from the remote server. Alternatively or in addition, the non-transitory processor-readable medium can also store code representing instructions to cause a processor to at least one of actively and autonomously via the agent, detect an update to a taxonomy associated with at least one candidate application software unit from a plurality of candidate application software units, and to generate, via the agent and in response to detecting the software update, an alert referencing the update to the taxonomy. Alternatively or in addition, the non-transitory processor-readable medium can also store code representing instructions to cause a processor to: (1) receive a notification that a new software component is available; (2) send, in response to the notification, a request for the new software component; (3) receive, in response to the request, the new software component; and (4) integrate, via the agent, the new software component into the software package.

BRIEF DESCRIPTION OF THE DRAWINGS

It is to be understood that the drawings are primarily for illustrative purposes, and are not intended to limit the scope of the subject matter described herein.

FIG. 17 is a diagram showing details of DKMF management phases, according to some embodiments.

FIG. 35 shows a typical decision matrix structure, for use in some embodiments.

FIG. 36 shows an analytic hierarchy process (AHP) Best Alternative Additive Formula, for use in some embodiments.

FIG. 37 shows an AHP Formula to Compare Alternatives, for use in some embodiments.

FIG. 38 shows a Formula Variant to Compare Alternatives, for use in some embodiments.

FIG. 39 shows an ELECTRE II Concordance Index equation, for use in some embodiments.

FIG. 40 shows an ELECTRE II Discordance Index equation, for use in some embodiments.

FIG. 41 shows a Benefit Criteria Normalization equation, for use in some embodiments.

FIG. 42 shows a Cost Criteria Normalization equation, for use in some embodiments.

FIG. 43 shows a Solution Pairwise Concordance Index equation, for use in some embodiments.

FIG. 44 shows a Solution Pairwise Discordance Index equation, for use in some embodiments.

FIG. 45 shows Solution Candidate Concordance Indices, for use in some embodiments.

FIG. 50 is a table showing a service set implementation, according to some embodiments.

FIG. 51 is a table showing a service set WSSL specification, according to some embodiments.

FIG. 52 is a table showing WSSL translation to a Fluent Executor (FLUX), according to some embodiments.

FIG. 74 is a table showing benefits of microservices containerization, according to some embodiments.

DETAILED DESCRIPTION

Figure 1:
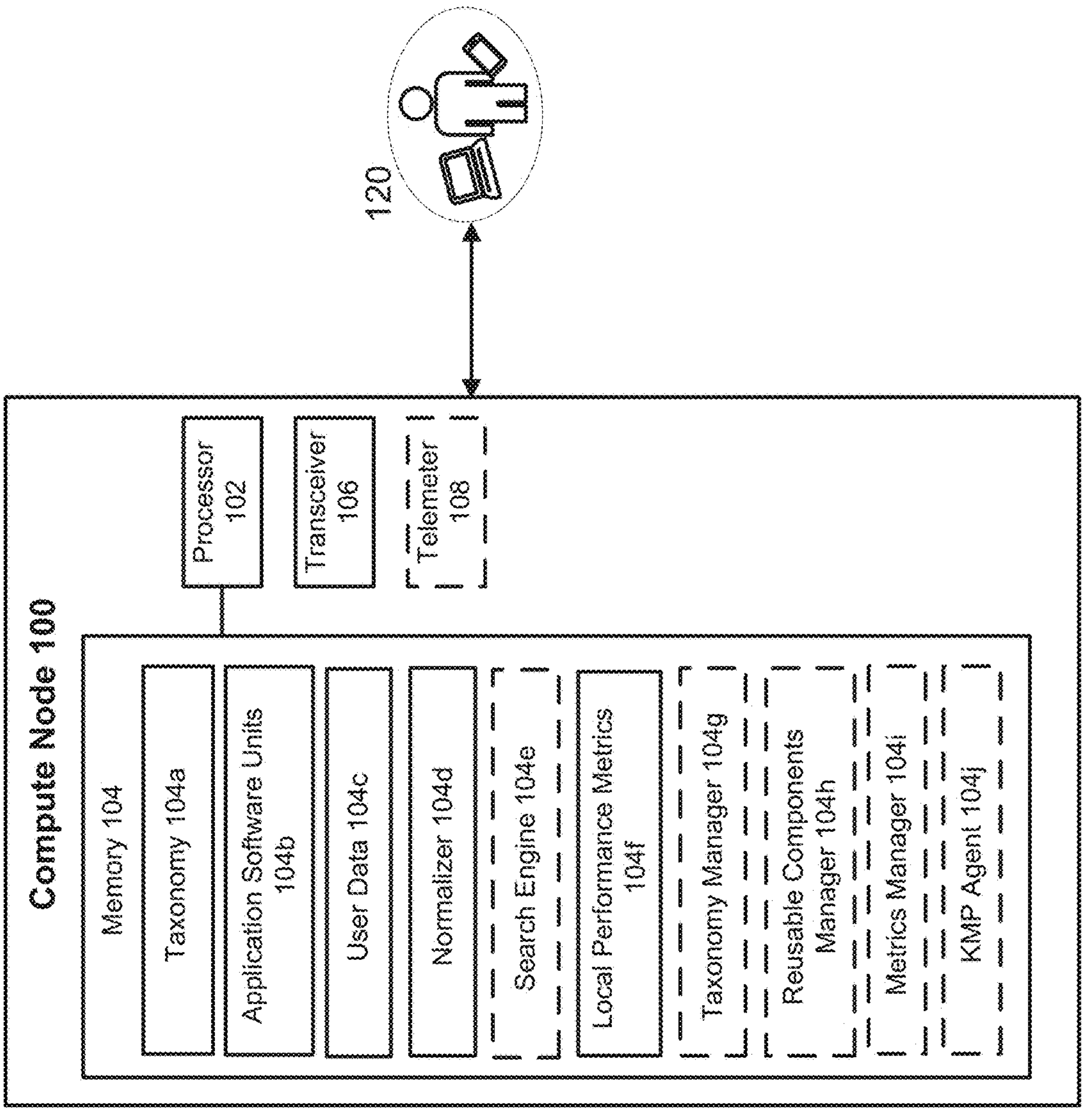
FIG. 1 is a block diagram showing a compute node, according to some embodiments.

Advances in artificial intelligence (AI) deep learning, Internet of Machine (IoM), and interactive user interface (UI) technologies are facilitating natural language interfaces, speech/face recognition, and increasingly complete awareness and control of environments via participation in a connected ecosystem, and the merging of traditional and immersive user interfaces into virtual or augmented reality. These revolutionary capabilities are clearing the way for development of intelligent business applications that can execute tasks that once required human intervention, to more comprehensively support businesses and their customers.

The practical use and reuse of many such "intelligent" applications, however, are hindered by the fact that identifying applicable technologies is dependent upon tacit and/or explicit knowledge being provided by business domain experts (i.e., humans). Another challenge is that, for these applications to perform without human intervention, they would need to evolve intelligently and/or in an autonomous fashion, to handle new tasks and to use the latest applicable technologies as they become available. No known system that can comprehensively and effectively meet these objectives is currently available.

Example systems and methods of the present disclosure (also referred to herein as Archemy™) address the foregoing challenges and facilitate the creation and management of intelligent autonomous business solutions in various business contexts, using one or more of: a digital knowledge management framework (DKMF) node, a broader digital knowledge management ecosystem (DKME) that can include one or more DKMF nodes, and/or a peer-to-peer (P2P) network that interconnects one or more DKMF nodes and/or DKME nodes, depending upon the embodiment. Architectures, functionalities and inter-operabilities associated with the DKME, DKMF, and P2P system components are set forth in detail below. Using the systems and methods set forth herein, curated sets of software components and/or customizations or modifications to software components can be identified and deployed to one or more networked compute nodes. In some embodiments, problem definitions and/or software components are "vetted" by one or more system tools (e.g., ArchDoc and/or ArchViz). To become "vetted," problem definitions and/or software components undergo a thorough cataloguing process that excludes problem definitions and/or software components from the catalog unless and until a condition is met. For example, software component can be excluded from the catalog unless and until their creation and targeted use lifecycle have been retrofitted into a holistic lifecycle methodology (i.e., an Archemy ArchDev-driven way) for developing reusable solutions, as set forth herein. In some embodiments, both problem definitions and reusable software components are catalogued. When a new reusable software component is catalogued, a problem definition can be matched with the reusable software component at the same time. When interacting with the Archemy system, a user or compute node seeking a solution to a problem (e.g., a business problem), where the solution is a reusable software component set that can be paired and integrated in a semi-automated fashion, that user or compute node may only have and/or specify a problem definition. In such cases, the problem definition can be captured/stored and, if matched, the corresponding relationships between related reusable software components and problem definitions becomes knowledge stored in ArchKnow. The vetting of problem definitions can include comparing them to a standard of specification that is aligned with ArchDev expectations.

The ArchDoc™ tool is used to capture the steps followed to develop business solutions along with the various tools used along the way and all the associated deliverables. The ArchViz™ tool complements ArchDoc™ by providing an immersive augmented reality interface to navigate through electronic documentation. ArchDev™ refers to a holistic lifecycle methodology and knowledge management platform that can leverage agile Enterprise Architecture data to generate transmutation plans to facilitate mission-critical and/or vision-oriented initiatives.

In some embodiments, a system includes a networked arrangement of compute nodes and is configured to analyze any of a plurality of subsets of elements, components, terms, values, strings, words, or criteria of a "taxonomy" (also referred to herein as a repository) that is stored within the system. A taxonomy can include one or more fields, some or each of which can be associated with a "facet" defining one of: an idea, a concept, an artifact, a component, a procedure, or a skill. Facets can include, but are not limited to: business capabilities, customer profiles, operational location characteristics, application infrastructure, data/information infrastructure, and technology infrastructure. Facets can optionally be associated with an architecture domain (e.g., a business domain, an application domain, a data domain, or a technology domain). The taxonomy can be stored in a variety of ways, including (but not limited to) one or more of: identical copies of the complete taxonomy stored on each compute node in the system or in a networked subsystem of the system; stored in a distributed manner across all compute nodes of the system or of a networked subsystem of the system; partially stored locally within a given compute nodes, and partially stored on one or more remote nodes (whether within the same or a different network) that are accessible to that node. As used herein, a taxonomy can be defined as a system or scheme of classification, for example linking semantic terms to objects such as software components, subcomponents and/or functionalities/capabilities. In some embodiments, Archemy™ taxonomies can be accessible via the ArchNav™ taxonomy management tool. The ArchNav tool includes an administrative or centralized node with an application programming interface (API) through which other nodes can access stored data and/or functionality of the ArchNav node, both of which are discussed further below. They can be encoded using, for example, XML/JSON, can be traversed as extended knowledge graphs, and can support set query capabilities. As used herein, an "ontology" defines concepts that, once known and understood, can be referred to using one or more taxonomy terms. A "repository" may refer to a storage subsystem for such taxonomies. Repositories can also be used to store, and provide access to, reusable components of business solutions, and/or metrics. Alternatively or in addition, repositories of the present disclosure can store, and provide access to, catalogued definitions of business problems that, in some cases, are linked to solutions (e.g., the reusable software components) in the repository, for example to assist businesses in identifying faster, and/or reacting faster to, real world problems and system capability needs.

In some embodiments, during operation of a compute node of the system, the system can detect or receive a signal that includes, defines or represents a request. The request can be input to the system (e.g., via a GUI interface of a compute node, which may be a workbench compute node) by a user (also referred to herein as a "requestor"), or alternatively, the request can be initiated in an autonomous or automated manner (e.g., via intelligent automation) by a compute node. The request can include one or more criteria and associated values, examples of which are provided in Table 1 below:

TABLE 1

Example Request Criteria

| Criteria | Value |
|---|---|
| Coverage Domain | Information |
| Scope | Partial |
| Weight | [numeric] |
| Innovation Area | Process |

In response to detecting (or receiving) the request signal, an attempt to "match" the request to one or more applicable "solutions" (e.g., software components, subcomponents, functionalities and/or capabilities) is performed by one or more of the following, in any order and in any combination (depending upon the implementation or application): parsing the request; normalizing or reformatting the request (e.g., such that a logical "OR" relationship is imparted between terms of the request); querying a repository organized according to and/or storing a taxonomy; restricting a query associated with the request to a single domain or set of domains; locally querying the compute node (i.e., querying the compute node at which the request was received); querying a remote compute node within the same network as the receiving compute node (e.g., where the common network is associated with a relevant domain, as discussed further below); and/or querying a remote compute node within a network that is outside (and separate from) the network of the receiving compute node (e.g., where the outside network has a domain type that differs from a domain type of the network to which the receiving node belongs). Each of the foregoing processes can be performed by the system automatically/autonomously (i.e., without further user input). The foregoing queries could be performed in succession, as needed (e.g., terminating when a match occurs, to minimize computation costs), or in parallel (e.g., to maximize the volume of applicable results).

The matching of requests to solutions can be based on scoring. In some embodiments, the scoring is based on (1) a number of matches identified during the querying process, and (2) weights assigned to criterion, terms or portions of the request, where the weights can be user-defined weights. For example, the system can calculate a score for each potential result identified as part of the querying process, and filter or reduce the set of potential results based on the scores to generate a final set of results to be sent or displayed to the requestor. The results (also referred to herein as "candidate application software units," or candidate ASUs) can be ordered based on the scores and presented to the requestor for selection, e.g., via the same GUI via which the requestor submitted the request. In some implementations, results include hyperlinks to details about the candidate ASUs. In some embodiments, the system includes an augmented reality capability, such that a user/requestor can "navigate" to a solution by interacting with an augmented reality interface.

If no match is identified during the querying, or if the scores for potential results identified during the querying do not exceed a predefined or calculated threshold value (i.e., the scores are insufficient), the system can detect that an update to the taxonomy is recommended. In response to detecting that an update to the taxonomy is recommended, the system can actively and/or autonomously seek to accomplish the taxonomy update by one or more of: sending a signal including an alert message to at least one user/requestor (e.g., via a GUI of a compute node), accessing a centralized repository that was not previously queried during the initial querying process, expanding the pool of compute devices that are queried and querying those additional compute devices, and/or sending an update request to a remote/third-party entity.

By way of example, suppose that, in a first search, a user-input request includes the single criteria "Coverage Domain/Information" (as shown in Table 1 above), with weight and closeness values of 100. As used herein, a "closeness value" can be a semantic value and/or a user-provided value. The "closeness value" can represent a measure of how close (or well-matched) a taxonomy keyword is to a reusable software component when it is used to describe the reusable software component. When end-users access the Enterprise Catalog (discussed further below) directly, for example to retrieve and/or store new reusable software components (also referred to as Knowledge Artifact Definitions (KADs), or "ArchiFacts," discussed further below), they can retrieve their selections and/or insert items into storage by choosing applicable taxonomy keywords from the various taxonomies within their selected domain namespace (e.g., to cover multiple facets and an architecture domain). When a user selects one or more taxonomy keywords, the user can assess how well-matched their selected taxonomy keywords are to what they would like to use, and the user can express that assessment (i.e., the strength of match or mismatch) using the closeness value. When using ML to match taxonomy-driven descriptions of components and trying to retrofit those taxonomies to the standard taxonomies that are vetted within ArchKnow (an evolving knowledge repository that can include artifacts such as vetted taxonomies, problem definitions, reusable components, and metrics), a closeness value can be generated via a learning algorithm/method. Closeness values can apply to both functional characteristics and to non-functional characteristics, as well as to syntactical versus semantics-related aspects.

Since, in the present example, where the user-input request includes the single criteria "Coverage Domain/Information," only one criterion is specified, it is assigned 100% weight. The results can be identified, and a signal representing the results can be sent to cause display of the results to a user (e.g., via GUI interface) as shown in Table 1A:

| Kad ID | KadLink | KadLinkPublic | KadName | DomainName | HitCounter | Usage Statistics | Score | Absolute Score |
|---|---|---|---|---|---|---|---|---|
| 1 | https://www.archem . . . | https://www.archemy . . . | New Cadillac Database | Business Solution | 2 | View Usage Statistics | 95 | 100 |
| 3 | https://www.archem . . . | https://www.archemy . . . | Biobanking Semantic | Business Solution | 1 | View Usage Statistics | 89 | 94 |
| 5 | https://www.archem . . . | https://www.archemy . . . | Real-Time Social Sentiment | Business Solution | 3 | View Usage Statistics | 75 | 79 |
| 6 | https://www.archem . . . | https://www.archemy . . . | ArchNav Multidimens . . . | Business Solution | 4 | View Usage Statistics | 70 | 74 |

Next, suppose a user-input request includes the criteria "Coverage Domain/Information" and "Scope/Partial," where each criteria includes a weight of 50 and a closeness value of 100. The results can again be generated as discussed above, and appear as shown in Table 1B:

| Kad ID | KadLink | KadLinkPublic | KadName | DomainName | HitCounter | Usage Statistics | Score | Absolute Score |
|---|---|---|---|---|---|---|---|---|
| 1 | https://www.archem . . . | https://www.archemy . . . | New Cadillac Database | Business Solution | 2 | View Usage Statistics | 96 | 100 |
| 3 | https://www.archem . . . | https://www.archemy . . . | Biobanking Semantic | Business Solution | 1 | View Usage Statistics | 92 | 96 |
| 4 | https://www.archem . . . | https://www.archemy . . . | EA Management as a . . . | Business Solution | 6 | View Usage Statistics | 84 | 87 |
| 5 | https://www.archem . . . | https://www.archemy . . . | Real-Time Social Sentiment | Business Solution | 3 | View Usage Statistics | 72 | 75 |
| 6 | https://www.archem . . . | https://www.archemy . . . | ArchNav Multidimens . . . | Business Solution | 4 | View Usage Statistics | 68 | 71 |

The results in Table 1B include the results of Table 1A as well as the EA Management as a service solution, by virtue of its match to the second criterion ("Scope/Partial"). Note that the score and ranking of the Biobanking Semantic Layer Middleware has increased because it matches both criteria, and the scores of the New Cadillac Database Web Platform, the Real-Time Sentiment Analyzer component, and the ArchNav solution have dropped, since they match the first criterion but not the second. The amount by which they drop can depend on the assigned weight given to the second criteria.

Next, suppose a user-input request includes the criteria "Scope/Partial," "Innovation Area/Process," and "Coverage Domain/Information," where the first two criteria have a user-defined weight of 25, the third criteria has a user-defined weight of 50, and each of the criteria has a closeness value (e.g., a user-defined closeness) of 100. The results can again be generated as discussed above, and appear as shown in Table 1C:

| Kad ID | KadLink | KadLinkPublic | KadName | DomainName | HitCounter | Usage Statistics | Score | Absolute Score |
|---|---|---|---|---|---|---|---|---|
| 1 | https://www.archem . . . | https://www.archemy . . . | New Cadillac Database | Business Solutions | 2 | View Usage Statistics | 94 | 100 |
| 3 | https://www.archem . . . | https://www.archemy . . . | Biobanking Semantic | Business Solutions | 1 | View Usage Statistics | 91 | 97 |
| 2 | https://www.archem . . . | https://www.archemy . . . | Heterogeneous Data Integration Platform | | 1 | View Usage Statistics | 89 | 95 |
| 4 | https://www.archem . . . | https://www.archemy . . . | EA Management as a . . . | Business Solutions | 6 | View Usage Statistics | 77 | 82 |
| 5 | https://www.archem . . . | https://www.archemy . . . | Real-Time Social Sentiment | Business Solutions | 3 | View Usage Statistics | 72 | 77 |
| 6 | https://www.archem . . . | https://www.archemy . . . | ArchNav Multidimens . . . | Business Solutions | 4 | View Usage Statistics | 65 | 69 |

The results in Table 1C include the results of Table 1B as well as the Heterogeneous Data Integration Platform as a service solution, by virtue of its match to the newly-added criterion ("Innovation Area/Process").

Next, suppose the criterion "Innovation Area/Process" is removed from the request, such that the Scope/Partial criterion has a weight of 25 and a closeness of 100, and the Coverage Domain/Information has a weight of 75 and a closeness of 100. The recalculated results can be generated as discussed above, and appear as shown in Table ID:

| Kad ID | KadLink | KadLinkPublic | KadName | DomainName | HitCounter | Usage Statistics | Score | Absolute Score |
|---|---|---|---|---|---|---|---|---|
| 3 | https://www.archem . . . | https://www.archemy . . . | Biobanking Semantic | Business Solutions | 1 | View Usage Statistics | 98 | 100 |
| 1 | https://www.archem . . . | https://www.archemy . . . | New Cadillac Database | Business Solutions | 2 | View Usage Statistics | 91 | 93 |
| 6 | https://www.archem . . . | https://www.archemy . . . | ArchNav Multidimens . . . | Business Solutions | 4 | View Usage Statistics | 74 | 76 |
| 5 | https://www.archem . . . | https://www.archemy . . . | Real-Time Social Sentiment | Business Solutions | 3 | View Usage Statistics | 70 | 71 |
| 4 | https://www.archem . . . | https://www.archemy . . . | EA Management as a . . . | Business Solutions | 6 | View Usage Statistics | 66 | 67 |

Note that each result from the groupings/sets of results shown above can have values under each column heading (e.g., KadLink, KadLinkPublic, Usage Statistics, etc.) that differ in their content and/or uniform resource locator (URL) destination, or that are the same in their content and/or URL destination.

In any embodiment set forth herein involving communication between multiple compute nodes (e.g., querying, messaging, retrieving, etc.), the method associated with the communication can include an authentication step to determine whether the attempted interaction is permissible and/or to prevent malicious or unauthorized access to system data.

In some embodiments, a network of compute nodes includes a "node manager" that implements management functions shown and discussed with reference to FIGS. 9-11, below. The node manager can monitor node operations for one or more of the following attributes: suitability (e.g., Quality of Service (QoS) or overall Quality of Experience (QoE)), applicability (e.g., functional fitness), portability (e.g., Cloud portability), suitability, reliability, usability, efficiency, performance, scalability, maintainability, compatibility, and security (or securability), as they relate to the desired capabilities of an end-user (or "user"). "Applicability," as used herein, can refer to the ability of a solution (e.g., one or more software components) to meet a desired capability of a user, and can be implemented within DKMF node managers via an associated extensibility platform. "Suitability," as used herein, can refer to the accuracy or correctness of a solution (e.g., one or more software components) in achieving/accomplishing the desired capability. "Security"/securability can be implemented using a role-based access control (RBAC) platform (also referred to as ArchSec). “(Cloud) Portability” can be implemented via a platform that leverages (Cloud) services abstract factories. “Reliability” can be implemented via underlying clustering and the use of a Cloud infrastructure.

“Usability” can be implemented via a platform that leverages multichannel Model-View-Controller (MVC) abstract factories. MVC refers to the industry-accepted architectural pattern that should be used to create modem web application frameworks (e.g., Django, MEAN/React stacks). The “View” in “Model-View-Controller” relates to a layer of software components that creates a presentation (e.g., web page display in a browser) from a rendering (e.g., a templated web page expressed using HTML5/CSS3/Javascript). The “Controller” in “Model-View-Controller” relates to a layer of software components that creates a rendering by dynamically plugging data obtained from the Model layer into a template (e.g., Django Template) that can be processed and passed by the Controller to the View layer. The “Model” in “Model-View-Controller” relates to a layer of software components that allows retrieval of data from a database, and can also include a mapping that facilitates transformation of such data (e.g., object-relational mapping) as well as a custom program that massages the data on the server side and completes any other necessary steps (if any) before passing the data to the Controller. In some implementations, patterns like MVC are used as part of the software component vetting process. For example, a component that implements part of a web framework may be reusable, but may not yet be “vetted” for cataloguing in ArchKnow if it does not align with architectural best practices subsumed by MVC and/or other patterns.

“Efficiency” and “performance” can be implemented via the Archemy “Fog and Edge” nodes constellation approach, as opposed to a purely Cloud-centric approach. “Scalability” can be implemented via the use of Cloud-based high-performance computing (HPC). “Maintainability” can be implemented via the use of a NoOps approach based on the ArchDev active software development life cycle (SDLC), the AEAM and KAEAM approaches, and/or the overall Archemy Platform.

Factors that can impact or alter node manager decision processes regarding what and/or how to build or refine business solutions can include, but are not limited to: accessibility, accountability, accuracy, adaptability, administrability, affordability, agility, auditability, autonomy, availability, compatibility, composability, configurability, correctness, credibility, customizability, debugability, degradability, determinability, demonstrability, dependability, deployability, discoverability, distributability, durability, effectiveness, efficiency, usability, extensibility, failure transparency, fault tolerance, fidelity, flexibility, inspectability, installability, integrity, interoperability, learnability, maintainability, manageability, mobility, modifiability, modularity, operability, orthogonality, portability, precision, predictability, process capabilities, producibility, provability, recoverability, relevance, reliability, repeatability, reproducibility, resilience, responsiveness, reusability, robustness, safety, scalability, seamlessness, self-sustainability, service-ability, securability, simplicity, stability, standards-compliance, survivability, sustainability, tailorability, testability, timeliness, and traceability.

Any of the foregoing attributes can be stored, for example, on one or more compute nodes of a specific domain network and/or accessible by the one or more compute nodes of a specific domain network. The network of compute nodes can also include and/or access a centralized compute node (e.g., via an API, referred to herein as ArchNav) that stores an Enterprise Catalog (also referred to herein as ArchKnow). The Enterprise Catalog can include multiple “best practice” reusable software components that can be tagged with one or more taxonomy elements, so that they are returned in response to a query referencing the one or more taxonomy elements. The reusable software components can be included in a set of “ArchiFacts,” defined herein as best practice reusable solution components within the Archemy Assets Catalog. The Enterprise Catalog can be continuously and/or intermittently (e.g., according to a predefined schedule) be updated and curated (i.e., additional reusable software components, which may be manually and/or automatically “vetted,” can be identified and added to the Enterprise Catalog). The Enterprise Catalog leverages a growing collection of ontologies, taxonomies, namespaces, bindings, and/or metrics that can be used to evaluate and/or enhance active business solutions by precisely describing the semantics of their underlying data and application components as well as their usage location characteristics, individual user profiles/information, company profiles/information, and business-specific functional needs, as well as expected qualities of experience (QoE) and service (QoS). Table 2, below, shows an example collection of ArchiFacts with their associated properties.

TABLE 2

Example ArchiFacts (Enterprise Catalog excerpt)

| (KadID) ArchiFact Name | Dimension | Area |
|---|---|---|
| (1) New Cadillac Database Web Platform | Coverage Domain | Information |
| | Coverage Domain | Master (Cross-Domain) |
| | Coverage Domain | Hybrid/Views |
| | Scope | Division |
| | Scope | Enterprise |
| | Innovation Area | Process |
| | Innovation Area | Output |
| (2) Heterogeneous Data Integration Platform | Coverage Domain | Hybrid/Views |
| | Scope | Enterprise |
| | Innovation Area | Process |
| | Innovation Area | Output |
| (3) Biobanking Semantic Layer Middleware | Coverage Domain | Information |
| | Coverage Domain | Master (Cross-Domain) |
| | Scope | Partial |
| | Innovation Area | Process |
| (4) EA Management as a Service Solution | Coverage Domain | Business |
| | Coverage Domain | Application |
| | Coverage Domain | Hybrid/Views |
| | Scope | Partial |
| | Innovation Area | Process |
| | Innovation Area | Output |
| (5) Real-Time Social Sentiment Analyzer | Coverage Domain | Business |
| | Coverage Domain | Information |
| | Coverage Domain | Hybrid/Views |
| | Scope | Enterprise |
| | Innovation Area | Input |
| | Innovation Area | Process |
| | Innovation Area | Output |
| (6) ArchNav Multidimensional Search Solution | Coverage Domain | Information |
| | Innovation Area | Output |

As shown in Table 2 above, ArchiFacts within ArchNav can be defined using Dimension and Area parameters. ArchNav can capture descriptive rules expressed using various taxonomies by mapping the various levels of nesting of these taxonomies to Dimensions (at the top-level), and then Areas, and Sub-Areas. Areas can be recursively nested, which allows the capture of deeply nested taxonomy terms. Dimensions can be orthogonal to each other. For example, in the Architecture Description Language (ADL)/Taxonomy, "Coverage Domain" is a dimension that relates to whether a component falls under the business, application, data/information, and/or infrastructure domain areas of classification. "Scope" is another dimension that expresses the degree of completeness of a component (e.g., partial). In some implementations, the ADL taxonomy includes multiple (e.g., 13) orthogonal dimensions at the top of the classification. Dimensions can have a recursive number of areas that facilitate very fine grained characterization. In an example healthcare symptom taxonomy, there may only be two levels (e.g., pain and swelling can be Dimensions, where the intensity of the pain and swelling would be the Area level such as "acute" pain or "intense" swelling). As symptoms are further described, an increasingly precise use of a taxonomy can assist doctors and/or AI tools such as LymphMeter provide diagnosis. With the Dimensions and recursive Areas levels as part of the ArchNav user interface, a user can enter any deeply nested rule by specifying the Dimension, then the Area and its parent Area without having to fill in the complete hierarchy, which would take considerable time, e.g., to specify deeply nested tree structures. In most embodiments, taxonomy descriptions are received via the ArchNav programmatic API and may, for example, be generated by a ML-driven matching algorithm to align gap descriptions (e.g., lack of or insufficient applicability/suitability) with descriptions of one or more catalogued solutions that can be adapted/reused and then deployed to address such gaps.

Some compute nodes in the network can have API-only access to the centralized ArchNav node (e.g., via a runtime interface), while other nodes can be development nodes that include workbench functionality (e.g., with different and/or more permissions to perform tasks within the network or system).

In some embodiments, a needed or recommended modification to a compute node and/or to a compute node network architecture, software, component set, etc., is detected by a compute node (e.g., by an administrative or centralized node, e.g., ArchNav), and can result in a signal generated to request that a user accept or authorize the needed or recommended modification. Alternatively, one or more compute nodes of the network can autonomously deploy such modifications, for example if a sufficiently imminent and/or impactful threat to security or data is detected, and/or based on administrator-defined or user-defined settings. Alternatively or in addition, in some embodiments, one or more compute nodes of the network can actively, dynamically and/or autonomously implement changes to the taxonomy and/or to the Enterprise Catalog, in real-time, in response to one or more of: machine-observed system performance, alerts detected, user-observed system performance, and/or qualitative user feedback (i.e., indicators of user "sentiment"). As used herein, "active" (or "actively") refers to the implementation of adaptations in an intelligent (e.g., using AI/ML), autonomous (e.g., using AI-driven autonomous systems capabilities and/or robotics), and/or collaborative (e.g., using an intelligent agent protocol to enable nodes to communicate with other intelligent networked nodes and optionally humans to create augmented/assisted intelligence and more precise autonomous reactions) fashion.

Systems and methods of the present disclosure find applicability in a wide range of applications and contexts, including (but not limited to) finance, healthcare, manufacturing, hobbyists (e.g., collectiors), insurance, autonomous vehicles, music, legal, real estate, museum (e.g., art museums), interactive human training, and technology incubation, etc., and can provide curated, dynamic software component based solutions therefor. For example, a HealthMeter system, shown and described with reference to FIG. 92 below, can track the status and progress of lymphedema patients. A user of the HealthMeter system can input symptoms and, if the symptoms are successfully matched via the taxonomy-based matching/querying process, results are returned and provided to the user/requestor, the results specifying whether and/or what treatment(s) are indicated by the symptom(s). Such systems can actively adapt to assimilate new symptom definitions, detect deficiencies in the taxonomy, etc.

FIG. 1 is a block diagram showing a compute node, according to some embodiments.

As shown in FIG. 1, the compute node 100 includes a memory 104 operably coupled to a processor 102, and also includes a transceiver 106 and, optionally, a telemeter 108, for communication with one or more other compute nodes (not shown). The memory 104 includes (or stores) a taxonomy 104*a*, application software units (ASUs) 104*b*, user data 104*c*, a normalizer module 104*d*, an optional search engine 104*e*, a local performance metrics pool 104*f*, an optional taxonomy manager 104*g*, an optional reusable software components manager 104*h*, an optional metrics manager 104*i*, and an optional KMP agent 104*j*. A compute node 100 can implement the KAEAM semi-automated phases shown in FIG. 13, which are a subset of all the KAEAM phases. The subset of phases can include "discovery," "reuse/adaptation," and "deployment." When the compute node 100 is a node manager, for example, it can include the taxonomy manager 104*g*, the business solutions (reusable components) manager 104*h*, the metrics manager 104*i*, and the KMP agent 104*j* to communicate with other compute nodes. When the compute node 100 does not include the search engine 104*e*, it can instead be configured to access a remote search engine instance (server) via a client API.

The local performance metrics pool 104*f* can be generated, for example, based on the execution and monitoring of request fulfillments performed by DKMF node. The local performance metrics pool 104*f* can be synchronized on a regular basis with a centrally managed/maintained business solutions network metrics pool, and can be used to ensure, or coordinate the adjustment of, one or more performance metrics (e.g., applicability, suitability, etc.), as discussed below. A user (who, in some embodiments, is a system administrator) 102 can interact with the compute node 100, for example via a graphical user interface (GUI) (not shown). The compute node 100 can be a DKMF execution node or a DKMF development node. DKMF nodes can include a node manager component, which ensures that the business solution that it is embedded in can behave in an active fashion and alter its behavior in an intelligent autonomous fashion and by possibly collaborating with other DKMF nodes that it communicates with on the Archemy business solutions network. DKMF execution nodes can access ArchNav functionality available on the business solutions network via an API. Some DKMF executions nodes can be configured to include an ArchNav UI in addition to the ArchNav API client functionality. DKMF development nodes can include the ArchNav UI. ArchNav can enable DKMF nodes to retrieve vetted reusable components that match descriptions specified via a collection of taxonomies and possibly new keywords. A DKMF node manager can communicate via the ArchNav API with another DKMF node that includes the ArchNav functionality and provides access to repositories of vetted reusable components. DKMF nodes use the ArchNav functionality to identify a matching solution set, for example when an adequate solution set cannot be matched locally to the DKMF node manager (as explained further below). The compute node 100 can be part of a wireless or wired compute network (not shown in FIG. 1), and configured to communicate with one or more other (remote) compute devices within that network. When the compute node 100 is part of a wireless or wired compute network, that network can be associated, in some implementations, with a particular domain and not other domains. Alternatively or in addition, when the compute node 100 is part of a wireless or wired compute network, that network can be in operable communication with another, distinct wireless or wired network, in what is herein referred to as a P2P configuration.

Figure 2A:
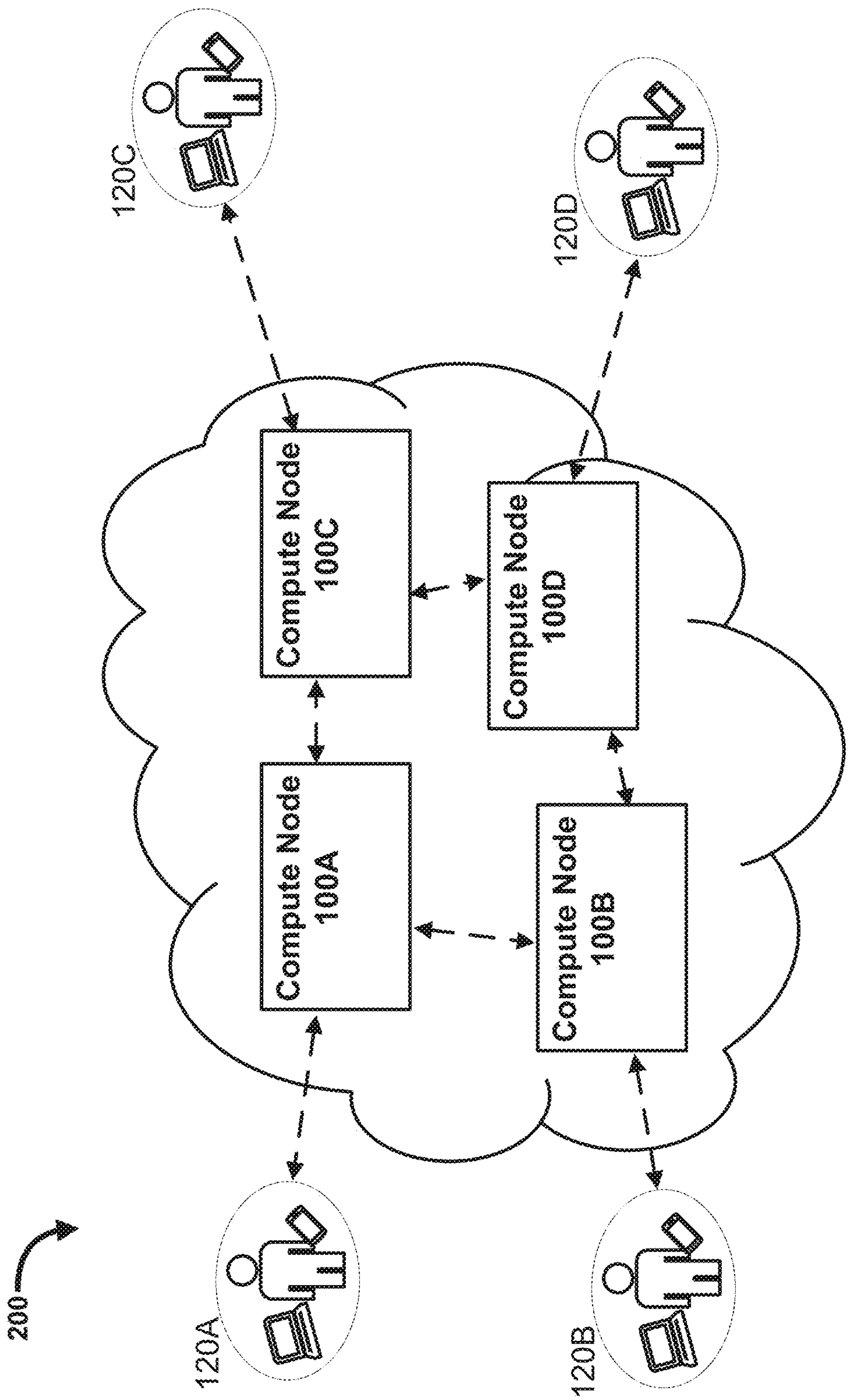
FIG. 2A is a system diagram showing multiple networked compute nodes, according to some embodiments.

FIG. 2A is a system diagram showing multiple networked compute nodes within a single network, according to some embodiments. As shown in FIG. 2A, the system 200 includes multiple (four) compute nodes, 100A-100D, each with an optional associated user (120A-120D, respectively). Each of compute nodes 100A-100D can communicate with each other compute node of the network, or with a subset thereof. Such a configuration facilitates, for example, the retrieval, by a first compute node of that network/domain, of software components, taxonomies, and/or other data from at least a second compute node of that network/domain that is in communication with the first compute node.

Figure 2B:
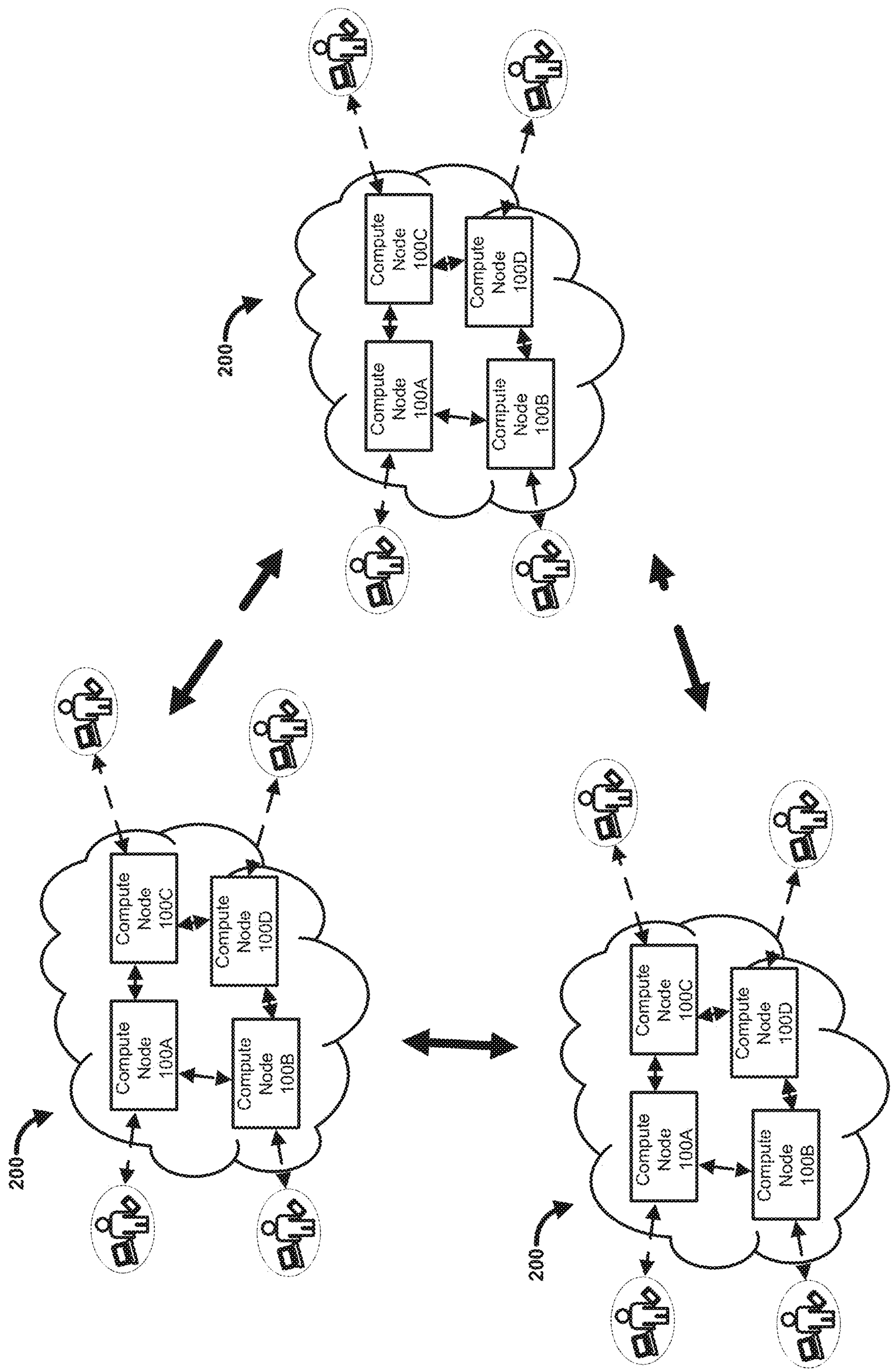
FIG. 2B is a system diagram showing multiple interacting, domain-specific networks of compute nodes, according to some embodiments.

FIG. 2B is a system diagram showing multiple interacting, domain-specific networks of compute nodes (i.e., the system 200 of FIG. 2A, replicated three times) in a P2P configuration, according to some embodiments. As shown in FIG. 2B, each of the networked systems 200 can communicate with each of the other networked systems 200 within the P2P setting. Such configurations facilitate, for example, the retrieval, by a first compute node of a first network/domain, of software components, taxonomies, and/or other data from at least a second compute node of a second network/domain in communication with the first network/domain.

Figure 3:
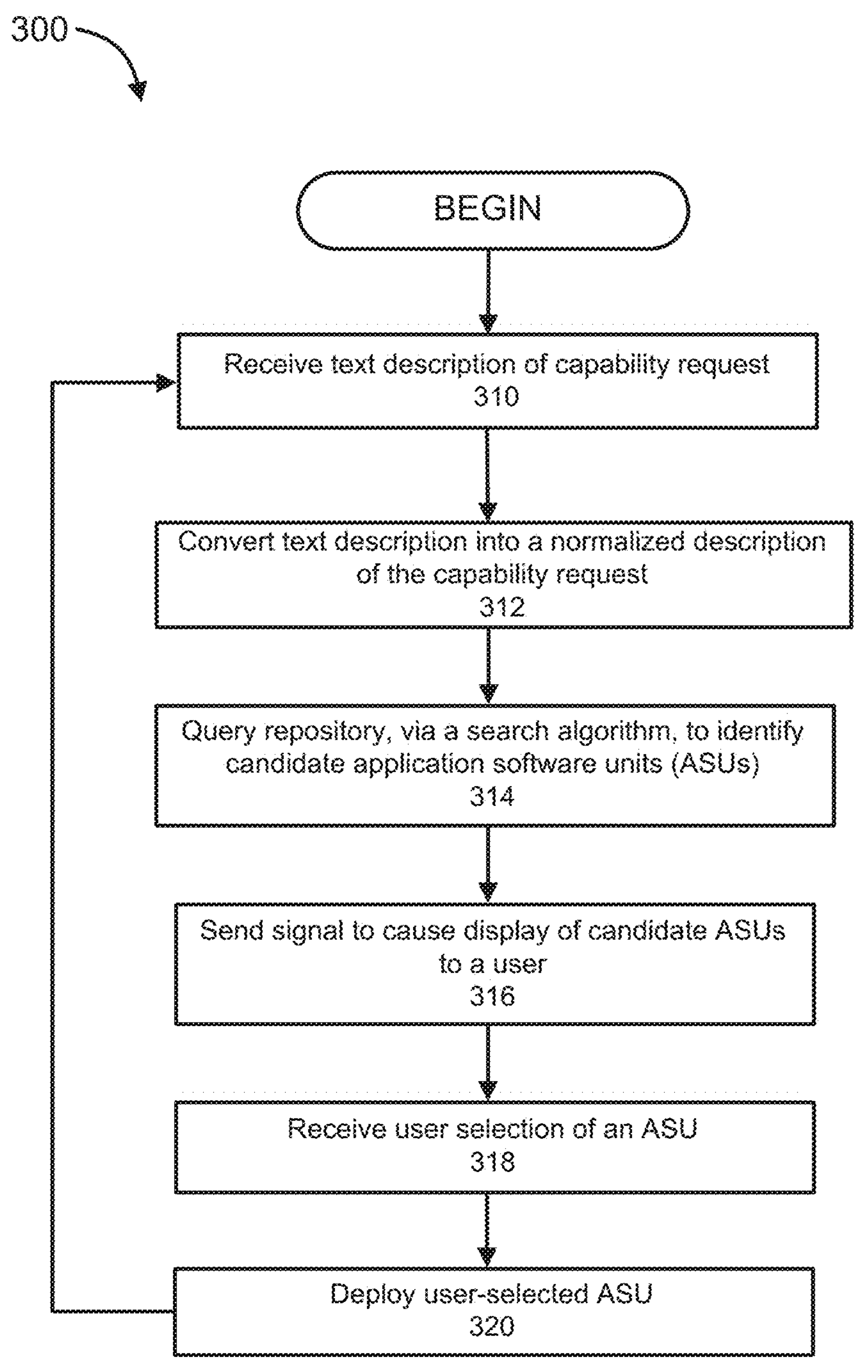
FIG. 3 is a flow diagram showing a method of handling system capability requests, according to some embodiments.

FIG. 3 is a flow diagram showing a method of handling system capability requests, according to some embodiments. The method 300 can be implemented using a system such as is shown in FIG. 1, for example via a non-transitory processor-readable medium storing code representing instructions to cause a processor to perform the steps of FIG. 3. As shown in FIG. 3, the method 300 includes receiving, at 310, a text description of a system capability request. The text description of the system capability request can include one or more criteria and, optionally, one or more weightings (e.g., user-defined weightings) associated with each criteria. The method 300 also includes converting the text description, at 312, into a normalized description of the system capability request. A repository is then queried, at 314, based on the normalized description and using a search algorithm, to identify multiple candidate application software units (ASUs). The search algorithm can include a classification search, a fuzzy search, a distance vector, or a machine learning algorithm. The candidate ASUs are displayed to a user for selection, as a result of a signal being sent to the user's compute device to cause the display of the candidate ASUs, at 316. The candidate ASUs can be displayed according to an order, e.g., calculated by the system based on the weightings from the system capability request. A user selection, from among the displayed candidate ASUs, is received, at 318. The user-selected ASU is then deployed, at 320, either locally or to at least one remote compute device, in response to receiving the user selection. Deployment can include the user-selected candidate ASU being integrated into a local or remote software package, thus defining a modified software package that is configured to provide the system capability.

After the user-selected candidate ASU has been deployed, the system may detect, in some embodiments, a deficiency in the user-selected candidate ASU. As used herein, a "deficiency" can include, but is not limited to, a run-time error, a compilation error, an outdated software version, a missing software patch, a performance metric (e.g., processor speed, processor computation efficiency, etc.) that fails to meet a predefined threshold value, or a user-defined deficiency (which may be quantitative or qualitative). The detection of the deficiency can be based, for example, on a user input and/or on an automated, real-time cognitive analysis. In response to detecting the deficiency, the system can autonomously trigger a service request to cause one of an update to or a replacement of the user-selected candidate application software unit. Alternatively or in addition, and in response to detecting the deficiency, the system can update a taxonomy associated with the plurality of candidate ASUs, and the user-selected candidate ASU can be modified or replaced with a replacement application software unit. In response to the taxonomy updating and/or the modification or replacement of the user-selected candidate application software unit, software deployment (e.g., of the replacement application software unit) to at least one remote compute device can be triggered or otherwise set in motion, without user intervention. Alternatively or in addition, and in response to detecting the deficiency, the system can update a taxonomy associated with the plurality of candidate ASUs, and a proposed replacement application software unit can be identified based on the updated taxonomy. A signal can be sent to cause display of the proposed replacement application software unit to the user, and subsequently, a signal can be received that represents a user acceptance of the proposed replacement application software unit. Deployment of the proposed replacement application software unit to the at least one remote compute device can then be performed.

In some embodiments, the plurality of candidate ASUs is a first plurality of candidate ASUs, and the code includes instructions to cause the processor to detect, during execution of the user-selected candidate application software unit, a deficiency in the user-selected candidate application software unit. In response to detecting the deficiency, a taxonomy associated with the plurality of candidate ASUs can be updated, and a second plurality of candidate ASUs based on the updated taxonomy can be identified. A signal can be sent to cause display of the second plurality of candidate ASUs to the user, and subsequently, a signal can be received that represents a user selection of a candidate application software unit from the second plurality of candidate ASUs. In response to the user selection, the user-selected candidate application software unit from the second plurality of candidate ASUs can be sent to the at least one remote compute device.

In some embodiments, the code also represents instructions to cause the processor to detect, during execution of the user-selected candidate application software unit, a modification to at least one candidate application software unit from the plurality of candidate ASUs of the repository, or a taxonomy associated with at least one candidate application software unit from the plurality of candidate ASUs of the repository. In response to detecting the modification, a signal, including data associated with the modification, can be sent to a user (e.g., as a signal for presentation via a GUI interface) and/or to a public distributed ledger for recording therein.

In some embodiments, the code also represents instructions to cause the processor to detect, during execution of the user-selected candidate application software unit, usage of the user-selected candidate application software unit. In response to detecting the usage, a signal, including data associated with the usage, can be sent to a public distributed ledger for recording therein.

In some embodiments, the code also represents instructions to cause the processor to detect, autonomously via the agent of that processor and/or via the agent of a processor of another compute node, an update to a taxonomy associated with at least one candidate application software unit from a plurality of candidate ASUs. In response to detecting the update to the taxonomy, an alert referencing the update to the taxonomy can be generated (e.g., via the agent) and at least one of presented (e.g., via a GUI interface) to the user of that compute node, sent to a remote compute node for presentation (e.g., via a GUI interface) to a user thereof, and sent to a centralized ArchNav compute node.

In some embodiments, the code also represents instructions to cause the processor to receive a notification that a new software component is available. In response to receiving the notification that the new software component is available, a request for the new software component can be sent. In response to the request, the new software component can be received, and the new software component can be integrated, e.g., automatically via the agent, into the software package.

In still other embodiments, systems of the present disclosure can interact with a public distributed ledger (implemented using, e.g., Blockchain technology) for the purposes of financial recordkeeping, billing, etc.

Figure 4:
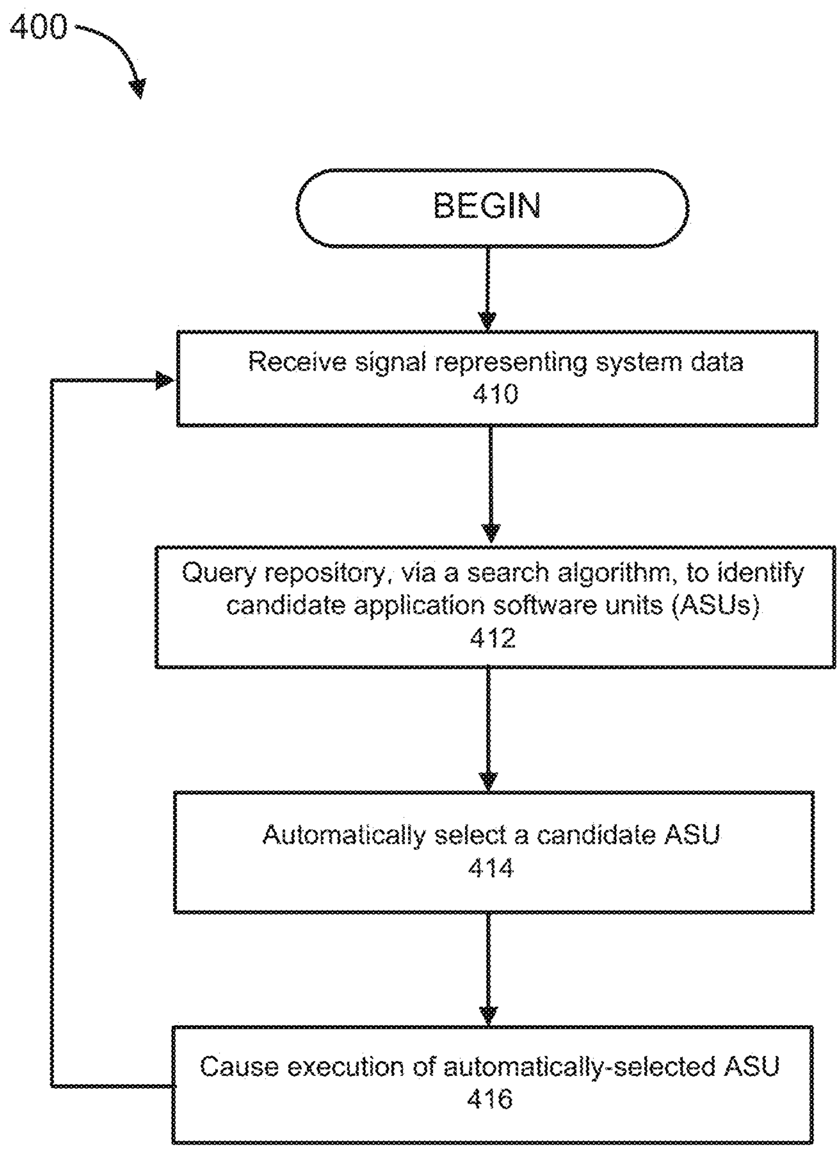
FIG. 4 is a flow diagram showing a method of handling system capability requests, according to some embodiments.

FIG. 4 is a flow diagram showing a method of handling system capability requests, according to some embodiments. The method 400 can be implemented using a compute node, such as compute node of FIG. 1, for example via a non-transitory processor-readable medium storing code representing instructions to cause a processor to perform the steps of FIG. 4. As shown in FIG. 4, the method 400 includes receiving, at 410 and via a processor of the compute node, a signal representing system data associated with at least one system capability request associated with a system capability. The system data may be received in a normalized format. A repository of the compute node can be queried, at 412, using a search algorithm of the processor and in response to receiving the system data, to identify a plurality of candidate ASUs suitable for addressing the at least one system capability request. The repository can be stored within and accessible via a network of nodes. The query can reference the system data. A candidate application software unit can be automatically selected (e.g., by the processor of the compute node), at 414, from the plurality of candidate ASUs. The instructions can also cause the processor of the compute node to execute, at 416, the automatically selected candidate application software unit on at least one remote compute device in response to automatically selecting the candidate application software unit. The automatically selected candidate application software unit can optionally (e.g., as part of the execution step) be integrated into a local software package of the compute device and/or at least one remote compute device to define a modified software package that is configured to provide the requested system capability. The identifying the plurality of candidate ASUs (412) and/or the automatically selecting the candidate application software unit from the plurality of candidate ASUs (414) can include one of a deep learning (DL) algorithm or a reinforcement learning (RL) algorithm.

In some embodiments, the execution of the automatically selected candidate ASU includes modifying a software associated with the automatically selected candidate application software unit based on a taxonomy.

In some embodiments, the method 400 also includes detecting, during execution of the automatically selected candidate ASU, a deficiency in the automatically selected candidate ASU, and in response to detecting the deficiency, cause deployment of a replacement application software unit to the at least one remote compute device. The method 400 can also include storing, in memory, data associated with the deployment of the replacement application software unit in a distributed ledger.

In some embodiments, the method 400 also includes gathering at least one of usage data and suitability data during execution of the automatically selected candidate ASU. The method 400 can also include at least one of updating a taxonomy, or modifying a software associated with the automatically selected candidate application software unit, based on the at least one of usage data and suitability data.

In some embodiments, the method 400 also includes detecting, during execution of the automatically selected candidate ASU, a modification to a data store of the repository, and in response to detecting the modification, automatically causing deployment of at least one replacement application software unit to the at least one remote compute device.

In some embodiments, the method 400 also includes receiving, prior to receiving the system data, an access token from a requestor (e.g., a user or a compute node associated with a user) via a dashboard hosted by the processor, and authenticating, prior to receiving the system data, the requestor and/or the user based on the access token.

Figure 5:
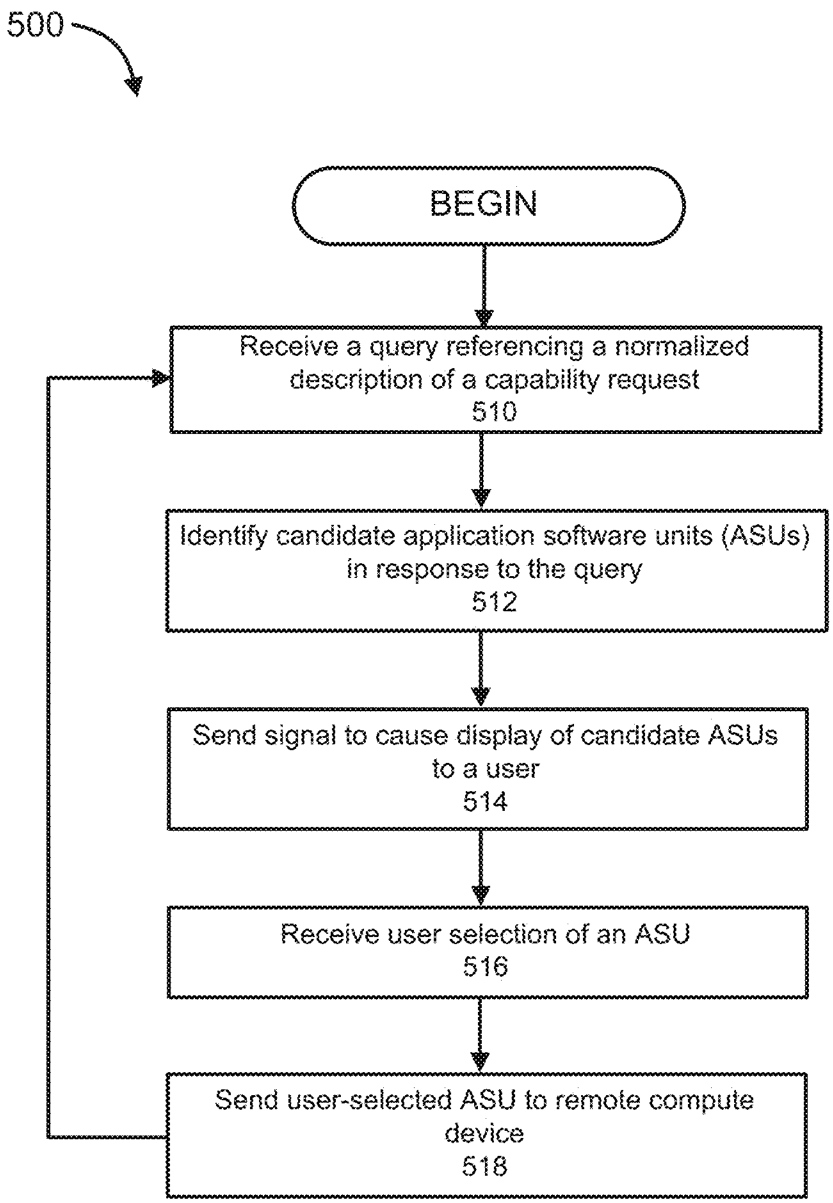
FIG. 5 is a flow diagram showing a method of handling system capability requests, according to some embodiments.

FIG. 5 is a flow diagram showing a method of handling system capability requests, according to some embodiments. The method 500 can be implemented using a compute node, such as the compute node 100 of FIG. 1 or any of compute nodes 100A-100D of FIG. 2A, for example via a non-transitory processor-readable medium storing code representing instructions to cause a processor to perform the steps of FIG. 5. As shown in FIG. 5, the method 500 includes receiving, at 510, at a processor, a query referencing a normalized description of at least one system capability request, and identifying, at 512 and in response to the query, a plurality of candidate ASUs based on a search of a repository operably coupled to the processor. A signal including a representation of each candidate application software unit from the plurality of candidate ASUs can be sent, at 514, and in response, a signal representing a user selection of a candidate application software unit from the plurality of candidate ASUs can be received at 516. The user-selected candidate application software unit can then be sent, at 518, to at least one remote compute device in response to receiving the user selection, such that the user-selected candidate application software unit is integrated into a software package of the at least one remote compute device to define a modified software package that includes the system capability.

The at least one system capability request can be defined, for example, according to a taxonomy. Alternatively or in addition, one or more of the candidate ASUs from the plurality of candidate ASUs can be characterized according to a taxonomy.

In some implementations, the plurality of candidate ASUs can be associated with a common architecture domain. The common architecture domain can be, for example, a business domain, an application domain, a data domain, or a technology domain.

Figure 6:
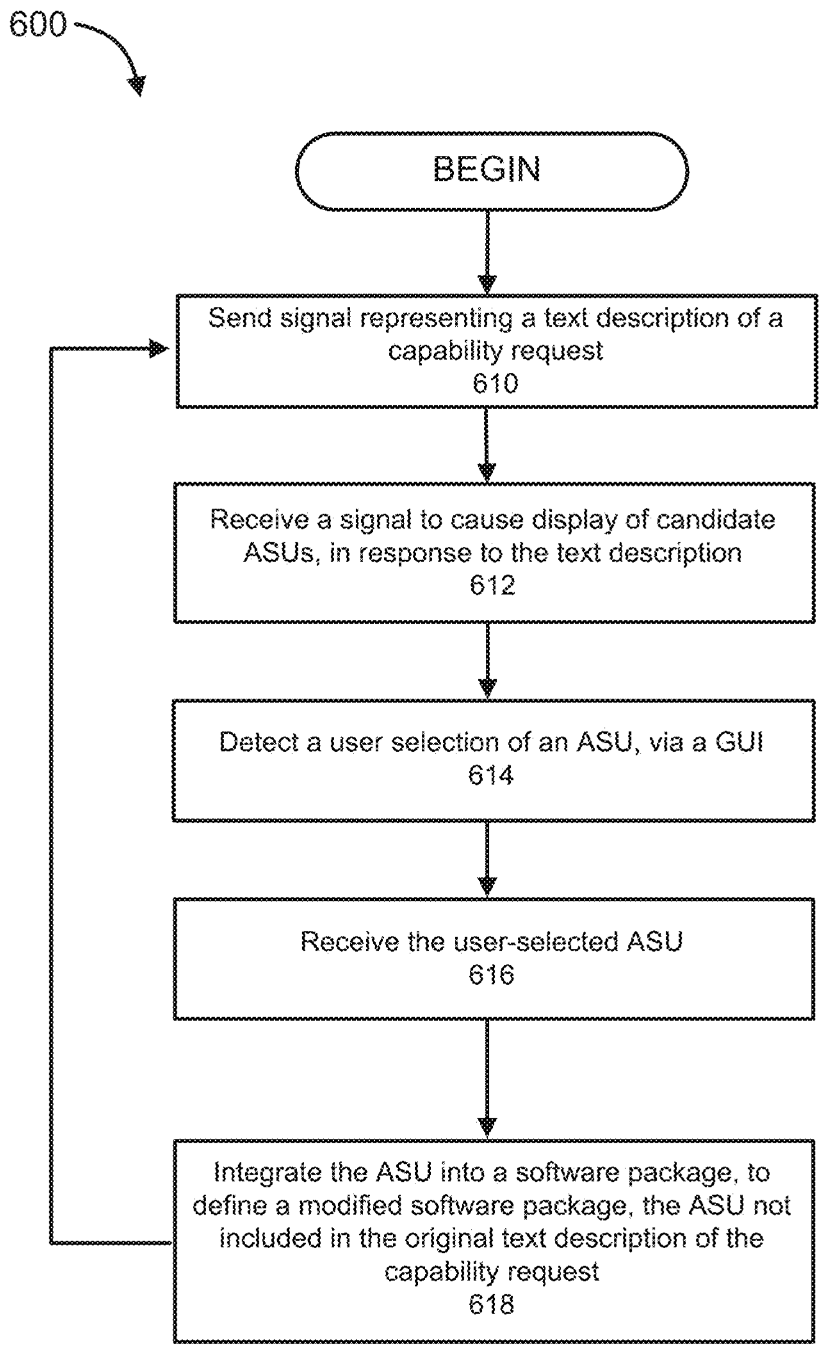
FIG. 6 is a flow diagram showing a method of handling system capability requests, according to some embodiments.

FIG. 6 is a flow diagram showing a method of handling system capability requests, according to some embodiments. The method 600 can be implemented using a compute node, such as the compute node 100 of FIG. 1 or any of compute nodes 100A-100D of FIG. 2A, for example via a non-transitory processor-readable medium storing code representing instructions to cause a processor to perform the steps of FIG. 6. As shown in FIG. 6, the method 600 includes sending, at 610 and via a processor, a first signal representing a text description of at least one system capability request associated with a system capability. A second signal is then received, at 612, at the processor and in response to the first signal, to cause display of a representation of each candidate application software unit from a plurality of candidate ASUs. A user selection of a candidate application software unit from the plurality of candidate ASUs can be detected, at 614 via a graphical user interface (GUI) executed by the processor. In response to a user selection made via the GUI, the user-selected candidate application software unit can be received, at 616. The user-selected candidate application software unit can then be integrated, at 618 and via an agent executed by the processor, into a software package stored in a memory operably coupled to the processor, to define a modified software package that includes the system capability. In some such implementations, the text description of the at least one system capability request associated with a system capability does not specify the user-selected candidate application software unit. In other words, the integration of the user-selected candidate application software unit need not be in response to a direct request for that application software unit.

In some embodiments, the method 600 also includes detecting, autonomously via the agent of the compute node, a software update that is one of available for or needed by the modified software package, and generating, via the agent and in response to detecting the software update, an alert referencing the software update.

In some embodiments, the method 600 also includes sending performance data during execution of the user-selected candidate ASU. The performance data can include one or more of historical usage data, computing device performance metrics (e.g., speed, data volume, login history, etc.), applicability data, suitability data, security data, and/or portability data. In response to sending the performance data, a signal representing actionable feedback data is received, and the actionable feedback data can be displayed via the GUI.

In some embodiments, the method 600 also includes sending, from the compute node and prior to sending the first signal, an access token to a remote server for authentication. The access token can represent data such as user credentials and/or compute node credentials (e.g., identifiers, internet protocol (IP) address, password, etc.). In response to sending the access token, a confirmation message can be received from the remote server.

In some embodiments, a system includes a plurality of compute nodes, each compute node from the plurality of compute nodes in operable communication with each other compute node from the plurality of compute nodes via a communications network (e.g., a peer-to-peer, or "P2P" network). Each compute node from the plurality of compute nodes can include a memory storing code representing instructions to cause a processor to receive, at a processor of that compute node, a signal representing system data associated with at least one system capability request associated with a system capability. A repository is queried, using a search algorithm of the processor of that node and in response to receiving the system data, to identify a plurality of candidate ASUs suitable for addressing the at least one system capability request. The query can reference the system data. A candidate application software unit is automatically selected from the plurality of candidate ASUs, and that compute node can cause execution of the automatically selected candidate application software on that compute node, in response to automatically selecting the candidate application software unit, such that the automatically selected candidate application software unit is integrated into a software package of that compute node, to define a modified software package that is configured to provide the system capability.

In some embodiments, the system includes multiple networks (e.g., P2P networks) that are in communication with each other, where at least one network from the multiple networks is associated with a domain type that differs from a domain type of at least one other network from the multiple networks. For example, the plurality of compute nodes can be a first plurality of compute nodes associated with a first domain type, and the system can further include a second plurality of compute nodes, each compute node from the second plurality of compute nodes in operable communication with each other compute node from the second plurality of compute nodes via a communications network, the second plurality of compute nodes associated with a second domain type different from the first domain type. Examples of domain types include, but are not limited to: business, application, data, and technology. Each compute node from the second plurality of compute nodes can include a memory storing code representing instructions to cause a processor to receive, at a processor of that compute node, a signal representing system data associated with at least one system capability request associated with a system capability. A repository can then be queried, using a search algorithm of the processor of that node and in response to receiving the system data, to identify a plurality of candidate ASUs suitable for addressing the at least one system capability request, the query referencing the system data. A candidate ASU can be automatically selected from the plurality of candidate ASUs. That node, in response to automatically selecting the candidate application software unit, can then cause execution of the automatically selected candidate application software on that compute node such that the automatically selected candidate application software unit is integrated into a software package of that compute node, to define a modified software package that is configured to provide the system capability.

In some embodiments, the instructions to query a repository are stored by each memory of each compute node from the second plurality of compute nodes, and include instructions to query at least one of (1) a local repository of that compute node, (2) a repository of another compute node within the second plurality of compute nodes, and (3) a remote repository of a compute node from the first plurality of compute nodes.

Additional implementation details and embodiments are set forth in the following sections:

I. Additional Details—Introduction

As discussed above, systems and methods of the present disclosure facilitate reusable intelligent active and/or autonomous business solutions. "Intelligent applications"

are often expected to combine customer, product and operational insights (e.g., uncovered using traditional predictive and prescriptive machine learning analytics) with modem application development tools and user-centric designs, to create an ever-more compelling, more prescriptive user experience. As a result, the first generation of intelligent applications often "knows" how to support or enable key user decisions and continually learn from the user interactions to become even more relevant and valuable to those users.

Recent advances in the artificial intelligence (AI) field and in deep learning, have made it possible to build software applications that are trained to perform specific human tasks faster and more reliably. While it so appears that this second generation of intelligent applications (based on "cognitive analytics") are gradually becoming mainstream, harnessing the first and second generation of intelligent applications to implement end-to-end solutions to business problems (a.k.a., "business solutions") is challenging today, as the community is still mining the collective knowledge to discover underlying principles for designing neural network architectures and their more traditional machine learning counterparts. Furthermore, engineering complex business solutions invokes practical experience in Enterprise Architecture Management (EAM) and the ability to relate to and understand a decentralized set of independent interacting EAM processes, artifacts, and actors. In short, building end-to-end solutions to business problems calls for a deep understanding of the underlying business domains, value chains, and capabilities. It also subsumes the ability to relate to domain specific ontologies and taxonomies used to express the many underlying facets of such business capabilities and the associated pattern languages and best practices to develop meaningful business solutions in these domains. Assuming that business taxonomies and capabilities are qualified using terminology that is either accepted or approved by experts, it is generally possible to classify business problems and business solution assets according to sets of criteria in a taxonomy. The approach makes it possible to match and reuse business solutions when matched to business problems in a different context and then assemble taxonomy elements as needed to enable the implementation of end-to-end business solutions that address possibly unrelated business problems. Once solutions to business problems have been identified as a match for a given set of criteria within a taxonomy, a wide variety of methods can be used (e.g., via deep learning), to compare (fuzzy) matching solutions and identify/rank the best possible choices.

The aforementioned taxonomy-centric classification and subsequent comparison and selection steps that lead to identifying business solutions for reuse is what motivates the "Assets Catalog" driven approach to business solutions engineering described herein. Furthermore, the present disclosure sets forth a novel ecosystem and business solutions framework, leveraging an Assets Catalog primed with tacit expert knowledge, that makes it possible to create and evolve intelligent active and/or autonomous software applications that implement business solutions. The framework is tailored to manage applications that can handle new tasks in various business domains and make use of the latest applicable technologies as they become available to address the evolving needs of end users.

Although a variety of known techniques for implementing business solutions have been explored in specific domains and/or contexts, there does not appear to be a consensus on combining them to power an ecosystem and knowledge management framework that facilitates the creation and management of intelligent active and/or autonomous business solutions across multiple different business contexts. In the following sections, an ecosystem and framework are described that address the various challenges and technological gaps discussed above. First, a vision and motivation is introduced and a detailed description of the ecosystem and framework architecture is stepped through. Then, the architecture and design details of the framework are described and design choices are explained by laying out the theoretical framework that supports them. The next section provides a practical view of one or more embodiments in their current state along with implementation details. Finally, several examples of practical intelligent active and/or autonomous applications that make use of the framework to support the needs of users in various business domains are provided.

II. Vision and Motivation

You can already imagine putting on your augmented reality glasses and listening to the calm voice of your day-to-day digital assistant telling you about the work that your portfolio of intelligent active and/or autonomous applications has accomplished on your behalf while you were busy doing other things. This brief would include any new learnings that your applications have acquired to make your life easier. Of course, your assistant would inquire about your willingness to leverage such learnings and add them to your subscription plan. What we just described is an individualized personal assistant business solution that includes an extensible portfolio of connected intelligent active and/or autonomous applications and interacts with a human via an immersive augmented reality interface.

Embodiments of the present disclosure can involve the creation of business solutions that can become more and more active and/or autonomously able and intelligent via individualized learning and/or via support provided by a knowledge backbone. Intelligent active and/or autonomous applications will keep assisting businesses and humans until the time when their day-to-day processes are fully streamlined and automated but "leaving humans to provide the inspiration and the intuition," as Tim Berners-Lee stated.

While the ecosystem and framework described herein seeks to realize that vision, there are challenges to harnessing knowledge at many levels. For example, providing users of a personal assistant with the ability to surround themselves with intelligent solutions as they become available likely involves the ability to discover and become knowledgeable about these solutions and add them to their portfolio.

Of the many activities involved in harnessing knowledge, however, the first is to understand and to be tuned to the evolving ontology and taxonomy of a domain, to acquire the tacit knowledge that needs to be improved upon. Taxonomies appear to be key to the process of harnessing knowledge in a meaningful way. Different from machines, humans can name what they know and learning for them really comprises leveraging the taxonomies that pertain to what they know and be able to associate meaning to the keywords that are added to these taxonomies. Once humans learn, they may forget what they learned and need to re-learn it. It is therefore important to develop domain taxonomies that enable people to acquire, retrieve and evolve knowledge so they can manage situations based on such (e.g., managing life based on the knowledge of a medical condition that is evolving).

AI is clearly an important enabler when it comes to knowledge management. Deep learning can automate certain tasks that may involve looking through a lot of data, which today's computer technology can do fast and reliably using High Performance Computing (HPC) and leveraging GPU or quantum technology processors such as the ones being commercialized by NVIDIA or IBM respectively. More specifically, deep learning can be applied to create Artificial Neural Networks (ANN) that are able to recognize if entity instances are contained in a stream of inputs. Different from humans, once ANNs learn how to perform simple tasks, they always remember how to do so and are consistently fast at it. For example, Google in 2012, could create a "cat" ANN that taught itself how to identify cats in YouTube videos. However, while the ANN could identify these furry animals, it was not able to connect the cat pattern to the "word "cat" so that part of the knowledge had to be provided to name the ANN, which is the "taxonomy" linkage.

While the community is working on other forms of learnings such as reinforcement learning, and transfer learning to expand machine learning capabilities, it appears that for the time being, we can only rely on machines to know what to do (i.e., automate specific tasks) in some areas (e.g., speech and image recognition) once we know (and therefore are able to name) which tasks they need to perform. Furthermore, while we may be able to identify all the processes in a business process hierarchy, only a few of these processes or underlying activities are possible candidates for full automation via machine learning today. Let alone the fact that a machine would not be able to recognize associated tasks by name or know when to apply them out of context.

As a result, to realize our vision and address the challenge of harnessing knowledge at many levels, we developed an ecosystem and framework that combines the use of taxonomies derived from expert knowledge and machine learning to manage (i.e., create, discover, classify, and operate) intelligent knowledge-driven active and/or autonomous business solutions that are driven via individualized learning as well as support provided by a knowledge backbone.

The motivation that drives us to realize this grand vision is to make it possible for mankind to harness tacit and explicit knowledge and help capture and evolve business domain taxonomies that may be used to describe, classify, and operate intelligent business solutions. Such taxonomies should be based on the hierarchy of services/features understood by domain experts so that evolving knowledge of business domains can become explicit and benefit the users of business solutions in these domains. Various studies in many business domains have shown that employees who leave institutions after decades of service are not easily replaceable and the extent of knowledge loss for institutions is tremendous. Imagine a world where intelligent knowledge-driven, active and/or autonomous, business solutions would come to the rescue of these institutions and help them preserve and evolve knowledge as well as possibly execute some of the related tasks once performed by sophisticated human employees that were privy to that knowledge. Let alone institutions, we all face the same situation when we lose close ones and miss the ability to leverage their knowledge and collaborate with them in our day-to-day life.

Now that we have laid out our vision and motivation, we are ready to share more details about our approach. In the next section, we describe our ecosystem and framework in detail.

III. Intelligent Applications Ecosystem

The term "ecosystem" was originally defined as "the combined physical and biological components of an environment." Subsequent refinements expanded this definition. In particular, The Convention on Biological Diversity, known informally as the Biodiversity Convention, defined an ecosystem as a "dynamic complex of plant, animal and micro-organism communities and their non-living environment interacting as a functional unit." In the next subsection, we elaborate on our definition of an intelligent applications ecosystem and refer to it as a "Digital Knowledge Management Ecosystem" (DKME). We also elaborate on the various components of such an ecosystem. In subsection III.2, we provide a deep dive into the innerworkings of Archemy's own DKME implementation.

III.1. Digital Knowledge Management Ecosystem

Herein, we assimilate an ecosystem to a special type of system and adopt the definition of a system set forth in Donella Meadows, "Thinking in Systems: A Primer", ISBN-10: 1603580557, ISBN-13: 978-1603580557, Chelsea Green Publishing (Dec. 3, 2008), the contents of which are herein incorporated by reference in their entirety, for all purposes. In this context, the digital world may be thought of as a system of interconnected elements that is coherently organized in a way that achieves something (i.e., a function or purpose). The elements are the things that make up the system. The interconnections are the relationships that hold the elements of the system together. The function or purpose is what the system is supposed to accomplish. Important properties of systems, which are also possessed by ecosystems, include the fact that they are hierarchical (i.e., can be composed of many other smaller systems), dynamic (i.e., the behavior of systems over time changes), and have feedback loops (i.e., the stocks within systems can be depleted or grow based on flows).

What sets ecosystems apart from any other system and makes them an appropriate metaphor for digital ecosystems of businesses is two-fold. First, ecosystems are systems that are composed of intelligent, active and/or autonomous and adaptive agents. Second, ecosystems evolve when elements are added or removed, like food webs or food cycles. Digital ecosystems are often in great flux, with elements constantly being added and removed, and business must be able to think about how things might evolve when they make changes, when elements are not functioning well, or when they are missing entirely.

In the present disclosure, we are focusing on a DKME (ecosystem) that is designed to enable businesses to discover and leverage intelligent self-learning active and/or autonomous business solutions and operate them as interconnected elements. The function or purpose of these elements being that of evolving the overall ecosystem and/or its elements based on the identification of gaps in knowledge and/or related capabilities via real-time analysis of metrics gathered by the ecosystem and its interconnected elements. A significant component of the DKME described herewith is a digital knowledge base of ontologies and related taxonomies, business solutions components, and metrics pools independently compiled and shared by a community of ecosystem participants (e.g., Archemists) as well as runtime needs and feedback being communicated in real-time by interconnected business solution elements. The premise of such a knowledge-centered ecosystem is to allow the proactive evolution of digital ecosystems by considering the fact that, in addition to more traditional reasons, elements may not function well or are missing entirely because they do not leverage the latest knowledge or related capabilities.

DKMEs can be defined as follows: The digital knowledge ecosystem of a business is the combination of all relevant interconnected elements including digital knowledge management touchpoints, the people that interact with them, and the business processes and technology environment that support both.

Figure 7:
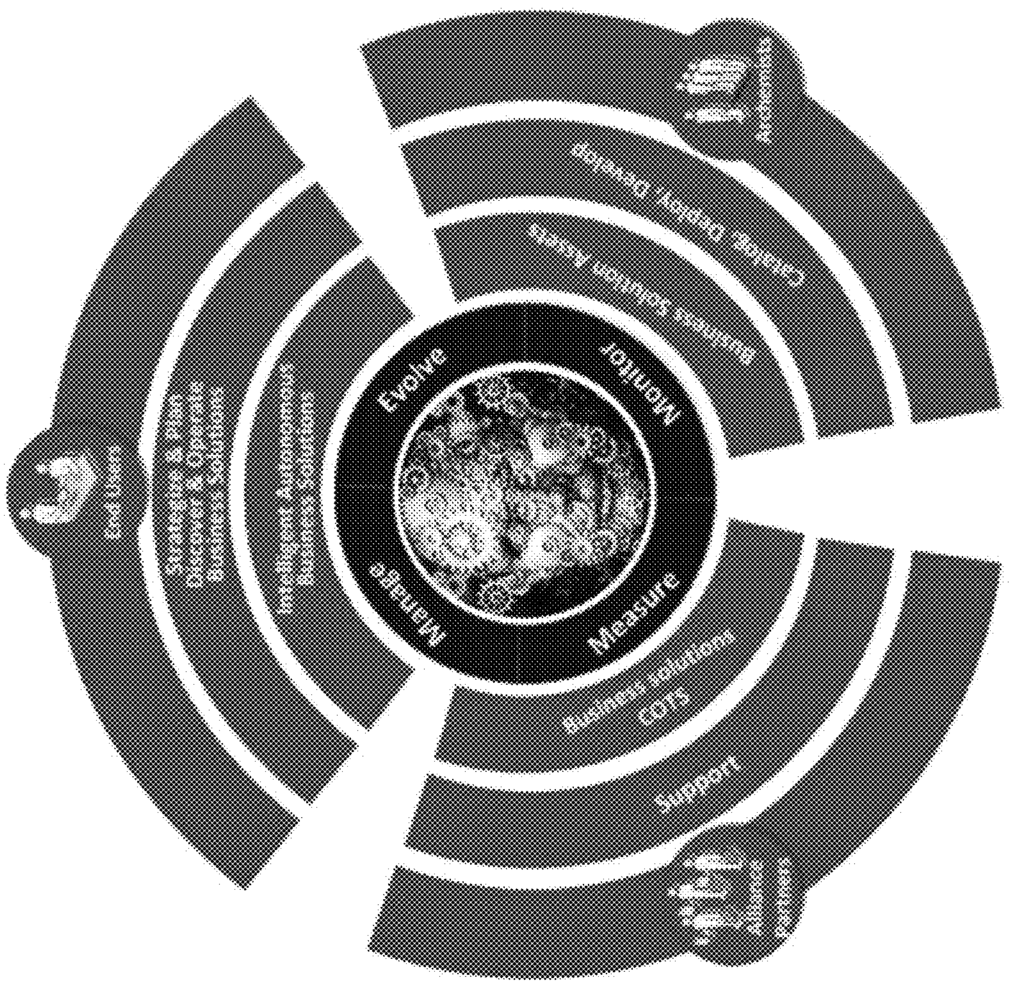
FIG. 7 is a diagram showing a sample digital knowledge management ecosystem (DKME), according to some embodiments.

FIG. 7 illustrates the DKME of a sample Company X at a high-level. More specifically, FIG. 7 outlines a subset of elements that are core to a solution being developed by Archemy, Inc. In this case the digital knowledge management touchpoints are represented as a knowledge "crunching" capability located at the center of the diagram, surrounded by the environment and processes that end users and possibly intelligent business solutions may interact with to evolve the digital knowledge base or the intelligent active and/or autonomous business solutions themselves. FIG. 7 explains how Archemy™ collaborates with its business solution end users, COTS providers, and affiliate community to catalog, deploy, and operate intelligent innovative active and/or autonomous business solutions symbiotically linked to a shared live Digital Knowledge Management Framework (DKMF) allowing dynamic knowledge realignment with evolving business needs and online updates to business solution components.

The function or purpose of a DKME is for the participating community to harness tacit and explicit knowledge to better support next-generation businesses and help them address customer needs more effectively. In the end, as noted in section II, being able to preserve and evolve knowledge, is of service to humanity as a whole.

In the next sub-section, we explain more precisely how people, process, and technology are balanced to provide a practical DKME. To do so we delve into specific details of the Archemy™ DKME implementation.

III.2. Archemy's DKME Distilled

Archemy™ is focused on engineering and productizing a DKME that has the characteristics defined in the previous sub-section. In some embodiments, a generic Digital Knowledge Management Framework (DKMF) can be used to construct and deploy intelligent self-learning active and/or autonomous business solutions and operate them as interconnected elements.

Figure 8:
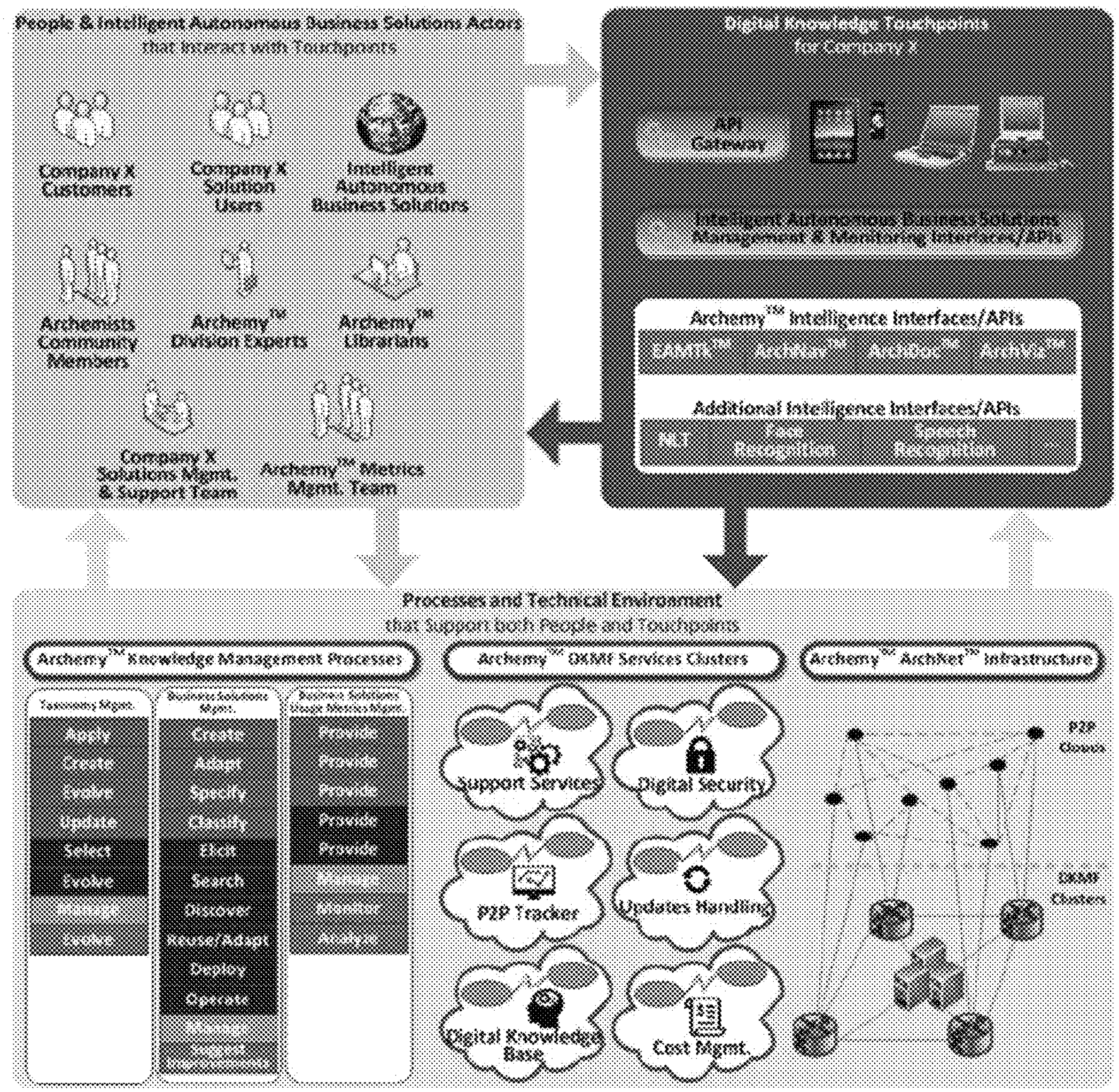
FIG. 8 is a diagram showing a detailed view of a DKME, according to some embodiments.

As Archemy's DKME grows, it may imply the acceptance of its DKMF by a large base of Archemists. FIG. 8 gives a more specific view of the Archemy DKME as it applies to a given Company X.

People and Intelligent Active and/or Autonomous Business Solutions:

The first key element of the Archemy DKME includes the people involved as well as the intelligent active and/or autonomous business solutions themselves. The ultimate purpose of the ecosystem is to serve their needs. Both external and internal audiences are part of the people subelement of the DKME as it applies to Company X. External individuals and communities include Company X customers who plan and discover strategies that lead to using business solutions provided by Company X, and the actual Company X business solutions users. Internal individuals and communities include Company X solutions management and support team as well as Archemy's DKME support team, which is composed of Archemists community members, and Archemy's division experts, librarians, and metrics management team. Intelligent active and/or autonomous business solutions may be considered as either internal or external actors since Company X may respond to needs from its own intelligent active and/or autonomous business solutions or some that are deployed by other companies. Either way, the DKME is aiming at making these business solutions as human as possible when it comes to their ability to react to needs and morph their capabilities over time. Internal individuals/actors and communities are responsible for managing and maintaining Company's X controlled touchpoints. Without them, the touchpoints that are within Company X control cannot evolve, respond to their ongoing external audiences and business solutions needs, and nurture engagement and community as necessary.

Digital Knowledge Management Touchpoints:

As discussed in the previous sub-section, a significant components of the Company X DKME described herewith is a digital knowledge base of touchpoints. These touchpoints are one set of elements in the digital knowledge ecosystem of a business, and they can be broken down into three categories: domain-specific business solutions taxonomies, reusable business solutions and related components, and metrics pools. These touchpoints may include a combination of knowledge independently harnessed and shared by a community of ecosystem participants (e.g., Company X and Archemy™ internal individuals and communities) as well as knowledge harnessed and shared in response to runtime needs and feedback being communicated in realtime by interconnected business solution elements. Only a portion of the knowledge touchpoints are controlled by Company X. The other portion may be supplied by Archemy™ or its affiliates, Archemy's alliance partners, or other business solutions providers in Company X's network.

Please note that we are not considering the touchpoints that do not relate directly to digital knowledge in the present disclosure but we assume that the digital knowledge ecosystem is a subset of the digital ecosystem of Company X. There are additional touchpoints, unrelated to the digital knowledge ecosystem, that may or may not be in control of Company X. For example, the digital experiences designed and completely controlled by Company X spans across Company X's web sites, desktop and (mobile) active and/or autonomous intelligent applications. These elements involve time and investment, and are of importance in the overall digital ecosystem of Company X. Furthermore, Company X may leverage social publishing touchpoints via Facebook, Twitter, YouTube, and LinkedIn. While Company X sets up these digital presences and publishes to them, these touchpoints may not be completely within Company X's control, since the user experience design is fixed by the platform being used, and because user-generated content is a significant part of the experience. Other touchpoints that may not be in Company X's full control but may impact the overall ecosystem's behavior are third-party touchpoints such as search engines and social review services (e.g., Yelp). As intelligent active and/or autonomous applications users may provide feedback that pertains to Company X's digital knowledge ecosystem, we are considering feedback provided via digital surveys, social media, and social review services as possible sources of metrics in the context of the present disclosure.

As shown in FIG. 8, digital knowledge touchpoints are acted upon via various types of devices and through corresponding interfaces and/or APIs depending on whether human or intelligent active and/or autonomous business solutions, respectively, are accessing the Archemy™ functionality. Archemy™ provides a management and monitoring interface/API that is used to gain access to its core functionality as well as specific cognitive/intelligence interfaces and APIs to support the needs of the various DKME actors. A few additional examples of cognitive/intelligence interfaces and APIs are also included in FIG. 8 to illustrate how specific as-needed support could be provided to Company X in the areas of speech and image recognition, or natural language translation (NLT). It is assumed that the collection of additional cognitive interfaces and APIs would change as intelligent active and/or autonomous business solutions evolve to address their ongoing users' needs and/or their own informed perception of gaps in knowledge and/or related capabilities. To effect such changes, DKME actors would make use of the interfaces and/or APIs provided by Archemy™ as shown in FIG. 8. For that purpose, Archemy provides five separate interfaces and/or APIs that are described in the technical environment discussion later in this sub-section. FIG. 8 does not provide a comprehensive view of all the APIs that are available to intelligent active and/or autonomous business solutions. More details are provided in sub-section III.2, below, and can be part of the Archemy™ Digital Knowledge Management Framework (DKMF).

Digital Knowledge Management Processes:

Archemy™ has designed a specific set of process to efficiently manage the three categories of knowledge touchpoints mentioned earlier. FIG. 9 provides an overview of Archemy's DKME taxonomy management processes. Archemy's division experts are responsible for creating and evolving domain specific taxonomies based on their own tacit and explicit knowledge as well as knowledge obtained from solution users or learned by business solutions. Archemy's librarians are responsible for updating the taxonomy knowledge base using available tools and making it available for use. Archemists, business solutions customers, and Archemy™ consultants all use taxonomies to identify reusable business solutions or related components. Intelligent active and/or autonomous solutions also leverage and evolve/update taxonomies via Archemy's ArchNav™ API to address perceived gaps in knowledge or capabilities. They learn how to support new needs based on taxonomy inputs provided by solutions' users and/or real-time cognitive analysis of metrics gathered on an ongoing basis by the ecosystem and its interconnected elements. Archemy's metrics management team constantly analyzes metrics and triggers business solutions updates as needed.

Figure 10:
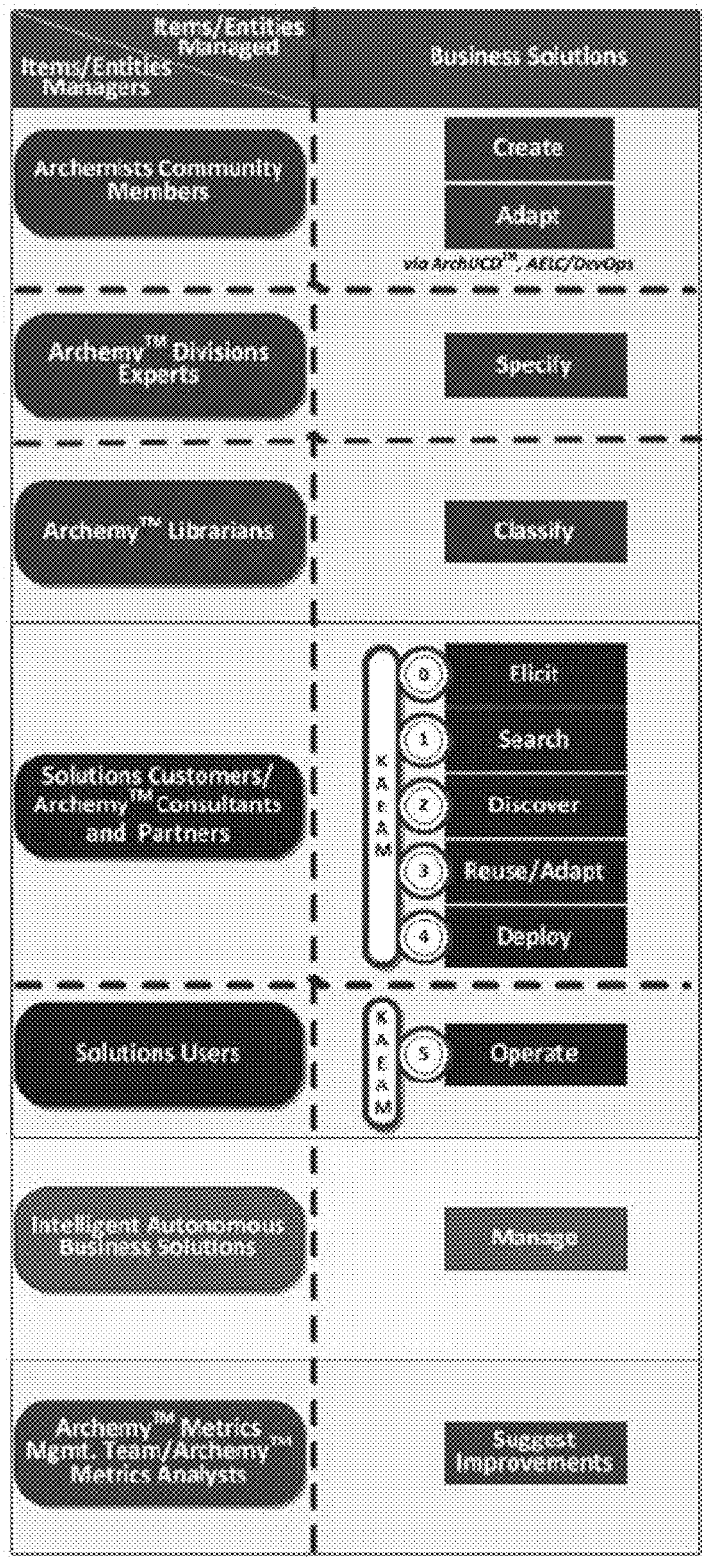
FIG. 10 is a diagram showing business solutions management processes, according to some embodiments.

FIG. 10 provides an overview of Archemy's DKME business solutions management processes. Archemists create and/or adapt intelligent active and/or autonomous business solutions using Archemy™ methodologies (e.g., AELC/DevOps) and tools (e.g., ArchUCD™). Archemy™ librarians classify these solutions using taxonomy criteria that are reviewed and/or specified by division experts. Solutions customers, Archemy™ consultants, and partners apply Archemy's Knowledge-Driven Agile Enterprise Architecture Methodology (KAEAM) to elicit, search, discover, reuse, adapt, and deploy intelligent active and/or autonomous business solutions that are subsequently operated by solutions users. These solutions may be upgraded at run-time based on their own perception of knowledge/suitability gaps based on real-time cognitive analysis of metrics gathered on an ongoing basis by the ecosystem and its interconnected elements. Updates may be triggered independently by the Archemy™ metrics management team as a result of a similar analysis of available metrics that suggests that improvements to existing solutions are needed.

Figure 11:
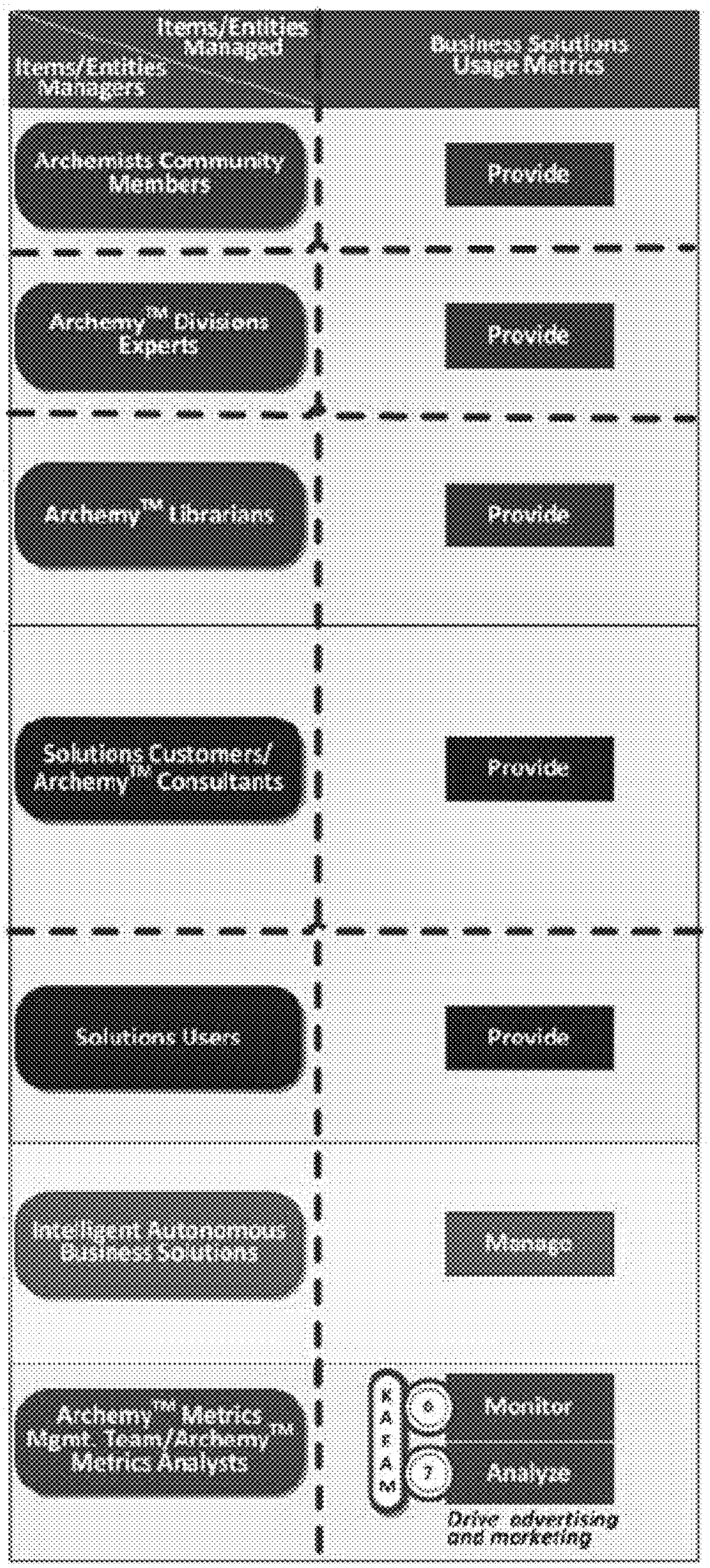
FIG. 11 is a diagram showing metrics management processes, according to some embodiments.

FIG. 11 provides an overview of Archemy's DKME metrics management processes. The Archemists community, and Archemy's division experts and librarians are responsible for providing metrics based on their usage of and/or exposure to business solutions provided via Archemy's Assets Catalog. Solutions customers, Archemy™ consultants and solutions users are also expected to provide metrics. Some metrics may be gleaned from digital feedback received on social media and social review sites and it is the solutions customers' responsibility to ensure that all feedback is funneled into the metrics' knowledge base via appropriate Archemy™ interfaces or APIs. Intelligent active and/or autonomous business solutions are designed to log traditional malfunctions (e.g., errors or warnings) as well as issues with solutions that may not function well or are missing entirely because they do not leverage the latest knowledge or related capabilities. Intelligent active and/or autonomous business solutions along with the Archemy™ metrics management team follow KAEAM processes to constantly monitor and analyze available metrics.

Archemy™ Technical Environment:

A substantial amount of technology resides behind, and is implemented by, a DKME. The following provides an overview of the various application and technology infrastructure capabilities supported by the Archemy™ technical environment.

Archemy's Digital Knowledge Management Framework

Archemy™ provides an architectural framework to manage digital knowledge (i.e., Digital Knowledge Management Framework or "DKMF") to help its customers deploy intelligent active and/or autonomous business solutions over hybrid clouds. Adhering to Archemy's DKMF makes it possible for business solutions to become part of a constellation of domain-specific P2P clouds as active P2P nodes with the ability to re-configure their activities and obtain behavioral updates using Archemy's decentralized taxonomy, business solutions, and metrics management that are all updated and maintained by the overall DKME. Various underlying resources are provided to support the P2P constellation as part of a DKMF cloud of clusters, which is designed to ensure availability, reliability, and scalability. These resources include global support for HPC and analytics, digital security, knowledge base management, P2P nodes tracking, and service requests cost management and notification.

Archemy's ArchNet™ Infrastructure

Archemy's DKMF and the clusters cloud mentioned in the above, along with other cloud services (e.g., storage), are hosted within the global Archemy's ArchNet™ infrastructure. ArchNet™ leverages traditional wired, wireless and mobile network capabilities, as well as content delivery networks (CDNs). Archemy™ is exploring the use of grid computing and upcoming Software Defined Network and Storage (i.e., SDN and SDS) to further enhance the performance of the overall DKME.

While many of these technology assets are outside the control of Company X when using the DKME, some of them are not. For example, Company X is responsible for providing the infrastructure needed to support the adequate performance of its intelligent active and/or autonomous business solutions once they are deployed as nodes in an Archemy™ business domain P2P network and P2P constellation. Just as the environment is critical for biological ecosystems, it is also critical for business DKMEs such as the one being deployed by Archemy™. Additional DKMF design details, underlying theoretical framework as well as DKMF implementation details are respectively provided in the next three sections of the present disclosure.

DKME Elements Interconnection:

So far, we have described the various elements of the DKME as people, intelligent active and/or autonomous business solutions, digital knowledge management touchpoints and processes. The DKME is meant to help interconnect these elements to optimize the flow of knowledge. As noted earlier, we assume that the DKME is used as part of a larger digital ecosystem that handles the general flow of information (i.e., via interactions between people, websites and social media, and corresponding processes and infrastructure).

Knowledge Flows

Every interconnection within the DKME is designed to support the function of the ecosystem. DKME knowledge flows are referred to as knowledge service requests and are described more formally in section IV. These requests are typically targeted towards leveraging and/or managing the knowledge base elements that are maintained by the DKME (i.e., taxonomy, business solutions and related components, and solution suitability and usage metrics). Information flows are not simply based on reactive feedback (e.g., errors, warnings, etc.). Different from traditional intelligent agents and/or "bots," intelligent active and/or autonomous business solutions managed by the DKME can trigger service requests in an active and/or autonomous and proactive fashion based on their own perception of gaps in taxonomy knowledge and/or related abilities to respond to end-users needs as expressed via taxonomy-driven requests. An important aspect of the DKME is the fact that any update requested by intelligent active and/or autonomous business solutions is subject to review and approval (e.g., service charges authorization) by the end users of the solutions. Practically, updates may be communicated to these end users daily via a dashboard focused on the specific corresponding area of business support provided by the solution. Knowledge flows are separate from the more traditional flow of information between elements of the more general digital ecosystem, which includes more traditional requests for content, contributions of content to social platforms, transactions, and even communications between internal and external audiences. In the more general digital ecosystem, hyperlinks are the connective tissue between many different elements of a digital ecosystem. They facilitate the flow of information, and allow people to discover content and find the products and services of interest to them. Links may exist within a given element, or connect different elements in a meaningful way. They help people use the ecosystem to achieve their goals. DKME knowledge services requests are equivalent to the hyperlinks used in the more general ecosystem. They provide the connective tissue between the many different elements of the DKME that facilitates the flow of knowledge and allow DKME actors to discover and find knowledge-related assets and services.

DKME Function:

So far, we have described the elements that make up the DKME and interconnections or relationships that hold the elements of the DKME together. We now aim to say a few words about the function or purpose of the DKME, in other words what it is supposed to accomplish. The more noble and long-term purpose of the DKME, as noted in section III. 1, is for the participating community to harness tacit and explicit knowledge to better support next-generation businesses and help them support customer needs more effectively. In general, as mentioned in section II, being able to preserve and evolve knowledge, is of service to humanity as a whole. When it comes to enabling intelligent active and/or autonomous business solutions that support various companies, the premise of Archemy's DKME is to allow proactive evolution of digital ecosystems by considering the fact that, in addition to more traditional reasons, elements may not function well or are missing entirely because they do not leverage the latest knowledge or related capabilities.

To sustain its R&D and operational costs, Archemy™ relies, in part, on sales, licensing, and subscriptions from intelligent active and/or autonomous business solutions. Archemy also provides access to the knowledge management metrics it collects via its monitoring of business problems and solutions usage/suitability for marketing and advertisement purpose. These metrics provide very useful supportive evidence for considering and recommending business solution components for reuse at various levels of abstraction (e.g., full solution components, candidate architecture, building blocks or patterns). To streamline the complexity of rating and billing service requests and associated costs within its global DKME, Archemy™ uses blockchain along with a D3 Ethereum application (DApp) that customers can use to review their bills. More details pertaining to the architecture and design of the Archemy™ cost management application are provided in section IV.1.

As noted above, for a company using the DKME, the purpose of their digital knowledge ecosystem is primarily to further their ends (i.e., to stay in business). Companies can only stay in business by serving the needs of the people within the ecosystem (whether they are consumers or other businesses) in a profitable way. By including the DKME as part of their more general digital ecosystem, companies can leverage knowledge to better serve their customers (i.e., understand their needs and provide solutions that meet them). For companies that sell physical products, this may mean having customers interact with an intelligent active and/or autonomous agent via an augmented reality interface to gain access to store location and product taxonomies. As the agent keeps learning, it makes it increasingly easier for customers to locate the stores and products that suit their needs (or buy them online). For service companies, this may mean using an intelligent active and/or autonomous service agent that uses taxonomies to automate interactions and optimize the suitability of their services and provide the right information about them. As the agent keeps leaning, it makes it increasingly easier for customers to make knowledgeable and informed decisions as to whether they should use certain services. For companies that provide content, it means using an intelligent active and/or autonomous content provider that interacts with customers to understand their content needs via taxonomies. As the agent keeps learning about these needs, it does everything possible to deliver the most suitable content in a way that is increasingly easier for customers to consume. As a result, it is important for DKME solutions to use taxonomies to match customer needs and provide solutions that meet their needs. In the following paragraph, we explain how the corresponding functions are provided within the DKME.

Using Taxonomies to Match Customer Needs

As noted earlier, Archemy™ develops and maintains knowledge of business problems and solutions using ontologies and related taxonomies. Archemy's knowledge management ontology exists as a federated set of business and technical domain ontologies (i.e., many smaller ontologies linked together rather than one large model). Archemy™ uses this ontology to define all aspects of the things that exist within its knowledge management extended organization. The Archemy™ knowledge management ontology is a governing reference for its knowledge management organization's content metamodel, associated Archifacts, and AEAM/KAEAM processes and deliverables. Archemy's DKME is a reference structure that helps define the knowledge management ontology in much the same way as frameworks like Zachman or TOGAF are reference structures that help define Enterprise Architectures within organizations. Ontologies (e.g., OWL or frames) are at the top of the semantic spectrum when it comes to semantic precision. While RDF and triples are a useful way to formally specify entities and their properties and show the relationships between the concepts, they lack the semantic expressive power required to precisely describe and match business problems and solutions semantics at a level that can be used to drive decisions and power intelligent active and/or autonomous business solutions that display human like abilities within that realm. Furthermore, ontologies provide a conceptual model that may be shared by multiple business solutions, providing good opportunities for reuse and interoperability. Ontologies are ideally suited for supporting Archemy's enterprise business problems and solutions at various levels of architectural abstraction. In particular, ontologies help ensure consistency (i.e., determine if models or solutions are consistent, which is important for validating against standards). Ontologies also allow subsumption (i.e., inferring knowledge structure, showing one concept being more general or specific than another such as a solution component being a subclass of a full solution), equivalence (i.e., determine if classes in the model denote the same set of instances such as a change process and an incident process being both instances of the class "Process"), and instantiation (i.e., determine if an individual is an instance of a given Class such as checking to ensure that the Change Management Process displays the explicit properties of the class Process). In opting for ontologies over RDF and Triples, we realize that there is a wide range of different types of entities to be stored and an evolving set of relationships between them. We also realize that the DKME classification model is going to evolve rapidly over time that there is a need to integrate data from a wide range of sources. The purpose of the present disclosure is therefore to explain how the approach will scale given these quite challenging processing time and data volume (i.e., "big data") requirements. An ontology formally represents knowledge as a set of concepts within a domain, and the relationships between those concepts.

Archemy™ operates business divisions and technology practices that seed taxonomies based on tacit and explicit knowledge gleaned from experts and other explicit knowledge sources (via automation). Archemy™ taxonomies are accessible via the ArchNav™ taxonomy management tool. They are encoded using XML/JSON, can be traversed as extended knowledge graphs, and support set query capabilities. Archemy's DKME actors (e.g., librarians, division experts) use ontology management tools (e.g., Protégé) to evolve ontologies and ensure adequate "reasoning" and validation. Taxonomies are also refined on an ongoing basis using machine learning to correlate contextual and historical usage of taxonomy keywords to their semantic meaning. Archemy™ catalogs business problems using taxonomy keywords as criteria to match end users' needs, requests, or problems descriptions (i.e., the "know what, who, where, when, and why") in a variety of business areas. Archemy™ also catalogs business solutions using taxonomy keywords as criteria to capture the business problems they are meant to solve (i.e., using the aforementioned business problem taxonomy) and describe the solutions semantics in detail (i.e., the "know how"). The expression of detailed business problems or solutions semantics is achieved by refining the taxonomies as/when needed (e.g., extending the hierarchy of descriptive keywords) and providing a choice of criteria values to express match intensity, as well as variables to express the semantic closeness of criteria, and weight (i.e., descriptive precision) to indicate the relative importance of criteria for matching purposes. Using the taxonomy and Assets Catalog makes it possible to understand needs/requests/business problems and suggest matching solutions. The ability to respond to a need is directly related to the semantics expressive power of the business problem taxonomy (that provides the ability to understand the need) and the availability of a matching solution. The ability to deliver a satisfactory business solution to fill a need is directly related to the semantics expressive power of the business solutions taxonomy (that provides the ability to produce a suitable solution). Therefore, gaps in the ability to respond to a need and/or deliver satisfactory solutions may be measured in terms of metrics that reflect the degree of understanding of requests, the availability of matching solutions, and the suitability of matching solutions (i.e., the precision and accuracy of solution matches). These metrics are derived from the analysis of original user requests, taxonomy/solution matches' characteristics, and DKME solutions' usage and satisfaction feedback logs that may include digital ecosystem feedback from sources such as social media.

Providing Solutions that Meet Customer Needs

Archemy™ maintains a catalog of business problems and best practice reusable business solutions (a.k.a., catalog assets). The company uses ontologies and taxonomies to drive DKME inference engines that offer decision support to DKME actors to optimize their leveraging of the Assets Catalog. In a nutshell, from the ontologies comes the ability to infer and reason about the entities within the model, which may be used to make decisions about the implications. Archemy™ works closely with its community of Archemists as well as alliance partners and other recognized communities to seed its catalog of business solutions components. Archemy™ also works closely with all these experts to precisely express the semantics of the components that are placed in the catalog using business problems and solutions taxonomies approved by industry domain experts. Furthermore, Archemy™ recommends the use of reusable components that have been developed using best practice software architecting and engineering methods and works with its community of experts to align components to corresponding standards as needed. Ensuring known best practices makes it possible to create well designed solution components that are reusable at various levels of abstraction, and evolve more standardized taxonomies that can describe the semantics of business solutions more precisely. It also makes it possible to create more precise specifications to implement missing solution components or align existing ones with the needs of end users.

Figure 12:
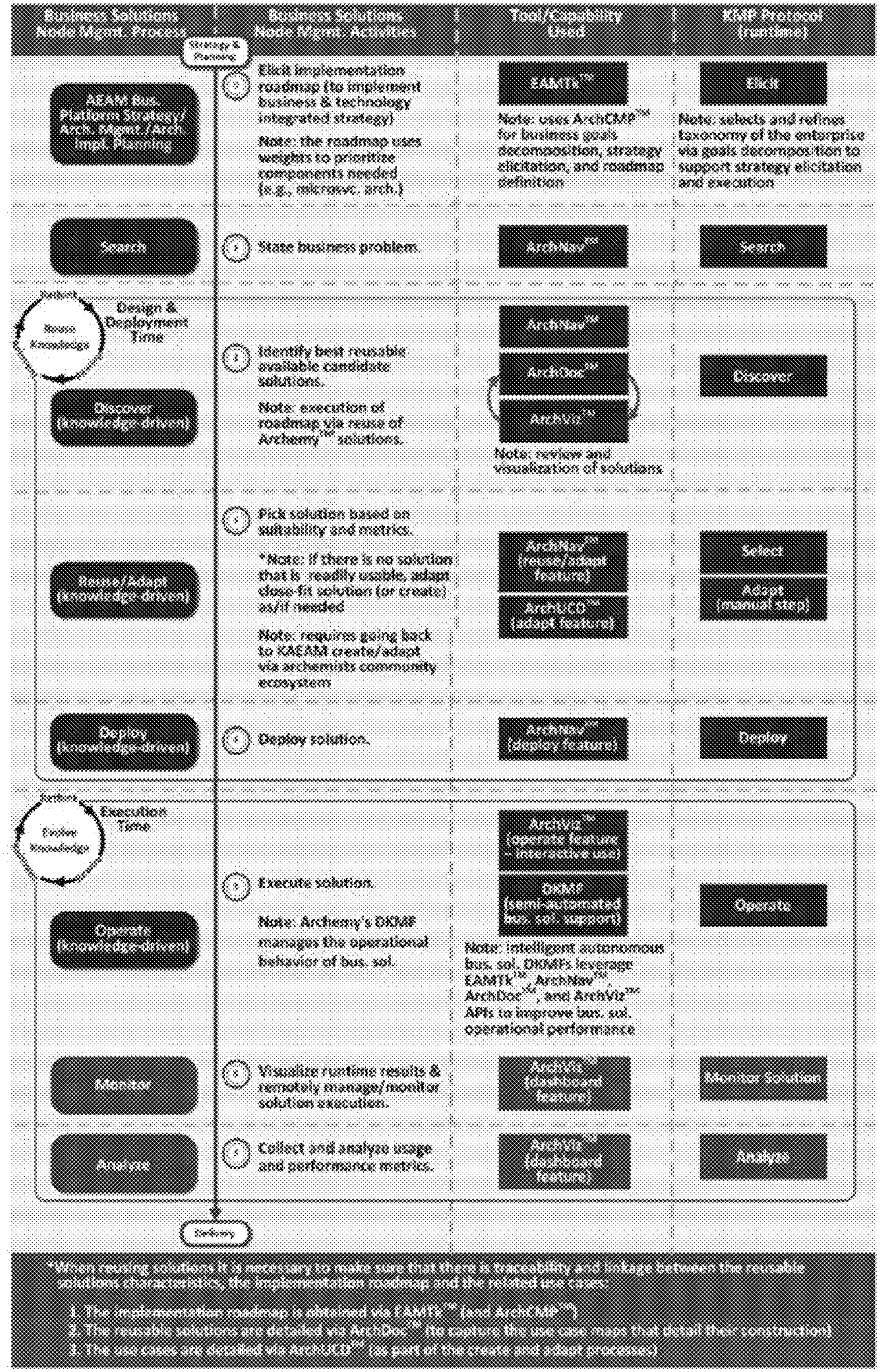
FIG. 12 is a diagram showing details of digital knowledge management ecosystem (KAEAM) processes, according to some embodiments.

To enforce the use of best development practices, Archemy™ recommends the use of its KAEAM business solutions development/evolution lifecycle approach to implement intelligent active and/or autonomous business solutions. The KAEAM approach is typically applied to the implementation roadmap that is created using Archemy's more general Agile Enterprise Architecture Management (AEAM) approach. The AEAM approach applies the ArchDev™/DevOps methodology and ArchDev's AELC Architecture Evolution Lifecycle. FIG. 12 details the activities that correspond to the KAEAM business solutions management processes shown in FIG. 10. FIG. 12 also relate these various activities with the Archemy tools that are used to facilitate them as well as the knowledge management protocol (KMP) keywords that are defined to invoke them.

Figure 13:
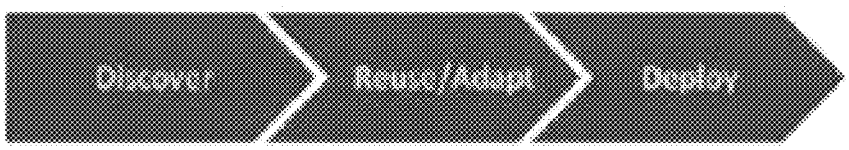
FIG. 13 is a diagram showing KAEAM semi-automated phases, according to some embodiments.

As shown in FIG. 13, three of the KAEAM phases (i.e., Discover, Reuse/Adapt, and Deploy) are semi-automated via the use of Archemy™ tools.

The three specific tools in use so far to qualify best practice reusable business solutions are EAMTk™, ArchDoc™, and ArchViz™. All three of these tools along with the KAEAM processes are used by DKME actors to support the end-to-end development/evolution of innovative business solutions from contextual goals capture to creation and operational monitoring as per FIG. 10. EAMTk™ is an Enterprise Architecture Management Toolkit that semi-automates the AEAM processes that lead to the creation of an implementation roadmap. It is used to support upstream KAEAM activities meant to capture contextual business forces that lead to the creation and/or reuse of business solutions or related components. In particular, EAMTk™ provides a notation to decompose business goals, elicit an integrated business and technology strategy to achieve these goals, and identify the implementation roadmap needed to realize this strategy. The corresponding contextual business forces (e.g., business goals and strategies) are part of the taxonomy used by Archemy™ to classify business solutions in its Assets Catalog. As discussed above, the ArchDoc™ tool is used to capture the steps followed to develop business solutions along with the various tools used along the way and all the associated deliverables. In general, ArchDoc™ supports KAEM activities focused on the creation/evolution of business solutions. As also discussed above, the ArchViz™ tool complements ArchDoc™ by providing an immersive augmented reality interface to navigate through the electronic documentation created by both EAMTk™ and ArchDoc™. The contextual documentation captured by ArchDoc™ and visual or audio snapshots generated via ArchViz™ are also used and aligned with the goals, strategy, and roadmap obtained via EAMTk™ to classify business solutions in the Archemy™ Assets Catalog. The level of semantics being captured via Archemy™ tools makes it possible to precisely express the semantics of components being placed in the Archemy™ Assets Catalog, as well as evolve the corresponding cataloguing taxonomies as needed.

The steps "0" though "4" of KAEAM shown in FIG. 10 correspond to the approach that is used by human actors in the DKME to create intelligent active and/or autonomous business solutions. The subsets of phases shown in FIG. 12 enable KAEAM users to state a problem and obtain a solution by making a hypothesis that it can reuse a (fuzzy) matching solution. The KAEAM users follow the given phases to specify their solution needs (i.e., problem statement), "discover" a matching solution set, "reuse/adapt" a specific solution within the matching solution set (i.e., statement of hypothesis/reuse of existing solution), "deploy" and "execute" the solution, and display the expected results (i.e., as a result of operating the solution). This approach requires the use of EAMTk™, ArchDoc™, and ArchViz™ to properly set/create a business context prior to discovery. It also assumes that the human actor can use business solutions taxonomy keywords as criteria for the discovery and plug in criteria, closeness variables, and weight values that may differ from those recorded for the solutions discovered in the matching solution set, which explains why suitable matches are generally "fuzzy."

The next section provides details of the Archemy™ DKMF architecture and design both at the business and technical architecture levels.

IV. DKMF Architecture and Design Details

This section focuses on the DKMF that Archemy™ is developing to operate intelligent active and/or autonomous business solutions within its DKME. In a nutshell, DKMF automates the use of business problems and solutions taxonomies to help tailor the semantics of intelligent active and/or autonomous business solutions and augment the underlying architectural framework used to evolve these solutions. The DKMF's perception of the real world needs it attaches to is translated in real time into taxonomies that the DKME uses to address customers' business needs. Sub-section IV.1 below describes Archemy's DKMF business architecture, and sub-section IV.2 delves into Archemy's DKMF Conceptual, Logical, and Technical Architectures.

IV.1. Archemy's DKMF Business Architecture

The following describes the Business Architecture Framework that Archemy™ uses to help capture the semantics of intelligent active and/or autonomous business solutions that are of interest to its customers. Contextual knowledge (e.g., business area, business goals, and other "business forces") is captured separately using a higher-level taxonomy. Also described here are cognitive and related business services that are provided by Archemy™ and automated via its DKME to power the DKMF.

Figure 14:
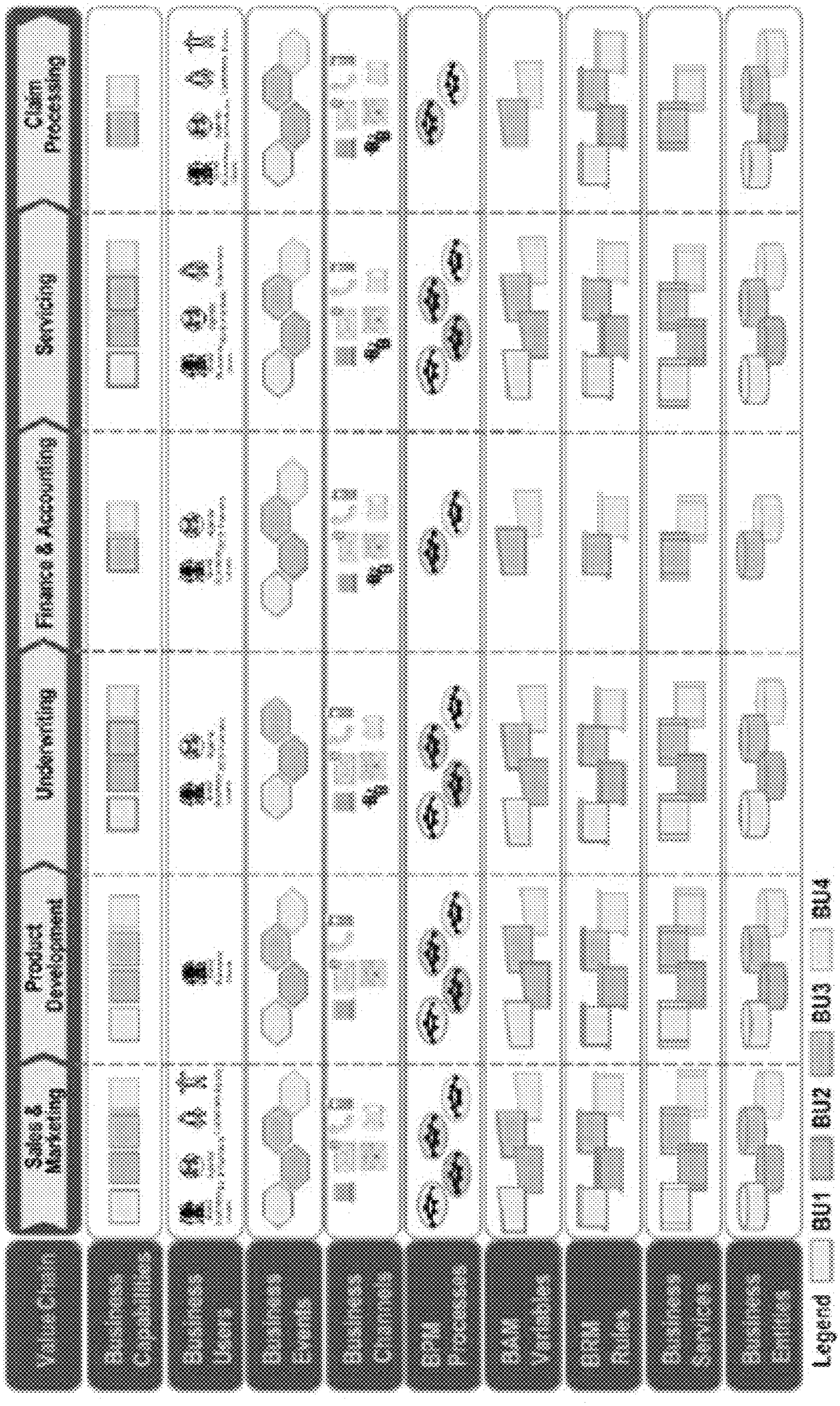
FIG. 14 is a diagram showing a business architecture framework, according to some embodiments.

DKMF Business Architecture Framework:

FIG. 14 depicts the DKMF business architecture framework and its taxonomy. For illustration purpose, the value chain area is filled in with the sample value chain of a company operating in the insurance industry. That company could build internal solutions or customer-facing solutions for any of the elements of the value chain (e.g., digital marketing solutions). Archemy™ is enhancing the traditional "Product Development" value chain element by providing access to knowledge and architecture management as well as other capabilities as part of a framework (i.e., DKMF) that enables intelligent active and/or autonomous business solutions to operate and evolve in real-time. The framework is ready to accept plug-and-play enhancements provided by anyone interested in creating or augmenting business solutions to become intelligent and active and/or autonomous using the built-in facilities provided by Archemy's DKMF. Archemy™ is deploying a P2P cloud of intelligent active and/or autonomous business solutions and has already implemented several solution nodes to populate its P2P cloud. Affiliate Archemists may develop their own Archemy nodes and attach them to the Archemy™ P2P cloud. Each node is free to grow its own taxonomy, business solution components, and metrics knowledge base. As a result, nodes in the Archemy™ P2P cloud may communicate with each other to obtain taxonomy or business components updates and/or connect to the Archemy™ global cluster as needed to obtain and suggest knowledge complements. The Business Architecture Framework shown in FIG. 14 above was used to implement Archemy™ P2P nodes and the following high-level semantics are representative of the business solutions architecture knowledge management taxonomy of Archemy™ P2P nodes:

Value Chain: DKME knowledge management support for people and intelligent active and/or autonomous business solutions.

Business Capabilities: taxonomy, business solutions components, and business solutions' usage and suitability metrics management.

Business Users: DKME People and intelligent active and/or autonomous business solutions.

Business Events: knowledge management business service requests (i.e., KMP BSRs), business solutions update requests (KMP SURs), business solutions updates notifications (i.e., KMP SUNs), custom event handlers (for custom activities), and IoT/IoM sensors APIs (as applicable). KMP is Archemy's Knowledge Management Protocol that is used by DKMF-powered intelligent active and/or autonomous business solutions to leverage support from the global DKME.

Business Channels: Devices and interfaces used to interact with the DKME (e.g., business users' interfaces, visualization interfaces, business events handlers).

BPM Processes: apply, create, evolve, update, select, and learn taxonomies (note: intelligent active and/or autonomous business solutions only apply/match, learn and evolve taxonomies at this time); create, adapt, specify, classify, elicit, search, discover, reuse/adapt, deploy, operate, upgrade, and suggest improvements to business solutions (note: intelligent active and/or autonomous business solutions only upgrade/evolve business solutions and analyze suggested improvements to them at this time); provide, monitor, analyze business solutions usage and suitability metrics.

BAM Variables: proprietary Business Activity Monitoring (BAM) process variables for Archemy™ specific DKMF business processes.

BRM Rules: Proprietary taxonomy, business solutions components, and business solutions usage and suitability metrics management rules for Business Rules Management (BRM) purpose.

Business Services: Archemy™ request processing, cost management, custom activities, and effector services (as applicable); ArchNav™ service (for taxonomy management), EAMTk™, ArchDoc™, and ArchViz™ services (for business solution management), metrics management service, and other cognitive services (for custom activities); Archemy™ service clusters including ArchSSV™ (for HPC, Analytics, and social media sentiment management and monitoring), ArchSec™ (for digital security), ArchTrk™ (for P2P nodes tracking), ArchKBM™ (for global knowledge base management), Archlnv™ (for invoicing), ArchCLD™ (for Cloud management and monitoring, which is included in ArchSSV™), and ArchUpd™ (for update notifications). ArchKBM™ includes ArchVault™ as well as other DKMF databases needed to operate the framework and the intelligent active and/or autonomous applications built around it.

Business Entities: Taxonomies, Business Solutions, Metrics, Accounts, (SR) Contracts, and local business solution entities.

Figure 15:
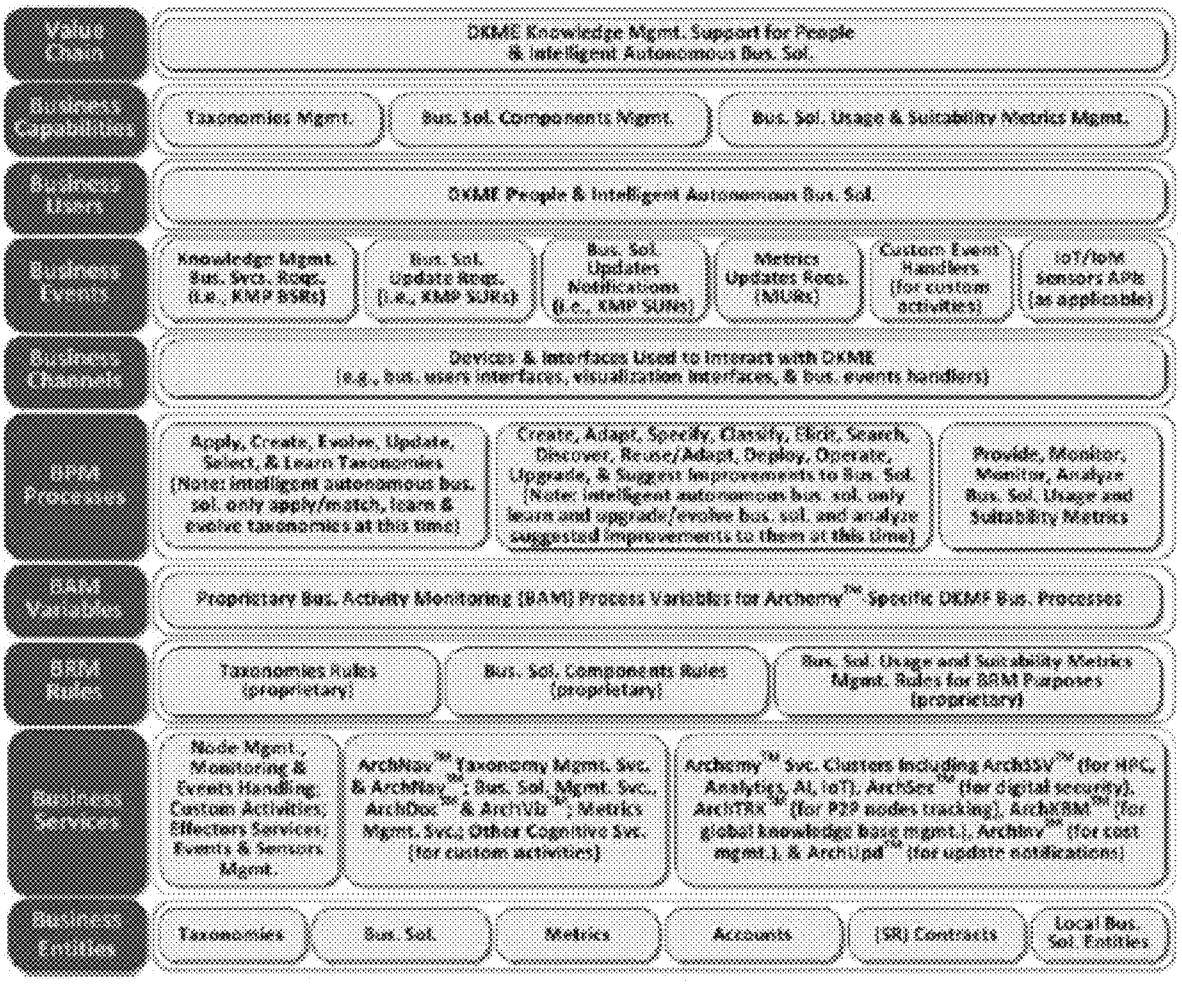
FIG. 15 is a diagram showing business solutions architecture taxonomy, according to some embodiments.

FIG. 15 summarizes the business solutions architecture taxonomy for Archemy™ P2P nodes as it pertains to knowledge management. Knowledge management is a driving element in Archemy's KAEAM product development approach.

Business architecture and design details for the various DKMF core business services and event handlers are provided in the following.

Figure 9:
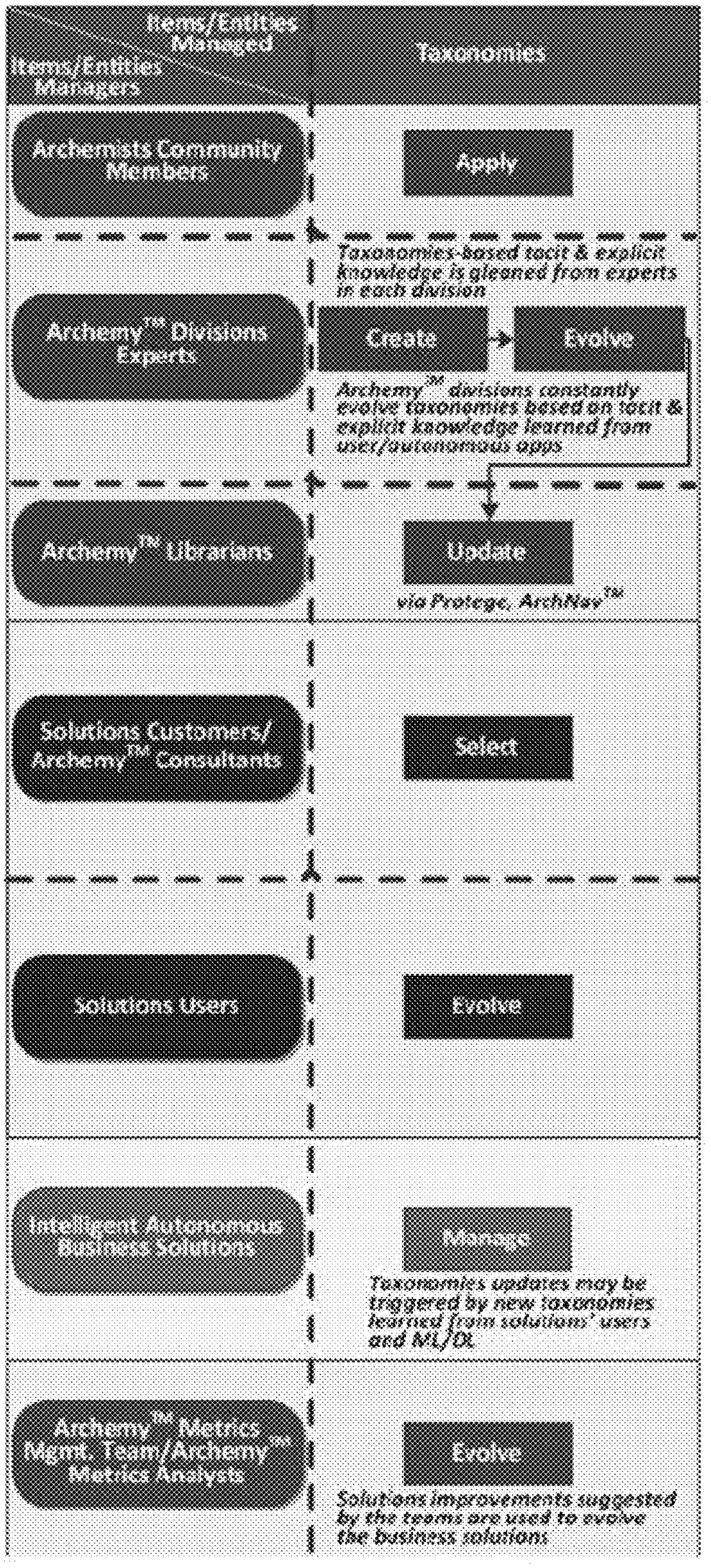
FIG. 9 is a diagram showing taxonomy management processes, according to some embodiments.
Figure 16:
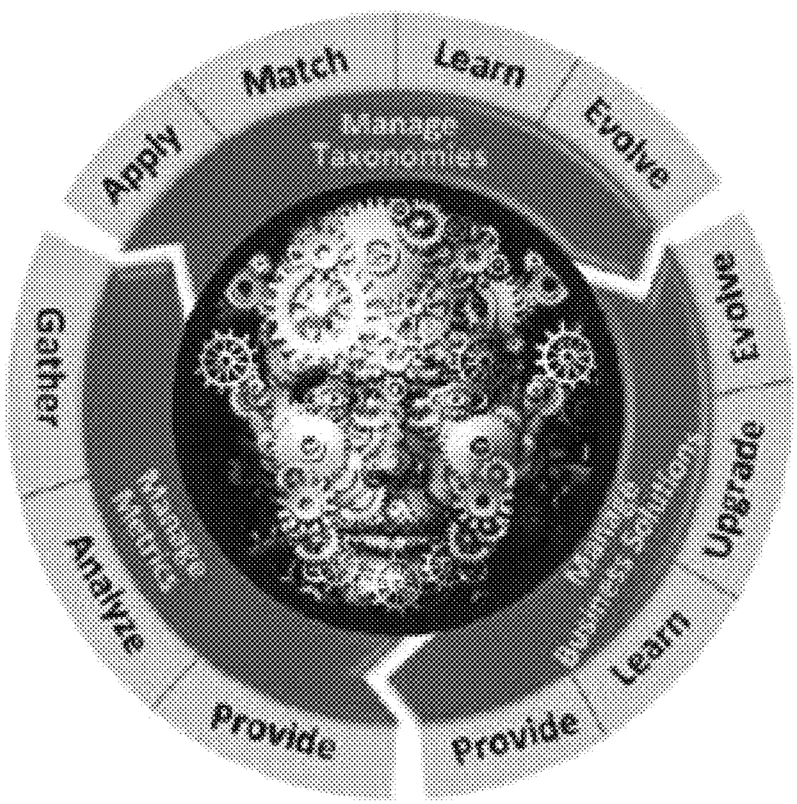
FIG. 16 is a diagram showing digital knowledge management framework (DKMF) management phases, according to some embodiments.

DKMK Node Manager Requests Processor:

The DKMF node manager implements the "manage" activities illustrated in FIGS. 9-11 to enable business solutions to operate in an intelligent active and/or autonomous fashion using the steps illustrated in FIG. 16.

To start with, intelligent business solutions placed in operation (i.e., deployed) can carry a manifest (i.e., a DKMF configuration file) that encodes a list of known requests (per the corresponding taxonomy) that can be handled by the solution given its current configuration. The DKMF configuration file also includes a list of configured enabler APIs used by the framework for the given node along with a list of configured clusters' APIs (e.g., interactive mobile/web/desktop interfaces, cognitive services APIs, IoT services APIs, analytics services APIs, security services APIs, HPC/Analytics/Sentiment analysis APIs). The initial choice of business solution components within the business solution and their mapping to the DKMF architecture framework results from a DKME human actor having followed steps "0" through "4 of the KAEAM approach. As part of the "Manage Solution" sub-phase shown in FIG. 16, the DKMF framework's underlying functionality ensures that the latest most descriptive taxonomies and corresponding component updates are always available to its containing business solution. Perception of gaps may occur as the DKMF supports the "operate" stage of KAEAM whenever a solution's user request does not match the list of requests recorded in the DKMF file. This is the case when any of the following scenarios occur:

The DKME and its associated DKMF platform allow support for a "Fog" and "Edge" computing models as well as the inclusion of capabilities for analyzing and acting on IoT data. Fog and Edge models improve the agility of Cloud service deployments in addition to bringing computing resources closer to devices and end-users as part of micro data centers located at the edge of the network. A business solution may be programmed to act as a solution user:

(a) a user revises the context settings via the EAMTk™ API (this affects all valid recorded requests in the DKMF configuration file), or (b) a user specifies new descriptive keywords as part of a request (this corresponds to a new non-recorded request), or (c) a user selects different criteria, closeness, or weight values for existing request descriptors via the ArchNav™ API (this results in altering the recorded request), or (d) DKME actors and the global P2P constellation obtain feedback on match closeness, solution availability, or solution suitability for a given request that indicates a gap (this affects any recorded request for which feedback is received), or (e) any other scenario that leads the DKMF to perceive a gap during the operate stage of KAEAM.

When such scenarios occur the DKMF node manager, which drives the intelligent active and/or autonomous business solution, follows the "Manage Taxonomies" and "Manage Business Solutions" activities illustrated in FIG. 16 and takes the following steps (a)-(f) for each solution's user request that exhibits a gap:

(a) In case new descriptive keywords are added to a recorded request, the DKMF node manager formulates a hypothesis by encoding the revised user request using terms provided within the solution taxonomy (i.e., the DKMF rethinks the solution).

Note: if new keywords specified by the solution user are not understood based on the existing taxonomy, the DKMF node manager issues a business service request (BSR) to obtain a revised taxonomy that includes the missing terminology and related business solutions updates. This may also prompt new taxonomy learnings to help evolve descriptive taxonomies at the DKME level and distribute related taxonomy updates to applicable DKMF nodes via service update notifications (SUNs).

(b) The DKMF node manager attempts to "discover" a matching solution set via the ArchNav™ API.

Note: if business solutions matching scores are too low, the DKMF node manager issues a service update request (SUR) to obtain appropriate business solutions' updates.

(c) The DKMF node manager optionally requests adaptation of candidate reusable solutions via the DKME (i.e. the DKMF reinvents the solution).

(d) The DKMF node manager selects a solution from the matching solution set in (b) potentially adapted via (c) through "best effort" semantics matching.

(e) The DKME node manager re-deploys the business solution with solution updates included (i.e., the DKMF rewires the solution).

Note: this may require integration with other existing components, signature mappings for components interfaces, integration of components as BPM/BRM activity/rule, etc.

(f) The DKMF node manager revises the DKMF node configuration file to reflect the solution updates.

Upon a subsequent user request, the revised solution is executed, and it produces and/or displays applicable results. The "Manage Metrics" activities shown in FIG. 16 are constantly performed by the DKMF node manager as part of a separate thread. They comprise gathering information from taxonomy and business solutions performance and feedback logs and generating metrics that are used by the DKMF to detect gaps. As part of these activities, the DKMF also logs taxonomy and business solutions performance issues (e.g., taxonomy mismatches, lack of availability or suitability of business solutions, business solutions malfunctions).

DKMF Node Manager P2P Protocol Handler:

Archemy™ P2P nodes communicate with their P2P Cloud neighbors via a Knowledge Management Protocol (KMP) to learn and evolve as needed. Solution users' needs that cannot be addressed by a given node via its own request processing service (e.g., need to generate a new type of smart contract that is described by a taxonomy not handled by the current node) may be propagated to other nodes within and beyond the containing P2P cloud via KMP Business Service Requests (BSRs) so they can be handled as events by more capable nodes. Node managers leverage various patterns of collaboration (e.g., brokerage, mediation). The perception of a taxonomy or capability gap by a given node triggers the issuance of a KMP Solution Update Requests (SURs) event that may be resolved within the node's own P2P cloud or by an Archemy™ P2P cloud node eventually in the absence of support for such update within the node's P2P cloud. Business solutions' updates that cannot be resolved at a given time result in a bid request to the Archemists community to build and deploy the needed solution update as it becomes available. The Archemists community is a collaborative network that harnesses global knowledge to create innovative solutions to individual business problems. Archemists may leverage various channels such as open source, partnerships with solution vendors, service providers, and hardware/software technology providers. As Archemy™ evolves its taxonomies and business solutions at the global level, nodes within P2P clouds may receive KMP Service Updates Notifications (SUNs) and may issue KMP Solution Update Requests (SURs) in response to obtain the corresponding updates.

DKMF Taxonomy Management Service (ArchNav™):

Archemy's taxonomy management capabilities (e.g., implemented by a compute node that can be referred to as a taxonomy manager") are coordinated via collaborating decentralized node managers and provided to end users or business solution nodes via the ArchNav™ interactive interface or the ArchNav™ API respectively. Both the ArchNav™ interactive interface and intelligent active and/or autonomous applications use the ArchNav™ API to learn how to support (new) needs based on taxonomy inputs provided by solutions' users and real-time cognitive analysis of performance and feedback data gathered on an ongoing basis by the DKME and its interconnected elements. The taxonomy management capability is one of the cognitive components of the knowledge base manager that is used by the node manager within intelligent active and/or autonomous applications to address a perceived history of gaps in business problems or business solutions knowledge based on the current taxonomy. Being able to represent contextual end users' business needs/requests and being able to identify matching functions using taxonomies (i.e., matching the "know-what" with the "know-how") within a business solution is key to human-like performance of intelligent active and/or autonomous business solutions.

The taxonomy management cognitive component is implemented as a learning agent using a layered architecture. The agent learns how to best serve the functional needs of its end users and uses several criteria matching algorithms to identify candidate matching solutions. Learning about (new) business problems and solutions is made possible by constantly reacting to new contexts and descriptive keywords introduced by end users as well as regular updates to taxonomies triggered by human experts and/or machine learning algorithms in reaction to the addition of new knowledge, cognitive analysis of knowledge management information (e.g., taxonomy and solutions availability matches), and feedback gathered by the DKME and the global P2P constellation. The taxonomy manager works with the local business solutions' node manager to check the availability of matching solutions in the business solutions knowledge base. Whenever the local taxonomy manager cognitive module (a.k.a., learning element) perceives a taxonomy gap that it cannot fill using it internal taxonomy manager and local taxonomy repository, it reaches out to taxonomy managers in other nodes of the solution's P2P network, or Archemy's taxonomy knowledge base cluster, to fill a BSR and/or active and/or autonomously requests a taxonomy and capability update via a SUR. Furthermore, globally validated changes to taxonomies are communicated to intelligent active and/or autonomous applications via SUNs that lead to subsequent SURs. The layered architecture used to implement the learning agent, enables it to handle reactive and pro-active behaviors more effectively. Furthermore, the interconnection of intelligent active and/or autonomous business solutions within and across P2P Clouds makes it possible to leverage hierarchies of learning agents with behaviors and responses that display an enhanced form of intelligence augmented via global DKME support. More formal details related to Archemy's taxonomy management learning agents and their functionality are provided in Section V.3.

DKMF Business Solutions Management Services:

At this time, intelligent active and/or autonomous business solutions can only suggest improvements to their behavior, and upgrade/evolve themselves as part of the DKMF manage phase. They use a semi-automated subset of KAEAM activities as explained in FIG. 17. This functionality is provided by the DKME via DKMF business solutions management services. It is expected that business solutions may eventually be able to handle the full spectrum of KAEAM activities using various Archemy™ tools' APIs. However, full automation of KAEAM steps such as "reuse/update" will require adoption of common standards for taxonomies so components may be specified and matched via a common standardized taxonomy. Archemy™ is on its way to helping with standardization and works closely via its divisions and practices with Archemists, alliance partners, the open source community, and other interested groups to achieve this very goal.

Archemy's DKMF current set of business solutions management capabilities are coordinated via collaborating decentralized node managers and provided to end users or business solutions nodes via interactive interfaces to EAMTk™, ArchDoc™, and ArchViz™ or their respective APIs as applicable. The purpose of these tools interfaces/APIs is to learn how to make the most suitable solutions available to address end users' needs based on inputs provided by solution users and/or real-time cognitive analysis of performance and feedback data gathered on an ongoing basis by the DKME and its interconnected elements. The EAMTk™, ArchDoc™, and ArchViz™ interactive interfaces and intelligent active and/or autonomous business solutions all use underlying APIs to the corresponding Archemy™ tools.

The business solutions management capability is one of the cognitive components of the knowledge base manager that is used by the node manager within intelligent active and/or autonomous applications to address a perceived (history of) gaps in availability or suitability of certain capabilities needed to address end users' needs. The business solutions management capability uses information obtained from the EAMTk™, ArchDoc™, and ArchViz™ APIs as needed to update the taxonomy criteria, closeness values, and weights scores that are used to classify business solutions. This is necessary since taxonomies are refined on an ongoing basis, existing business solutions evolve, and new business solutions are added constantly. Solutions suitability and availability gaps generally result from insufficient knowledge or understanding of the solutions and/or solution components that are currently in use or possibly the lack of such solutions altogether. As intelligent active and/or autonomous business solutions operate, the underlying DKME knowledge base repository of reusable innovative business solutions keeps growing and gets more refined or gets to include completely new innovative business solutions to address DKME actors' perceived gaps in end-users' needs or availability or suitability of certain business solutions. As explained earlier, the DKMF taxonomy manager ensures that the latest most descriptive taxonomies are made available to business solutions as part of taxonomy updates. However, while the Archemy™ business problems and solutions cataloguing process is designed to minimize gaps, intelligent active and/or autonomous business solutions may still need to realign their behavior on an ongoing basis to address a perceived history of their inabilities to fulfill some end users' needs. Gaps may incur when taxonomies become more expressive and problem or solution details are lacking or have been updated by the DKME. Until semantics are captured for problems and solutions using the most descriptive taxonomy criteria, mismatches between problems and solutions may occur. New or existing taxonomy criteria values may need to be optimized as taxonomies evolve again possibly increasing the extent of mismatches. The ongoing evolution of business solutions and the addition of new ones requires a similar optimization of criteria, closeness variables, and weight values. Gaps may be creeping for numerous other reasons and it is the role of the DKME to ensure convergence and minimize the extent of such gaps as the knowledge base repository of problems and solutions evolves.

Like its taxonomy management counterpart, the business solutions management cognitive component is implemented as a learning agent using a layered architecture. Once the taxonomy manager learning agent identifies a solution match for a given user request, it is the responsibility of the business solutions management service to make the latest suitable solution available. The agent learns how to perform this task in the most optimal way. Learning is made possible by constantly reacting to the addition of new components and component updates provided via human experts. The agent is also guided by machine learning algorithms that analyze performance data (e.g., availability and suitability of solutions) and feedback gathered by the DKME and the global P2P constellation. Availability and suitability metrics obtained globally make it possible to predict needs and learn how to provide more precise taxonomies to describe solution components. Whenever the local business solutions manager's cognitive module (a.k.a., learning element) perceives a solution availability or suitability gap that it cannot address using its internal business solutions manager and local repository of solutions, it reaches out to business solutions managers in other nodes of the solution's P2P network, or Archemy's business solutions knowledge base cluster, by issuing SURs. Furthermore, globally validated changes to solutions or additions of such are communicated to intelligent active and/or autonomous applications via SUNs that lead to subsequent SURs. The layered architecture used to implement the learning agent, enables it to handle reactive and pro-active behaviors more effectively. As noted earlier, the interconnection of intelligent active and/or autonomous business solutions within and across P2P Clouds makes it possible to leverage hierarchies of learning agents with behaviors and responses that display an enhanced form of intelligence augmented via global DKME support. Once the DKME obtains a business solution update, it active and/or autonomously performs validations of its semantics and signature syntax, integrates it and the business solution node gets regenerated and redeployed to make the update available as part of the node functionality.

More formal details related to Archemy's business solutions management learning agents and their active and self-generative aspects are provided in Section V.3.

DKMF Metrics Management Service:

Archemy's division experts, librarians, and other actors within the DKME (including intelligent active and/or autonomous business solutions) are responsible for providing feedback based on their usage and/or exposure to taxonomies and business solutions provided by Archemy™ or its affiliates. Archemy's metrics management capabilities is one of the components of the knowledge base manager that is used by the node management and monitoring capability (a.k.a., "node manager") within intelligent active and/or autonomous applications to gather node performance and feedback information and generate metrics that are used by the nodes to make intelligent active and/or autonomous decisions. Performance and feedback information is funneled into the metrics' global knowledge base cluster via appropriate Archemy™ interfaces or APIs, and global metrics are computed by the Archemy™ metrics management team in a semi-automated fashion to drive ongoing intelligent decisions that address taxonomy and business solutions gaps at a global level and then update individual nodes as necessary.

Performance information may be obtained from logs of solutions users' requests, taxonomy/solution matches characteristics, business solutions logs, solutions users feedback on needs understanding (i.e., taxonomy availability) and solutions availability and suitability, and DKME solutions usage (e.g., usage of solutions per industry, specific components used within nodes, maturity rating of components in use, components implementation status and versions, and other comments) and satisfaction feedback (e.g., benefits rating, and other comments) logs across the global P2P constellation that may include digital ecosystem feedback from sources such as social media and social review sites. Intelligent active and/or autonomous business solutions log traditional malfunctions (e.g., errors or warnings) as well as issues with solutions availability and suitability. As a result, information flows are not simply based on reactive feedback and they are designed to gather information that may lead to proactive decisions and related taxonomy and business solutions enhancements within the overall DKME.

The metrics management capability is meant to address a collection of possible gaps locally or globally that are a direct reflection of the low degree of understanding of user requests, the lack of availability of matching solutions, or suitability of matching solutions. As a result, metrics measure the perceived history of gaps in business problems or business solutions knowledge based on the current taxonomy, the inability to respond to a need and/or deliver satisfactory solutions, and the lack of precision and accuracy of solutions' matches.

The DKMF metrics management service leverages capabilities that implement the "Manage Metrics" activity illustrated in FIG. 17. The analysis of performance information uses predictive, prescriptive, and cognitive algorithms that drive the constant evolution of the taxonomy and business solutions knowledge base by leveraging the augmented (human) intelligence provided by DKME actors and the global P2P constellation. Being able to manage metrics and drive improvement decisions in real-time is key to providing human-like performance via intelligent active and/or autonomous business solutions.

DKMF Cost Management Service:

Archemy™ uses the Blockchain 2.0 Ethereum platform to implement a global cost management application to bill (i.e., debit or credit) the various DKME participants for BSRs, SURs, and all other support requests (referred to more generally as service requests or "SRs") handled by participating nodes in the overall P2P constellation. The application also rates the requests and perform payment processing. Ethereum provides the capability to create applications/code on top of the blockchain instead of merely using it as a cryptocurrency (as in Bitcoin). The basic design of Ethereum provides two types of accounts: externally owned account (i.e., EOAs) and contracts. Just as in Bitcoin, where the state of the network is the set of all account balances, similarly the state of the Ethereum network can be described as the set of all accounts, where each account is either an EOA or a Contract. If the account is an EOA, the state simply stores the account's balance in Ether (i.e., Ethereum's internal cryptocurrency, like Bitcoin). If the account is a contract, the state stores the contract's code and the contract's storage. A transaction in Ethereum specifies a destination address and a data field that can contain any information. If a transaction is sent to an EOA, it acts as a simple transfer of Ether from the source address to the destination EOA. If a transaction is sent to a Contract, however, the contract's code runs. This code can read the transaction data, read and write to the contract's own storage and send a transaction to another contract. Upon exiting execution, the contract's code can return bytes of data to the calling address (EOA or another contract). In effect, a contract works like a function that can be called, execute and return data to the calling function.

Archemy™ uses a private Ethereum network and has EOAs for each one of its intelligent business solutions subscribers. So, each subscriber has an account which has an Ether balance (i.e., bought by the subscriber using normal flat currency), and can send transactions (i.e., ether transfer or contract code trigger) to other EOAs or Contracts. Archemy™ has created several Contracts on its Ethereum network, each representing a usage component or a function to be performed (i.e., an SR). For example, a contract written for a BSR has a code that says—"in the received transaction data, if BSR type is X, then return a SR charge that is calculated based on other parameters in the data." This calculated charge can be returned to a particular address.

Now, when a SR is generated by an intelligent active and/or autonomous business solutions management and monitoring sub-system, it publishes the SR on the Ethereum network as a transaction to the first contract that determines the basic charge for the SR. The first contract executes the cost management application code using the SR data as its input and sends the output data to the next contract. This way all the rating and SR charges can be computed based on the SR data as sequential calls to contracts, which are basically blocks of functions each computing a particular charge amount. The contracts can intelligently determine which charges should be applied to a particular EOA (that is, which contracts should execute) based on the "rate plan" of the subscriber. As only EOAs can send a transaction on the network, the DKMF business solutions management and monitoring sub-systems are also setup as EOAs but with private keys that are controlled by Archemy™

Since every SR is associated with an EOA (i.e., the subscriber account) that is identified by the details in the SR, after all the contracts have run their code and the charges for that SR/usage has been computed, the final output can be sent as a transaction to the subscriber EOA. Once all the contracts execute their code, they return the charge that the subscriber must pay for that transaction. The cost management application is programmed to automatically deduct charges (in the form of Ether) from the account balance of the subscriber's EOA. For subscribers to see at any time all the charges that have been applied to their account, Archemy™ supplies an Ethereum DApp that provides a web interface to query SRs history and usage charges. Therefore, there is no need for Archemy™ to generate a monthly bill and send it to the customer separately. There are many advantages to the Archemy™ cost management application. First it performs all the functions of a traditional billing system using DApps and Contracts at a fraction of the cost. Second, Archemy's cost management application supports converged billing by allowing subscribers to have one EOA with any number of contracts created across all SRs and the charging can be converged, which is a key element of today's leading billing systems Third, Archemy's cost management application is secure as Private Blockchain 2.0 allows Archemy™ to control the data, instead of it being present on an external server. This helps prevent data breaches which are expensive. And fourth the cost management application is scalable as the system can be expanded to support any number of users and any number of new ratings and SRs, or any number of ways to charge a subscriber (by creating EOAs and Contracts, respectively).

DKMF Clusters Services:

Archemy™ provides global business services to support its P2P constellation of P2P Clouds. These business services and their supporting technical frameworks and technologies are clustered to maximize performance, reliability, and availability. The various clusters include ArchSSV™ (for HPC, analytics, and social media sentiment analytics), ArchSec™ (for digital security), ArchTrk™ (for P2P nodes tracking), ArchKBM™ (for global knowledge base management), ArchInv™ (for invoicing), and ArchUpd™ (for update notifications).

The ArchSSV™ "compute" cluster provides big data processing capabilities including HPC, predictive analytics, and social media sentiment analysis. It is used to train and deploy machine and deep learning algorithms on various types of operational performance data provided by the DKME (e.g., end users' requests, taxonomy/solution matches characteristics, business solutions logs, solutions users' feedback on needs understanding and solutions availability and suitability, and DKME solutions usage, and satisfaction feedback logs across the global P2P constellation that may include digital ecosystem feedback from sources such as social media and social review sites). These algorithms are used to address a perceived history of gaps in business problems or business solutions knowledge based on current taxonomies in use. They are also used to address a perceived (history of) gaps in availability or suitability of certain capabilities needed to address end users' needs. ArchSSV™ helps uncover operational end users and solutions insights using a combination of predictive, prescriptive, and cognitive machine learning techniques. It helps predict needs and learn how to provide more precise taxonomies to describe solution components. It also helps make the most suitable solutions available to address end users' needs.

The ArchSec™ digital "security" cluster handles traditional authentication/authorization, role base access control (RBAC), and licensing capabilities. It is designed as an extensible facility meant to provide full DKME support for Governance, Risk Management, Compliance, and Security (GRC/S).

The ArchTrk™ P2P nodes "tracker" cluster assists in the communication between peers in the Archemy™ P2P constellation that use the KMP protocol. The "tracker" cluster keeps track of where copies of taxonomies and business solutions modules (i.e., "knowledge assets") reside on peer machines, which ones are available at the time BSRs or SURs requests are issued by DKMF nodes, and helps coordinate efficient transmission and relocation of the knowledge assets. Intelligent active and/or autonomous business solutions' nodes communicate with the tracker cluster periodically to negotiate faster knowledge transfer with new peers, and provide network performance statistics. Archemy™ P2P implementation uses a distributed hash table (DHT) method to ensure "trackerless" P2P capabilities. The use of the tracking cluster is redundant (i.e., communication between peers can occur without connection to the tracking cluster), and the tracking cluster is mostly used to track network performance metrics and improve the speed of peer discovery.

The ArchKBM™ global "knowledge base management" cluster host the central repository of DKME knowledge for taxonomy, business solutions modules, and metrics (i.e., ArchVault™). It also includes databases that support the operation of the DKMF as well as intelligent active and/or autonomous business solutions that use it. Individual business solutions P2P nodes use a similar repository structure and management interface to manage local data. As noted earlier, P2P nodes collaborate with one another to fulfill their taxonomy and business solutions updates needs. However, when KMP requests cannot be resolved within P2P clouds, they are directed to the global ArchKBM™ cluster. The ArchKBM™ knowledge base manager is also responsible for distributing global taxonomy and business solutions updates to interested nodes in the P2P constellation. P2P nodes are responsible for providing the operational performance and feedback data they collect to the global ArchKBM™ metrics repository to help drive performance analytics meant to optimize the overall abilities of the DKME to better understand end users' needs and ensure availability and suitability of business solutions made available via the P2P constellation.

The ArchInv™ "invoicing" cluster host the private blockchain 2.0 cost management components used by Archemy™ to maintain EOA and usage contracts and bill its P2P constellation participants for services.

Finally, the ArchUpd™ "updates" notifications cluster manages the propagation and handling of KMP SUNs and SURs. It is provided to offload intensive update processing activities from the ArchKBM™ cluster.

The next sub-section provides specific details that pertain to the DKMF technical architecture.

IV.2. DKMF Technical Architecture

The following describes the Technical Architecture Framework that Archemy™ uses to capture the semantics of intelligent active and/or autonomous technical solutions and related components that are of interest to its customers. Technical business solutions implement the business architecture semantics captured via the DKMF business architecture framework presented in section IV.1. Contextual knowledge (e.g., enabling technology area, technical goals, and other "technical forces/requirements") are captured separately using a higher-level taxonomy. This sub-section mostly describes the DKMF conceptual, and logical architectures and explains how cognitive and related business services introduced in sub-section IV.1 are mapped into technical components as part of the Archemy™ logical architecture. Details of the DKMF implementation, technical architectures, along with the actual combination of technologies used to power the DKMF are provided in section VI.

Figure 18:
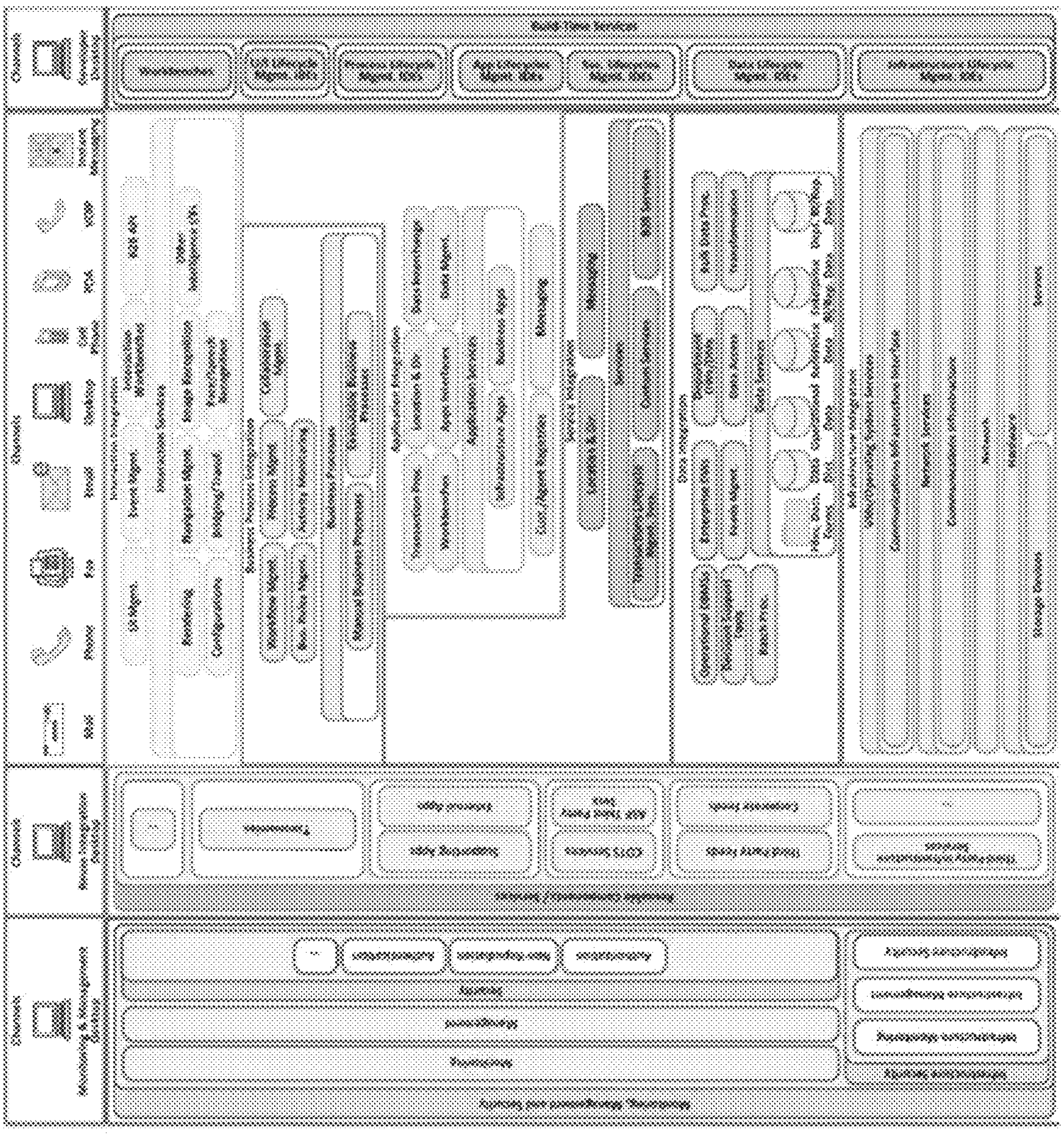
FIG. 18 is a diagram showing a technical architecture framework, according to some embodiments.

DKMF Technical Architecture Framework:

FIG. 18 depicts the whole DKMF technical architecture framework and its taxonomy. For illustration purpose. Its various areas are detailed in subsequent figures and are not meant to be fully readable. It should be possible to describe any DKMF architecture extension using this framework.

Figure 19:
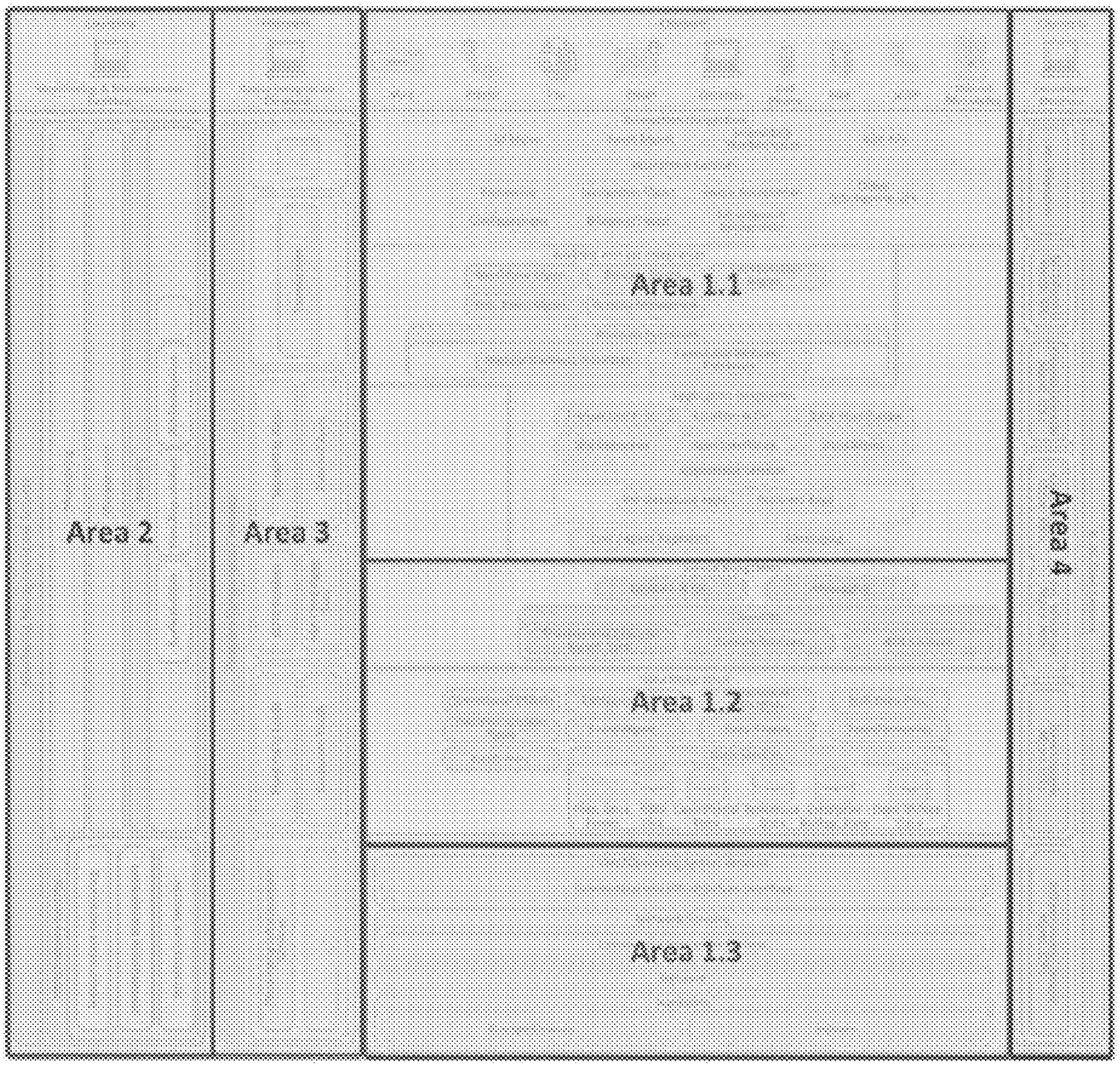
FIG. 19 is a diagram showing technical architecture framework containerization, according to some embodiments.

The DKMF architecture framework also provides a (taxonomy) tagged architectural container shown in FIG. 19 to help capture the semantics of business solutions technical components. On one hand, the level of semantic precision provided by the framework taxonomy is sufficient to meet the needs of customers who would like to describe their technical components using Archemy's business solutions taxonomy. Doing so enables them to advertise their components for reuse in the Archemy™ Assets Catalog as candidate components for intelligent active and/or autonomous business solutions. On the other hand, customers looking for specific technical components in their DKMF nodes implementations may also use the various framework templates to detail their needs and/or preferences using their corresponding taxonomies.

Figure 20:
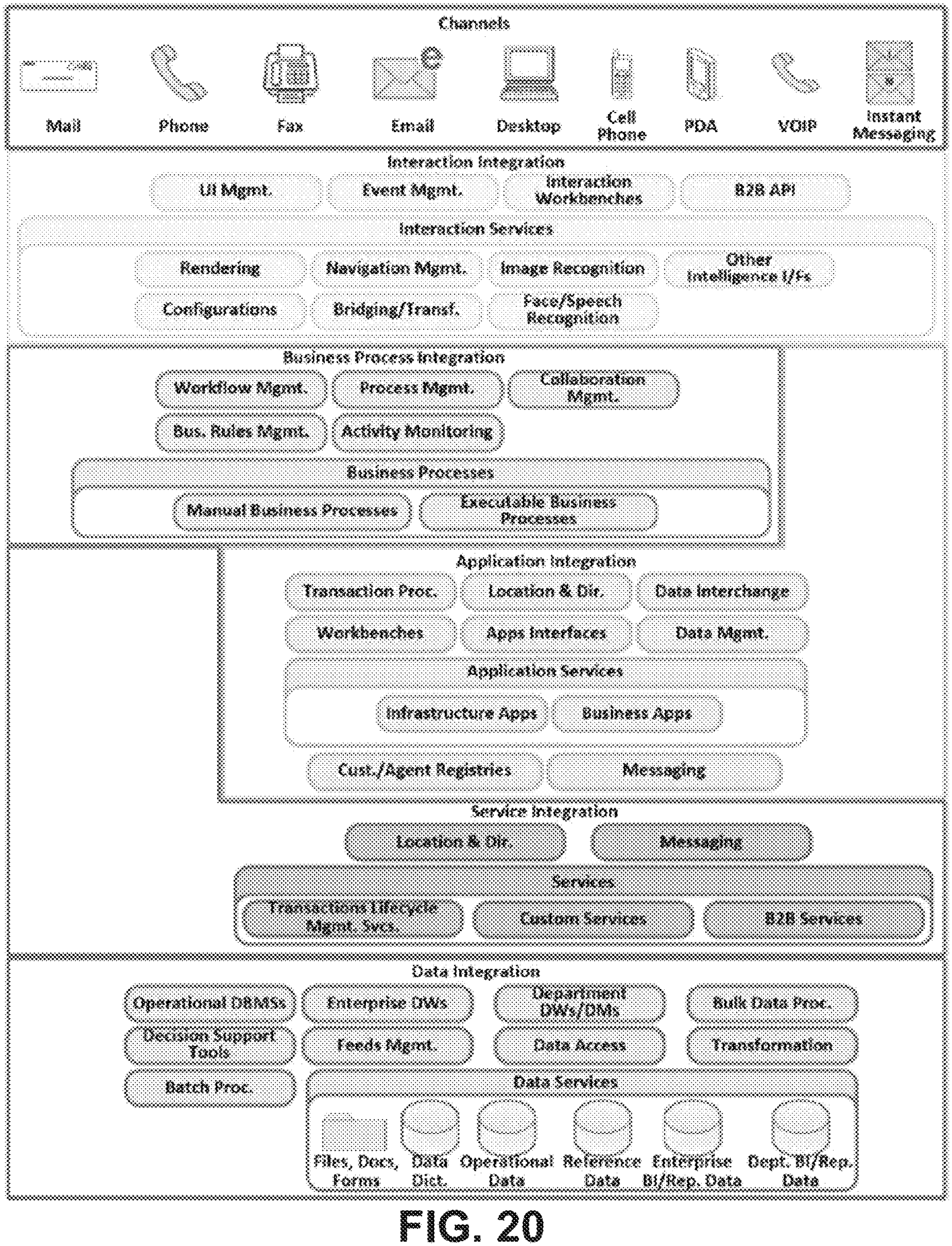
FIG. 20 is a diagram showing a peer-to-peer (P2P) node architecture framework taxonomy, according to some embodiments.

FIG. 20 is an excerpt of FIG. 18. It combines the architecture layers tagged as Area 1.1 and 1.2 in FIG. 19. The resulting framework taxonomy should be used to describe the related technical architecture elements of DKMF P2P nodes (i.e., layers, components, and sub-components). It provides sufficient semantic precision to classify the various P2P node's layers, components, and sub-components within the Archemy™ Assets Catalog via the Archemy's ArchNav™ tool. Additional business solutions-specific semantics are captured via Archemy™ tools such as EAMTk™, ArchDoc™, and ArchViz™ and added, as needed, to the descriptive business solution taxonomy via ArchNav™

Figure 21:
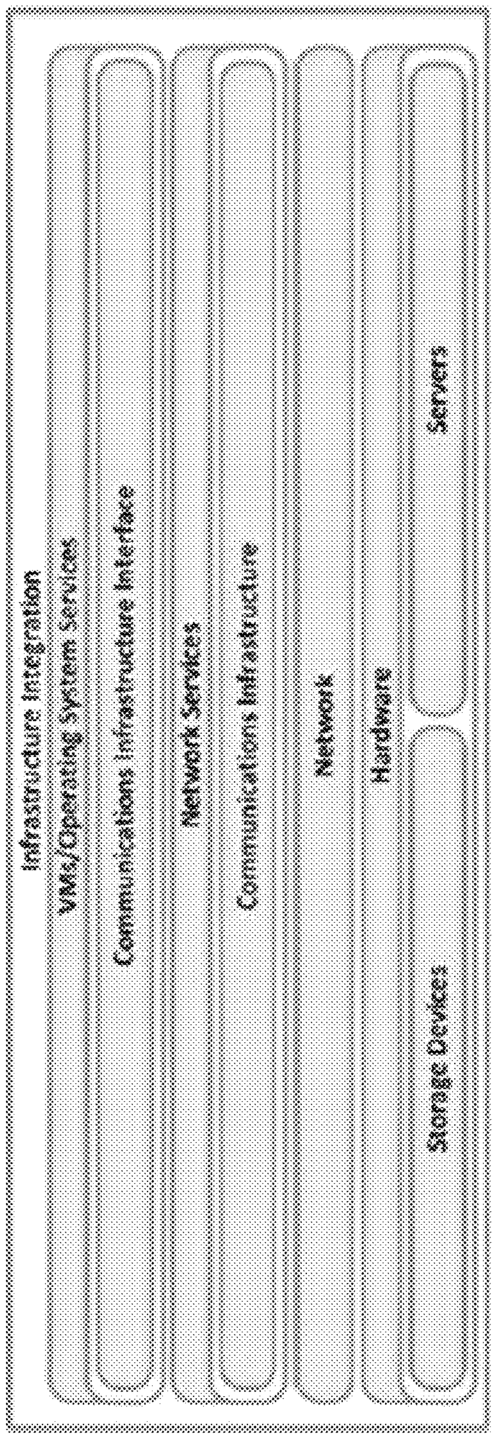
FIG. 21 is a diagram showing an infrastructure architecture framework taxonomy, according to some embodiments.

FIG. 21 is an excerpt of FIG. 18. It focuses on the architecture layer tagged as Area 1.3 in FIG. 19. The resulting framework taxonomy should be used to describe the related technical architecture elements of DKMF P2P (clusters) nodes' technical infrastructures (whether Cloud-based or traditional). It provides sufficient semantic precision to classify the various infrastructure layers, components, and sub-components within the Archemy™ Assets Catalog via Archemy's ArchNav™ tool. Additional business solutions-specific semantics are captured via Archemy™ tools such as EAMTk™, ArchDoc™, and ArchViz™ and added, as needed, to the descriptive business solution taxonomy via ArchNav™.

Figure 22:
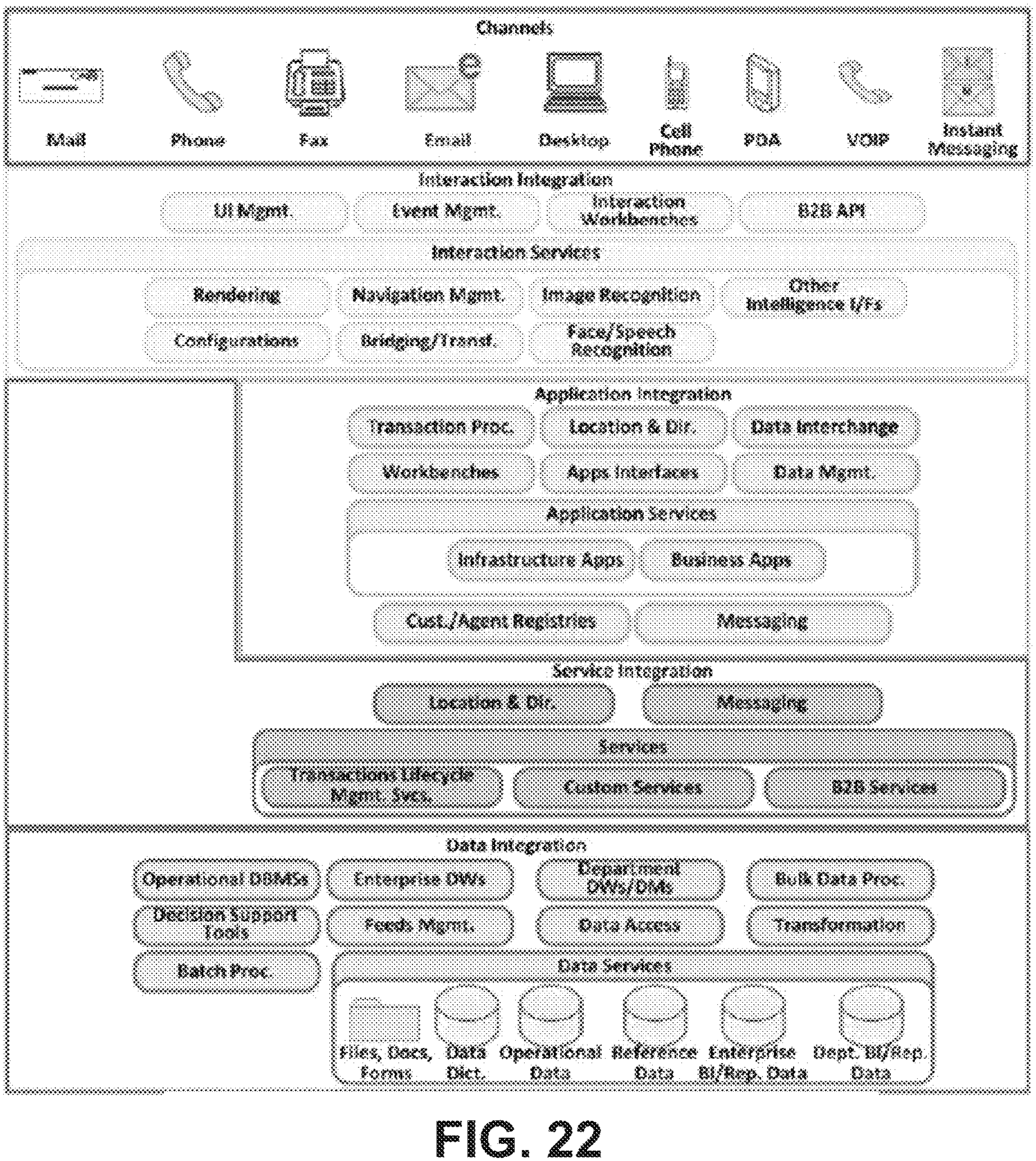
FIG. 22 is a diagram showing clusters of a service architecture framework taxonomy, according to some embodiments.

FIG. 22 is an excerpt of FIG. 18. It combines sub-areas of the architecture layer tagged as areas 1.1 and 1.2 in FIG. 19. The resulting framework should be used to describe the technical architecture elements of DKMF P2P clusters nodes (i.e., layers, components, and sub-components). It provides sufficient semantic precision to classify the various P2P clusters nodes' layers, components, and sub-components within the Archemy™ Assets Catalog via Archemy's ArchNav™ tool. Additional business solutions-specific semantics are captured via Archemy™ tools such as EAMTk™, ArchDoc™, and ArchViz™ and added, as needed, to the descriptive business solution taxonomy via ArchNav™. FIG. 22 assumes that DKMF P2P clusters nodes do not typically include a business process integration layer and may not include an interaction layer. However, nothing keeps DKMF-based business solutions architects from building P2P clusters node that have the same set of layers as the ones used by P2P nodes as illustrated in FIG. 14.

Figure 23:
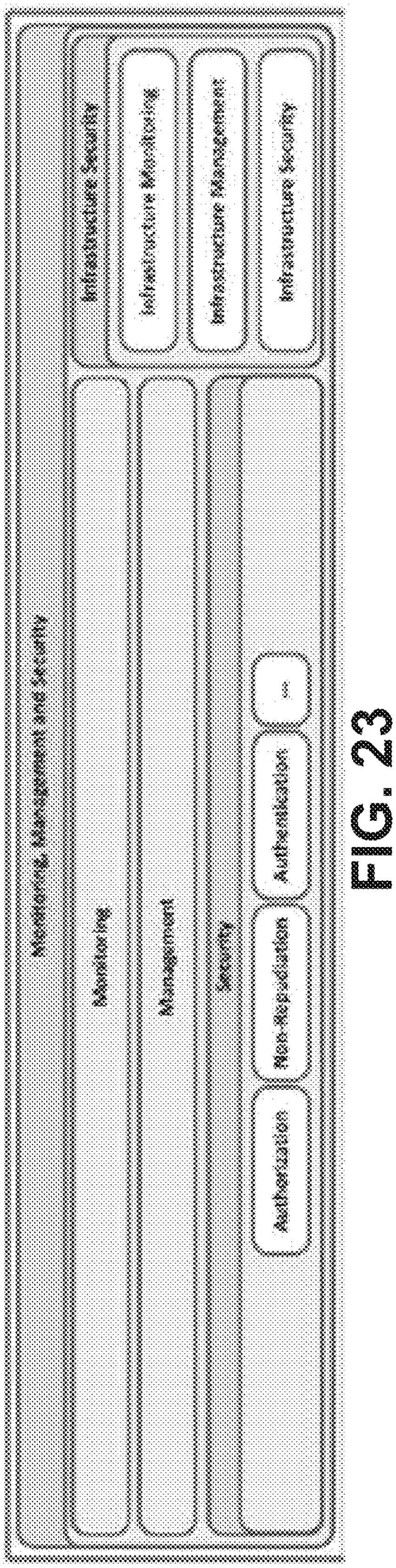
FIG. 23 is a diagram showing digital security and monitoring architecture framework taxonomy, according to some embodiments.

FIG. 23 is an excerpt of FIG. 18. It focuses on the architecture layer tagged as Area 2 in FIG. 19. The resulting framework taxonomy should be used to describe the related technical elements of DKMF P2P (clusters) nodes' digital security and monitoring architectures (whether Cloud-based or traditional). It provides sufficient semantic precision to classify the various layers, components, and sub-components within the Archemy™ Assets Catalog via Archemy's ArchNav™ tool. Additional business solutions-specific semantics are captured via Archemy™ tools such as EAMTk™, ArchDoc™, and ArchViz™ and added, as needed, to the descriptive business solution taxonomy via ArchNav™.

Figure 24:
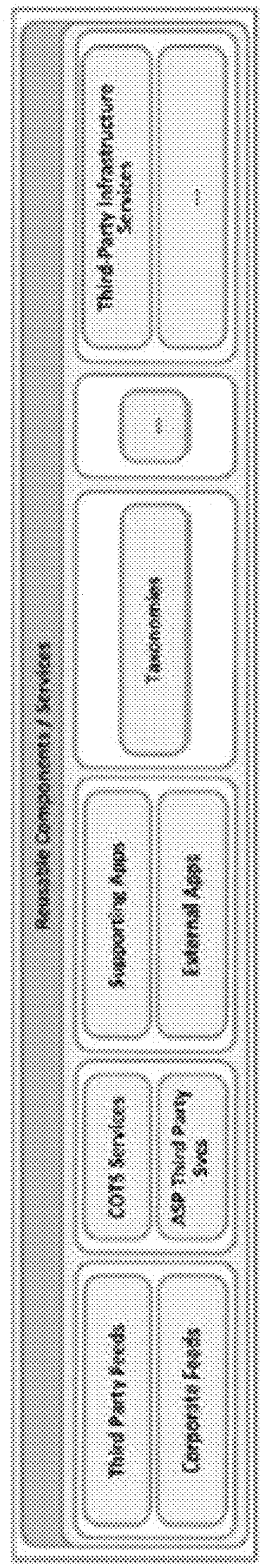
FIG. 24 is a diagram showing a component/service management architecture framework taxonomy, according to some embodiments.

FIG. 24 is an excerpt of FIG. 18. It focuses on the architecture layer tagged as Area 3 in FIG. 19. The resulting framework taxonomy should be used to describe the related technical elements of DKMF P2P (clusters) nodes' reusable components and services management architectures. It provides sufficient semantic precision to classify the various layers, components, and sub-components within the Archemy™ Assets Catalog via Archemy's ArchNav™ tool. Additional business solutions-specific semantics are captured via Archemy™ tools such as EAMTk™, ArchDoc™, and ArchViz™ and added, as needed, to the descriptive business solution taxonomy via ArchNav™. This part of the architecture framework focuses on DKMF-specific hosting of reusable business solutions and services components. These component are typically stored in the P2 (clusters) node's Digital Knowledge Base (cluster).

Figure 25:
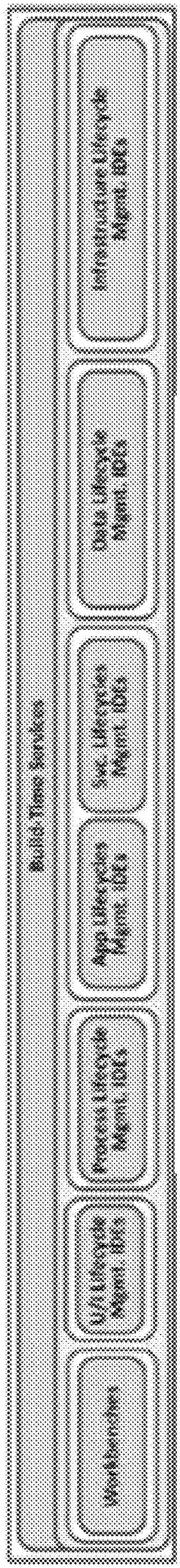
FIG. 25 is a diagram showing a development environment architecture framework taxonomy, according to some embodiments.

FIG. 25 is an excerpt of FIG. 18. It focuses on the architecture layer tagged as Area 4 in FIG. 19. The resulting framework taxonomy can be used to describe the related technical elements of the DKMF development environment architecture for P2P nodes. It provides sufficient semantic precision to classify the various layers, components, and sub-components within the Archemy™ Assets Catalog via Archemy's ArchNav™ tool. Additional business solutions-specific semantics are captured via Archemy™ tools such as EAMTk™, ArchDoc™, and ArchViz™ and added, as needed, to the descriptive business solution taxonomy via ArchNav™

Figure 26:
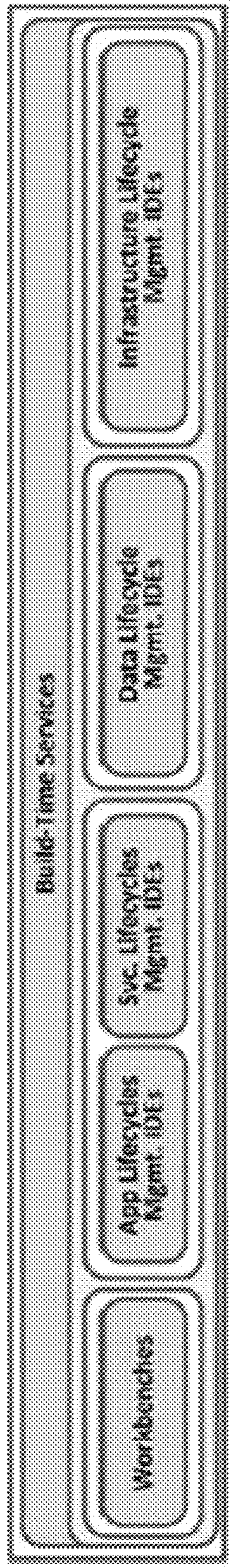
FIG. 26 is a diagram showing a cluster-type development environment architecture framework taxonomy, according to some embodiments.

FIG. 26 is an excerpt of FIG. 18. It focuses on a subset of the architecture layer tagged as Area 4 in FIG. 19. The resulting framework taxonomy can be used to describe the related technical elements of the DKMF development environment architecture for P2P clusters nodes. It provides sufficient semantic precision to classify the various layers, components, and sub-components within the Archemy™ Assets Catalog via Archemy's ArchNav™ tool. Additional semantics are captured via Archemy™ tools such as EAMTk™, ArchDoc™, and ArchViz™ and added, as needed, to the descriptive business solution taxonomy via ArchNav™. FIG. 26 assumes that DKMF nodes do not typically include a business process integration layer and may not include an interaction layer. Therefore, the development environment in FIG. 26 does not include provisions for interaction and business process integration components' development. However, nothing keeps DKMF-based business solutions architects from building P2P clusters node that have the same set of layers as the ones used by P2P nodes as illustrated in FIG. 20. If that is the case, the development environment architecture should be the same as the one used for P2P nodes development as illustrated in FIG. 25.

In the following, we assume that customers interested in building their own intelligent active and/or autonomous business solutions are using Archemy's DKMF to implement them and attach them to existing P2P clouds in the Archemy™ P2P constellation. If customers decide to implement their own DKMF, Archemy™ can provide node architecture details and API specifications via its API management portal as well as a custom DKMF test suite to assist customers interested in developing their own node architectures and implementations. Following these specifications will allow customers to attach their nodes to the existing Archemy™ constellation of P2P clouds and have them access the underlying Archemy™ business services clusters.

The Technical Architecture Framework shown at a high-level in FIG. 20 above was used with minor practical simplifications to implement Archemy™ P2P nodes. The benefit of using the DKMF is to immediately gain access to technical knowledge and architecture management as well as other capabilities as part of a ready-built framework (i.e., DKMF) that enables intelligent active and/or autonomous business solutions to operate and evolve in real-time within the Archemy™ P2P constellation. Knowledge management is a driving element in Archemy's KAEAM product development approach. By making the DKMF available to its solutions users, Archemy™ is enhancing the traditional "Product Development" value chain element mentioned in section IV.1 by providing access to knowledge and architecture management as well as other capabilities as part of a framework (i.e., DKMF) that enables intelligent active and/or autonomous business solutions to operate and evolve in real-time. As noted earlier, the DKMF is ready to accept plug-and-play enhancements provided by anyone interested in creating or augmenting business solutions to become intelligent and active and/or autonomous using the built-in facilities provided by Archemy™

In the following, we provide a conceptual technical architecture for the DKMF P2P constellation. We then elaborate on the logical architecture of DKMF P2P nodes and the underlying DKMF business services cluster.

Figure 27:
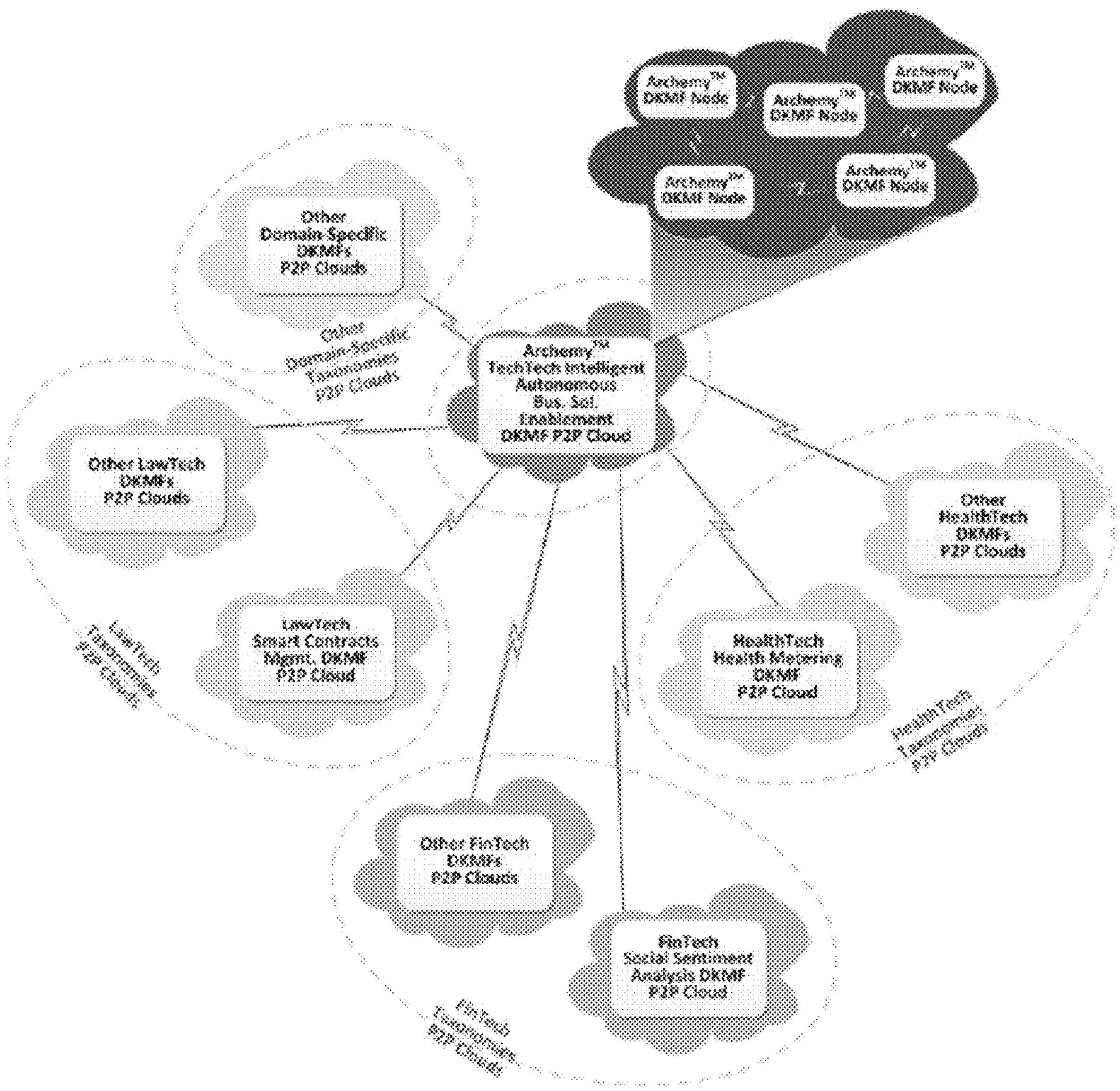
FIG. 27 is a diagram showing DKMF P2P constellations and clouds, according to some embodiments.

DKMF P2P Constellation Conceptual Architecture:

The technical architecture subsumed by the Archemy™ DKME includes domain-specific sets of intelligent active and/or autonomous business solutions deployed onto a P2P architecture as part of a "P2P cloud." It is assumed that all business solutions in a given P2P cloud share all or part of the same business taxonomy area (e.g., smart contracts business solutions). In other words, all business solutions that associate within a P2P cloud "speak the same language." The various P2P clouds may become interconnected as some of the business solutions evolve and require access to taxonomies from other P2P clouds. All P2P clouds are connected to the Archemy™ P2P cloud. This evolving arrangement leads to a P2P constellation that includes various P2P clouds as illustrated in FIG. 27. Each node in a given P2P cloud is an intelligent active and/or autonomous business solution supported by a specific company. Each node had its own limited scope knowledge base that includes the node's taxonomy, its business solution components, and the node's metrics pool. Node knowledge bases changes are automatically mirrored onto the global Archemy™ knowledge base cluster via Archemy™ P2P nodes. Archemy™ P2P clouds conform to a decentralized structured P2P architecture, rely on a P2P tracker cluster to improve the speed of peer discovery, and use a Distributed Hash Table to allow scalability and manage P2P nodes chum.

DKMF Nodes Logical Architecture:

Per the above, our goal is to be able to classify, enable, and evolve intelligent, knowledge-driven, active and/or autonomous, business solutions. To achieve this goal, our vision is that business solutions should be structured and enabled in a certain way to be intelligent and supportive of humans. First, each intelligent business solution, should be based on a scalable coexistence architecture model that makes it possible for them to evolve their existing features or add new features in an active and/or autonomous knowledge-driven fashion while making use of the most recent innovative technologies to implement them. We are therefore interested in making business solutions intelligent by augmenting their capabilities as needed using innovative technologies when needed, including AI but not limited to AI. Second, intelligent business solutions cannot simply rely on built-in knowledge that limits their ability to perform a few pre-determined tasks. Intelligent business solutions need to leverage augmented intelligence and should be able to network with other peer solutions using a P2P architecture to obtain the support needed to perform and/or evolve on an ongoing basis.

Note that the approach described so far purely relies on a traditional pattern of collaboration often used by humans to share knowledge and abilities to perform complex tasks faster. While deep learning techniques use simplified biological neural networks that attempt to mimic the way humans learn, we are not attempting to mimic telepathy here by considering a collaboration model that may look like the one humans use to collaborate. While, recent progress has been made on conscious brain-to-brain communication in humans using non-invasive technologies, the scientific community still considers parapsychology a pseudoscience. There are clearly no known mechanisms for telepathy today after more than 130 years of research in the field. We will therefore assume for the time being that the most practical model for intelligent business solutions to operate is to leverage collaborative learning and/or intelligence sharing as necessary.

Figure 28:
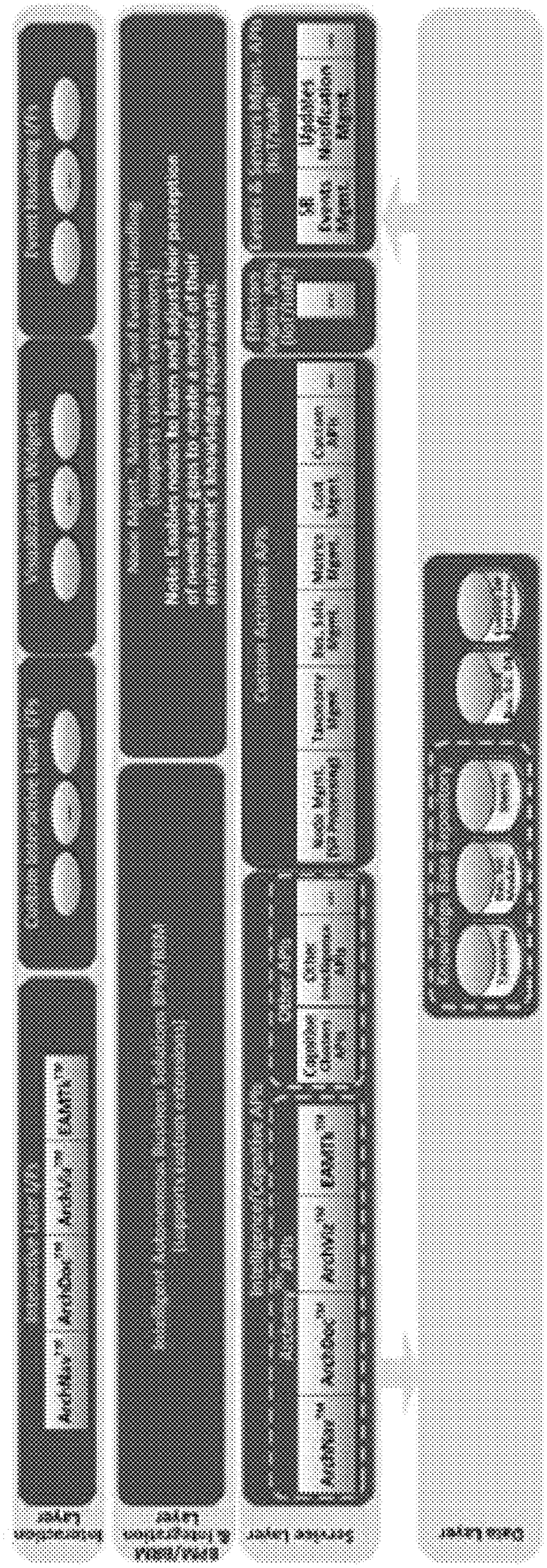
FIG. 28 is a diagram showing DKMF nodes logical architecture, according to some embodiments.

FIG. 28 illustrates the logical architecture of DKMF nodes, which is derived from the generic architecture set forth in the Technical Architecture Framework shown at a high-level in FIG. 20.

DKMF nodes have four layers including, from the top down, interaction integration, BPM/BRM service integration, application integration, and data integration layers. The BPM/BRM integration layer is shown at the same level as the application integration layer in FIG. 28. The DKMF uses both layers simultaneously and accesses them via the interaction integration layer as needed. Both layers access services and/or related APIs provided via the service integration layers and act as encapsulated components. As a result, it makes sense to consider these two layers as components of a single layer as far as the DKMF technical architecture is concerned. The DKMF framework comes pre-filled with knowledge management capabilities. It provides interfaces to the Archemy™ EAMTk™, ArchNav™, ArchDoc™, ArchViz™ tools that support activities that conform to the Archemy™ KAEAM processes. These KAEAM processes, along with supporting node manager activities, operate within the BPM/BRM and application integration layer. The corresponding KAEAM process activities are implemented by composing services from the service layer's cognitive APIs to the various Archemy™ tools. KAEAM activities interact with the local knowledge base repository to gain access to taxonomy, business solutions modules, and a collected pool of metrics. As explained earlier, the node manager may decide to delegate requests to other nodes in the P2P cloud it belongs to, and defer processing, when applicable, to the global DKMF cluster via its cognitive clusters APIs. DKMF nodes are equipped with a node management, monitoring, and events handling components that enables nodes to learn and adjust their perception of end-users needs and related node performance gaps to create a model of their environment and adjust to it in an intelligent active and/or autonomous fashion. The node manager also has access to custom activities APIs, which include cost management (Archemy™-specific module available via its Assets Catalog), SR processing, clusters management, and metrics management as part of the base DKMF configuration. Each node is also equipped with event handling interfaces to receive KMP events from other P2P nodes and the DKMF cluster. KMP events are handled by the node manager, SR processor, and update notification management APIs. The node manager has access to an extensible library of data visualization widgets to facilitate the presentation of results achieved via predictive, prescriptive, or cognitive analytics processing performed either locally or on the DKMF ArchSSV™ cluster. Provisions are made in P2P nodes to support events generated by IoT devices and react by controlling effectors connected to the node. For example, an IoT surveillance camera connected to a node may sense activity, record a video and pass it on to the node to analyze its content and trigger an alarm via an effector API. To analyze the content of the video, the node manager may have to call upon a special cognitive/intelligence API (or local module) that performs face or speech recognition. Such additional cognitive modules and APIs are key extensions to the suite of knowledge management intelligence modules provided by Archemy™. Some of these modules leverage deep learning architectures (e.g., deep neural networks, deep belief networks, and recurrent neural networks) to help power a myriad of cognitive capabilities (e.g., computer vision, speech recognition, natural language processing, audio recognition, social network filtering, machine translation, and bioinformatics). Finally, the node manager uses a local database to maintain its operational state, which is managed as part of the local ArchKBM™-lite repository.

So far, we have described the pre-configured functionality that any DKMF node has access to as part of its base architecture and implementation. In addition to these capabilities, node functionality may be extended by adding: (a) custom data visualization widgets, (b) event handling interfaces, (c) BPMN process models and related activities and rules deployed within the built-in BPM/BRM engine, (d) node management, monitoring, and events handling extensions (i.e., to support additional node processing activities, and manage additional types of metrics and events), (e) custom cognitive modules and APIs, (f) custom activities modules and APIs, (g) custom effectors management modules and APIs, (h) custom events and sensors management modules APIs, (i) schema extensions for the local business solutions database, and (j) custom clusters to extend the existing clusters cloud.

The DKMF service layer that interacts with the clusters Cloud is implemented using a microservices architecture. We believe that this choice of architecture is a good fit as the boundaries for componentization of the DKMF capabilities are well established and Archemy™ does not anticipate major clusters services interface changes that could not be handled via DKME teamwork. Furthermore, the clusters themselves are monolithic and benefit from the modularity provided via the microservices architecture. Clustered capabilities are therefore implemented as suites of services. These services are independently deployable and scalable, each service also provides a firm module boundary, even allowing for different services to be written in different programming languages. They can also be managed by different teams. We share the belief that the microservices architectural style is an important idea worth serious consideration for enterprise applications but do not advocate that it will become a default style for building enterprise applications.

While DKMF nodes subsumes the aforementioned capabilities, nodes can be extended to implement custom capabilities that leverage the built-in knowledge management and DKME underlying (augmented intelligence) support facilitated by the Archemy™ P2P constellation and the underlying clusters Clouds. Custom activities may implement and integrate their own architectures and do not need to abide to microservices (or any other) architectures to connect to their own underlying subsystems (i.e., services clusters or other). For example, the Baanda™ smart contract business solution discussed in section VII.3 is implemented using Blockchain 2.0 and operates an Ethereum DApp application within the Ethereum network. It uses a DKMF node, a custom BPM flow of activities and a custom U/I to interface with its end users. It also leverages the Archemy™ knowledge management capabilities to map the semantics of contracts specified in English (or other natural language) between various end users into a known taxonomy. It then translates the contract taxonomy into the Ethereum Solidity language and passes the contract onto Blockchain 2.0/Ethereum (via a DKMF custom activity API) to take advantage of Blockchain's immutable storage and to handle subsequent events processing and contract modifications chaining. The DKMF node facilitates contract updates and manages related events while taking advantage of the DKMF cognitive capabilities to analyze the lifecycle of contracts and suggest updates as/when needed. Resulting contract updates are passed to the BlockChain 2.0/Ethereum DApp and chained with the original contract. This example demonstrates that the DKMF does not impose specific architectural constraints on the implementation of custom solutions. Custom business solutions builders are free to build their own architectures while leveraging the DKMF framework and attaching their solutions to the Archemy™ DKME.

As indicated above, the DKMF framework is quite flexible and makes it possible to design intelligent active and/or autonomous business solutions as processes specified using the BPMN notation, or as individual activities in a BPMN process specification. Intelligent active and/or autonomous business solutions may also operate in a P2P cloud that operates as a "M2M" network. There are absolutely no limits to the architectural possibilities for custom intelligent active and/or autonomous applications. The DKMF is simply meant to augment new or existing business solutions with the ability to leverage cognitive, architectural, and other capabilities that make it possible for them to operate as innovative intelligent active and/or autonomous business solutions within the Archemy™ DKME. In fact, the DKMF already allows integration of many of the innovative technology enablers that Archemy™ has been focusing on. In particular, DKMF nodes can integrate enablers such as interactive user experience (e.g., AR/VR), connected ecosystems (e.g., IoT, IoM), cognitive computing (e.g., KM, ML, DL). DKMF clusters integrate other key enablers such as hyperscale computing (i.e., HPC), enterprise analytics (e.g., Big Data and Cognitive Analytics), and digital security (e.g., Cybersecurity). The overall DKMF P2P architecture leverages next-generation enterprise and solution architectures knowledge (e.g., EAM, AEAM™, KAEAM, ArchDev™/DevOps, AELC, deployment containers), and next-gen infrastructures (e.g., CDN, SDN/SDS in the near future). Using a BPM/BRM engine within DKMF facilitates the rewiring of existing business solutions when underlying business solutions components evolve and need to be updated. BPMN process activities are typically implemented as API calls to (internal or external) business services accessible from the service layer. This design makes it easy to reconfigure the functionality of DKMF nodes by providing an updated BPMN model (as/if needed) and updating the components that provide the functionality that is accessed via the API. DKMF provides a sophisticated component composition and integration capability to smooth the integration of new components used to implement BPM services. Once a P2P node is reconfigured, it is regenerated and redeployed seamlessly, as needed, so that nodes can operate using updated and/or functionality at all times.

Figure 29:
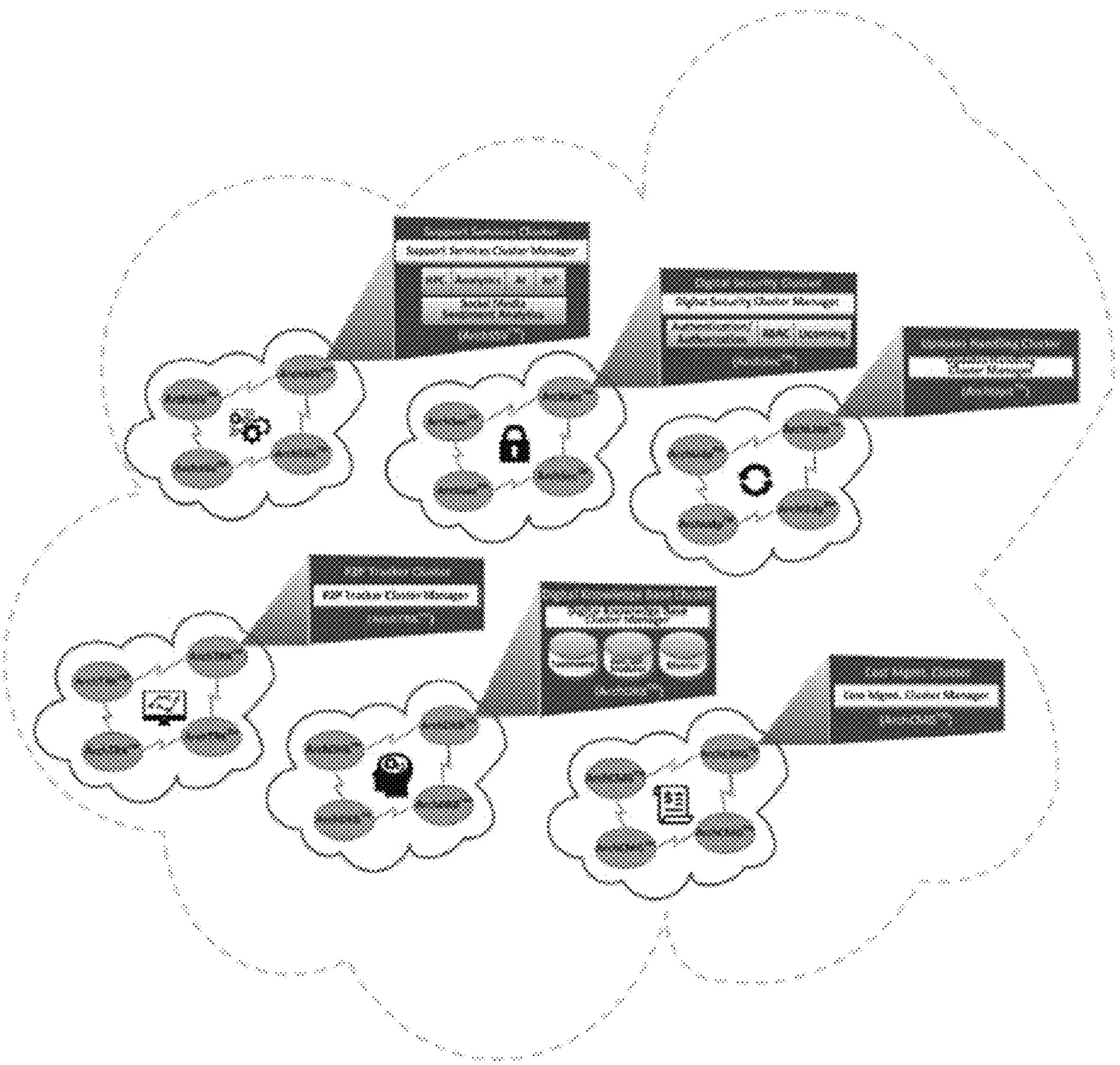
FIG. 29 is a diagram showing s DKMF clusters logical architecture, according to some embodiments.

DKMF Clusters Cloud Logical Architecture:

FIG. 29 illustrates the logical architecture of the DKMF clusters layer that provides support to the Archemy™ constellation. The various clusters are described in section IV.1.

This section provided a wealth of details on the DKME and DKMF architectures and the high-level design of some of their internal components. In the next section, we delve into the theory that supports the choices that were made to address some of the complexities of the ecosystem and framework.

V. Theoretical Framework

"Rational prediction requires theory and builds knowledge through systematic revision and extension of theory based on comparison of prediction with observation. . . . It is an extension of application that discloses inadequacy of a theory, and need for revision, or even new theory. Again, without theory, there is nothing to revise. Without theory, experience has no meaning. Without theory, one has no questions to ask. Hence without theory, there is no learning."—William Edwards Deming As noted in Section I, the ecosystem framework described in the present disclosure combines various techniques in a novel way to facilitate the creation and management of intelligent active and/or autonomous business solutions in various business contexts. These techniques and their implementation draw from many years of research in various areas of computer science including enterprise and solution architectures, knowledge management, intelligent active and/or autonomous agents and artificial intelligence. As always, the sum of the parts is greater than the parts themselves and improving on the parts will keep augmenting the value that can be gleaned from their combination. In the following, we delve into the theory that supports the most challenging aspects of the DKMF. We also explain the added value that results from this work and possible areas of continued research to improve the approach. We first relate the choices made to design the DKMF to accepted architecture best practices in software engineering and Enterprise Architecture Management (EAM). We then focus on the core aspects of the approach and explain the theoretical rationale and value added by our approach as it pertains to taxonomy management, active and/or autonomous business solutions management, and metrics management. As mentioned earlier in the present disclosure, the DKMF node manager capability uses APIs to these more granular capabilities, which provide the core functions. We will not be discussing the theoretical framework for the DKMF cost management capabilities since it leverages Blockchain or similar technology (e.g., Hashgraph, Electrum) that is covered elsewhere in research papers.

V.1. Digital Knowledge Management Framework

The design and implementation of the DKMF leverages the results of decades of research in enterprise and solution architectures as it relates to architectural patterns and their intricacies, and the frameworks used to create and manage enterprise business solutions. We elaborate on both aspects in the following.

Focus on Patterns:

In this subsection, we first provide some background on accepted architecture best practices and the use of patterns in software engineering today. We believe that this background is necessary to explain the choices that were made to design the DKMF. We subsequently explain how the DKMF builds on and helps extend the collective knowledge that relates to software patterns. We also state our intentions for continued work in this area.

In the field of software engineering, Christopher Alexander, a well-known building architect, is regarded as the father of the Pattern Language movement. Eric Gamma, Martin Fowler, and several other contributors are all part of the large community that has been focusing on collecting and documenting software patterns over the past thirty years. As a side note, the original wiki, the technology behind Wikipedia, led directly from Alexander's work, according to its creator, Ward Cunningham. Christopher Alexander's work has also influenced the development of Agile software development and Scrum.

In general, a "pattern" documents a recurring problem-solution pairing within a given context and provides the rationale that binds them together. Following the same intent, each software pattern deals with a specific, recurring problem in the design or implementation of a software system. Therefore, software patterns, which we will refer to as "patterns", in the following, can be used to construct software architectures with specific properties. Patterns also capture existing, well-proven experience in software development (i.e., the collective experience of skilled software engineers) and help promote good design practice. As it comes to their classification, patterns are either design or implementation-centric, and range from abstract to concrete. The design-centric patterns are typically organized in a "pattern hierarchy" that includes "architectural styles", "architectural patterns", and "design patterns." The corresponding implementation-centric pattern hierarchy includes "implementation styles", "implementation patterns", and "idioms." In patterns terminology, styles are named collection of architectural (design or implementation) decisions that are applicable in a given software development context, constrain architectural decisions that are specific to a system within that context, and elicit beneficial qualities in each resulting system. For example, Service Oriented Architecture (SOA) is a design-centric architectural style, and Enterprise Service Bus (ESB) is a corresponding implementation-centric implementation style. An Architectural Pattern is a named collection of architectural design decisions that are applicable to a recurring design problem parameterized to account for different software development contexts in which that problem appears. For example, MVC is a design-centric architectural pattern, and ASP.Net MVC is a corresponding implementation-centric implementation pattern. Finally, a design pattern relates to common design structures and practices that enable the creation of reusable software. For example, a "singleton" is a design pattern that restricts the instantiation of a class and ensures that only one instance of the class exists (e.g., a scoreboard class in a game should be modeled as a singleton to ensure that there is only one scoreboard object and one set of scores for the players at any given time). A Java singleton class is a corresponding implementation-centric example of an idiom that implements a singleton design pattern and allows one instance of a Java class to exist. Enterprise and solution architects make use of pattern hierarchies to create best practice architectures for software systems that are meant to implement solutions to business problems. For example, a single (enterprise or solution) architecture may contain several architectural styles, and each architectural style may make use of several architectural patterns. Furthermore, patterns are typically combined as a coherent set, referred to as a "pattern language", that provides a connected view of how to apply one pattern in the presence of another. Patterns may be described using a pattern taxonomy and stored in a pattern repository or catalog (e.g., patterns catalog at hillside.net). The community of enterprise architects typically describes enterprise architectures using four separate architecture domains (i.e., business, application, data, and technology) and uses architecture views to handle hybrid domains (e.g., an information systems architecture is as an architectural view that spans across the application and data architecture). Therefore, the applicability of patterns may be qualified according to the (combination of) domain(s) of architecture they apply to (e.g., business architecture patterns). There may be several implementation-centric patterns that realize a given design-centric pattern.

Software systems generally include sub-systems, which are sets of collaborating components performing a given task. A sub-system is therefore considered a separate entity within a software architecture. It performs its designated tasks by interacting with other sub-systems and components. A component is an encapsulated part of a software system, which has an interface and serves as a building block for the structure of a (sub-)system. At a programming language level, components may be represented as modules, classes, objects or as a set of related functions. When designing architectures for software systems, software designers typically start with a requirements model (either explicit or implied) that presents an abstract representation of the system. The requirements model describes the problem set, establishes the context, and identifies the system of forces that hold sway (e.g., design quality attributes). In a traditional architecture design approach that does not leverage patterns, software designers gather the "big picture" from the requirements model and proceed with defining external entities (i.e., other systems, devices, people) that the software system interacts with and the nature of the interaction. Software designers then need to identify a set of architectural archetypes and specify the structure of the system by defining and refining software components that implement each archetype. When they think about applying patterns or start "thinking in patterns," software designers first try to relate patterns to the requirements model, which communicates the big picture and the context in which the software to be built resides. Examining the big picture, they extract the patterns that are present at that level of abstraction and begin their design with big picture patterns that establish a context or skeleton for further design work. They then work inward from the context looking for patterns at lower levels of abstraction that contribute to the design solution. The same steps of applying patterns are repeated until the complete design is fleshed out and the design is then refined by adapting each pattern to the specifics of the software being built. Per the approach, the various types of patterns mentioned earlier are applied to the big picture with their level of abstraction in mind. An architectural style is a transformation that is imposed on the design of the entire software system. It corresponds to a coordinated set of architectural constraints that restricts the roles/features of architectural elements and the allowed relationships among those elements within any architecture that conforms to that style. An architectural Pattern expresses a fundamental structural organization schema for the software system (e.g., predefined sub-systems and their responsibilities, rules and guidelines for organizing the subsystems, and relationships between subsystems). Finally, a design pattern provides a scheme for refining the sub-systems or components of the software system, or the relationships between them. It describes a commonly-recurring structure of communicating components that solves a general design problem within the particular context of the software system at hand. An archetype may be defined as an abstraction (similar to a class) that represents one element of system behavior).

While the architectural design approach described in the above leads the way to pattern-based design, patterns themselves may not always be sufficient to develop a complete design. In some cases, it may be necessary to provide an implementation-specific skeletal (sub-)system, called a "framework", for design work. That is, you can select a "reusable mini-architecture that provides the generic structure and behavior for a family of software abstractions, along with a context ( . . . ) which specifies their collaboration and use within a given domain." A framework is not an architectural pattern, but rather a skeleton—a partially complete software (sub-)system that is intended to be instantiated—with a collection of "plug points" (also called "hooks" and "slots") that enable it to be adapted to a specific problem domain. The plug points enable you to integrate problem specific classes or functionality within the skeleton. Therefore, a framework defines the architecture of a family of (sub-)systems and provides the basic building blocks to create them. It also defines the places where adaptations for specific functionality should be made.

As we delved into the architectural design of a software system that would enable business solutions to learn how to improve their performance of particular tasks on their own, it quickly became clear that the system could not be designed outright by just applying patterns. Thinking in patterns did help relate some patterns to our DKME technology environment requirement model and revealed that our software solution should leverage characteristics from several architectural styles including Cloud, P2P, and Microservices. We also identified the need to leverage the EAM, BPM and Intelligent Active and/or autonomous Agents architectural patterns as part of our software solution. Our architectural design led to a partially complete software system or framework (i.e., DKMF) that could be instantiated to power intelligent active and/or autonomous business solutions as nodes in a decentralized marketplace. To support the creation of complete business solutions, DKMF nodes provide a collection of plug points, shown in FIG. 28, that enable solutions to be adapted to address customer problems in various business domains. Plug points are available in all the layers of the logical node architecture as noted in FIG. 28. Examples of plug points at the service layer level include the ability to extend the set of cognitive, custom activities, effectors management, and events/sensors management APIs to support additional functionalities that are not included in the baseline framework provided by Archemy™.

While the DKMF clearly builds on the collective knowledge that relates to software patterns, it also helps extend it going forward in at least three novel ways that add a tremendous value by facilitating the use of patterns in intelligent active and/or autonomous marketplaces:

1. The DKME takes a novel approach by semi-automating the enforcement and use of best practices design in business solutions rather than just suggesting them.

2. The DKMF semi-automates the selection and deployment of reusable best practice solutions that are stored in an underlying Assets Catalog using AI ML and DL (and the DKME as needed) to match solutions and BPM integration algorithms to enact them.

3. The DKMF combines P2P and microservices architectural styles and includes architectural patterns such as EAM and BPM in a novel way to allow semi-automated strategy guided transformations of legacy (i.e., monolithic) or other business architectures to next-generation decentralized marketplaces (coexistence) architectures that leverage P2P, Microservices, and EAM to power intelligent active and/or autonomous service-centric business solutions.

Indeed, by streamlining the process of creating and managing intelligent active and/or autonomous business solutions and providing a framework to build upon, the DKMF makes it possible for solutions designers to focus on appropriate architectural choices when designing and implementing best practice reusable plug points solutions that use innovative and often nascent technology enablers (e.g., machine learning, deep learning, IoT). This will lead to more guidance and understanding, and will facilitate the discovery of new patterns and further help develop and combine existing ones as new reusable innovative business solutions using these patterns come to light and provide immediate business value to customers in various industries. What is novel there is that the DKME enforces the use of best practices rather than just suggesting them. Unless a reusable component has been vetted as best practice, it will not be stored in the Assets Catalog and used in business solutions attached to the DKME marketplace. Furthermore, the novel knowledge management capabilities built into the DKMF are meant to facilitate and semi-automate the selection of these reusable best practice solutions that are stored in an underlying Assets Catalog. As the DKMF uses ML/DL (and the DKME as needed) to match solutions to user needs and as the pool of solutions grows, the precision of matches will keep increasing as will the focus on creating new patterns to optimize the suitability of business solutions. Business solutions will then be augmented and re-deployed using our BPM integration algorithm. Another major benefit of DKMF, as it comes to helping extend the collective knowledge of software patterns, is that it nurtures the need to evolve pre-existing patterns to align them with the decentralized characteristics of the P2P architectural style. For example, the BPM and EAM architectural patterns have typically been applied to centralized architecture and related patterns should be developed for cooperative information systems. The focus on P2P architectures is bound to increase as new changing attitudes of individuals, such as millennials, has led to the emergence and dominance of P2P marketplaces. Traditional industries are being disrupted and pushed to re-strategize. A PwC UK 2014 report estimates that P2P economies will grow to $335 billion in 2025 compared to $14 billion in 2014. Fashion and apparel, alone, is expected to be $33 billion by 2021. Over the past couple of years, the microservice architectural style has become a de facto architectural style for enterprise solutions as it allows the transformation of traditional monolithic architecture to business service centric best practice architecture. The DKMF's novel combination or the P2P and microservices architectural style, and the inclusion of architectural patterns such as EAM and BPM, takes this a step further by allowing semi-automated strategy guided transformation of legacy (i.e., monolithic) or other business architectures to next-generation decentralized marketplaces (coexistence) architectures that leverage P2P, Microservices, and EAM to power intelligent active and/or autonomous business service-centric solutions. Using DKMF will also support the need to evolve pre-existing patterns to become suitable in a P2P context as well as create pattern languages that are compatible with future combinations of architectural styles so that reusable best practice components can be created and reused to power next generation business solutions.

Figure 30:
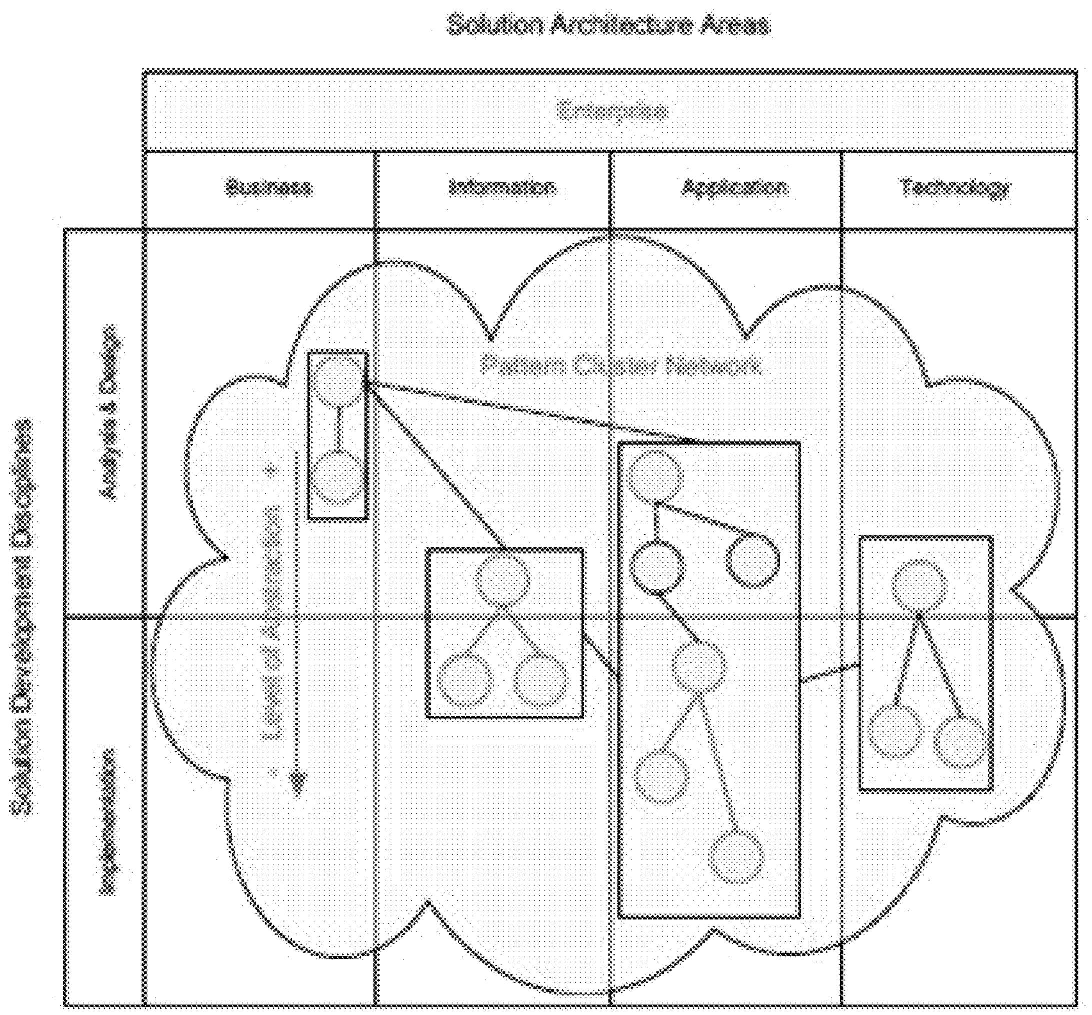
FIG. 30 is a diagram showing s pattern clusters catalog structure, according to some embodiments.

Continued work towards developing and promoting the use of patterns is driven by our focus on best practice reusable components and our need to keep improving DKMF's ability to match and integrate best practice reusable components seamlessly as part of intelligent active and/or autonomous business solutions. We believe that continued research and development on DKME and DKMF will lead to the creation of a specific cluster of design- and implementation-centric pattern hierarchies, languages, and catalogs for intelligent active and/or autonomous business solutions. FIG. 30 illustrates the general structure of the pattern catalog we are working on for such clusters of patterns related to intelligent active and/or autonomous business solutions.

Corresponding architectural styles will be derived from learnings gleaned from widespread usage of the DKME and DKMF in the industry as well as the application of AEAM, KAEAM, and AELC in practical settings. These architectural styles will focus on managing the lifecycle of intelligent active and/or autonomous business solutions in an optimal way. Associated architectural patterns will be derived from similar learnings gleaned from the widespread use of the DKMF components including Cost Management, Node Management, Clusters Management, Taxonomy Management, Business Solutions Management, and Metrics Management. We will elaborate on these various topics in a separate paper that will be published soon. Another area of interest is to provide semi-automated improved support for additional KAEAM activities (i.e., including and beyond "discover", "reuse"/"update", and "deploy") using various tools as mentioned in Section IV of the present disclosure. This will require the adoption of common standards for taxonomies, which we are working on with our partners and affiliates and through our business divisions and innovative technology practices.

Focus on Enterprise Architecture Management (EAM):

In this subsection, we first provide some background on the way business solutions are assembled in enterprises today using EAM. We believe that this background is necessary to understand the choices that were made to design the DKME/DKMF and their benefit as it applies to the creation and management of suitable business solutions. We subsequently explain how the DKMF builds on and helps extend the collective knowledge that relates to EAM. We also state our intentions for continued work in this area.

Enterprises always focus on activities that allow them to meet their current and future objectives. Current objectives reflect enterprises' mission and short-term strategies while future objectives reflect their vision and long-term strategies. To ensure successful development and execution of these strategies, either short or long term, enterprises recourse to Enterprise Architecture (EA). EA provides a comprehensive well-defined approach to determine how an organization can most effectively achieve its objectives. Practically, EA follows the requirements of a pre-established operating model, helps establish meaningful strategic boundaries and helps define and manage core business capabilities to enable the creation and evolution of a business platform for execution that automates routine business tasks and allow people to concentrate on improving the business rather than just purely running it. Enterprise Architects typically engage with business and technology executives via a system of governance mechanisms to ensure that business and IT projects achieve both division-wide and company-wide objectives. EA is an evolving practice that takes time, patience, and investment. As stated by Gartner Group most recently, "EA must proactively and holistically lead enterprise responses to disruptive forces by identifying and analyzing the execution of change toward desired business vision and outcomes. EA delivers value by presenting business and IT leaders with signature-ready recommendations for adjusting policies and projects to achieve target business outcomes that capitalize on relevant business disruptions." In the past forty years, businesses have shifted their focus away from operational excellence to address business disruptions (i.e., automation and cost optimization), business/IT agility (i.e., process and data integration agility), boundary-less Enterprises (i.e., expanded ecosystem collaborating with consumers and partners), and now real-time enterprises (i.e., the next-generation of automation, real-time sensing and reaction). While not so long ago, EA's focus was on aligning systems of records and (first generation) systems of automation with business needs, the (digital) systems of insight are now meant to support all other systems and the targeted end result is proper integration of business and IT innovation. In a nutshell, EA helps transform organizations and guide them through innovation as business focus changes to respond to disruptive forces.

Traditional EA used a model-centric approach to determine how an organization could most effectively achieve its current and future objectives. It captured a representation of the current enterprise architecture as a set of conceptual, logical, and technical blueprints and attempted to align them with a future state reference architecture that defined the end goal to be achieved by the enterprise. This model-centric approach was prohibitively time-intensive to keep up-to-date and left too much room for error as changes to the architecture occurRed unchecked and isolated in the heads of small groups of architecture specialists. This has led to a more modem approach to EA referred to as Enterprise Architecture Management (EAM). Successful Enterprise Architecture programs today are approached from a management perspective as opposed to a modeling perspective. A new generation of EA Planning tools has also emerged (e.g., SoftwareAG's Alfabet) that supports not only the modeling of the architecture, but also the creation of roll-out and implementation plans for continuous IT improvement over time. EAM is a management practice that establishes, maintains and uses a coherent set of guidelines, architecture principles and governance regimes that provide direction and practical help in the design and development of an enterprise's architecture to achieve its vision and strategy. EAM brings the highly distributed knowledge of all experts to the table and allows every participant to provide such knowledge and input in the terms that best fit the experience and expectations of the contributing stakeholders.

As EA (and EAM) regards the enterprise as a large and complex system or system of systems, it is necessary to manage the scale and complexity of this system. To address this requirement, Enterprise Architecture Frameworks (EAFs) provide tools and approaches that help architects abstract from the level of detail at which builders work, to bring enterprise design tasks into focus and produce valuable architecture description documentation. EAFs provide structured guidance that is divided into three main areas including descriptions of architecture (i.e., how to document the enterprise as a system, from several viewpoints), methods for designing architecture (i.e., overarching enterprise architecture process, composed of phases, broken into lower-level processes composed of finer grained activities), and organization of architects (i.e., guidance on the team structure and the governance of the team, including the skills, experience, and training needed). To describe architectures, EAFs employ flexible data models that are built upon metamodels that provide evolving outlines for capabilities and relationships. A single house is much like a single system—it has various types of architecture within it and it exists within ever-larger ecosystems.

Figure 31:
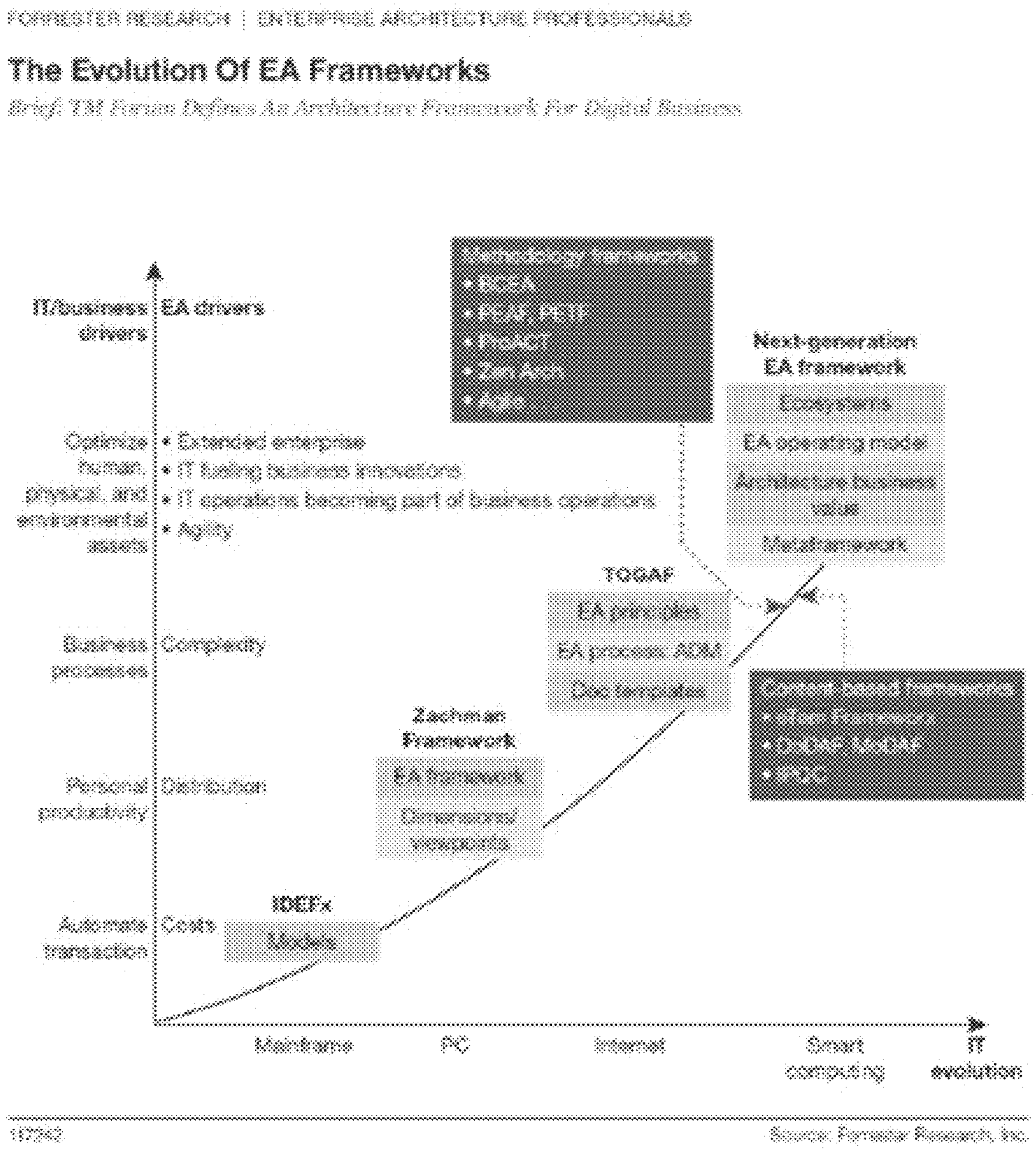
FIG. 31 is a chart showing the evolution of Enterprise Architecture frameworks.

As the practice of EA evolves, the supporting EAFs frameworks that enable communities and enterprises to apply EA also evolve. Indeed, as complexity increases, the ingenuity needed to master it must continuously improve. In fact, Architecture strategies keep playing an enormous and ever-increasing role in determining whether an enterprise is successful. The next generation of EAFs is focused on enabling the creation of dynamic ecosystems and related architectures that provide value for all business participants via systems of insight that integrate and facilitate decisioning across systems of record (i.e., focus on costs), systems of operations/automation (i.e., focus on Opex), systems of design (i.e., focus on innovation), and systems of engagement (i.e., focus on customer experience). FIG. 31 illustrates the evolution of EA frameworks that has taken place over the years.

Figure 32:
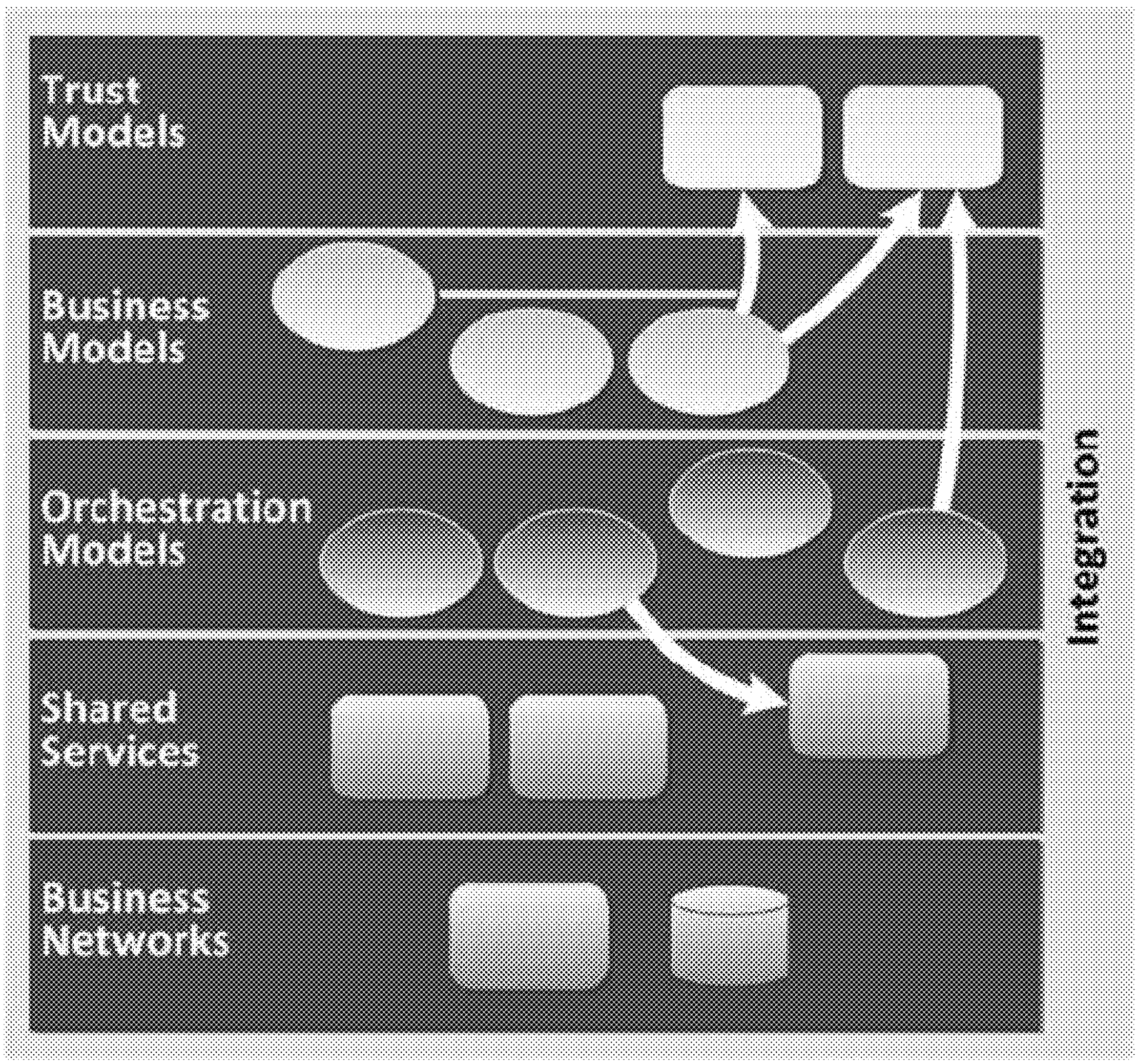
FIG. 32 is a diagram showing next-generation ecosystems architectures, according to some embodiments.

The architecture subsumed by this new breed of ecosystems is illustrated in FIG. 32. It relies on various layers that can be modeled (using next-generation EAFs) as trust models, business models, orchestration models, shared services models, and business networks. Trust models ensure that all participants within the ecosystem share and agree on additional values than just making money (e.g., respect privacy, guarantee security, provide customer oriented value and social values, improve level of quality) as well as shared outcomes including externalities (e.g., pollution, regulation). Business models ensure that the values identified in trust models are shared and business models can be established which split the margin and revenue between ecosystem participants. Orchestration models optimize the split of responsibilities and orchestrate services to deliver the best values for customers at the right price/quality (e.g., the links navigation digital experience journey or the knowledge flows journey maps to services and processes at the ecosystem level). Shared services models include supporting data and application services. Finally, business networks enable the sharing of processes and data (e.g., cloud applications shared between partners in digital business networks via a mix of shared and multi-tenancy architectures).

Figure 33:
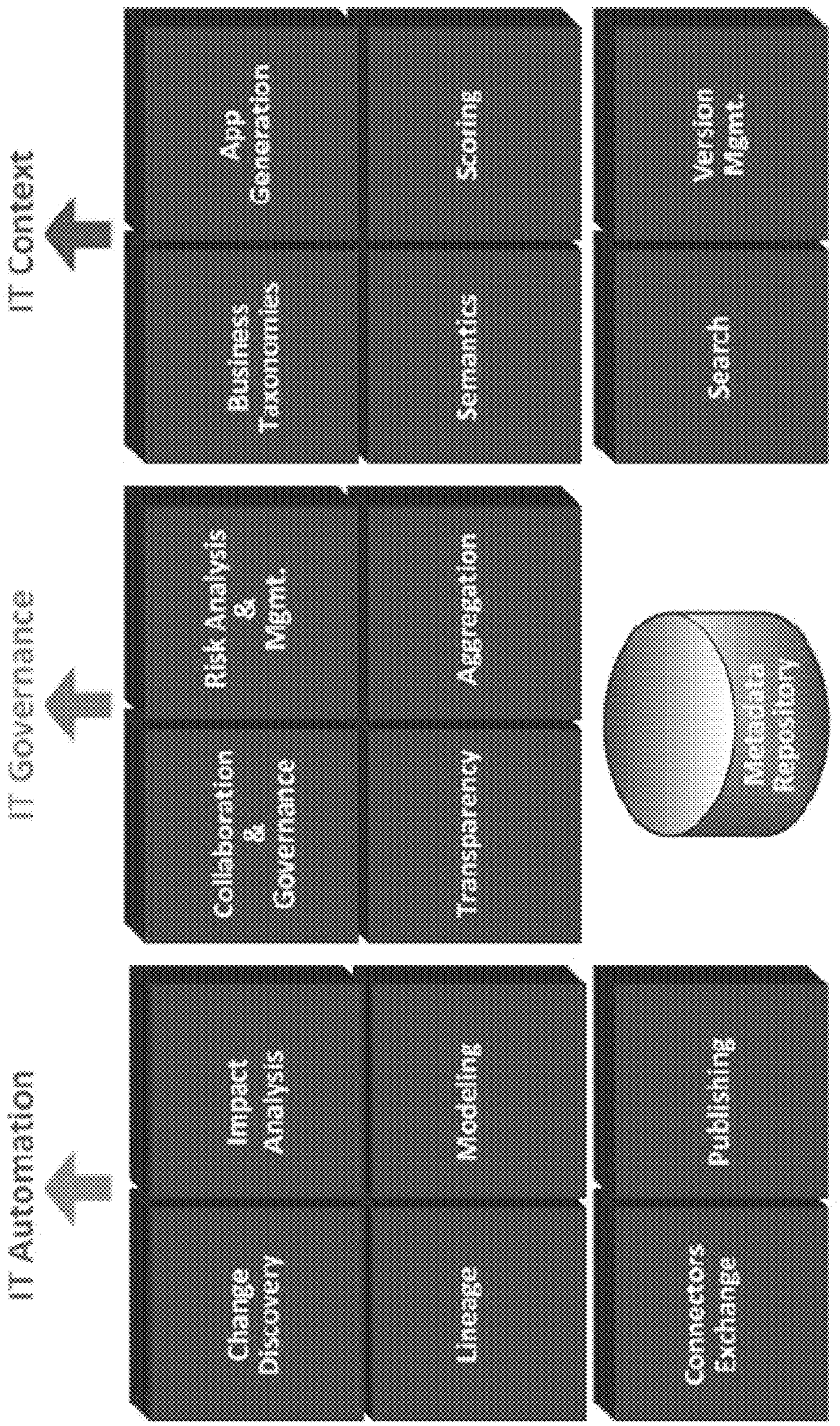
FIG. 33 is a diagram showing metaframework capabilities, according to some embodiments.

To provide adequate support, next-generation EAFs must supply an extensive set of generic capabilities as part of an underlying meta-framework as illustrated in FIG. 33. Clearly, these capabilities go beyond modeling and related features and must be meant to span across EAFs requirements for IT Automation, IT Governance, and IT Context management. The DKME described in the present disclosure is a next-generation ecosystem, architected as per the guidelines provided in FIG. 33 above. It is meant to provide support for an extensible organically growing set of interconnected intelligent active and/or autonomous business solutions marketplaces. The DKME is meant to support next-generation trust models such as the ones indicated earlier. As per FIG. 28, the underlying DKMF node architecture is designed to support the development and deployment of next-generation business models and the orchestration of shared services (via its BPM/BRM and integration layer). It also enables the sharing of processes and data via its decentralized P2P infrastructure. Furthermore, the DKMF implements and leverages some of the built-in EAF meta-framework capabilities shown in FIG. 33 to manage context (e.g., the DKMF node manager uses taxonomies to match user requests to suitable business solutions behavior), governance (e.g., the DKMF node manager governs taxonomy, business solutions, and metrics management), and automation (e.g., the DKMF node manager monitors needed changes, and updates/re-deploys business solutions as needed). The DKMF uses several tools and related APIs to gain access to these meta-framework capabilities and includes a metadata repository as part of its underlying knowledge base. In particular, the EAMTk™ tool allows business solutions to learn how to improve their performance of particular tasks on their own. To drive the overall meta-framework governance aspects, Archemy™ has developed an Agile EAM (AEAM) approach, which is documented on its website. Archemy™ paired AEAM with a tool-driven knowledge management framework and an underlying digital business taxonomy and business solution digital knowledge base (i.e., ArchVault™) to create a Knowledge-Driven AEAM approach (i.e., KAEAM). Solutions customers, Archemy™ consultants, and partners apply Archemy's KAEAM approach to elicit, search, discover, reuse, adapt, and deploy intelligent active and/or autonomous business solutions that are subsequently operated by solutions users. EAMTk™ is one of several tools in Archemy's next-generation EAF. It semi-automates Archemy's Agile Knowledge-Driven EAM (KAEAM) processes that lead to the creation of implementation roadmaps for business solutions. EAMTk™ supports upstream KAEAM activities meant to capture contextual business forces that lead to the creation and/or reuse of business solutions or related components. EAMTk™ uses the ArchCMP™ tool and its notation, which is based on the User Requirement Notation (URN), to decompose business goals and capture them as contextual business forces, elicit integrated business and technology strategy to achieve these goals, and identify the implementation roadmap needed to realize this strategy. In the past, these tasks were performed by skilled Enterprise Architects on an annuity basis and the resulting work products quickly became obsolete. The corresponding contextual business forces (e.g., business area, business goals and strategies, and other "business forces") are part of the taxonomies used and evolved by Archemy™ to classify business solutions in its Assets Catalog. The DKMF accesses the Archemy™ knowledge management framework via APIs to its various tools (including EAMTk™) and uses the Archemy™ taxonomies to analyze user requests and evolve the behavior of business solutions to improve their ability to handle user requests. The various tools' APIs are used by the DKMF node manager to learn how to make the most suitable solutions available to address end users' needs based on inputs provided by solution users and/or real-time cognitive analysis of performance and feedback data gathered on an ongoing basis by the DKME and its interconnected elements. As noted earlier in Section IV.1 of the present disclosure, revising the business context settings via the EAMTk™ API affects all valid recorded requests in a DKMF node's configuration file and triggers a quest for improved business solution behavior.

While the DKMF clearly builds on the collective knowledge that relates to EAM, it also helps extend it going forward in many ways via the novel capabilities described in the above. These novel capabilities can be summarized as follows:

1. The DKME extends the applicability of next-generation EAF functionality in a novel way to make it available to intelligent active and/or autonomous business solutions marketplaces.

2. The DKME provides novel capabilities to semi automates Archemy's AEAM and KAEAM processes, implements supporting EAF meta-framework capabilities, and makes them available to DKME end users via Archemy's EAMTk™ tool user interface.

3. The EAMTk™ exposes a novel KAEAM-driven API that is used at runtime by intelligent active and/or autonomous business solutions (via the DKMF node manager) to learn how to improve their performance of particular tasks on their own.

4. AEAM is a novel Agile approach to EAM developed by Archemy™ and KAEAM is a novel knowledge-driven approach that uses AEAM in combination with Archemy's EAF meta-framework.

5. EAMTk™ leverages a novel ArchCMP™ tool to manage business goals, business and technology strategies, and implementation roadmaps.

6. The DKMF provides novel APIs to additional tools (e.g., ArchNav™, ArchDoc™, and ArchViz™) that are used by the DKMF node manager to learn how to make the most suitable solutions available in order to address end users' needs based on inputs provided by solution users and/or real-time cognitive analysis of performance and feedback data gathered on an ongoing basis by the DKME and its interconnected elements.

There are at least three reasons why the novel capabilities mentioned above add tremendous value by semi-automating the application and use of EAM/EAF capabilities and making them available via an ecosystem and framework that may be used interactively by end users as well as intelligent active and/or autonomous business solutions. First, this approach makes it possible for businesses to relate to decentralized set of independent interacting EAM processes, artifacts, and actors. Second, different from traditional approaches, EAM artifacts are now managed by tools in a semi-automated fashion and accessible to DKME users and business solutions, which ensures that EAM information is kept up to date at all times. Third, the overall value provided by EAM is optimized via reliable, real-time information access (i.e., access to richer information), instant response (i.e., minimal headcount requirements), and proven governance and processes (i.e., faster/easier decision making).

Continued work towards developing and promoting the use of EAM and related EAF capabilities is inherent to Archemy's current focus as it comes to consulting, training, business solutions management, and products development activities. As we move forward with these activities, we plan to further refine the DKME architecture foundations described in FIG. 32 and keep aligning them with the evolving needs of intelligent active and/or autonomous marketplaces end users. We will also keep developing and refining the DKMF meta-framework illustrated in FIG. 33. These efforts will lead to additional capabilities, tools, and related DKMF APIs that will be documented in subsequent papers. These papers will also document the evolution of the DKME and DKMF and their application to business solutions marketplaces in various industries. In addition to research and development in the EAM/EAF area, Archemy™ will keep working with industry standard groups (e.g., The Open Group), committees, and researchers in the academia to standardize the EAF meta-framework and capabilities APIs with a particular focus on automating the management of intelligent active and/or autonomous business solutions via leveraging of EAM guidance at run-time in an ecosystem context. Again, this work will lead to the publication of future papers and/or specifications.

In the next sub-section, we focus on the core aspects of the DKMF approach and explain the theoretical rationale and value added by our approach as it pertains to taxonomy management.

V.2. Taxonomy Management

Taxonomy management is one of the functions that is performed by the DKMF (clusters) nodes. This function is handled by the taxonomy manager. It supports DKMF meta-framework context, governance and automation aspects that pertain to the management of taxonomies. The design and implementation of the DKMF taxonomy management function leverages the results of decades of research in tacit and explicit knowledge capture, representation, and selective reuse. We elaborate on the DKMF specific handling of these aspects in the following.

Tacit and Explicit Knowledge Capture and Encoding:

In this subsection, we first provide some background on the state of research and practice that apply to the capture and representation of tacit and explicit knowledge. Our focus in this area is on tacit knowledge as it is still a topic of intensive research today. We believe that this background is necessary to understand the choices that were made to design the DKMF and their benefit as it applies to the creation and management of suitable business solutions. We subsequently explain how the Archemy™ taxonomy management approach builds on and helps extend the collective knowledge that relates to tacit and explicit knowledge capture and representation. We also state our intentions for continued work in this area.

As mentioned earlier, our interest in using ontologies and related taxonomies stems from our focus on being able to understand business requests for services and match them to corresponding reusable best practice business solutions stored in an underlying Assets Catalog. It is acceptable for the approach to be "fuzzy" when humans are making use of the Assets Catalog to match their requests manually. However, the degree of semantic precision needed to support intelligent active and/or autonomous business solutions is much greater, especially when it aims at minimizing reliance on augmented intelligence needed for business solutions to operate on their own. Being able to augment ontologies and related taxonomies on an ongoing basis across a plurality of business domains is key to the success of the approach and is one of the factors that led to the creation of the DKME. To support this approach, Archemy™ operates business divisions populated with business domain experts to seed its ontologies and taxonomies knowledge base. The company also operates innovative technology practices populated with experts to develop ontologies and taxonomies that fully qualify best practice reusable business solutions and related components. Archemy™ uses these taxonomies once they have been vetted by experts to capture and classify business problems and solution assets and stores them in its Assets Catalog. It is then possible for end users or intelligent active and/or autonomous business solutions to leverage the Archemy™ ArchNav™ tool or its API to help optimize the suitability of business solutions components by matching them as precisely as possible with business problems at hand and combining them to enable the implementation of end-to-end business solutions that possibly address unrelated business problems.

Knowledge is mainly divided into two parts: explicit and tacit. Explicit knowledge can be verbalized into words and numbers and can be shared. There are abundant studies that focus on explicit knowledge and their representation and we will briefly touch upon that topic later in this sub-section. However, few studies have focused on tacit knowledge and it is known to be complex in nature and difficult to acquire and extract. Organizations may have different views as to how knowledge should be managed within the Enterprise, but it does not change the fact that tacit knowledge acquisition is difficult. The complexity of tacit knowledge results mostly from the fact that it is personal, not easy to articulate, contextualized, job specific, both known and unknown to the holder, and therefore difficult to verbalize and share with others. However, it is generally possible to share tacit knowledge via conversations or narrative, and it is sometimes possible to transform it into explicit knowledge. Finding ways to extract tacit knowledge is the main difficulty since a large amount of it is specific and resides in the heads of experts who are not available at all times. Deeply embedded in these experts' minds are insights, institutions, hunches, inherent talents, skills, experience, know-who, know-why, and working experiences. This does not make is easy to extract justifications from experts about their decisions, methods, sequence of steps in doing a specific task. To address this challenge, several protocol-based and knowledge modeling techniques have been developed by the research community and can be combined to help elicit knowledge from experts:

1. Protocol-generation techniques include interviews, reporting and documentation.

2. Protocol analysis techniques drive the extraction of knowledge from available material such as written stories or narratives.

3. Hierarchy-generation techniques focus on building taxonomies or other hierarchical structures.

4. Matrix-based techniques use frames to represent the properties of concepts.

5. Diagram-based techniques generate and use concept maps, state transition networks, event diagrams, and process maps.

Figure 34:
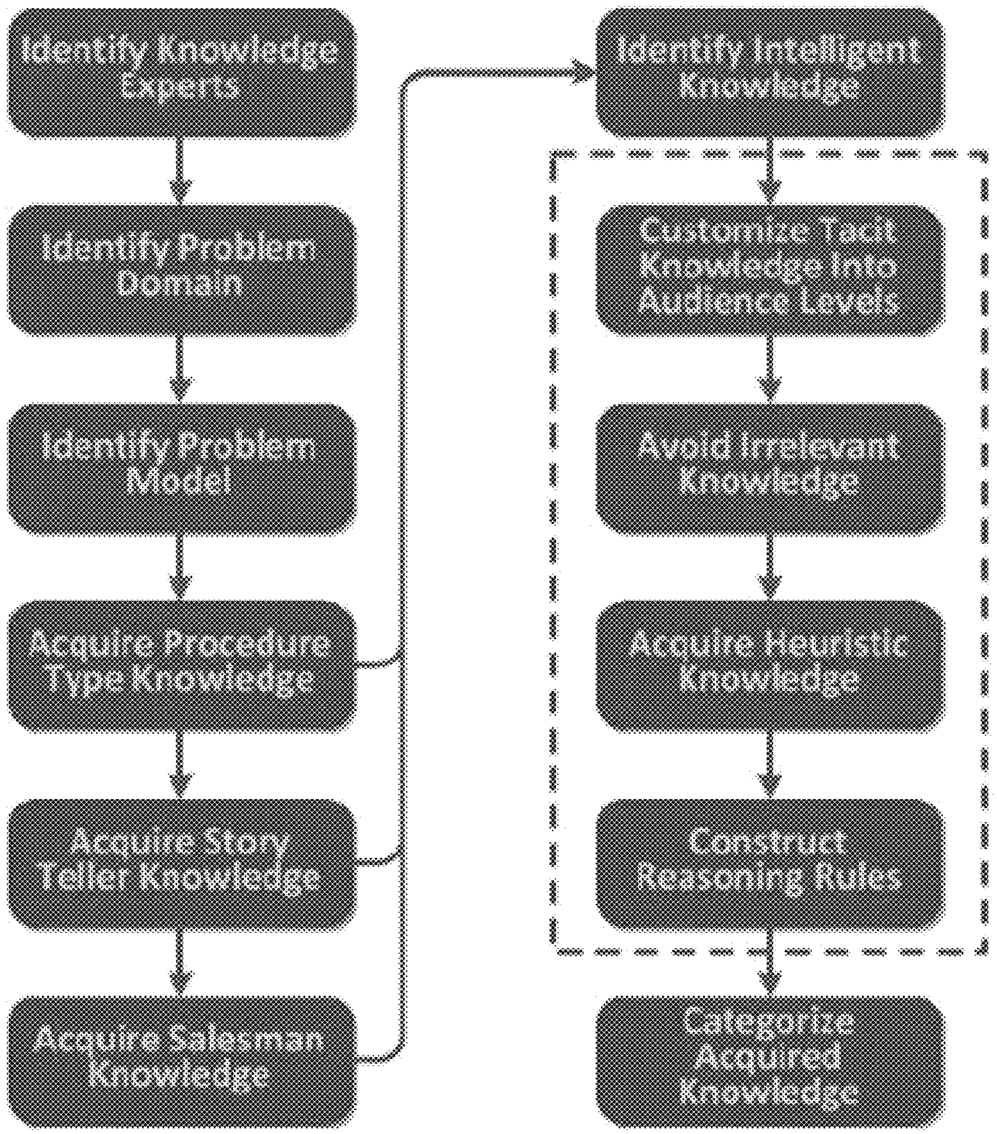
FIG. 34 is a diagram showing tacit knowledge acquisition guidelines, according to some embodiments.

Using these techniques, the typical guidelines followed by knowledge developers when acquiring tacit knowledge from experts are as follows and are summarized in FIG. 34:

1. Become familiar with the domain terminology and review available documentation.

2. Identify the human experts who are familiar with a given restricted problem area within the domain.

3. Identify how the problem is accurately modeled.

4. Devise an interactive iterative (i.e., to allow corrective feedback) knowledge acquisition process to capture reliable tacit knowledge using a combination of procedural, storytelling, and salesman techniques. The procedural technique focuses on understanding the approach to the solution. The storytelling technique focuses on understanding the content of the domain rather than the solution and capturing the knowledge that is best acquired by prompting for narratives and stories. The salesman technique lets the expert spend most of their time explaining the solution, while the knowledge developer asks predefined (multiple-choice or scale-ranking) questions without requiring all the answers 5. Identify the type of intelligent knowledge and experiences to capture using the following four techniques. First, let the human experts customize their tacit knowledge to align with various audience levels. Second, avoid irrelevant knowledge that is not based on facts or figures. Third, acquire heuristic knowledge going beyond the facts to clarify the fuzzy details and uncertain information. Fourth, construct reasoning rules based on the experts reasoning process, their knowledge, and qualitative explanations.

Once knowledge has been acquired by knowledge developers, the following typical guidelines are applied to model it:

1. Categorize the knowledge into know-how, know-why, and know-what and address possible conflicts.

2. Interpret or convert the expert knowledge acquired and encode it into rules through collaboration with the experts.

3. Represent the knowledge acquired using a structured approach, while capturing how it is used functionally and how it relates to other concepts. For example, knowledge captured in text-form is converted to a concept-based format by splitting the text into focused sentences, identifying terms within each sentence, normalizing the terms into a standardized problem-domain taxonomy, and determining the precise semantics attached to each term.

4. Link knowledge elements that are semantically, contextually, and functionally similar.

5. Evaluate the quality of the knowledge acquired by having experts cross-check the knowledge gathered from other experts.

Different from tacit knowledge, explicit knowledge is typically such that formal processes may be used to help individuals articulate it to create knowledge assets. Explicit knowledge assets can then be disseminated within an organization through documents, drawings, standard operating procedures, manuals of best practice, and the like. Information systems play a central role in facilitating the dissemination of explicit knowledge assets over company intranets or between organizations via the internet.

As noted earlier, Archemy™ leverages the support of experts to seed the creation and management of the descriptive ontologies and taxonomies that it uses to capture and qualify the business problems and best practice reusable business solutions that are stored in its knowledge base. When acquiring knowledge from experts through its divisions and practices, Archemy™ librarians uses a tacit knowledge acquisition process that follows the protocol-based and knowledge modeling techniques described above very closely. Archemy™ librarians use hierarchy-generation techniques and the Protégé and ArchNav™ tool to model captured knowledge as ontologies and related taxonomies. The focus of knowledge capture is typically restricted to confined areas of larger business domains (e.g., subsets of contract law within the legal business field, symptoms set that pertain to specific diseases in healthcare). The premise is to create assemblies of business domain ontologies and related taxonomies that are focused on the business "dialects" that are used in specific business areas where everyone "speaks the same language." This explains, the structure of the DKMF P2P Cloud Constellations shown in FIG. 27 where the constellations are subdivided into business domains and further divided into assemblies of P2P clouds within each business domain. Archemy's specific focus when it comes to ontologies and taxonomies is to precisely describe the context, semantics, and functionality of business problems and reusable best practice business solutions, including the Key Performance Indicators (KPIs) of these solutions. Given, this focus, Archemy™ also leverages existing work on business, enterprise, and technical ontologies and related taxonomies as applicable (e.g., FIBO, OBO ontologies, AURUM). Furthermore, to be able to relate user requests to its various taxonomies, Archemy™ uses a lexical reference system similar to WordNet (https://wordnet.princeton.edu/) to help normalize requests and align them to the latest applicable taxonomies. Finally, Archemy™ is developing and perfecting AI-driven tools that help semi-automate the tacit knowledge acquisition and modeling steps described earlier in this sub-section.

While Archemy's taxonomy management approach clearly builds on the collective knowledge that relates to tacit and explicit knowledge capture and encoding, it also helps extend it going forward in many ways via the novel capabilities described in the above. These novel capabilities can be summarized as follows:

1. Archemy™ has developed a novel DKME-driven tacit knowledge acquisition process that bridges protocol-based and knowledge modeling techniques.

2. Thanks to a novel way to extract tacit and explicit knowledge, the Archemy™ ontologies and taxonomies that are accessible to the DKMF via ArchNav's API precisely describe, the context, semantics, and functionality of business problems and reusable best practice business solutions (including the KPIs of these solutions).

3. Archemy™ provides access to a novel DKME that enables interested parties to share its ontologies and related taxonomies and works closely with its divisions and practices to use these assets and refine them.

4. Archemy™ has developed a novel ontology-driven classification and search engine (i.e., ArchNav™) that enables DKME participants to look for solutions to business problems expressed using applicable domain taxonomies that stem from tacit knowledge.

5. Archemy's DKME-centric divisions and practices work closely with organizations that are developing business, enterprise, and technology ontologies and related taxonomies that are partially based on tacit knowledge capture to perfect its novel ontologies and taxonomies.

6. Archemy' DKME and DKMF make it possible to develop novel marketplaces for intelligent active and/or autonomous business solutions that use taxonomy management to adapt to new user requests and evolve their behavior on their own to be able to handle them.

7. Archemy™ uses a lexical reference system similar to WordNet to help normalize DKMF users' requests in a novel way and align them to the latest applicable taxonomies that result from the ongoing capture of tacit and explicit knowledge.

8. Archemy™ is developing novel AI-driven tools to help semi-automate DKME-centric tacit and explicit knowledge acquisition and modeling.

There are at least three reasons why the novel DKME/DKMF capabilities mentioned above add tremendous value and meaning to tacit and explicit knowledge capture and representation. First any progress made in semi-automating the tacit knowledge acquisition and modeling represent significant progress in the area. Second, Archemy's DKMF is focused on using ontologies and related taxonomies to precisely characterize business problems and reusable best practice business solutions. At the DKME level, being able to capture tacit and explicit knowledge to help formalize business problems and solutions descriptions accelerates the ability to respond to business requests and make suitable business solutions available to handle them. The ability to describe solutions best practice aspects and KPIs as taxonomy criteria facilitates the reuse of standardized solution components and accelerates the need for methods to acquire tacit and explicit knowledge to support the process. Third, the DKMF is making it possible for business solutions to use the ArchNav™ taxonomy API to help understand new user requests and describe the software components that are needed to handle them. This approach accelerates the growth of P2P marketplaces that allow their connected business solutions to become intelligent and active and/or autonomous and it also accelerates the need for methods to extract and precisely represent tacit and explicit knowledge in real time.

Continued work towards improving tacit and explicit knowledge capture and representation is inherent to the business focus of Archemy's divisions and practices as part of its DKME. It is our plan to keep formalizing and semi-automating tacit knowledge capture and representation and refined techniques will be described in more detail in an upcoming paper. It is also our plan to raise the level of interest in this area of research and development by creating an increased demand for business solutions that leverage related capabilities. Furthermore, we plan to keep leveraging deep learning algorithms to optimize the quality of tacit knowledge acquired.

As an example, our current focus on relating contextual aspects to semantic and functional nuances helps increase the level of semantic precision that can be achieved when characterizing business problems and solutions. An important consideration is that DKMF end users are sometimes the experts that need to be listened to as they may be the ones who describe new needs and help evolve ontologies and taxonomies. For example, the knowledge of disease symptoms in healthcare comes directly from the patients who feel these symptoms and report them in the first place. It is therefore quite important to be able to capture historical knowledge variations and adaptations over time as well as contextual nuances that may also be evolving over time (e.g., disease symptom criteria may evolve, their intensity may change, and new symptoms may be identified).

Validating the Contextual Applicability of Knowledge:

In this subsection, we first provide some background on the state of research and practice that pertain to selective reuse of tacit and explicit knowledge in our problem domain. We believe that this background is necessary to understand the choices that were made to design the DKMF and their benefit as it applies to the selection of suitable business solutions. We subsequently explain how Archemy's taxonomy management approach builds on and helps extend the collective knowledge that relates to selective reuse of tacit and explicit knowledge. We also state our intentions for continued work in this area.

Selective reuse of tacit and explicit knowledge in our context is focused on being able to compare and match elements of knowledge to make decisions as to the applicability of such knowledge. In our case, the elements of knowledge consist of a pool of business problems descriptions and reusable best practice solution assets stored in an Assets Catalog. As explained above, these elements have been described very precisely using ontologies and related taxonomies that are vetted by experts and evolved on an ongoing basis. The focus of selective reuse in this context is to be able to match the description of business problems with business solutions so that suitable business solutions may be selected and reused to enable the implementation of end-to-end business solutions that solve business problems in an optimal way. As mentioned briefly in Section I, we are aware of various research attempts to link software solution patterns to a Non-Functional Requirements (NFR) taxonomy and then use an algorithm to decide as to which of the matching patterns should be selected as part of the design of a business solution. Given the need to identify a precise matching technique, multi-criteria decision analysis (MCDA), multi-criteria decision making (MCDM) and related methods comes to mind. Research in this area has demonstrated that ranking irregularities may occur when using such methods when certain manipulations on the structure of a simple MCDA problem are performed. As a result, different MCDA methods may yield different answers for exactly the same problem and there is, in general, no exact way to know which method gives the right answer. Therefore, evaluating the performance of the different MCDA methods is important before selecting one of them. The typical problem in MCDA is concerned with the task of ranking a finite set of decision alternatives, each of which is explicitly described in terms of different characteristics (also often called attributes, decision criteria, or objectives) which must be considered simultaneously. Therefore, the conjecture of the problem is such that that there is a finite set of alternatives and a finite set of decision criteria. Each alternative is, somehow, described by how well it meets each one of the decision criteria. If a given criterion refers to a qualitative aspect of the alternatives, then the alternatives may be described in relative or qualitative terms regarding that criterion. In case the criterion is easily quantifiable, then the alternatives may be described in absolute terms regarding that criterion. Meanwhile, the criteria may be associated with weights of importance. For example, in the hypothetical problem of selecting the best car among three candidate cars, say car A, car B and car C, the decision criteria may refer to price, mileage per gallon, and the physical attractiveness of the shape of a car. That is, on one hand, we have three criteria. Of these three criteria, the first two are easy to quantify as one may have the exact price value of each car as well as the exact fuel consumptions. On the other hand, expressing the alternatives in terms of the last criterion might be trickier as that criterion is a qualitative one. In such cases one may use percentages expressing how much a given car is more desirable than another car. The above data can also be viewed as the entries of a decision matrix. The rows of such a matrix correspond to the alternatives of the problem while the columns to the decision criteria. The $a_{ij}$ element of a decision matrix represents the performance value of the i-th alternative in terms of the j-th criterion. The typical decision matrix can be represented as in FIG. 35 (observe that the criteria weights are depicted in this matrix as the $w_j$ parameters).

While there is a plethora of MCDA methods that have been developed in the literature, we will concentrate on the single decision maker deterministic MCDA methods that attempt to find the best alternative subject to a finite number of decision criteria. The top three methods of choice are the analytic hierarchy process (AHP) and its variants, the ELECTRE methods, and the utility value functions. AHP reduces complex decision problems to a system of hierarchies and uses the pairwise comparisons and eigenvector methods to determine the $a_{ij}$ values as well as the criteria weights $w_j$. In this method, $a_{ij}$ represents the relative value of alternative Ai when it is considered in terms of criterion $C_j$. In the original AHP method, the $a_{ij}$ values of the decision matrix need to be normalized vertically. That is, the elements of each column in the decision matrix add up to one. In this way, values with various units of measurement can be transformed into dimensionless ones. If all the criteria express some type of benefit, then according to the original AHP method, the best alternative is the one that satisfies the following expression shown in FIG. 36 that uses an additive expression to determine the final priorities of the alternatives in terms of all the criteria simultaneously. In our case the priorities for individual candidates in FIG. 36 are obtained by taking the norm of the difference between the problem description priority (i.e., the ideal solution candidate) and the candidate priority. A corresponding adjustment is made to the formula in FIG. 37 to ensure that the comparison of candidates is made in relation to how close they are to the problem description.

To address possible rank reversal irregularities, one variant to this method (instead of having the relative values of the alternatives sum up to one) is to normalize the $a_{ij}$ values of the decision matrix by dividing the elements of each column in the decision matrix by the largest value in that column. This AHP method variant is referred to as the ideal mode AHP. This method however still suffers ranking problems that stem from the normalization and the use of an additive formula on the data of the decision matrix for deriving the final preference values of the alternatives. Luckily, the use of an additive formula is avoided by using a multiplicative expression, which brought the development of a multiplicative version of the AHP method, known as the multiplicative AHP. Using this method, each alternative is compared with others in terms of a number of ratios, one for each criterion. Each ratio is raised to the power of the relative weight of the corresponding criterion. Generally, the following formula shown in FIG. 37 is used in order to compare two alternatives $A_K$ and $A_L$:

If $R(A_K/A_L)\geq 1$, then $A_K$ is more desirable than $A_L$ (for the maximization case).

Then the best alternative is the one that is better than or at least equal to all other alternatives. According to this method, the relative performance values $a_{ij}$ and criteria weights $w_j$ are not processed according to the formula in FIG. 36, but the weighted product model (WPM) formula shown in FIG. 37 is used instead. Both the use of an additive formula and the negative effects of normalization can be avoided by using the multiplicative formula. Furthermore, one can use a variant of the formula shown in FIG. 37 to compute preference values of the alternatives that in turn, can be used to rank them. The preference values can be computed as shown in FIG. 38.

Please note that if $P_i>P_j$, then $P_i/P_j>1$, or equivalently, $P_i-P_j>0$. That is, two alternatives $A_i$ and $A_j$ can be compared in terms of their preference values $P_i$ and $P_j$ by forming the ratios or, equivalently, the differences of their preference values.

The ELECTRE approach uses the data within the decision problems along with some additional threshold values to measure the degree to which each alternative outranks all others. A number of variants of the ELECTRE method have been proposed and the widely used versions are ELECTRE II and ELECTRE III. The ELECTRE methods are based on the evaluation of two indices, the concordance index and the discordance index, defined for each pair of alternatives. The concordance index for a pair of alternatives a and b measures the strength of the hypothesis that alternative a is at least as good as alternative b. The discordance index measures the strength of evidence against this hypothesis. There are no unique measures of concordance and discordance indices.

In ELECTRE II, the concordance index C(a, b) for each pair of alternatives (a, b) is defined as shown in FIG. 39: Where Q (a, b) is the set of criteria for which alternative a is equal or preferred to (i.e., at least as good as) alternative b and wi is the weight of the i-th criterion. One can see that the concordance index is the proportion of the criteria weights allocated to those criteria for which a is equal or preferred to b. The discordance index D (a, b) for each pair (a, b) is defined as shown in FIG. 40, where 8 is the maximum difference on any criterion The formula shown in FIG. 40 can be used when the scores for different criteria are comparable. After computing the concordance and discordance indices for each pair of alternatives, two outranking relations are built between the alternatives by comparing the indices with two pairs of threshold values. They are referred to as the strong and weak outranking relations. We define (C*, D*) as the concordance and discordance thresholds for the strong outranking relation and (C−, D−) as the concordance and discordance thresholds for the weak outranking relation where C*>C− and D*<D−. Then the outranking relations are built based on the following rules:

(1) If C(a, b)≥C*, D(a, b)≤D* and C(a, b)≥C(b, a), then alternative a is regarded as strongly outranking alternative b.

(2) If C(a, b)≥C−, D(a, b)≤D− and C(a, b)≥C(b, a), then alternative a is regarded as weakly outranking alternative b.

The value of (C*, D*) and (C−, D−) are decided by the decision makers for a particular outranking relation. These threshold values may be varied to give more or less severe outranking relations; the higher the value of C* and the lower the value of D*, the more severe (i.e., stronger) the outranking relation is. That is, the more difficult it is for one alternative to outrank another. After establishing the strong and weak outranking relations between the alternatives, the descending and ascending distillation processes are applied to the outranking relations to get two pre-orders of the alternatives. Next by combining the two pre-orders together, the overall ranking of the alternatives is determined. Compared with the simple process and precise data requirement of the AHP methods, ELECTRE methods apply more complicated algorithms to deal with the complex and imprecise information from the decision problems and use these algorithms to rank the alternatives. ELECTRE algorithms look reliable and in neat format, however they are also subject to ranking irregularities.

In contrast with the AHP and ELECTRE approaches, there is another different type of analysis which is based on value functions. These methods use a number of trade-off determinations which form what is known as utility or value functions. The utility or value functions attempt to model mathematically a decision maker's preference structure by a utility function (if the problem is stochastic) or a value function (if the problem is deterministic), and these functions are next used to identify a preferred solution. The functions attempt to map changes of values of performance of the alternatives in terms of a given criterion into a dimensionless value. Some key assumptions are then made in the process for transferring changes in values into these dimensionless quantities.

AHP and ELECTRE are scientific and efficient decision-making methods that have played and are playing an important and indispensable role in many decision-making activities related to engineering (e.g., environmental highway design selection, financial business failure risk, industrial maintenance related decision-making process, and manufacturing material selection). However, given some of the flaws in the various methods used to ensure reliable decision-making, Archemy™ is using various algorithms in its ArchNav™ tool to match business problem descriptive criteria to reusable best practice business solutions criteria and related components. The DKMF accesses these capabilities via the node manager that interfaces with the taxonomy manager API. The various decision-making algorithms include direct fuzzy comparison method (for small criteria sets where the fuzziness is based on the fact that taxonomy criteria are compared based on closeness values, and weights scores that are used to classify business problems and solutions), ELECTRE II (distance-based with extensions comparison method), AHP (eigenvector-based comparison method), rules-based comparison method, machine learning classification-based comparison method (i.e., comparison method that uses decision trees), as well as neural network-based comparison methods. Some of these algorithms are not elaborated upon here and will be the focus of a separate paper. The results produced by these various algorithms are compared to come up with a final ranking. Archemy™ has also evaluated the relative performance of different MCDA methods in its context using the three criteria that were established in the literature to test the relative performance of different MCDA methods. These test criteria are as follows:

Test Criterion #1: An Effective MCDA Method should not Change the Indication of the Best Alternative when a Non-Optimal Alternative is Replaced by Another Worse Alternative (Given that the Relative Importance of Each Decision Criterion Remains Unchanged).

Suppose that an MCDA method has ranked a set of alternatives in some way. Next, suppose that a non-optimal alternative, say $A_k$, is replaced by another alternative, say $A'_k$, which is less desirable than $A_k$. Then, the indication of the best alternative should not change when the alternatives are ranked again by the same method. The same should also be true for the relative rankings of the rest of the unchanged alternatives.

Test Criterion #2: The Rankings of Alternatives by an Effective MCDA Method should Follow the Transitivity Property.

Suppose that an MCDA method has ranked a set of alternatives of a decision problem in some way. Next, suppose that this problem is decomposed into a set of smaller problems, each defined on two alternatives at a time and the same number of criteria as in the original problem. Then all the rankings which are derived from the smaller problems should satisfy the transitivity property. That is, if alternative $A_1$ is better than alternative $A_2$, and alternative $A_2$ is better than alternative $A_3$, then one should also expect that alternative $A_1$ is better than alternative $A_3$.

Test Criterion #3: For the Same Decision Problem and when Using the Same MCDA Method, after Combining the Rankings of the Smaller Problems that an MCDA Problem is Decomposed to, the New Overall Ranking of the Alternatives should be Identical to the Original Overall Ranking of the Un-Decomposed Problem.

This third test criterion is similar to the previous one but now one tests for the agreement between the smaller problems and the original un-decomposed problem. As before, suppose that an MCDA problem is decomposed into a set of smaller problems, each defined on two alternatives and the original decision criteria. Next suppose that the rankings of the smaller problems follow the transitivity property. Then, when the rankings of the smaller problems are all combined, the overall ranking of the alternatives should be identical to the original ranking before the problem decomposition.

As a result of the tests, Archemy™ implemented a simplified version of the ELECTRE II methods, which is often used by ArchNav™ as the main algorithm to compare decision-making results with when a limited amount of user inputs is available. In our context, there are many criteria that may be applied to compare different candidates. Luckily, ELECTRE II can be extended to account for specific decision problem properties and there exists a useful extension to ELECTRE II, which further reduces the input requirement with a view to enhance the decision reliability. In general, depending on the description of criteria related to business solutions, the number has the potential to be quite extensive. This number will likely detract from the feasibility of developing a business solution selection decision aid if the decision maker must assign a preference to each of the criteria. This difficulty has been examined and it has been previously postulated elsewhere that an increasing number of decision criteria impacts negatively on the reliability of an associated decision result. The option that Archemy™ has applied entails establishing a hierarchy of criteria, where many criteria can be categorized or generalized. The decision maker then assigns weights at the highest level in the hierarchy. In essence, this simplification entails removing the application of the ELECTRE II decision rules and does not make use of the concordance and discordance thresholds. This new alternative was selected over conducting a multivariate or interdependence analysis between criteria to reduce the numbers (such analysis among object-oriented design metrics is a field of study possessing its own merits). Our simplified solution selection decision analysis algorithm facilitates the comparison of candidate reusable best practice business solutions with the intent to establish those business solutions most suitable to address a business problem. Archemy™ applied this approach in independent tests and results confirm the suitability of the proposed method to the solution selection decision problem under the circumstances stated. These results will not be reported here and will be elaborated upon in a separate paper.

The simplified version of the ELECTRE II algorithm used by ArchNav™ uses the following decision-making analysis inputs:

The Candidates: The candidates are those business solutions to be evaluated as matches as part of the decision analysis method. Each solution has specific values assigned to its criteria that indicate how well the solution supports those criteria. The criteria being focused on are the ones that are of interest to the business problem and the values or these criteria are being offset from the corresponding values specified for the business problem's corresponding and applicable criteria.

The Criteria: In our context, the criteria correspond to the various descriptive properties that are organized in the taxonomy in use to qualify the business problems and solutions rooted on total satisfaction. Criteria's value domains are adjusted to consider that the maximum score for a given criteria value correspond to the score expected for that criteria by the actual business needs/problem description.

The Decision Maker's Preference: The business solution user will assign preference to the highest level of criteria in the hierarchy.

Concordance Thresholds: Defined in terms consistent with the original ELECTRE II method, two concordance (the agreement that candidate a outranks candidate b) thresholds are needed.

Discordance Threshold: Likewise, a discordance (the refusal that candidate a outranks candidate b.) threshold is needed.

The business solutions decision analysis method operates in two stages starting with the comparison of candidates and followed by the analysis of comparison results. These stages are then repeated beginning with the deepest level in the taxonomy hierarchy and moving up until the results have been generated from comparison against the highest level of forces with the candidate solutions.

Stage 1—Comparing the Candidates

Stage 1 can operate in three steps as follows:

(0) Set maximum criteria values (as noted earlier).

(1) Normalize the criteria.

(2) Calculate pairwise concordance indices.

(3) Calculate candidate concordance indices.

Stage 1.1—Normalizing the Criteria

Beginning with the metrics in the taxonomy hierarchy, metric values are normalized. Criteria values are normalized to avoid calculations with criteria representing different quantitative units or qualitative indices. An assumption regarding normalization is that a particular criteria value can be divided by a norm aligned to a desired criteria value. In this regard, the normalized values are oriented towards the desirable criteria value.

The desired value of the benefit criteria is the maximum value. Given the value, $g_{ji}$ for criteria j, candidate (solution) i, the associated benefit normalization, $h_{ji}$, bounded by $0 \leq h_{ji} \leq 1$, is included in the formula shown in FIG. 41.

The desired value of the cost criteria is the minimum value. The calculation for normalizing cost criteria, $h_{ji}$, bounded by $0 \leq h_{ji} \leq 1$, is calculated according to the formula shown in FIG. 42.

As the comparison proceeds up the criteria taxonomy hierarchy, the number of candidates a particular candidate outranks will be normalized. This later calculation is dealt with in Stage 2.2. In the case of the number of outranks, it will always be treated as a benefit criteria.

Stage 1.2—Calculating Pairwise Concordance and Discordance Indices

It is at this step that our solution decision analysis diverts from the extension to ELECTRE II and introduces a new extension to ELECTRE II to accommodate a hierarchy of criteria. The pairwise concordance and discordance indices are calculated consistent with the original ELECTRE II.

Pairwise Concordance Index: Given the preference weights from the user for the criteria and the representation of candidates by the values related to the multiple criteria, a pairwise concordance index, c(a,b), is calculated by pairwise comparison of the candidates a to b as shown in FIG. 43.

Pairwise Discordance Index: The pairwise discordance index is the maximum difference of criteria values within a particular comparison, normalized by the maximum difference, among all such differences. An interesting side effect of using normalized criteria values entails the maximum separation, which will always be 1. Thus, the calculating of a pairwise discordance index, transforms into a search for the maximum disagreement that candidate a outranks candidate b as illustrated in FIG. 44.

Stage 1.3—Calculating Candidate Concordance Indices

The original ELECTRE II was interested in conditions where the strong and weak outranking of candidate a over candidate b could be established. With a view to accommodate incomparable candidates, the calculation of candidate concordance indices is amended to reintroduce the decision rules of the original ELECTRE II method. In so doing, the net flow of preference between two candidates can be qualified by the strength of that preference. The notion of a preference out-flow and in-flow has been used in the exploitation of other outranking methods. Consequently, a precedent is not being established herein. For the purposes of business solutions selection decision analysis, calculating four candidate concordance indices as shown in FIG. 45 will be of interest, distinguishing between strong and weak flows and whether it is an in-flow or out-flow.

With the calculation of these candidate concordance indices, the comparison stage for particular solution criteria is completed. Although psychologically complex, the intent is not for a person to have to carry out the calculations. Rather the distributed decision aid handles all related calculations while deriving the final ordering of business solution candidates. With the candidate concordance indices calculated, the following analysis stage entails considering the associated preference flows similar to the analysis accompanying the original ELECTRE II explanation.

Stage 2—Analyzing the Comparison Results

This stage is comprised of one step that is repeated as each level in the criteria hierarchy. This stage marks the completion of the method with the calculation of the number of outranks. The corresponding step is described below.

Stage 2.1—Determine the Number of Other Candidates a Particular Candidate Outranks As explained previously, the original ELECTRE II derived its final ranking by treating each candidate as a vertex in a directed graph and considered the strong out-degree and in-degree of each candidate vertex. The respective weak degrees were considered to break ties. In the solution selection decision analysis, a particular visit to a criteria node in the criteria hierarchy is completed by generating the number of outranks a candidate possesses which indicates that the candidate in question has a more dominant strong outflow and lower strong in-flow than the other candidates. Similarly, weak out-flow and in-flow is used to break ties. This number of outranks forms the relative position of preference for the criteria in question and in turn forms the basis for normalization in the subsequent visit to a higher-level criteria in the criteria hierarchy.

Solution Selection Decision Analysis Output

When the number of outranks is generated at the total satisfaction level in the criteria hierarchy, the number of outranks for each candidate is normalized one last time. This final normalized value represents the relative order of candidates from highest to lowest, with preferred candidates having a normalized value of 1.00. It must be stressed that this final value is not indicative of the amount that one candidate is better than another, but is useful to generate a final ordering of candidates. That is, if candidate a has a final value of 1.00 and candidate b has a value of 0.75. This does not imply that candidate a is 25% better than candidate b. The only inference suggested is that based on the input preference weights it is concluded that candidate a will be preferred to candidate b by the selection decision.

While Archemy's taxonomy management approach clearly builds on the collective knowledge that relates to selective reuse of tacit and explicit knowledge in our problem domain, it also helps extend it going forward in many ways via the novel capabilities described in the above. These novel capabilities can be summarized as follows:

1. Archemy™ is using a novel combination of algorithms in its ArchNav™ tool and making them available to the DKMF via and API. Using this API, business problems can be described using taxonomy-centric descriptive criteria that are then matched with criteria used to catalog reusable best practice business solutions. This approach makes it possible to identify business solutions that are most suited to address the business problem.

2. Archemy™ has implemented several decision-making algorithms as part of its DKMF taxonomy management capability, including ML classification, and DL neural networks algorithms. These algorithms provide options as to the degree of precision achievable when matching business problems to solutions; some of these algorithms are tuned to perform faster when a large number of criteria have to be handled.

3. Archemy™ has evaluated the relative performance of different matching methods in its business context and is continually improving its DKMF ML and DL algorithms as more data becomes available.

4. Archemy™ implemented, tested, and confirmed the suitability of a simplified fast version of the ELECTRE II method under certain circumstances; this method is often used by ArchNav™ via the DKMF as the main algorithm to compare decision-making results.

There are at least five reasons why the novel capabilities mentioned above add tremendous value by allowing selective reuse of tacit and explicit knowledge in our problem domain. First, the various DKMF algorithms allow precise and accurate matching of business problems with solutions, which has been proven to be difficult to achieve with decision-making algorithms. Second, these DKMF algorithms are applied to a new practical decision-making context where real-time decision-making is key, and the algorithms are being tuned to perform accordingly. Third, the application of ML and DL techniques to this novel DKMF context (rather than traditional MCDA methods) facilitates the processing of large numbers of criteria. This provides the very valuable ability to improve the quality of matches as the number of business problems and solutions being added to the Assets Catalog grows. Fourth, Archemy™ is providing its DKMF as a testbed, which has not been available so far, to facilitate ongoing research, development, testing and improvement to current and future MCDA methods in a real-time business environment. Fifth, the need for precise and efficient selective reuse decision-making methods renews interest in discovering and improving MCDA algorithms. These algorithms now have a whole new meaning and context of application as they aim to contribute to the growth of P2P marketplaces and allow connected business solutions to become intelligent and active and/or autonomous.

Continued work towards developing and promoting the use of DKME techniques and algorithms that allow selective reuse of tacit and explicit knowledge is inherent to Archemy's current focus as it comes to consulting, training, business solutions management, and products development activities. As we move forward with these activities, we plan to keep developing and improving the precision, accuracy, and efficiency of our existing DKMF MCDA algorithms with a focus on applying the latest deep learning techniques to be able to select the most applicable combination of algorithms (and possibly discover and create new DL algorithms) when handling real-time matching needs. We will not elaborate on the innerworkings of our DKMF ML and DL algorithms in the present disclosure and we plan to publish a separate paper on the topic in the near future. It is also our plan to raise the level of interest in this area of research and development by providing a testbed for new selective reuse methods and creating an increased demand for business solutions that leverage related capabilities. As we make our selective reuse decision-making DKMF algorithms available to our Archemists community and DKME, we look forward to being supportive to the growth of a new breed of P2P marketplaces powered by intelligent active and/or autonomous business solutions.

In the next sub-section, we continue focusing on the core aspects of the DKMF approach and explain the theoretical rationale and value added by our approach as it pertains to business solutions management.

V.3. Active and/or Autonomous Business Solutions Management

Business solutions management is one of the functions that is performed by the DKMF (clusters) nodes. This function is handled by the business solution manager. It supports DKMF meta-framework context, governance and automation aspects that pertain to the management of business solutions. The design and implementation of the DKMF business solutions management function leverages the results of decades of research in components reuse, active and/or autonomous components composition and integration, and intelligent active and/or autonomous agents support. We elaborate on the DKMF specific handling of these aspects in the following.

DKMF-Based Components Reuse:

In this subsection, we first provide some background on the state of research and practice that apply to components reuse. We believe that this background is necessary to understand the choices that were made to design the DKMF and their benefit as it applies to the creation and management of suitable business solutions. We subsequently explain how Archemy's business solutions management approach builds on and helps extend the collective knowledge that relates to components reuse. We also state our intentions for continued work in this area.

"Software reuse" can be defined as the use of existing software or software knowledge to construct new software. "Reusable assets" can be either reusable software or software knowledge. "Reusability" is a property of a software asset that indicates its probability of reuse. Software reuse's purpose is to improve software quality and productivity. Reusability is one of the "illities" or major software quality factors. Software reuse is of interest because people want to build systems that are bigger and more complex, more reliable, less expensive and that are delivered on time. They have found traditional software engineering methods inadequate, and feel that software reuse can provide a better way of doing software engineering. A key idea in software reuse is domain engineering (aka., product line engineering). The basic insight is that most software systems are not new. Rather they are variants of systems that have already been built. Most organizations build software systems within a few business lines, called domains, repeatedly building system variants within those domains. This insight can be leveraged to improve the quality and productivity of the software production process. Contrary to popular belief, customers moving to the Cloud still need to worry about reuse as they are now leveraging another organization's reuse program and lose direct control over the assessment of benefits, reliability and safety of using reuse. Furthermore, customers may still be responsible for their own software that is being deployed on the Cloud and they now rely on components that are provided by third parties.

The notion of reusability has been around since humans began to solve problems. When humans solve problems, they try to apply the solution to similar new problems. If they find that only some elements of the solution apply, they adapt it to fit the new problem. Proven solutions, used over and over to solve the same type of problem, become accepted, generalized, and standardized. We are not facing a lack of reuse in software engineering, but rather a lack of widespread, systematic reuse. The reuse research community has been focusing on formalizing reuse for several decades and many conferences are held regularly on the topic (e.g., ICSR or International Conference on Software Reuse has being gathering once a year the past seventeen years). It is clear that substantial quality and productivity payoffs will be achieved only if reuse is conducted systematically and formally. Unfortunately, fast informal solutions always seem to take precedence in a setting where pragmatic problems are the norm. Doug McIlroy introduced the concept of formal software reuse in his seminal paper, M. D. McIlroy, "Mass-Produced Software Components," in Software Eng. Concepts and Techniques, 1968 NATO Conf. Software Eng., J. M. Buston, P. Naur, and B. Randell, eds, Petrocelli/Charter, New York, 1969, pp. 88-98, the entire contents of which are hereby incorporated by reference in their entirety for all purposes. Mr. McIlroy proposed an industry of off-the-shelf, standard source-code components and envisioned the construction of complex systems from small building blocks available through catalogs. The term "software factory" was registered as a trademark by Systems Development Corp (SDC) in 1974. In the mid-1970s Robert Lanergan began a reuse project at the Raytheon Missile Division that is considered the first case of formal reuse at an organization's level. Interest in reuse spread through academia in the late 1970s leading to active areas of reuse research including programming languages and libraries, domain engineering methods and tools (e.g., DARE, FAST, FORM, KobrA, PLUS, Koala), reuse design, design patterns (and more recently architectural patterns and reference architectures), domain specific software architecture, componentry (e.g., OMG's CORBA, CCM and COS, Sun's JEE EJB, and Microsoft COM+ and, .NET), generators, measurement and experimentation, and business and finance. Large reuse projects were created in the 1980s by the US Advanced Research Projects Agency (ARPA) and by the European Strategic Programme for Research in Information Technology (ESPRIT) (e.g., Eureka Software Factory). Similar commitments to developing software factories were made in Japan (Hitachi, Toshiba, NEC, Fujitsu, and NTT) and in the US (GTE, AT&T, IBM, and HP). While work on reuse intensified on the late 1980s, it did not deliver on its promise to significantly increase productivity and quality. In 1988, Vic Basili broadened the definition of reuse to include the "use of everything associated with a software project including knowledge" leading to the recognition that the reuse problem is ubiquitous. In the 1990s, it became clear that there were at least six facets from which to view software reuse: "by-instance" defines the essence of the items to be reused (e.g., ideas, concepts, artifacts, components, procedures, skills), "by-scope" defines the form and extent of reuse (i.e., vertical or horizontal), "by-mode" defines how reuse is conducted (i.e., planned and systematic, or ad-hoc and opportunistic), "by-technique" defines what approach is used to implement reuse (i.e., compositional or generative), "by-intention" defines how element will be reused (i.e., black-box as-is or white-box modified), and "by-product" defines what work products are reused (e.g., source code, design, specifications, objects, text, architectures).

Figure 46:
FIG. 46 is a diagram showing techniques for implementing software reuse, according to some embodiments.

In the past two decades, the availability of the Internet has helped develop software reuse standards, such as web service standards, making it easier to develop general services and reuse them across a range of applications. There are many ways today to implement software reuse as illustrated in FIG. 46, and it has become common practice to develop most new business software systems by reusing knowledge and code from previously implemented systems.

As it comes to software reuse today, the most appropriate techniques for reuse depend on several key factors such as the requirements for the system being developed (e.g., development schedule for the software, expected software lifetime, criticality of the software and its non-functional requirements), the technology and reusable assets available (e.g., availability of application domain generic configurable products, componentry), and the expertise of the development team (i.e., background, skills, and experience).

Although significant progress has been made on software reuse since the late 1960s and domain engineering since the late 1980s, significant gaps remain today in the following areas:

1. Scalability of reuse and domain engineering methods to very large systems (i.e., best use of reusable components, formal architecture specifications, scope of applicability of reuse and domain engineering methodologies).

2. Representation mechanisms for all software assets (e.g., means for specification and verification, support and enforcement of behavioral "design-by-contract" vs. "design-by-interface" specifications for components, methods for specification and reasoning support for popular component libraries, and for work on elimination reference semantics in industrial languages).

3. Sustainability of reuse (i.e., means of sustaining reuse programs on a long-term basis such as links between reuse and domain engineering and corporate strategy, identifying what should be made reusable based on envisioned ROI or extent of technology transfers needed).

4. Seamless integration between the models output from domain analysis and the inputs needed for domain implementations, such as components, domain specific languages, and application generators.

5. Safety and reliability.

6. Relationship of reuse and domain engineering to agile methods and DevOps.

7. Prediction of needed variabilities in future assets (e.g., richer means of specifying potential reuse needs such as clearly stating reuse contexts and assumptions).

8. Identification and validations of measures of reusability (i.e., ways to estimate the number of potential reuses).

9. Reuse education (e.g., facilitate better reuse technology transfers via joint efforts work between industry and academia).

10. Adaptation and reconfiguration of architectures and components at runtime to support ubiquitous computing (most reuse research focuses on creating and integrating adaptable components at development or at compile time; this requires embedding engineering know-how into code so it can be applied while an application is running).

11. Self-adaptive software.

12. Reconfigurable context-sensitive software.

13. Self-healing systems.

Archemy™ is well-aware of the current state and gaps in the software reuse field and believes that reuse of knowledge is key. To help address noted gaps in the reuse field, the company is commercializing a DKME focused on all facets of software reuse. It does not limit the instances or products that can be reused as taxonomies can be defined or extended to support them. The DKME scope of reuse can be either horizontal or vertical. Its mode of reuse is planned and systematic via established DKME divisions aligned on industry verticals and practices focused on technology enablers. The DKMF reuse approach is both compositional and generative, and the DKME intention is to reuse elements "black-box as-is first" and push them back to the DKME and Archemists Community to handle white-box modifications if/as needed. Archemy™ is focusing on seven areas as part of the design and implementation of its DKMF. First (to help address gaps 1, 3, 6. And 9), the DKMF can gain access to a knowledge base (aka., Assets Catalog) to access reusable best practice business solutions and related components. Second (to help address gaps 2, 4, and 10), the DKME forces the refactoring of reusable assets to follow best practice development and documentation guidelines to ensure that these assets can be used effectively by the DKMF. Third (to semi-automate solutions to gaps 2, 4, and 10), the DKME provides tools that are made available to the DKMF via APIs to help refactor assets and ensure that they are reusable and follow best practices (e.g., ArchCMP™, ArchDoc™, ArchUCD™, and ArchBPM™), Fourth (to help address gaps 1, 3, 5, 6, 8, 9, 10), the DKME leverage an Archemists community ecosystem that enables participants to collaborate on effectively implementing reuse processes within the enterprise in a scalable and sustainable way. Fifth (to help address gaps 1, 3, 6, 9, 10, 12), the DKMF keeps track of various types of updates to reusable assets. Sixth (to help address gaps 1, 2, 3, 9), the DKMF helps classify reusable best practice assets using fine grain taxonomies and meters reuse. Seventh (to help address gaps 2, 5, 7, 8, 11, 12, 13), the DKMF applies reuse technology to support safe and reliable broad deployment of business marketplaces powered by intelligent active and/or autonomous business solutions.

DKMF-Based Assets Reuse Catalog:

The DKMF accesses the Archemy™ ArchVault™ Assets Catalog via the ArchNav™ API. ArchVault™ is populated with descriptive business problems and solutions taxonomies, reusable best practice business solutions, and metrics. It acts as a modem software factory and a scalable and sustainable assets reuse repository. It was designed to provide knowledge management support to the Archemy™ AEAM, and KAEAM approaches. These approaches are based on the Archemy's ArchDev™ reuse-centric methodology and its AELC lifecycle management methodology. ArchDev™ supplements the Agile and DevOps techniques with architecture management capabilities. In addition to supporting the DKMF immediate knowledge management needs, ArchVault™ facilitates reuse education at the DKME level by providing mechanisms to import reusable business solutions from various sources and acting as a reference repository available to a large community of Archemists.

Figure 47:
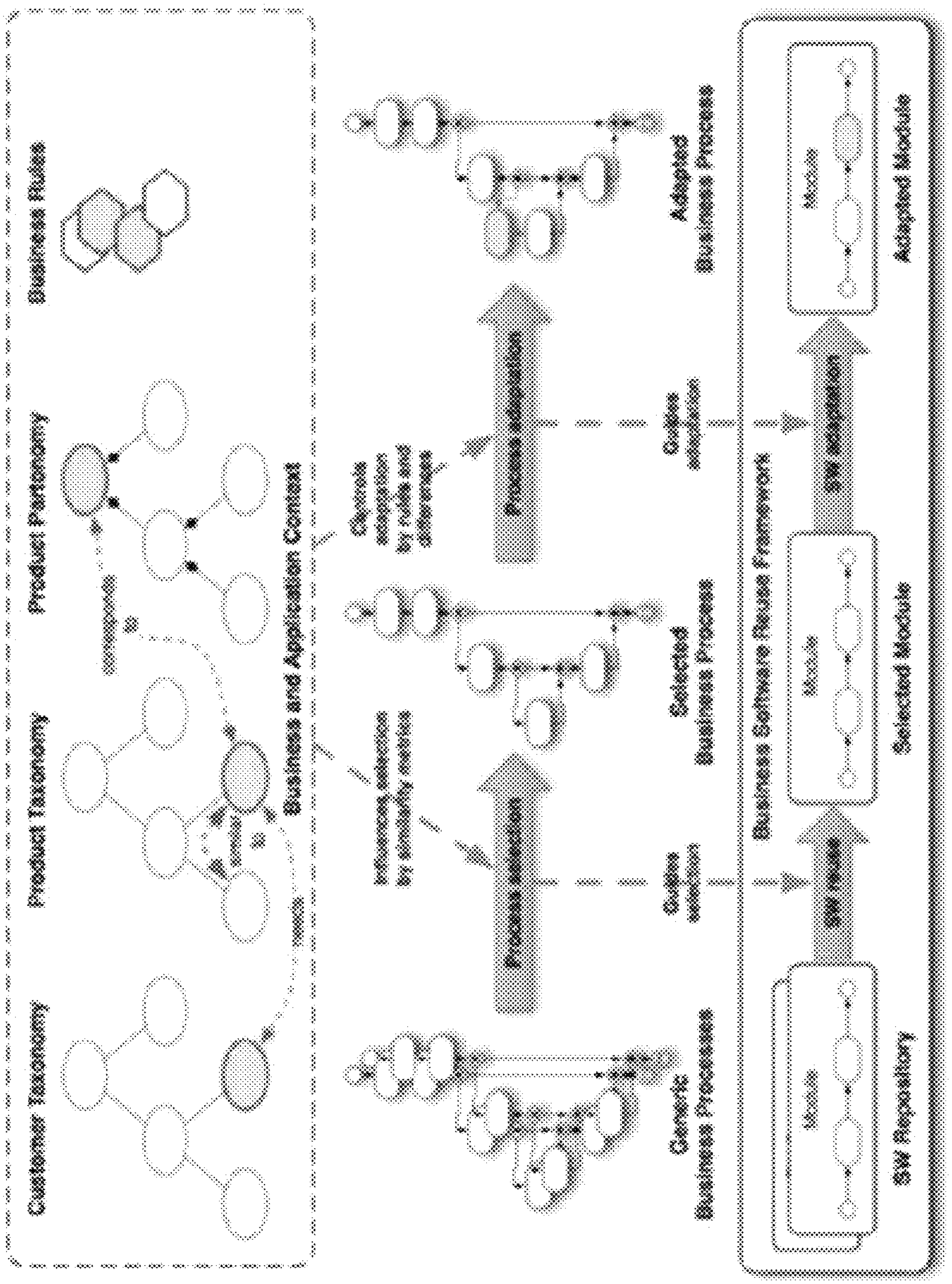
FIG. 47 is a diagram showing business process-driven reuse, according to some embodiments.

DKMF Reuse of Best Practices:

From a best practice development standpoint, the DKMF business solutions management capability leverages state of the art software reuse and reusability techniques that are applicable to various types of reusable software assets including software cases requirements and artifacts, product lines assets, and business knowledge assets. Per IEEE standard, a "requirement" is defined "as condition or capacity needed by a user to solve a problem or achieve an objective." The DKMF business solutions management capability builds upon the approach suggested in Hermann Kaindl, "Software Reuse and Reusability based on Business Processes and Requirements," in Proceedings of the 20th Asia-Pacific Software Engineering Conference (APSEC), (Dec. 2-5, 2013), by leveraging the URN notation and its formalism. Rather than addressing software reuse and reusability at the level of code or low-level design, the business solutions management capability focuses on driving reuse from requirements and business processes via a combination of techniques meant to extract descriptive information about the assets to be reused and encode it using an applicable taxonomy. Each type of asset has its own specific taxonomy or taxonomy extensions. As an example, fully implemented reusable components have a more complete set of descriptive taxonomy fields than architectural patterns. Three of the techniques described here are based on product lines and case-based reasoning, and semantic services specification. The first technique applies the Goal Requirements Language (GRL) and its notations as well as Feature Oriented Domain Analysis (FODA) to help explicitly represent commonality and variability among product line requirements assets and facilitate the consistent derivation of requirements for individual systems within the product line. Consistency can be verified formally and requirements for a product line can be modeled, selected and reused to engineer the requirements for innovative new products. Instead of explicit relations between requirements (or other artifacts), the second technique applied by the DKMF business management capability also uses the GRL and applies a method like the one used for product lines to software case requirements. In addition to the GRL, WordNet is used to understand partial requirements specifications or scenarios. The resulting technique drives reasoning about software cases using similarity metrics for requirements and design artifacts. The approach helps find the software cases in the knowledge base that match a given set of requirements expressed using the applicable taxonomy. This also works when a single envisioned usage scenario is specified, and it allows reuse of requirements from retrieved cases. Using this approach makes it possible to facilitate the reuse of software designs (including architectures) and code among similar software cases. The third technique handles semantic service specification by leveraging the GRL and the Use Case Map (UCM) notations (i.e., the URN notation) to relate requirements (e.g., business goals, business use cases) to (business) scenarios and corresponding business use cases and related processes. Furthermore, the URN notation is extended with Key Performance Indicators (KPIs) and other concepts to measure and align processes and goals, which will be discussed in more details in Section V.4. The resulting approach facilitates automated service reuse (i.e., adaptation of business processes based on business rules) and business process verification, validation, and generation using business ontologies (i.e., OWL), semantics service specification (via OWL-S), and fluent calculus (via FLUX) based on formal logic and using the high-level automated business process-driven software development and reuse approach illustrated in FIG. 47. FLUX stands for "Fluent Executor." Fluent calculus is a formalism for expressing dynamical domains in first-order logic, and can be used in an AI context. FLUX can be used as a logic programming method to implement the mathematical formalism of the fluent calculus. More details on this approach will be provided in the DKMF active and/or autonomous components composition and integration discussion later in this section.

Based on the above, the product line reuse technique allows reuse of requirements and features and systematic semi-automated product line selection. The case-based technique allows reuse of requirements and software artifacts and adaptation of most similar cases. The business knowledge reuse technique allows reuse of business processes and services and adaptation of business processes and service composition. Elements of the three techniques described herewith are applied selectively or in combination by the business solutions management capability to handle reuse of product lines, software cases, or business assets knowledge (i.e., business goals, business use cases, business processes, business rules). As noted earlier, Archemy™ evaluates all software assets via its DKME before including them in its Assets Catalog (i.e., ArchVault™). This aligns with the formal practice of planned reuse where systematic and formal practice of reuse, guidelines and procedures for reuses must be defined. For assets to be worthy of inclusion in the Assets Catalog, their development steps and associated documentation must conform to the best practice development guidelines set forth by Archemy™. The guidelines used by Archemy™ to evaluate software assets are similar in nature to the set of tenets, success factors, practices, design considerations, and tips documented by Vijay Narayanan in "The Art of Software Reuse," accessible at https://www.gitbook.com/book/vijaynarayanan/art-of-software-reuse/details, the entire contents of which are hereby incorporated by reference in their entirety for all purposes.

The various guidelines also align with Archemy's ArchDev™ and AELC reuse-centric methodologies and related AEAM, and KAEAM approaches. When software assets are worthy of inclusion in the Assets Catalog but do not meet the best practice development and documentation criteria, Archemy™ may decide at its discretion to invest in refactoring and documenting the software assets with the help of the assets supplier(s) and the Archemists Community. In summary, Archemy™ forces the refactoring of its reusable assets to follow best practice development and documentation guidelines. Without a strict compliance to best practice guidelines, it would not be possible to specify precise criteria when using Archemy™ taxonomies to properly classify software assets and add them to ArchVault™. As a result, uniform representation mechanisms are included with all reusable software assets, which facilitates seamless integration between the models output from domain analysis and the inputs needed for domain implementations. These mechanisms also allow adaptation and reconfiguration of architectures and components at runtime to support ubiquitous computing.

DKMF-Based Reuse Tools:

As a sequel to the above, Archemy™ provides various tools and associated APIs via the DKMF to semi-automate the refactoring of reusable assets and follow best practice development and documentation guidelines. The Archemy™ Compass tool (i.e., ArchCMP™) is used to support the software reuse and reusability technique that leverage knowledge about the linkage between strategic business requirements and the currently applicable implementation roadmap strategy. The ArchDoc™ tool is used to capture the steps that were followed to develop software assets along with all artifacts created in the process. It is then used along with the ArchViz™ tool to evaluate software for best practice development and documentation conformance. Archemy™ also provides the ArchUCD™ and ArchBPM™ tools to help refactor business use cases and business processes respectively. This combination of tools semi-automates the capture and validation of uniform software assets representation mechanisms, and validates the seamless integration provided between the models output from domain analysis and the inputs needed for domain implementations. Thanks to these tools, Archemy™ makes it possible to adapt and reconfigure DKMF-based architectures and related components at runtime to support ubiquitous computing enabled via next-generation P2P marketplace and powered by intelligent active and/or autonomous business solutions.

Reuse-Centric DKME:

The Archemists community ecosystem, which supports the DKME introduced in section III.2 of the present disclosure, clearly plays a major role in sustaining reuse and facilitating technology transfers. The DKME provides augmented intelligence to the DKMF. It is also designed to assist enterprises by supporting corporate reuse strategies in a flexible way and addressing the typical process and organizational issues that an enterprise may face when sustaining a reuse program. Finally, the DKME is best positioned to measure the effects of reuse via metrics provided through the DKMF and ensure that reuse is leveraged reliably and safely. Being able to implement intelligent active and/or autonomous business solutions nodes using the DKMF and attach them to the DKME allows the business solutions to learn and evolve taxonomies to adapt to changing user requests, and update business solutions in reaction to suggested improvements provided via analysis of performance and feedback data. DKME support via the Archemists community can be tailored to the need of every enterprise and the nature of their individual reuse program and related needs so a case can be made to maximize return to their shareholders. From a process standpoint, enterprise investment towards software reuse may be either proactive or reactive. A proactive approach tends to require large upfront investment, and returns on investment can only be seen when products are delivered and operational. It is typically hard for enterprises to predict their product line requirements well into the future and have the time and resources for a long development cycle. In this case, using the DKME minimizes the upfront costs and risks since it is possible to leverage an existing software reuse framework. A reactive investment approach typically takes an incremental approach to assets building. Reusable assets are developed as the reuse opportunity arises while developing products. Unless there is a clear problem boundary and projected requirements variations, it may be difficult to apply this approach. Furthermore, if there is no sound architectural basis for the products in a domain, a reactive approach may lead to ongoing costly refactoring of existing products as new assets are developed. A reactive approach can also benefit from using the DKME and connecting to it anytime it needs to with minimal investment. As an alternative to proactive and reactive investment, it may be possible to leverage the DKME to identify a software product to establish the product line's initial baseline. In this case the time and cost needed to transform the organization and move over to a new platform is minimized when using the DKME since the enterprise can then benefit from the DKME's reusable best practice assets. Furthermore, long term usage of the DKME would provide return on investment in all cases. In a nutshell, the DKME enables participants to collaborate on effectively implementing reuse processes within the enterprise in a scalable and sustainable way.

From an organization standpoint, establishing a reuse program leads to either centralized or distributed asset development. The cost of a centralized unit is typically amortized across projects within the product line. On the good side, a common engineering vision can be shared among all projects, development knowledge and corporate expertise can be utilized efficiently across projects, and assets can be managed systematically. However, this centralized approach may require a large upfront investment to mobilize an organizational unit dedicated to implementing a reuse program, and experts may have to be pulled away from ongoing projects to populate this new unit. This centralized organizational approach is not typically successful without a strong commitment from upper management. The other solution is to promote a distributed approach and implement a reuse program collaboratively by projects in the same product line. This results in less cost overhead and assets development costs are distributed among projects. However, the lack of a common vision for the reuse program may make it difficult for a given project to develop a component that meets the needs of other projects and there must be a cost/benefit model in place to solicit active bilateral participation from all projects. Using the DKME addresses the limitations of both the centralized and distributed organizational model of reuse. Indeed, as an established reuse ecosystem, the DKME provides the overarching vision and supporting organization to limit upfront costs. The DKME uses a combination of distributed collaborative units internally but it provides support to its customers via centralized divisions, which is the best of both worlds from a customer's organization standpoint as the DKME enables all participants to collaborate on effectively implementing organizational support for reuse within the enterprise in a scalable and sustainable way.

There is another side to the coin when it comes to reuse programs, which is the ability to experiment and measure the benefit of reuse. In particular, the impact on productivity and quality must be measured. A software metric is a quantifiable measurement of an attribute of a software product or process. A model is a stated relationship among metric variables. Experimentation is the process of establishing the effect of one set of variables on another. Metrics have been defined for many areas of software reuse. These include classification models of types of reuse, reuse library metrics, cost benefit models, maturity assessment models, amount of reuse metrics, failure modes models, and reusability assessment models. It is expected that reuse does impact the cost of software production, time to market, and project completion time. However, the measurement and experimentation of reuse and domain engineering is known to be an area where much more work is needed. Archemy™ is focusing on this area and able to share insights, metrics, and corresponding measurements based on its ongoing experience of reuse across the whole DKME cloud constellation and its ongoing support of P2P DKMF-based business nodes.

Finally, reliability and safety of (reused) components is emergent behavior, defined as system behavior that cannot be predicted based on the behavior of components comprising the system. As components are designed to become more active and/or autonomous and intelligent, reuse programs must avoid unpredictable system behavior based on components' interactions. This is another area that Archemy™ is focusing on and can provide expertise about based on its ongoing support of customer solutions that leverage semi-automated adaptive reuse. In summary, Archemy's DKME directly supports reuse scalability and sustainability. It also ensures that reuse is leveraged in a safe and reliable way and handles the process and organizational aspects that relate reuse and domain engineering to agile methods and DevOps. Furthermore, the DKME can measure the benefits of reuse, and help improve technology transfers via participants' collaboration. Using reuse techniques and associated algorithms, the DKMF handles the adaptation and reconfiguration needs of many connected intelligent active and/or autonomous DKMF nodes that power business solutions within the larger P2P marketplace.

DKMF Reusable Assets Tracking:

To manage the software reuse process effectively, the DKMF business solutions management capability uses an underlying framework to manage reuse engineering. The framework manages various types of reuse processes and analyzes reuse feasibility accordingly. There are many factors to be considered when reusing software that include the reuse level (e.g., low level reuse as a design pattern, high level reuse when product line techniques are used to identify reusable components), the results of a feasibility and suitability analysis (i.e., the fact that reuse worked in one system does not guarantee it will work in another), non-technical aspects (e.g., economic or organizational issues). In addition, there are various possible processes that may be applied to support reuse (e.g., product line requirements reuse, functions reuse, architectures reuse, patterns reuse, code reuse). To simplify, we will assume that there is a single level of reuse focused on fully implemented reusable components. In that case, the engineering management framework only provides four reuse processes: reuse without modification, reuse with parameters modification, reuse with code modification, and no reuse and new software implementation. The reuse without modification process has three steps: functional test, functional test verification, and transition to maintenance mode. The reuse with parameters modification process has five steps: modification impact assessment, regression test, configuration test, functional test, functional test verification, and transition to maintenance mode. The reuse with code modification process has eight steps: requirements update review, design update, implementation update, regression test, configuration testing, functional test, functional test review, transition to maintenance mode. Finally, the no reuse and new software implementation process has the same steps as the reuse with code modification process. Prior to selecting a reuse process, the reuse engineering management framework performs a reuse feasibility analysis that considers various factors such as: origin of the reusable candidate component, functional and non-functional requirements, component complexity, etc. This information is obtained from the taxonomy used to describe the reusable component with the Assets Catalog. It is assumed that all software components obtained from the catalog are suitable for reuse since they passed the best practice development and documentation qualification stage prior to being stored in the catalog. The reuse engineering framework also keeps track of the modifications that are made to a reused component as well as the traceability matrix that relates reused components back to the original components they derive from. The DKMF's ability to keep track of various types of updates to reusable assets plays an important role in ensuring reuse scalability and sustainability. It also provides integrated reuse support with available change management processes used by agile methods and DevOps, and facilitate reuse education by making it easy to trace the evolution of reused components within the underlying knowledge base. Finally, reusable assets tracking is automated by the DKMF to facilitate the adaptation and reconfiguration of business solutions and the use of reconfigurable context-sensitive software within intelligent active and/or autonomous business solutions.

DKME Assets Classification and Metering:

The DKME leverages ontologies and related taxonomies to qualify reusable best practice business solutions and store them in the Assets Catalog. Authorized DKME participants use ArchNav™ to add new solutions to the Assets Catalog once they have verified that these solutions qualify as best practice assets as noted earlier. There are different types of reusable assets and corresponding fine grain ontologies and related taxonomies must be used to qualify them. Once an asset has been qualified as a reusable best practice business solution and is stored in the catalog, its descriptive credentials are represented using the applicable taxonomy and may be matched against an incoming business request for a solution to a business problem specified using a comparable taxonomy. As explained in section V.2, the DKMF taxonomy manager is responsible for obtaining matching available business solutions. Mismatches may lead to a reuse feasibility analysis and the subsequent selection of a reuse process as described earlier. Reused components taxonomies have metering fields used to keep track of their history and type of reuse. The DKME assets classification and metering capabilities play an important role in ensuring reuse scalability and sustainability of reuse. It also leverages metering representation mechanisms for all software assets, and facilitates reuse education by exposing the metering information in a shareable format to authorized DKME participants.

DKMF Reuse Safety and Reliability:

The DKMF is responsible for ensuring that reuse is leveraged in a safe and reliable way. The DKMF also makes it possible for intelligent active and/or autonomous business solutions to learn and evolve their taxonomies to understand new types of user requests and upgrade their behavior to provide adequate support for these new requests. However, the DKMF requires authorized human approval to perform a behavior upgrade on a business solution node. There are two reasons for this. On one hand, a behavior upgrade may result in increasing the node DKME subscription cost, as well as services or transactions costs. On the other hand, it is necessary to monitor and control requests for automated behavioral updates and only authorize them after verifying that they are legitimate and that transitioning a node to an updated behavior level will allow the node to operate safely and reliably. DKMF nodes use a DKMF node configuration descriptor that limits the set of capabilities they can perform. Guards can also be placed on the descriptor to preempt the ability of the node to perform certain functions listed in the DKMF node configuration descriptor. The DKMF reuse safety and reliability capability leverages specific representation mechanisms used by nodes to upgrade their behavior and operate new configure components in a safe and reliable way. This capability also identifies and validates various measures of reusability and enables the prediction of needed variabilities in future assets based on safety and reliability analysis. Finally, this capability plays a major role in supporting self-adaptiveness, context-sensitive reconfigurability, and self-healing abilities of intelligent active and/or autonomous business solutions. Again, it is critical that reuse technology be applied in a safe and reliable way to ensure continued broad deployment of business marketplaces powered by intelligent active and/or autonomous business solutions.

While Archemy™ clearly builds on the collective knowledge that relates to components reuse, it also helps extend it going forward in many ways via the novel capabilities described in the above. These novel capabilities can be summarized as follows:

1. The DKMF provides real-time access to a knowledge base that supports a novel way to select best practice business components that can be reused to help intelligent active and/or autonomous business solutions address end users' requests.

2. The DKME forces the refactoring of reusable assets in a novel way to follow best practice development and documentation guidelines to ensure that these assets can be used effectively by the DKMF.

3. The DKME provides novel tools that are accessed by the DKMF via APIs, to help refactor assets and ensure that they are reusable and follow best practices (e.g., ArchCMP™, ArchDoc™, ArchUCD™, and ArchBPM™).

4. The DKME leverage the Archemists community ecosystem that creatively enables participants to collaborate on effectively implementing reuse processes within the enterprise in a scalable and sustainable way.

5. The DKMF keeps track of various types of updates to reusable assets in a novel way and uses mainstream change management capabilities to handle versioning.

6. The DKMF helps classify reusable best practice assets in a novel way using fine grain taxonomies that enable metering across the various facets of reuse.

7. The DKMF applies reuse technology creatively to support safe and reliable broad deployment of business marketplaces powered by intelligent active and/or autonomous business solutions.

There are at least four reasons why the novel capabilities mentioned above add tremendous value by providing business solutions management capabilities that enable reuse.

First, the overall set of features supported by the DKMF business solutions manager addresses various significant gaps identified in the field of reuse and domain engineering over the past fifty years. These gaps and the way the DKMF addresses them was discussed at length in the above sections. Second, the DKMF enables support for reuse in a challenging area of planned reused that requires semi real-time capabilities since it aims at supporting intelligent active and/or autonomous business solutions. Third, the DKMF provides a new way of distributing reusable components via plug-and-play updates to the behavior of business applications connected to a P2P marketplace. The more traditional way of distributing reusable components via software factories was to make them available via a catalog. In this case, the DKMF manages access to the catalog and is focused on providing the best possible business services to end users by (semi-)automating updates to the behavior of business solutions. Fourth, the DKMF capitalizes on most recent advances in technology enablers, such as cognitive and hyperscale computing, enterprise analytics, and enterprise/solution architecture, to make practical innovative solutions of real-time reuse available to business solutions connected to a P2P marketplace and growth ecosystem.

Continued work towards developing and promoting components reuse capabilities is inherent to Archemy's current focus as it comes to consulting, training, business solutions management, and products development activities. As we move forward with these activities, we plan to keep populating our DKMF Assets Catalog with reusable best practice business solutions and related components. We also plan to keep developing DKMF algorithms to qualify new types of reusable knowledge and automate the creation and/or extension of ontologies and related taxonomies. We are working on developing our reuse capabilities further to improve the DKMF average speed of knowledge reuse as it supports various types of business solutions across many industries. We are dedicated to optimizing our best practice development and documentation guidelines to qualify reusable assets as it is critical to the support of precise automated reuse and therefore the overall performance of our DKMF. We will keep developing and improving our DKMF knowledge management automation toolset and associated reuse-centric capabilities (e.g., ArchNav™, ArchCMP™, ArchDoc™, ArchUCD™, and ArchBPM™). As the Archemists community grows, we will help enhance the DKME and optimize collaboration by all participants to nurture the implementation of reuse processes within enterprises in a scalable and sustainable way. We also plan to keep developing new and better ways to manage the history of reuse and the versioning of reusable assets within our DKMF. We have a similar long-term focus as it comes to continued development of fine taxonomies that support metering across the various facets of reuse. Our focus in reuse will lead to additional DKMF capabilities and tools that will be documented in subsequent papers. Finally, we are dedicated to ensuring that the DKMF allows safe and reliable use of reuse as we support the broad deployment of business marketplaces powered by intelligent active and/or autonomous business solutions.

Now that we have covered the component reuse aspect of the DKMF business solutions management function, we delve into its active and/or autonomous components composition and integration function in the following subsection.

Active and/or Autonomous Components Composition and Integration:

In this subsection, we first provide some background on the state of research and practice that apply to active and/or autonomous components composition and integration. We believe that this background is necessary to understand the choices that were made to design the DKME/DKMF and their benefit as it applies to the creation and management of suitable business solutions. We subsequently explain how the DKMF builds on and helps extend the collective knowledge that relates to active and/or autonomous components composition and integration. We also state our intentions for continued work in this area.

As noted in Section IV.2 and illustrated in FIG. 28, DKMF nodes leverages a BPM/BRM engine to facilitate the rewiring of existing business solutions when business processes and/or underlying business solutions components must evolve and/or need to be updated in response to new types of user requests or taxonomy/business solutions updates. BPMN process activities are typically implemented as API calls to (internal or external) business services accessible from within the node service layer. This design makes it easy to reconfigure the functionality of DKMF nodes by providing an updated BPMN model (as/if needed) and/or updating the components that provide the functionality that is accessed via the API. The DKMF business solutions manager, which operates under the control of the DKMF node manager, provides integrated knowledge elements reuse capabilities and supports taxonomy-driven discovery of business solutions and related components to match new types of user requests as needed. Matching business solutions and related components can be reused subject to interface and/or behavior updates. These updates are either automated or semi-automated via the DKME. In that case, once the DKME obtains applicable business solutions updates, it passes them on to the DKMF node manager. In all cases of reuse and updates, the business solutions manager performs signature syntax and semantics validations for all updated components that are composed via BPM process orchestration within the DKMF node as part of the updates integration process. Once the updates integration is complete, the business solution node gets regenerated and redeployed to make the updates available as part of the node functionality. In essence, the DKMF provides a seamless component composition and integration capability and supports the active and self-generative features of intelligent active and/or autonomous business solutions. The ability to support this functionality within the DKMF is one of the functions of the business solutions manager.

Automated services composition has been an ongoing research topic in the literature and has been studied extensively in a Web context. Web service composition facilitates the creation of new services out of existing ones to satisfy the need for a more complex functionality. The initial promise of Web services was to transform the Web from a static collection of documents into a vast library of programs. Note that it is not the author's intent to advocate the exclusive use of XML/SOAP based service versus REST. Rather, Web Services technology is used to facilitate the internal composition and integration of services. The notion of Web service has raised considerable interest in both the industry and academia. Web services technology also opened the door to a new era dominated by applications with a high degree of intelligence (aka., intelligent active and/or autonomous agents), capable of making decisions and searching information on the Internet. The original set of standard technologies provided for Web services (i.e., WSDL, and UDDI) only provided descriptions of their semantics. W3C's Web Services Description Language (WSDL) specifies a way to describe the abstract functionalities of a service and concretely how and where to invoke it. UDDI was introduced as a Standard by the Online community for the Universal Description, Discovery, and Integration Standard (OASIS) to define a universal method for enterprises to dynamically discover and invoke Web services. The absence of machine-interpretable semantics can necessitate human intervention for service discovery and composition. This limited the use of Web services in complex business contexts, where the automation of business processes was necessary.

Semantic Web Services enhanced the existing standards by annotating the services with semantic descriptions provided by ontologies. Semantic descriptions are necessary to allow for automatic Web service composition. In an automatic composition system, the user's role is limited to specifying the functional requirements. The system is responsible for defining the data and control flow by assembling individual services based on user provided inputs and expected outputs. Automatic Web service composition is critical to the full success of enterprise application integration (EM) and the integration of business-to-business (B2B) applications on the Internet. To address gaps in this area, various sets of techniques for ontology-driven automatic Web service composition have been developed in the literature. Various models, methods, and Web services composition algorithms have also been validated. These various techniques have been focused on automatic service discovery, the development of algorithms for service selection based on quality of service (QoS) criteria, and automatic service composition, and automatic service selection based on service QoS criteria. Furthermore, the planning capabilities of the fluent calculus have been used to automatically generate a Web service composition. In this approach, the capabilities of Web services are first described using an OWL-S ontology. OWL-S(formerly DAML-S) is an ontology of services that was defined to make it possible for the Semantic Web to enable greater access not only to content but also to services on the Web. Using OWL-S, users and software agents should be able to discover, invoke, compose, and monitor Web resources offering particular services and having particular properties, and should be able to do so with a high degree of automation if desired. Powerful tools should be enabled by OWL-S service descriptions, across the Web service lifecycle. Based on the OWL-S ontology semantics, the web service description is encoded in the fluent calculus formalism based on a mapping between an OWL-S process ontology and the fluent calculus concepts. The fluent calculus is bundled with FLUX, a logic programming implementation that is extremely valuable for creating tools related to service specifications. In a nutshell, FLUX is used as the logic programming method to implement the mathematical formalism of the fluent calculus. A detailed description of the fluent calculus is out of the scope of the present disclosure and we refer the reader to easily accessible online resources on the topic. The fluent calculus manipulates entities such as "fluent" (i.e., a single atomic property that may change). "state" (i.e., a snapshot of the environment), "action" (i.e., a high-level operation), and "situation" (i.e., a history of action performances). Fluent calculus can express action precondition axioms, state update axioms, and unary function symbols are used to specify inputs and outputs as input/output formulas. An alternative but similar and complementary approach has been described in S. McIlraith, and T. Son, "Adapting Golog for Composition of Semantic Web Services," in Proceedings of the Eight International Conference on Knowledge Representation and Reasoning (KR 2002), Touluse, pp. 482-493, (2002), and it uses the GOLOG logic programming language, which is based on the situation calculus, instead of FLUX. Situation calculus decidability results can be ported to the fluent calculus. GOLOG applies the principle of regression for condition evaluation, which is more efficient for short action sequences, but the computational effort increases with the number of performed actions. FLUX uses the principle of progression for condition evaluation, which keeps the computational effort the same regardless of the number of performed actions.

Figures 48, 49:
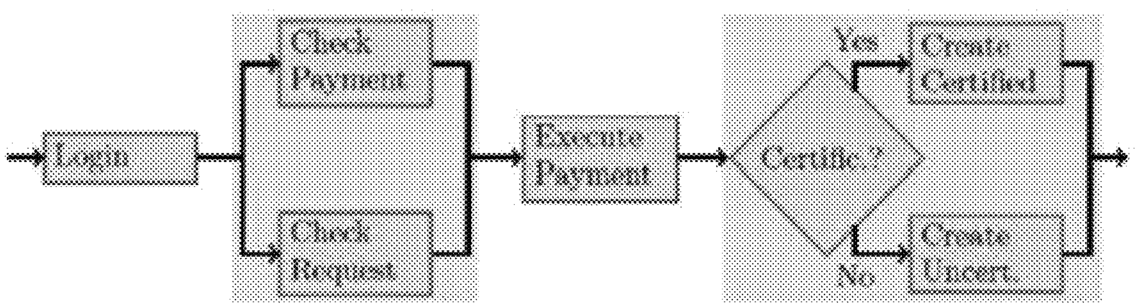
FIG. 48 is a table showing an OWL-S to Fluent Calculus translation, according to some embodiments.
FIG. 49 is a flow diagram showing a service-based process, according to some embodiments.

A fluent calculus planning problem can be described, like in the classical planning, by the (S, G, A, PE) tuple, where S is the initial state of the world, G is the goal to be achieved, A is a set of possible actions which may be executed to achieve the goal, and PE is a set of preconditions and effects. In the fluent calculus, the preconditions are encoded as action precondition axioms specifying the necessary conditions for executing action a in state S. The fluent calculus effects are encoded as state update axioms. Based on these assumptions, a fluent calculus composition algorithm can be developed using backtracking search. The composition algorithm starts by considering the input parameters encoded as a list of fluents that represent the initial state Zo. In every intermediate state, the algorithm performs two important operations: (1) it verifies whether the preconditions of an action in this current state are satisfied before including the action in the compositional plan, and (2) the effect of the included action is applied to the current state to produce a state transition. The fluent calculus knowledge base used in the planning process is automatically generated from the OWL-S service descriptions. The mapping rules to automatically translate an OWL-S atomic process into an equivalent fluent calculus server specification are illustrated in FIG. 48. An OWL-S composite process can also be translated into the formalism of fluent calculus.

Algorithms are available to translate OWL-S service descriptions into an equivalent fluent calculus service specification. This specification is then forwarded as input to a flux planner to generate the plans that solve the service composition goal. This leads to a composed Web service that provides a solution that matches the requested functionality. Fluent calculus is needed to provide a non-narrative-based formalism for service specification as there is no need for an explicit representation of time. Frame problems typically occur when behavioral service specifications, used in composition and verification frameworks for Semantic Web Services, employ a precondition/postcondition notation. The frame problem results from the difficulty of effectively expressing what does not change, apart from what changes. To illustrate the frame problem, consider the scenario described in FIG. 49 that supports an online system that allows web users to purchase documents.

The corresponding service name, inputs, outputs, preconditions, and postconditions are shown in FIG. 50. In this case, it may be hard to be sure that the only change to the "CheckPayment" service is that the form of payment is valid for the user making the payment, which would be expressed as Valid(payForm, user).

Other known potential issues with service specification-based composition and verification framework for Semantic Web Services are the ramification and qualification problems. The ramification problem results from possible difficulties in representing knock-on and indirect effects (aka., ramifications). For example, PayCompleted(doc, user) may lead to credit card invalidation if a limit is reached. The qualification problem results from possible difficulties dealing with qualifications that are outside our knowledge and result in inconsistent behavior (i.e., exogenous aspect). For example, the preconditions of ExecutePayment are true before execution, but postconditions are not after execution. The specification approach that uses the OWL-S translation to FLUX does address the family or frame problems. However, it does not consider the fluent calculus extensions that solve the ramification and qualification problems, resulting in a framework that ignores their effects and fails to capitalize on the benefits of their solutions, such as expressing ramifications or explaining non-conforming behavior. Moreover, the planner produces at best sequences of parallel executions, disregarding any other control constructs. Finally, the choice to model inputs and outputs using a "Knows Val" macro appears to be invalid since, by definition, it was introduced to represent a subset of fluent-related variables that is true in all possible states, and not the semantics of a service input, which is a fluent that holds at the state before service execution.

An improved composition and verification framework for Semantic Web Services is presented in George Baryannis and Dimitris Plexousakis, "Fluent Calculus-based Semantic Web Service Composition and Verification using WSSL," in Proceedings of the International Conference on Service-Oriented Computing (ICSOC 2013), Lecture Notes in Computer Science book series (LNCS, volume 8377) ("Baryannis"), and a variant of this framework is used by Archemy™. It addresses all three of the problems mentioned above using the formalisms of the fluent and event calculi and temporal action logic. It supports additional control constructs that address the limitations of the framework presented earlier. This framework requires that web services be specified using WSSL, a novel service specification language based on the fluent calculus. WSSL accurately expresses the behavior of a service, expresses causal relationships between conditions, and accounts for and explains unsuccessful executions. A WSSL specification is a 5-tuple S=<service, input, output, pre, post>, where service is a set of identifiers offering general information (e.g., name, invocation details), input is a set of input formulas, output is a set of output formulas, pre is a set of action precondition axioms defining service preconditions, and post is a set of state update axioms defining service postconditions. All elements are defined using WSSL logical expressions using an alphabet that consist of: (1) a countable set S of sorts: fluents, states, actions, situation, and boolean values, (2) logical connectives (i.e., $\neg$, $\land$, $\lor$, $\rightarrow$, $\equiv$, $\top$, $\bot$), (3) quantifiers and equality (i.e., $\exists s$, $\forall_s$, $\equiv_s$ for every sort $s \in S$), (4) a countably infinite set of variables, and (5) non-logical symbols (i.e., constants, function symbols that include at least Do, State, HasInput, and HasOutput, and predicate symbols that include at least Poss). WSSL provides various extensions to solve the ramification, (exogenous) and qualification problem (i.e., via accident modeling). XML syntax for WSSL (aka., WSSL/XML) is also available to provide machine readability for WSSL documents and facilitate standard parsing processes. Archemy™ uses a validation tool to parse a WSSL/XML document, translate it into FLUX, and validate a user goal (WSSL or FLUX) against the specification. The validation tool is implemented in Java for the translation mechanism and the ECLIPSe CLP constraint programming system is used for the validation process. The overhead of the translation process is insignificant (e.g., around 600 ms processing time and under 8000 KBs of memory on an Intel© Core™ i7-740QM processor running at 1.73 GHz, with 6 GB RAM to process synthetic WSSL specifications ranging from 1 to 500 pairs of pre- and postconditions) to all fundamental entities of WSSL, from fluents to accidents, can be expressed using concepts defined in service ontologies. It is envisioned that existing OWL-S and WSMO descriptions can be ported to WSSL and then annotated to fill up information related to causal relationships and accident modeling, resulting in complete semantic service specifications that consider the frame, ramification and qualification problems. The sample service set specification shown on FIG. 50 can be expressed in WSSL as shown in FIG. 51.

Translation to FLUX obeys the mapping shown in FIG. 52.

Figure 53:
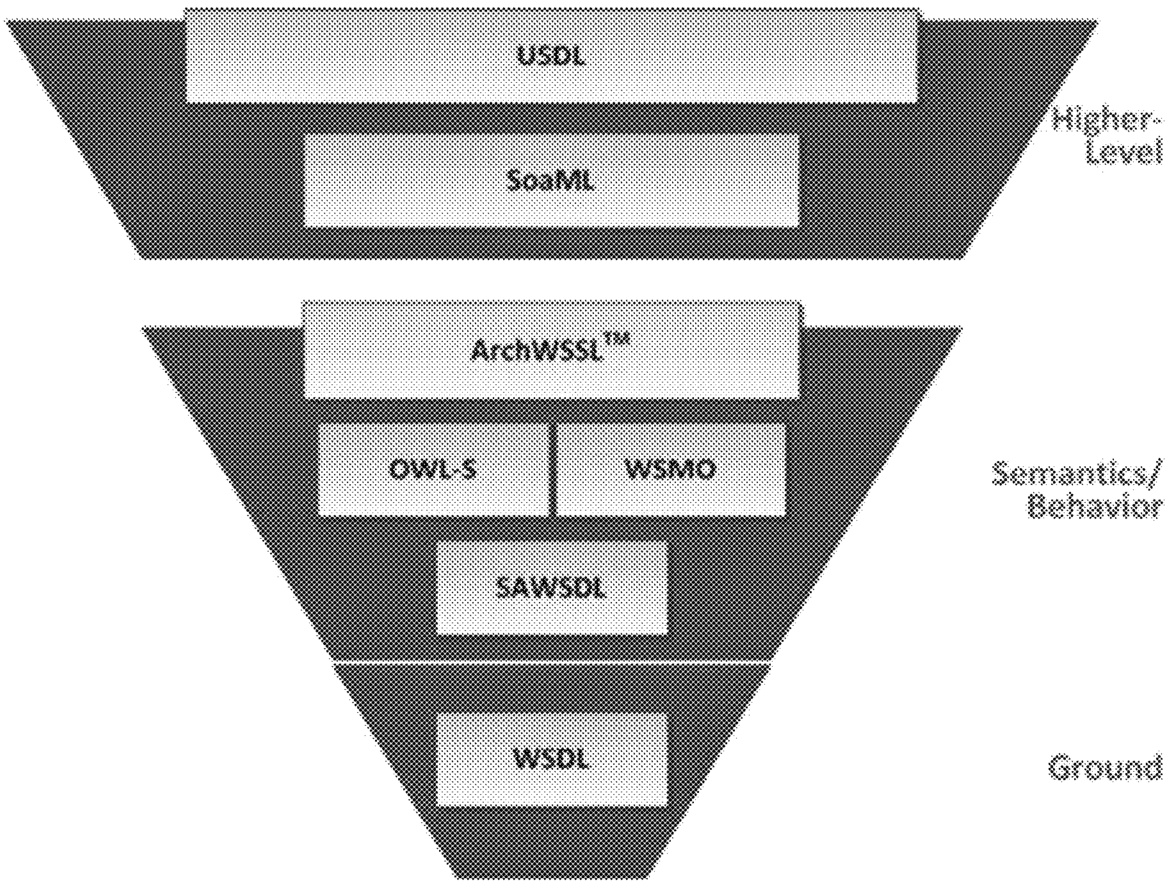
FIG. 53 is a diagram showing Web Service Specification Language (WSSL) placement, according to some embodiments.

WSSL's design goal is high expressivity. It operates at the same level as OWL-S or WSML as illustrated in FIG. 53.

USDL is a W3C language describing general and generic parts of technical and business services to allow services to become tradable and consumable. SoaML is an open source specification project from the Object Management Group (OMG), describing a UML profile and metamodel for the modeling and design of services within a service-oriented architecture. The Web Service Modeling Ontology (WSMO) provides a conceptual framework and a formal language for semantically describing all relevant aspects of Web services to facilitate the automation of discovering, combining and invoking electronic services over the Web. The Semantic Annotations for WSDL and XML Schema (SAWSDL) W3C recommendation defines mechanisms using which semantic annotations can be added to WSDL components. SAWSDL does not specify a language for representing the semantic models (e.g. ontologies). Instead, it provides mechanisms by which concepts from the semantic models that are defined either within or outside the WSDL document can be referenced from within WSDL components as annotations. These semantics when expressed in formal languages can help disambiguate the description of Web services during automatic discovery and composition of the Web services.

When using WSSL, WSDL (or SAWSDL) can be used as ground languages and existing OWL-S or WSML descriptions can be translated to WSSL and annotated. WSSL can facilitate service validation, verification, and composition. WSSL also addresses issues related to the frame, ramification and qualification problems. These deal with the succinct and flexible representation of non-effects, indirect effects and preconditions, respectively. The framework exploits the unique features of WSSL, allowing, among others, for compositions that consider ramifications of services; determining the feasibility of a composition a priori; and considering exogenous qualifications during the verification process. The framework is implemented using FLUX-based planning, supporting compositions with fundamental control constructs, including nondeterministic ones such as conditionals and loops. Performance is evaluated with regards to termination and execution time for increasingly complex synthetic compositions.

Figure 54:
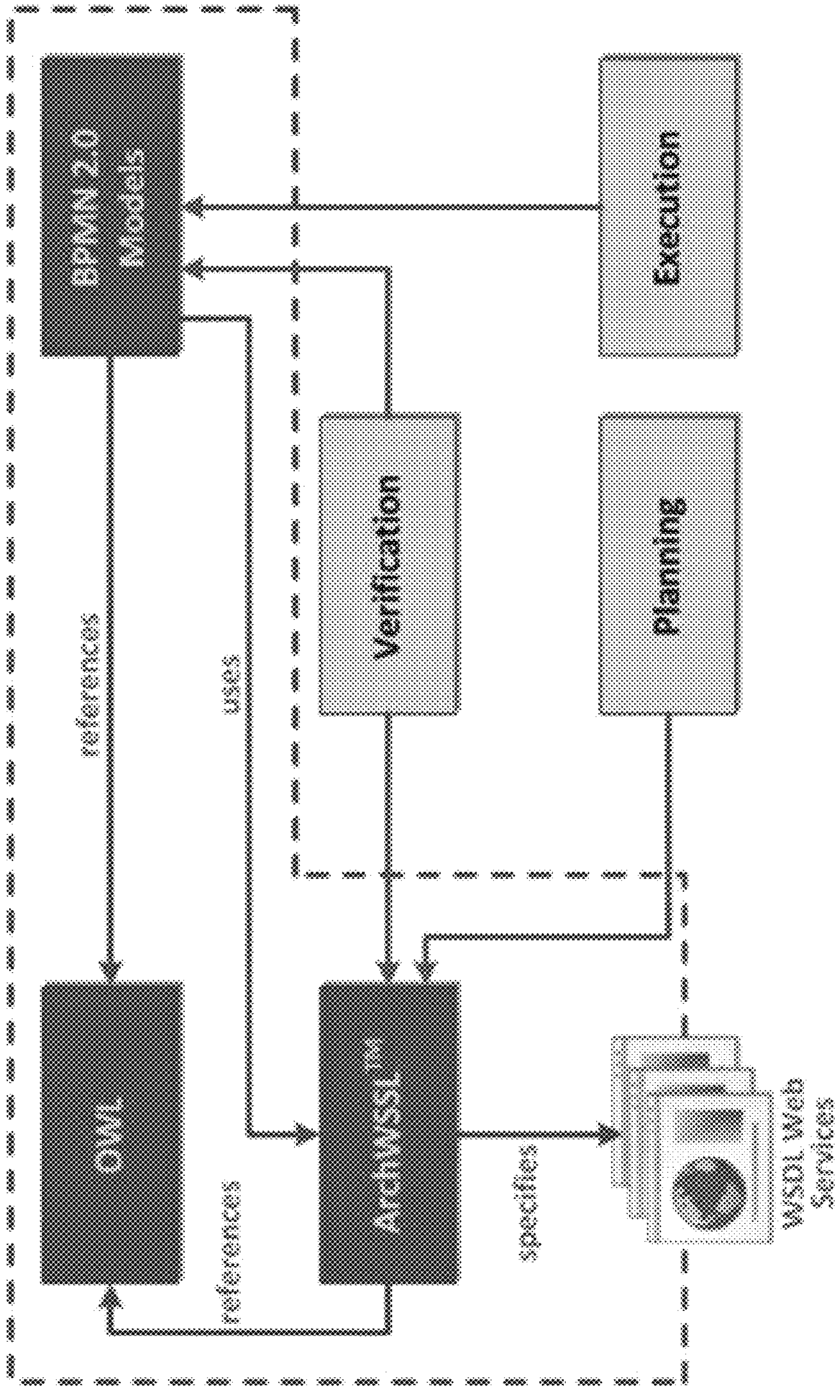
FIG. 54 is a diagram showing a DKMF conceptual capability view, according to some embodiments.

The DKMF active and/or autonomous components composition and integration approach leverages the WSSL service specification language and related framework introduced in the above and described in Baryannis. It also extends that framework as part of ArchWSSL™ to integrate support for QoS (by providing QoS-aware and metrics-driven matchmaking and selection mechanisms and improved efficiency by limiting the search space before the planning process and using graph-based rule optimization), knowledge states, asynchronous services interactions, and derivation of executable composite processes. Furthermore, DKMF allows formal behavior specifications in the lifecycle of Cloud-based services deployed on multiple Cloud providers. Beyond leveraging and extending WSSL, the overall approach implemented in the DKMF provides integrated support for modeling business processes in BPMN 2.0, representing their semantics and their associated services' specifications, and allowing the verification and generation of models as well as their execution using assigned services or objects. The DKMF's model translation from BPMN 2.0 to executable processes follows an approach similar to the one described at a high-level in Ralph Hoch, Hermann Kaindl, Roman Popp, and Dominik Ertl, "Comprehensive Integration of Executable Business Process Models with Semantic Concept and Task Specifications," in Proceedings of the Fifth International Conference on Business Intelligence and Technology (BUSTECH 2015), (Jan. 10, 2015), the entire contents of which are hereby incorporated by reference in their entirety for all purposes. Different from this high-level approach, the DKMF semantic business process management (SBPM) provides a proprietary ontology that includes semantic knowledge about organizational contexts, workflow activities, and other process-related elements. Using this ontology, it is possible to refer to semantic annotations to facilitate the overall validation and verification of business processes as a composition of tasks/activities provided by underlying services. To model simple scenarios, it is sufficient to use BPMN 2.0 as a modeling and orchestration language. In that case, OWL-S is used directly to handle the specification of services semantics and BPMN 2.0 is used to execute business processes. In fact, the DKMF currently generates OWL-S specifications and BPMN 2.0 models based on the representations of business processes in its proprietary ontology. FIG. 54 illustrates at a conceptual-level the end-to-end SBPM capabilities implemented within the DKMF business solutions manager.

The Business Process Modeling Notation (BPMN) is a graphical notation that depicts the steps in a business process. The notation has been specifically designed to coordinate the sequence of processes and the messages that flow between different process participants in a related set of activities.

Figure 55:
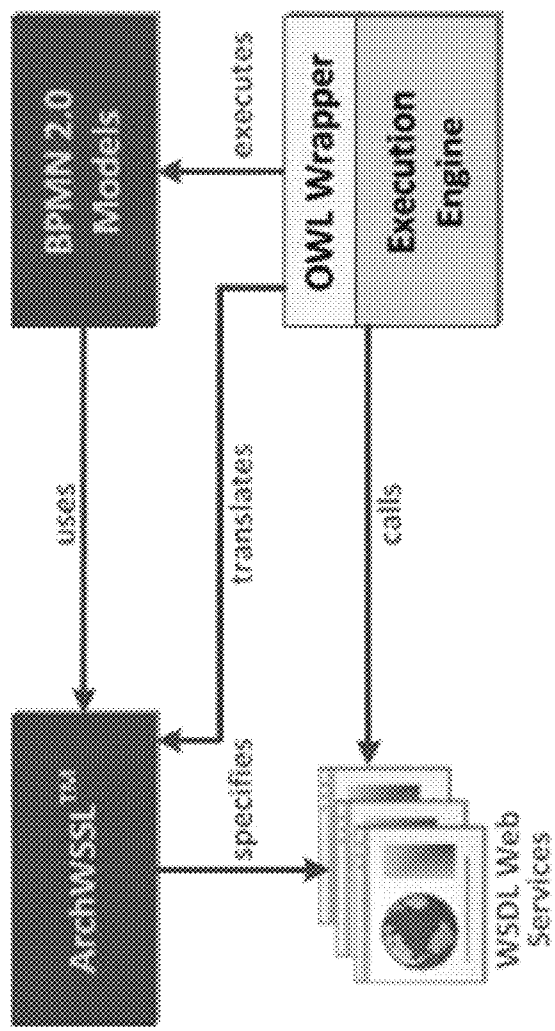
FIG. 55 is a diagram showing a DKMF execution engine, according to some embodiments.

This approach enables separation between the business domain ontology, which represents business domain concepts and objects, and the business services/tasks ontology, which represents the services/tasks. The business process model specifies how services/tasks are composed and the objects they operate on. Services enable the life-cycle defined for objects. They operate on objects and manipulate their states. They may be coupled with specific objects and define the operations that are possible or allowed on these objects. Integrating these two models provides a scalable and efficient way to manage the creation and update of business solutions composed of services/tasks. In FIG. 54, OWL is used as a knowledge representation language to specify the ontology of the underlying semantic repository. The semantic specification of services is provided via a ArchWSSL™ repository. As mentioned earlier, ArchWSSL™ is an ontology based on WSSL and built using OWL that handles semantic descriptions of Web services; it allows direct references to existing OWL ontologies and provides support for additional specifications (e.g., pre- and post-conditions) for services. ArchWSSL™ is much richer than WSDL, which is limited to input-/output-specifications of services. Assuming that Web services or Java objects are available to implement the services/tasks, BPMN 2.0 allows automatic execution of business processes and it is supported by a wide range of BPMS frameworks. To address the fact that BPMN 2.0 only supports WSDL services and cannot directly leverage WSSL (or OWL-S) services, the DKMF implements a wrapper around the BPMN 2.0 execution engine as illustrated in FIG. 55. The wrapper deals specifically with OWL references used by WSSL. These references are translated into their corresponding implementations (i.e., Web services specified using WSDL). The resulting address of the corresponding WSDL is then used to directly call the associated Web service or Java object, which results in executing the BPMN 2.0 process. Mappings to implemented methods or objects is a possible alternative to using Web services described using WSDL. The DKMF adheres to certain safety and reliability reuse guidelines when deploying updated processes, so updated processes are not always deployed automatically. On the technical side, since processes are being re-generated and integrated on the fly, node re-generation does not require down-time.

The DKMF business solutions manager composition and integration capability uses FLUX for planning purposes and a translation from ArchWSSL™ to FLUX is implied to handle this function as noted earlier. The resulting generated business processes are directly available in BPMN 2.0. When using FLUX, a formal verification of business process models against the specifications of the services composed within them is performed automatically as noted in FIG. 54. Using this capability, the DKMF can handle various scenarios active and/or autonomously:

1. Piece together BPMN 2.0 process model based on building blocks available within the ontologies/taxonomies and business solutions (and related components) knowledge base, verify the process model against the semantic specifications of its parts, and execute the process model using the available service implementations.

2. Automatically generate a business process model for a given user goal, and execute it using the available service implementations.

3. Create a business process model from scratch via augmented intelligence, or reuse an existing one, create semantic specifications of services that are not yet available, verify the model against the semantic specifications of its services, implement missing services according to their specifications, and execute the business process model using the available service implementations (both old and new).

While Archemy™ clearly builds on the collective knowledge that relates to components composition and integration, it also helps extend it going forward in many ways via the novel capabilities described in the above. These novel capabilities can be summarized as follows:

1. The DKMF components composition and integration capabilities extend the proven WSSL framework as part of ArchWSSL™ to integrate novel support for QoS. knowledge states, asynchronous services interactions, and derivation of executable composite processes.

2. Service specifications are managed by DKMF components composition and integration capabilities in a creative semi real-time way by the DKMF to: (1) construct services based on requirements provided as a formal specification, (2) check conformance of an existing service to a specification created to describe a user request, (3) check service conformance for services that are currently stored in the Assets Catalog as part of the DKMF auditing process, (4) verify whether a service satisfies a property (e.g., termination or temporal ordering of actions), (5) evaluate the results of service adaptation or service evolution, and (6) detect inconsistencies in a composite service.

3. The DKMF components composition and integration capabilities fully define and implement a novel commercial service composition and verification framework based on ArchWSSL™ and ensure compatibility with other service description languages through suitable translation and annotation mechanisms, then integrate formal behavior specifications in the lifecycle of Cloud-based services deployed on multiple Cloud providers (i.e., multi-cloud approach).

4. The DKMF components composition and integration capabilities provide novel integrated support for modeling business processes in BPMN 2.0, representing their semantics and their associated services' specifications, and allowing the verification and generation of models as well as their execution using assigned services or objects. The Business Process Modeling Notation (BPMN) is a graphical notation that depicts the steps in a business process. The notation has been specifically designed to coordinate the sequence of processes and the messages that flow between different process participants in a related set of activities.

5. The DKMF components composition and integration capabilities apply semantic business process management (SBPM) and provide a proprietary ontology that includes semantic knowledge about organizational contexts, workflow activities, and other process-related elements 6. The DKMF components composition and integration capabilities currently use a proprietary translator to generate ArchWSSL™ specifications and BPMN 2.0 models from representations of business processes expressed in a proprietary ontology.

7. The DKMF components composition and integration approach enables unequalled separation between the business domain ontology, and the business services/tasks ontology, which represents the services/tasks; the integrating of these two models provides a novel scalable and efficient way to manage the creation and update of business solutions composed of services/tasks.

8. The DKMF components composition and integration capabilities implement a proprietary wrapper around the BPMN 2.0 execution engine that makes it possible to execute generated BPMN 2.0 processes automatically.

9. The DKMF components composition and integration capabilities apply creative safety and reliability reuse guidelines when deploying updated processes.

10. The DKMF-driven novel process re-generation approach does not require down-time.

11. The DKMF creative process components composition and integration capability is completely flexible and can handle various scenarios active and/or autonomously.

There are several reasons, seven of which are listed below, why the novel DKMF capabilities mentioned above add tremendous value by providing business solutions management capabilities that enable seamless composition and integration of business components. First, this DKMF approach and related capabilities automates a complex end-to-end process integration process involving syntactic and semantic verification of individual services and their composition as well as that of the resulting process. Second, the resulting DKMF platform provides value to both the industry and academia as it becomes a testbed for experimenting with new enhanced techniques in the area while providing advanced technology for use in a commercial context. Third, these novel DKMF capabilities also provide tremendous value given the fact that they are applied in a context where users are expecting real-time response from intelligent active and/or autonomous business solutions. The level of automation set forth by the underlying technique will accelerate the ongoing development of business problems and solutions ontologies, and related taxonomies, which will facilitate standardization. The context is such that the knowledge base of taxonomies and business solutions will grow quickly and will foster optimizations to the platform, which is beneficial to the industry as well as the research community. Fourth, pairing these novel DKMF capabilities with the reuse focus set forth by the DKME makes that the sum of the parts bigger than the parts themselves. Given the fact that the DKME is designed to promote reuse, the use of semi-automated business components composition and integration will accelerate the growth of the reusable components knowledge base. Conversely, as the knowledge base keeps growing, the platform continues to be optimized to support new and existing composition and integration scenarios, which provides a lot of value to the industry and the research community. Fifth, the fact that these DKMF novel capabilities are being applied to enable intelligent active and/or autonomous business solutions also makes the sum bigger than the parts. While these capabilities are of tremendous value to enable this type of solutions, the context provided by these solutions will lead to more optimizations in automated process generation and composition/integration of business components. Again, this adds tremendous value to industrial and academic applications. Sixth, the ability to drive DKMF-enabled QoS as part of planning the composition and integration of business components adds tremendous value to the ability of business solutions to make intelligent decisions based on real value provided to end users by active and/or autonomous intelligent business solutions. We will also learn a lot from the feedback and ability of these solutions to deliver QoS in real-time, which is of great value to the industry as well as the research community. Seventh, being able to provide this type of DKMF end-to-end automation provide great value overall as it helps accelerate the deployment of the next-generation P2P marketplaces that leverage services provided by all the commercial Cloud platforms available today.

Continued work towards developing and promoting components composition and integration capabilities is inherent to Archemy's current focus as it comes to consulting, training, business solutions management, and products development activities. As we move forward with these activities, we plan to keep developing ArchWSSL™ to integrate novel support for QoS. knowledge states, asynchronous services interactions, and derivation of executable composite processes. We will keep working on streamlining the management of service specifications to improve the availability, suitability and conformance of all services stored in our Assets Catalog. It is our plan to keep improving our end-to-end DKMF components composition and integration capabilities to improve their flexibility and commercial viability and fully define and ensure compatibility with as well as leverage other complementary services offered via multiple Cloud providers. Our continued focus on components composition and integration will lead to refined and new DKMF capabilities that will be documented in subsequent papers. We plan to support the development and standardization of business process models in various industries using a SBPM-centric approach while providing access to BPMN 2.0 and OWL-S compatible models that can be verified, generated, and executed. We plan to work with standards committees to help standardize SBPM ontologies and promote the development of common component composition and integration guidelines, approaches, frameworks and related tools. To that extent, the development of standards guidelines to ensure safety and reliability when deploying automatically engineered composition of components is quite critical in our opinion. Finally, we are dedicated to ensuring optimal use of component composition and integration capabilities as they are essential to support the broad deployment of business marketplaces powered by intelligent active and/or autonomous business solutions.

As this concludes the coverage of the active and/or autonomous components composition and integration aspect of the DKMF business solutions management function, we delve into its intelligent active and/or autonomous agents support in the next sub-section.

Intelligent Active and/or Autonomous Agents Support:

In this subsection, we first provide some background on the state of research and practice that apply to active and/or autonomous intelligent agents. We believe that this background is necessary to understand the choices that were made to design the DKME/DKMF and their benefits as it applies to the creation and management of suitable business solutions. We subsequently explain how the DKMF builds on and helps extend the collective knowledge that relates to active and/or autonomous intelligent agents. We also state our intentions for continued work in this area.

Various definitions of agents have been given in the literature and there does not seem to be a strong consensus on adopting a universal definition. Agents can be defined as computer systems that are capable of active and/or autonomous action in some environment in order to meet their design objectives. Environments have various properties such as being accessible vs. inaccessible (i.e., depending on whether or not it is possible to obtain complete, accurate, up-to-date information about the environment), deterministic vs. non-deterministic (i.e., depending on whether or not it is possible to guarantee the effect of any action within the environment), episodic vs. non-episodic (i.e., depending on whether or not the performance of an agent is dependent on a number of discrete episodes, with no link between the performance of an agent in different scenarios), static vs. dynamic ((i.e., depending on whether or not the environment can be assumed to remain unchanged except by the performance of the actions by the agent), discrete vs. continuous (i.e., depending on whether or not there are a fixed number of actions and percepts in the environment). For example, the physical world is inaccessible, non-deterministic, and dynamic; Mail sorting is an episodic environment; Taxi driving is a continuous environment. The most complex, general class of environments are those that are inaccessible, non-deterministic, non-episodic, dynamic, and continuous. An agent will typically sense its environment (by physical sensors in the case of agents situated in part of the real world, or by software sensors in the case of software agents), and will have available a repertoire of actions that can be executed to modify the environment, which may appear to respond non-deterministically to the execution of these actions. Any control system can be viewed as an agent (e.g., thermostat, space probes). Most software daemons in Linux can be viewed as agents.

Intelligent Active and/or Autonomous Agents:

For an agent to be intelligent, it should be capable of flexible active and/or autonomous action to meet its design objectives, which means that they should exhibit some form of reactivity (i.e., perceive their environment and respond in a timely fashion to changes that occur to satisfy their design objectives) or pro-activeness (i.e., exhibit goal-oriented behavior by taking the initiative to satisfy their design objectives), and social ability (i.e., interact with other agents and possibly humans to satisfy they design objectives). In addition, intelligent agents must achieve an effective balance between goal-director and reactive behavior.

Abstract Agents Formalism:

An abstract view of agents can be formalized by assuming that the state of the agent's environment is characterized as a set $S=\{f_1, s_2, \ldots\}$. At any given time, the environment is supported to be in one of the states defined in S. The set of actions that can be performed by an agent can be characterized as belonging to the set $A=\{a_1, a_2, \ldots\}$. Then, an agent can be abstractly viewed as a function such as action: $S^* \rightarrow A$, which maps sequence of environment states to actions. Agents modeled by a function of this form are referred to as standard agents. Using this formalism, the interaction of an intelligent agent and its environment can be represented as an history or sequence of transitions from states to states as a result of successive actions. Reactive agents base their decision making entirely on the present, with no reference at all to history. Agent architectures typically separate the agent's decision function into perception and action subsystems. Perception is a function p that maps environment states in S to percepts in a set of perceptions P (e.g., p: $S \rightarrow P$). Then an action is now a function action: $P^* \rightarrow A$ that maps sequences of percepts to actions. Rather than just rely on history to influence their decision making, agents can have state (i.e., internal data structures) to record information about the environment state and history). If we assume that I is the set of all internal states of the agents, the action-selection function action can now be defined as a mapping action: $I \rightarrow A$ from internal states to actions. We can also create an additional function next: $I \times P \rightarrow I$ that maps an internal state and percept to an internal state. An agent typically starts in some internal state $i_0$, observes its environment state s, and generates a percept p(s). The internal state of the agent is then updated via the next function and becomes next(i0, p(s)), and the action selected by the agent is then action(next(i0, p(s)). Once this action is performed, the agent starts another perception cycle and so on. State-based agents are no more powerful than the standards agents introduced earlier—every state-based agent can be transformed into a standard agent that is behaviorally equivalent.

Agent-Based Architectures:

There are various ways to implement intelligent agents, which correspond to four classes of agents as noted below:

1. Logic-based agents realize decision making through logical deduction.

2. Reactive agents implement decision making via some form of direct mapping from situation to action.

3. Belief-desire-intention agents are such that decision making depends upon the manipulation of data structures representing the beliefs, desires, and intentions of the agents.

4. Layered architectures are such that decision making is realized via various software layers, each of which is more-or-less explicitly reasoning about the environment at different levels of abstraction.

In each of these four cases above, we are moving away from the abstract view of agents, and making specific commitments about the internal structures and operation of agents. In the logic-based "traditional" approach to building artificially intelligent agents (known as symbolic AI), decision making is viewed as deduction. Intelligent behavior can be generated in a system by giving that system a symbolic representation of its environment and its desired behavior, and syntactically manipulating this representation. An agent's program becomes a decision-making strategy encoded as a logical theory and the process of selection an action reduces to a problem of proof. In that context, constraint handling rules system like FLUX may be used as a programming method for the design of agents that reason logically about their actions and sensor information in the presence of incomplete knowledge. However, in general, the problems associated with representing and reasoning about complex, dynamic, possibly physical environments are still essentially unsolved. An alternative approach is to implement intelligent agents using a reactive architecture in which agents are simply reacting to an environment without reasoning about it. In that context, decision-making may be realized through a set of tasks accomplishing behaviors, where each behavior may be thought of as an individual action function as defined earlier, which continually takes perceptual input and maps it to an action to perform. Corresponding behavior modules are intended to achieve some task and can be implemented as state machines that do not include any symbolic reasoning. The third approach to implementing intelligent agents is to use belief-desire-intention (BDI) architectures that have their roots in the philosophical tradition of understanding practical reasoning (i.e., the process of deciding, moment by moment, which action to perform in the furtherance of our goals). Practical reasoning involves deciding what goals we want to achieve (i.e., deliberation process), and how we are going to achieve them (i.e., means-end reasoning process). Intentions play a central role in the BDI model as they provide stability for decision making, and act to focus the agent's practical reasoning. The fourth approach to implementing intelligent agents is to use layered architectures. These architectures make it possible to combine different subsystems with different types of behaviors (e.g., reactive, and proactive) and organize them in a hierarchy of interacting layers. For example, a reactive layer may be used to provide semi real-time responses to changes that occur in the environment via a set of situation-action-rules. A planning layer may be used to handle the "day-to-day" running of the agent and decide what the agent does. Finally, a modeling layer may be used to represent the various entities in the world (including the agent itself, and possibly other collaborating agent). This layer would be used to predict conflicts between agents for example and generate new goals to be achieved to resolve these conflicts. These goals would then be posted down to the planning layer that would make use of its plan library to determine how to satisfy them. Layers may be laid out horizontally or vertically and there must be a mechanism to decide which layer has control of the agent at any given time.

Classes of Agents:

There are five classes of agents that have been classified in the literature based on their degree of perceived intelligence and capability including: simple reflex agents, model-based reflex agents, goal-based agents, utility-based agents, and learning agents. Simple reflex agents act only based on their current percept ignoring the rest of the percept history. The agent function is based on the condition-action rule (i.e., if condition, then action), which only succeeds when the environment is fully observable. Model-based reflect agents can handle partially observable environments using stored internal knowledge about a "model of the world" that depends on the percept history and reflects some unobserved aspects of the current state. Percept history and impact of action on the environment are then determined using the internal model and influences the choice of actions. Goal-based agents further expand the capabilities of model-based agents by using goal information to describe situation that are desirable. The action sequences that achieve the agent's goals are determined as a result of search and planning processes. Different from goal-based agents that only distinguish between goal states and non-goal states, utility-based agents use a utility function to obtain a measure of how desirable a particular state is. A rational utility-based agent chooses the action that maximizes the expected utility of the action outcome (i.e., what the agent expects to derive, on average, given the probabilities and utilities of each outcome). A utility-based agent must model and keep track of its environment and tasks, which led to a great deal of past research on perception, representation, reasoning, and learning. Finally learning agents can operate in unknown environments and become more competent than initial knowledge alone might allow. The most important distinction is between the "learning element", which is responsible for making improvements, and the "performance element", which is responsible for selecting external actions. The learning element uses feedback from the "critic" on how the agent is doing and determines how the performance element should be modified to do better in the future. The performance element takes in percepts and decides on actions. The last component of a learning agent is the "problem generator." It is responsible for suggesting actions that will lead to new and informative experiences. Agents may be organized in a hierarchical structure that contain many sub-agents responsible for performing lower level functions. Multi-agents' systems (MAS) leverage various collaboration patterns such as delegation, mediation, passive vs. active, etc.

Agent Oriented Programming:

Programming agents require different programming paradigms. For that purpose, agent-oriented programming (AOP) was introduced to make it possible to program agents in terms of "mentalistic" notions such as belief, desire, and intentions in the same way as we use these notions to describe and explain the behavior of humans. These concepts are then used as abstraction mechanisms to represent the properties of complex systems. Another aspect that relates to programming is to provide the ability for agents to communicate and collaborate with each other in multi-agent systems. The Foundation for Intelligent Physical Agents (FIPA) developed the Agent Communication Language (ACL), which is used in FIPA-OS and the Java-based JADE agent framework. FIPA-ACL builds on and extends the prior state of agent communication and collaboration languages such as KQML. These languages rely on the speech act theory developed by Searle in the 1960s and enhanced by Winograd and Flores in the 1970s. They assert that almost any speech act is the performance of several acts at once, distinguished by different aspects of the speaker's intention: there is the act of saying something, what one does in saying it, such as requesting or promising, and how one is trying to affect one's audience." Agent communication languages rely on this theory and define a set of performatives, also referred to as Communicative Acts, and their meaning (e.g., ask-one). The content of the performatives is not standardized and therefore varies from systems to systems. To make agents understand each other requires the use of a common language and a common ontology (e.g., OWL, KIF) which is part of the agent's knowledge base. The ontology describes the kinds of things that an agent can deal with and how they are related to each other.

DKMF Intelligent Active and/or Autonomous Business Solutions:

Given the above background on intelligent active and/or autonomous agents, a few facts can be stated more formally as it comes to describing the DKMF being presented in the present disclosure. First, the DKMF operates in an inaccessible, non-deterministic, non-episodic, dynamic, and continuous environment. It enables the operation of intelligent active and/or autonomous business solutions that are capable of flexible active and/or autonomous actions to meet their design objectives. As such DKMF intelligent active and/or autonomous business solutions fall under the classification of intelligent active and/or autonomous agents. The DKMF node manager exhibits reactivity as it responds to business service requests (i.e., BSRs), business solutions and metrics updates requests (i.e., SURs and MURs respectively) on a timely fashion to satisfy the design objectives of the business solution it supports. The DKMF node manager also exhibits pro-activeness to enhance its node taxonomy and business solution capabilities. In doing so, it takes the initiative to satisfy the design objectives of the intelligent active and/or autonomous business solution it supports. For example, intelligent active and/or autonomous business solutions managed by the DKME can trigger service requests in an active and/or autonomous and proactive fashion based on their own perception of gaps in taxonomy knowledge and/or related abilities to respond to end-users needs as expressed via taxonomy-driven requests. Extensive details were provided in Section III to explain the implementation of the DKMF taxonomy and business solutions management cognitive learning components. Finally, the DKMF node manager also exhibits social ability by interacting with other intelligent active and/or autonomous business solutions nodes to obtain taxonomy and business solutions updates as well as propagate metrics updates. The DKMF social abilities are such that its requests may be propagated all the way up to humans interacting with the DKME to obtain updates that cannot be filled automatically by communicating and collaborating with other DKMF nodes. The DKMF social abilities are geared towards satisfying the design objectives of the intelligent active and/or autonomous business solution it supports. The DKMF also achieves an effective balance between goal-directed and reactive behavior. The DKMF implements a layered architecture in which decision making is realized via horizontal modeling, planning, and reactive software layers. It also provides built-in mediating capabilities to ensure that the layered architecture implementation orchestrates complete control of the intelligent active and/or autonomous business solution at all times and ensures guided support for both proactive and reactive (i.e., event-driven) functions. Intelligent active and/or autonomous business solutions implemented by the DKMF operate as learning agents that use feedback provided via taxonomy and business solutions availability metrics as well as business solutions suitability metrics to determine how the performance element of the business solution should be modified to do better in the future. This functionality relies on the framework's ability to increase the degree of precision of the descriptive taxonomies used to understand end-user's requests and match business solutions to these requests. Like a learning agent, the DKMF node manager implements a "problem generator" that is responsible for suggesting actions that lead to new and informative node experiences. DKME intelligent active and/or autonomous business solutions are organized in a hierarchical structure within a decentralized P2P environment. Some DKMF nodes are more capable than others from a service provider standpoint. Clusters nodes are at the top of the hierarchy when it comes to support services. In general, intelligent active and/or autonomous business solutions communicate and collaborate with each other and may act as sub-agents to one another in order to handle business service requests. The node manager leverages agent-oriented programming capabilities and FIPA-ACL to interact with other nodes. The KMP protocol described earlier is embedded within FIPA-ACL to drive specific service request management actions that require communication and collaboration with other nodes. The DKMF node also uses the KMP protocol to handle service requests events reactively. DKMF nodes communicate with each other in the context of business ontologies and related taxonomies specified using OWL. The Knowledge Interchange Format (KIF) is also leveraged to share and re-use information with the DKME underlying ArchVault™ knowledge base. The natural language translation (NLT) service which is provided as a share service to DKMF users leverages speech act theory and uses reinforcement learning powered by a sophisticated deep learning algorithm. Given their comprehensive set of functionalities, DKMF-powered intelligent active and/or autonomous business solutions are much more powerful than light-weight "bots" and are designed and implemented to support mission critical large-scale business activities. Each intelligent active and/or autonomous business solution node leverages built-in EAF-grade capabilities to support its own set of goals in addition to the node manager operational goals baseline. An important aspect of the DKME is the fact that any update requested by intelligent active and/or autonomous business solutions is subject to review and approval (e.g., service charges authorization) by the end users of the solutions. Practically, updates may be communicated to these end users daily via a dashboard focused on the specific corresponding area of business support provided by the solution.

DKMF Agent Approach Novelty and Value:

While Archemy™ clearly builds on the collective knowledge that relates to intelligent active and/or autonomous agents, it also helps extend it going forward in many ways via the novel capabilities described in the above. These novel capabilities can be summarized as follows:

1. The DKMF implements a novel layered intelligent active and/or autonomous architecture with intelligent agent capabilities that leverages content, governance, and automation capabilities set forth in an underlying DKMF EAF meta-framework. EAF governance is used to drive the control of each agent layer at all times. The various layers are designed to help the agent capabilities reason about their environment at different levels of abstraction to drive automation by planning based on an EA-centric evolving content-model.

2. The DKMF layered intelligent architecture combines the use of logic-based agents, reactive agents, and BDI capabilities in a novel way. The use of symbolic AI is restricted to a bounded area where login reasoning is feasible. Event-handling is realized via reactive agents. Using an underlying EAF meta-framework makes it possible to establish beliefs, desires, and intentions for DKMF node agents and leverage BDI capabilities.

3. The DKMF leverages intelligent active and/or autonomous agent capabilities in a novel business solutions' management context where the role of agents is to facilitate the optimization of end-user requests management.

4. The DKMF intelligent active and/or autonomous agent capabilities are programmed using AOP and use a novel hybrid combination of agent languages including FIPA-ACL integrated with the DKMF proprietary KMP, and the FLUX logic programming language, which is used internally to facilitate the integration and composition of updates services in an active and/or autonomous fashion.

5. The DKMF uses a mixture of novel machine learning predictive, prescriptive, and cognitive algorithms to generate feedback to the DKMF node manager and its underlying learning agent capabilities to help determine how the performance element of the taxonomy and business solutions management should be enhanced to do better in the future.

6. DKMK-based intelligent active and/or autonomous agents are organized in a hierarchical structure that contains many P2P accessible sub-agents responsible for performing lower level functions. Globally, this combination of agents implements a novel MAS that leverages various collaboration patterns such as delegation, mediation, and master-slave interaction.

There are several reasons, seven of which are listed below, why the novel capabilities mentioned above add tremendous value by making it possible to use intelligent active and/or autonomous agent capabilities as part of the DKMF to facilitate the creation and management of suitable business solutions. First, the DKMF approach makes it possible to advance the state of intelligent active and/or autonomous agent architecture and EAFs by implementing a hybrid logic-based, reactive, and BDI solution that is centered around the use of an underlying EAF meta-framework. It should be noted that little significant work was done over the past decades to further develop agent architectures. The contribution of the DKMF approach in this area is therefore quite significant. Second, the DKME and its associated DMKF provide a testbed to develop intelligent active and/or autonomous agent technologies in a business context. This is quite valuable as it will accelerate the spread of agent technology and emphasize its merits for years to come. Third, the DKME promotes the application of intelligent active and/or autonomous agent technology in a myriad of business contexts. This is also quite valuable as it will help establish variants of usage of that technology and possibly new usage patterns. Fourth, the spread of DKMF intelligent active and/or autonomous business solutions accelerates the ability to enable the use of AI by intelligent active and/or autonomous business solutions both internally as part of their own operation but also via various services that the agents make available as part of their customized solutions. Fifth, the value of using a hybrid AOP language is of clear benefit to both business users and the research community. Sixth, the ability to leverage the latest AI-driven predictive, prescriptive, and cognitive metrics development methods to drive agents is quite valuable to the field as both a business and research objective. And finally, seventh, the DKMF bring value by allowing business users and research to conquer new fields of knowledge as they leverage and develop the use of inter-agent communication and collaboration capabilities.

DKMF Agent Approach Next Steps:

Continued work towards developing and promoting intelligent active and/or autonomous agent capabilities is inherent to Archemy's current focus as it comes to consulting, training, business solutions management, and products development activities. As we move forward with these activities, we plan to keep enhancing the DKMF EAF-driven hybrid architecture to optimize its benefits to the business users' community and its widespread usage in a myriad of business contexts. We also plan to keep developing the DKMF AOP-centric languages and create a more integrated standardized language for intelligent active and/ or autonomous business solutions with the support of our business partners. We are dedicated to help refine the use of predictive, prescriptive, and cognitive AI algorithms to drive the precision of decisioning within DKMF-centric intelligent active and/or autonomous business solutions. We will keep supporting the widespread use of intelligent active and/or autonomous business solutions that carry DKMF-enabled AI services that will help improve business users' experience within business marketplaces powered by intelligent active and/or autonomous business solutions. We are currently working on expanding our DKMF inter-agent communication and collaboration capabilities and plan to publish a paper specific to our use of intelligent active and/or autonomous agents' capabilities soon. As we are dedicated to ensuring safety and reliability when using innovative combinations of technologies, we are taking these considerations into account as we design autonomy for DKMF agents in a MAS context. This topic will be covered as part of the upcoming paper along with other key topics. Topics of interest when it comes to MAS communication and collaboration include the ability for multi-agents to negotiate, and intelligent active and/or autonomous agent mobility.

This concludes the coverage of the business solutions management function. As part of that coverage, we have explained how the DKMF leverages the results of decades of research in components reuse, active and/or autonomous components composition and integration, and intelligent active and/or autonomous agents support. In the next subsection, we explain the theoretical rationale and value added by the DKMF approach as it pertains to metrics management.

V.4. Metrics Management and Analytics

Metrics management and analytics is one of the functions that is performed by the DKMF (clusters) nodes. This function is handled by the metrics and analytics manager under the control of the DKMF node manager. It supports DKMF meta-framework context, governance and automation aspects that pertain to metrics management and analytics as it applies to business solutions. The design and implementation of the DKMF metrics management and analytics function leverages the results of decades of research in metrics management and related predictive, prescriptive, and cognitive analytics methods. We elaborate on the DKMF-specific handling of these aspects in the following.

In this subsection, we first provide some background on the state of research and practice that apply to metrics management predictive, prescriptive, and cognitive analytics methods. We believe that this background is necessary to understand the choices that were made to design the DKME/DKMF and their benefit as it applies to the creation and management of suitable business solutions. We subsequently explain how Archemy™ builds on and helps extend the collective knowledge that relates to metrics management and analytics. We also state our intentions for continued work in this area.

Analytics and Metrics in a DKMF Context:

As stated in Section II that realizing our vision requires the creation of business solutions that are active and/or autonomous and intelligent enough to plan and execute day-to-day tasks without human intervention while "leaving humans to provide the inspiration and the intuition." The DKME ecosystem and associated DKMF were developed, in full awareness of today's machine learning limitations, to help harness knowledge at many levels to support the creation and management of intelligent active and/or autonomous business solutions. DKMF-driven business solutions rely on augmented intelligence and the support of enterprise and solution architecture, ontology/taxonomy management, business solutions management (via reuse, automated integration and composition of services, and intelligent active and/or autonomous agents' capabilities), and metrics management to semi-automate the discovery, reuse and adaptation, and deployment phases of the overall DKME business solutions lifecycle. The ability for DKMF-driven business solutions to act as intelligent active and/or autonomous agents is triggered by their perception of a low-degree of taxonomy-driven understanding of (new or evolving) user requests, or their perception of the lack of availability or suitability of business solutions they provide to end-users. This perception is synthesized via machine learning analytics at various levels (i.e., predictive, prescriptive, and cognitive) to generate metrics and/or feedback. This feedback helps power a business solution learning element that uses these metrics to measure how well the agent is doing and determine how the performance element of the business solution should be modified to do better in the future. In a nutshell, the performance element takes in percepts and decides on actions. Perception of gaps by intelligent active and/or autonomous business solutions can be triggered by their inability to understand end-users' requests or serve their needs. It can also result from induced gaps caused by regular updates to taxonomies triggered by human experts and/or machine learning algorithms in reaction to the addition of new knowledge, cognitive analysis of performance and feedback data (e.g., taxonomy and solutions availability matches), and feedback gathered by the DKME and the global P2P constellation. As noted earlier, the overall premise of our knowledge ecosystem is to allow proactive evolution of digital ecosystems by considering the fact that, in addition to more traditional reasons, elements may not function well or are missing entirely because they do not leverage the latest knowledge or related capabilities. As mentioned in Section III.2, the DKME described in the present disclosure relies on a set of metrics management processes introduced in FIG. 11. The precise origin of these metrics is described in detail in the part of Section IV.1 that describes the "DKMF metrics management service." DKMF nodes are equipped with a node manager that accesses the metrics management service to learn and adjust its perception of end users needs and related gaps, create a model of its environment, and adjust to it in an intelligent active and/or autonomous fashion. The core of the knowledge gathered by the DKME from various sources is maintained by P2P clusters business solutions nodes (i.e., ArchKBM™ cluster) that provide scalable knowledge base management services. Another set of P2P clusters nodes (i.e., ArchSSV™ "compute" cluster) provides big data and cognitive analytics services including HPC, predictive and prescriptive analytics, and social media sentiment analysis. These services are used to train and deploy machine and deep learning algorithms on various types of operational performance and feedback data provided by the DKME to address perceived history of gaps in business problems or business solutions knowledge as described above. ArchSSV™ helps uncover operational end users and solutions insights using a combination of predictive, prescriptive, and cognitive machine learning techniques. It helps predict needs and learn how to provide more precise taxonomies to describe solution components. It also helps make the most suitable solutions available to address end users' needs. Additional details related to ArchKBM™ and ArchSSV™ are covered in Section IV.1 under the subheading titled "DKMF Clusters/Services."

The Evolution of Analytics Methods:

Recent advances in Machine Learning capabilities was clearly a motivating factor that influenced the creation and design of our DKME/DKME solution. The purpose of this section is not to take an exhaustive look at the history and/or current state of the machine learning field. Our focus in this sub-section is to elaborate on predictive, prescriptive, and cognitive analytics methods since they are directly applied within the DKMF as part of P2P nodes or P2P clusters nodes. A little bit of background on these methods will help explain the choices that were made to design the DKME/DKMF as noted at the beginning of this subsection.

Figure 56:
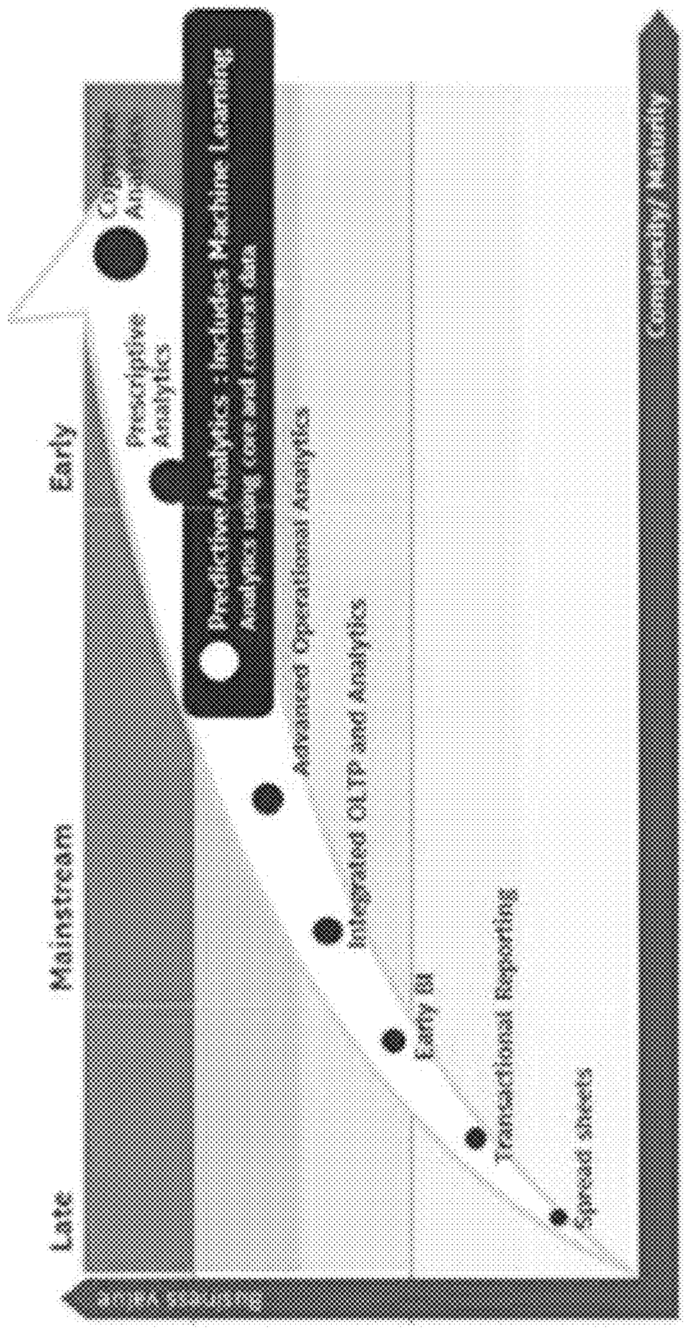
FIG. 56 is a chart showing the evolution of analytics methods.

Analytics methods are meant to enable business decisions based on data via the use of many different techniques and tools. As these methods aimed at producing increasing business value, their maturity and complexity also increased as shown in FIG. 56. The level of interaction required by the various methods went from natural and intuitive to automatic.

Accordingly, there are many types of analytics methods that produce business value at different levels by providing ways to view and explore available data. These most recent and prominent method types include descriptive, diagnostic, predictive, descriptive, and now cognitive analytics. Descriptive analytics focuses on figuring out what has happened (e.g., data exploration). Diagnostic analytics focuses on uncovering why something happened (e.g., detect a cancer and recommend a form of treatment). It provides insights (e.g., patterns, relationships) found within data via statistical analysis as an example. Predictive analytics uses insights to predict what will happen. For example, it can be used to forecast future sales levels, predict attrition, or find relations between concepts and ideas buried in literature. Prescriptive analytics focuses on determining how to make something happen. It can compute decisions such as the scheduling of production to meet forecasted sales. The net results of all these analytics methods is to automate the enablement of business decisions and bring it to a point where humans can intervene and do what is necessary to make decisions.

The Advent of Big Data:

The evolution of analytics has been facilitated by the increasing volume of data available to enterprises. Modem "big data" systems contain a much broader and deeper quantitative picture of enterprise domains than traditional relational database systems. The business output from traditional data and business intelligence systems (e.g., databases, spreadsheets, electronic tables) is an informational report that contains a quantitative description of what was captured in the data records (e.g., historical transactions). This output can be extracted from the data via descriptive analytics, which provides hindsight (i.e., based on past data) and oversight (i.e., based on current data) for a given set of enterprise domains' activities. However, big data systems now combine non-traditional data from multiple sources (i.e., inside and outside of the organization), multiple channels (e.g., social media, web logs, purchase transactions, customer service interactions), and multiple viewpoints (e.g., context, content, sentiment, location, time). This leads the way to big data analytics and the quest for more sophisticated analytics methods than the ones that were applied to traditional data. Furthermore, big data analytics is primarily concerned with the symbolic processing of vast data for cumbersome problems (e.g., targeted advertisements, recommendation systems) and the learning of straightforward correlations. Big data analytics has been processing large datasets for some time now but is only able to generate insights from structured or pre-tagged data. While humans produce insights from structured information slowly, big data analytics produces insights from structured information much faster than humans.

Applying Analytics Methods to Big Data:

As big data became widespread within enterprises, it became possible to build predictive models of the behavior of entities (e.g., customers, machines, business activities) within business domains. Predictive analytics, provides foresight about what is likely to occur regarding the entities within a business domain. As a result, the business output from big data systems becomes much more than informational reports and starts representing new knowledge about the past, present, and future of business domains. Predictive analytics utilizes a variety of statistical, modeling, data mining, and machine learning techniques to study recent and historical data, thereby allowing analysts to make predictions about the future. Sentiment analysis is a common type of predictive analytics. The input to the model is plain text and the output of that model is a sentiment score. Predictive models are typically trained on historical patterns and behaviors. Therefore, they cannot predict a behavior, or pattern, or outcome that has never been seen before. Insight is needed to see beyond what has happened in the past to understand objectively under what conditions a given entity (e.g., customer, machine, business process, competitor) will (re-)act in a certain way that was not seen in the historical training data. A step up from predictive analytics is prescriptive analytics, which provides this insight into how entities may behave in the future, recommends one or more courses of actions, and shows the likely outcome of each decision. Prescriptive analytics requires a predictive model with two additional components: actionable data and a feedback system that tracks the outcome produced by the action taken. Armed with the insights and knowledge that prescriptive analytics models can provide, and tasked with specific business objectives to guide the models, it is then possible to prescribe a set of conditions (e.g., marketing campaigns, external triggers, offers, instrumental parameter settings, business decisions) that is most likely to yield an optimal outcome. Consequently, optimization theory becomes an important and essential skill for the data science teams that are reaching to achieve prescriptive analytics success. The business output from such projects will be optimized outcomes (e.g., maximized revenues, minimized costs, maximized sales, minimized down time, maximized ROI, happier customers, maximized conversions).

Cognitive Computing and Analytics:

Cognitive computing extends analytics levels to new kind of data, using new technologies. With the advent of scalable, distributed computing, data scientists are now also keen to intelligently manage information that is captured in text, speech and other unstructured forms. Cognitive computing is especially useful when data is a large corpus of free text documents (e.g., Wikipedia), where it is used to analyze millions of free text documents to support a wide range of activities. Dealing primarily with unstructured data and free text, cognitive computing leverages technologies like natural language processing and machine learning. Cognitive computing approaches and technologies are generally developed as project-distinct and largely independent of the "big data-ness" of the analytics environment. Cognitive analytics is essentially what happens when cognitive computing is used to process and generate insights from unstructured data (e.g., natural language). Cognitive analytics applies human like intelligence to certain tasks, such as understanding not only the words in a text, but the full context of what is being written or spoken, or recognizing objects in an image or video within large amounts of information. Cognitive analytics brings together many intelligent technologies to accomplish this, including semantics, artificial intelligence algorithms and many learning techniques such as deep learning and machine learning. Applying such techniques, a cognitive application can get smarter and more effective over time by learning from its interactions with data and with humans. Cognitive analytics holds much greater potential than Big data analytics. It also holds more challenges. The answers to analyses conducted using big data are usually deterministic. Given a set of assumptions and rules, a machine will give a reliable output. The trick is to get the right set of assumptions and rules, and to program the machine or cluster in a resource-efficient way. Builders of cognitive systems are not so lucky. Cognitive Analytics deals with problems that are inherently uncertain; problems whose solutions are unavoidably and necessarily probabilistic. Unstructured data creates problems that are inherently uncertain; problems whose solutions are unavoidably probabilistic. Humans solve these problems all the time—we speak in language, recognize objects around us, register sounds, have a sense of beauty, develop likes and dislikes. These bits of information, which we often take for granted, are unstructured. Furthermore, unlike big data analytics, most cognitive analytics tasks do not render themselves to the map-reduce style of distributed computing. Due to completely unpredictable, unstructured and string-based data the computational complexity of the reduce step tends to be the same order of magnitude as the complexity of the original problem. As a result, when used to process big data, cognitive analytics systems must be designed to execute as much as possible in a single node and use problem-specific distributed architectures where needed. That is partly why IBM Watson is a hardware-based solution, a derivative of the Blue Gene supercomputer. This is also one of the reasons why Google, Facebook, Apple, and other companies dealing with large quantities of text, design their data centers using super-fast, flash-based Direct Attached Storage rather than prevalent network storage (SAN or NAS).

The "Turing" test for cognitive computing is not about a computer's ability to mimic humans; it is about the practical value achieved, like return on investment, new market opportunities, diseases cured and lives saved, etc.

Notwithstanding the challenges, the sky is the limit with cognitive analytics. Consequently, the big data analytics train is now moving ahead at hyper-speed and is taking us to places of discovery, decision management, and deep learning that we never imagined when the first databases and business intelligence tools appeared on the market. Cognitive analytics is the best paradigm for data-driven discovery and decision-making. Machine learning algorithms applied to big data will mine the data for historical trends, real-time behaviors, predicted outcomes, and optimal responses. The cognitive machine powered by cognitive analytics algorithms can be deployed to operate active and/or autonomously (i.e., without human intervention) in appropriate settings. As well as scalability, other advantages of cognitive analytics include increased adaptability (i.e., cognitive systems can adapt to different contexts with minimal human supervision), and more seamless human-machine interaction—cognitive systems can be designed to explain insights to humans in normal human language. Of course, not all applications should be left to a machine to make the decision, but it is not unreasonable to allow a machine to mine your massive data collections active and/or autonomously for new, surprising, unexpected, important, and influential discoveries. It is also acceptable to allow active and/or autonomous operations in some environments, including deep space probes operating far from Earth, or supply chain monitoring and ordering processes, or common help desk support functions, or massive data center operations, and many more applications involving smart devices, smart metering systems, and smart data (i.e., self-aware data, whose metadata tags were self-generated through automated cognitive learning algorithms at the point when the data were ingested into the big data system). Applied in the enterprise, cognitive analytics can be used to bridge the important gap between large volumes of information and the need to make decisions in real time. A deep understanding of information helps companies draw from the wide variety of information sources in its knowledge base to improve the quality of enterprise knowledge, and provide competitive positioning as well as a deep and personalized approach to customer service. Cognitive analytics provides a data forward approach that starts and ends with what's contained in information. This unique way of approaching the entirety of information (all types and at any scale) reveals connections, patterns and collocations that enable unprecedented, even unexpected insight.

DKME Analytics:

Metrics management is a critical function of the DKME and its underlying DKMF. Being able to manage metrics and drive improvement decisions in real-time is key to providing human-like performance via intelligent active and/or autonomous business solutions. All DKME actors generate information and feedback data as they monitor and rate the performance of intelligent active and/or autonomous business solutions across their full lifecycle. The feedback data may also include comments and ratings obtained from social media sources. FIG. 11 outlines the overall set of metrics management processes supported within the DKME and the associated processes are explained in detail in Section III.2. Metrics management processes area aligned with the taxonomy and business solutions management processes that are outlined in FIGS. 9 and 10, respectively. In other words, the information and feedback data provided by DKME actors is gathered as part, or as a result, of the execution of these later processes. As explained in Section III.2, the subset of taxonomy and business solutions management processes that end-users follow when operating intelligent active and/or autonomous business solutions adhere to Archemy's KAEAM approach. KAEAM activities interact with the local knowledge base repository to gain access to taxonomies, business solutions modules, and a collected pool of metrics. As it comes to intelligent and active and/or autonomous behavior, the DKMF is the brain of all business solutions that extend it. It was conceived to handle the fact that, in addition to more traditional reasons, intelligent active and/or autonomous business solutions components may not always function well or may be missing entirely because they do not leverage the latest knowledge or related capabilities. As a result, the DKMF was designed to augment new or existing business solutions with the ability to manage knowledge and adapt their behavior as needed under the guidance of metrics generated via big data and cognitive analytics. The DKMF also leverages hyperscale computing and other innovative technology enablers to facilitate near real-time updates. The DKMF "manage" function automates a subset of KAEAM processes and leverages augmented intelligence provided by the DKME as part of its intelligent active and/or autonomous behavior. All internal DKMF software modules generate performance and feedback data as they monitor and rate the performance of the DKMF automated manage process. Business solutions that are implemented using the DKMF typically need to collect additional information and feedback data that is specific to their functionality. To support this need, the DKMF provides mechanisms that make it possible to extend its metrics management framework by leveraging its built-in functionality.

As noted earlier, Archemy's division experts, librarians, and other actors within the DKME (including intelligent active and/or autonomous business solutions) generate information and feedback data as they monitor and rate the performance of intelligent active and/or autonomous business solutions across their full lifecycle. As a result, the information and feedback data pool is either independently compiled and shared by a community of ecosystem participants (e.g., Archemists) or originates from runtime needs and related gaps being communicated in real-time by interconnected business solution elements. In general, information and feedback data is based on usage and/or exposure to taxonomies and business solutions provided by Archemy™ or its affiliates. The type of data available varies widely as it may be obtained from logs of solutions users' requests, taxonomy/solution matches characteristics, business solutions logs (e.g., traditional malfunctions such as errors or warnings), solutions users feedback on needs understanding (i.e., taxonomy availability) and solutions availability and suitability, and DKME solutions usage (e.g., usage of solutions per industry, specific components used within nodes, maturity rating of components in use, components implementation status and versions, and other comments) and satisfaction feedback (e.g., benefits rating, and other comments) logs across the global P2P constellation that may include digital ecosystem feedback sources such as social media and social review sites. All data is funneled into the metrics' knowledge base via appropriate Archemy™ interfaces or APIs. The DKME manages a tremendous amount of information and feedback data. Indeed, as affiliate Archemists develop their own Archemy nodes and attach them to the Archemy™ P2P cloud, these nodes are free to grow their own taxonomy, business solution components, and metrics knowledge base. As noted above, data comes from a large variety of sources. Since intelligent active and/or autonomous applications users may provide feedback that pertains to the digital knowledge ecosystem developed by Archemy™ and its affiliates, the DKME also considers feedback provided via surveys, social media, and social review services as possible sources of data to be analyzed.

All DKMF nodes include a local metrics management manager module that operates under the control of the node manager. This module is meant to address a collection of possible gaps locally or globally that are a direct reflection of the low degree of understanding of user requests, the lack of availability of matching solutions, or the lack of suitability of matching solutions. This module collects local information and data, stores it in its local knowledge base and applies local analytics algorithms to generate actionable diagnostics and feedback metrics on an ongoing basis. The DKMF node manager uses these metrics to drive ongoing intelligent decisions to address individual nodes taxonomy and business solutions gaps. To address these gaps, the node manager may decide to delegate end-users' requests to other nodes in the P2P cloud it belongs to as well as seek taxonomy and solution components updates by requesting support from the larger DKME and its interconnected elements. To gain access to that support, intelligent active and/or autonomous business solutions' node managers can trigger service requests (i.e., BSRs and SURs) in an active and/or autonomous and proactive fashion based on their own perception of gaps in taxonomy knowledge and/or related abilities to respond to end-users needs as expressed via taxonomy-driven requests. Updates may also be triggered independently by the Archemy™ metrics management team as a result of a similar analysis of available metrics that suggests that improvements to existing solutions are required. Both the ArchNav™ interactive interface and intelligent active and/or autonomous applications use the ArchNav™ API to learn how to support (new) needs based on taxonomy inputs provided by solutions' users and real-time cognitive analysis of performance and feedback data gathered on an ongoing basis by the DKME and its interconnected elements. The performance and feedback data collected locally is also shared (via MUR service requests) with the ArchKBM™ on a regular basis for global storage. The ArchKBM™ knowledge base manager leverages the ArchSSV™ "compute" cluster to perform analytics on the global performance and feedback data collected within the DKME. The ArchKBM™ and ArchSSV™ clustered capabilities are optimized for performance, reliability, and availability. The ArchKBM™ global "knowledge base management" cluster hosts the central repository of DKME knowledge for taxonomies, business solutions modules, and metrics. DKMF P2P nodes provide the operational performance and feedback data they collect to the global ArchKBM™ repository to help drive performance analytics. Analysis conducted at the global level is meant to optimize the overall abilities of the DKME to understand end users' needs and ensure availability and suitability of business solutions made available via the P2P constellation. The ArchSSV™ cluster applies analytics algorithms to generate actionable diagnostics and feedback metrics on an ongoing basis to drive ongoing intelligent decisions that address individual nodes taxonomy and business solutions gaps (and update these nodes accordingly) using the rich set of globally available DKME information and feedback data. ArchSSV™ uses HPC and leverages big data and cognitive analytics capabilities to handle various types of analytics including social media sentiment analysis. ArchSSV™ is used to train and deploy machine and deep learning algorithms on various types of operational performance and feedback data provided by the DKME (e.g., end users' requests, taxonomy/solution matches characteristics, business solutions logs, solutions users' feedback on needs understanding and solutions availability and suitability, and DKME solutions usage, and satisfaction feedback logs across the global P2P constellation that may include digital ecosystem feedback sources such as social media and social review sites). These learning algorithms are used to address a perceived history of gaps in business problems or business solutions knowledge based on the current taxonomy. They are also used to address a perceived (history of) gaps in availability or suitability of certain capabilities required to address end users' needs. In a nutshell, ArchSSV™ helps uncover operational end users and solutions insights using a combination of predictive, prescriptive, and cognitive machine learning techniques. It helps predict needs and learn how to provide more precise taxonomies to describe solution components. It also helps make the most suitable solutions available to address end users' needs.

The information and data generated by the DKME is processed via various analytics algorithms to generate actionable diagnostics and feedback metrics used to optimize the behavior of intelligent active and/or autonomous business solutions by ensuring their best possible combination of taxonomies and business solutions at all times. The set of analytics algorithms may be extended by business solutions builders that leverage the DKMF to analyze solutions-specific behavior (e.g., integration of custom cognitive analytics modules and related APIs). All DKMF nodes include a local metrics management manager module that operates under the control of the node manager. This module collects local information and data, stored it in its local knowledge base and applies local analytics algorithms to generate actionable diagnostics and feedback metrics on an ongoing basis to drive the behavioral optimization of individual nodes with the support of the larger DKME ecosystem (via BSR and service update request (SUR) service requests). Information and feedback data collected locally is also shared (via MUR service requests) with the ArchKBM™ on a regular basis for global storage. The ArchKBM™ knowledge base manager leverages ArchSSV™ to analyze the global data. ArchSSV™ uses HPC to perform big data and cognitive analytics and generate actionable diagnostics and feedback metrics on an ongoing basis. These metrics are used to drive the behavioral optimization of individual nodes using the rich set of globally available DKME information and feedback data. To handle both reactive and proactive DKMF optimization decisions and related taxonomy and business solutions enhancements, the DKME leverages an extensible combination of descriptive, diagnostics, predictive, prescriptive, and cognitive analytics that are performed either locally within DKMF nodes or globally within the DKMF ArchSSV™ cluster. Non-DKMF actors may also run analytics in a non-automated fashion to generate reports, diagnostics, and metrics as needed. For example, Archemy's metrics management team constantly performs analytics and triggers business solutions updates as needed.

The DKME leverages descriptive, diagnostics, predictive, prescriptive, and cognitive analytics that are performed either locally within DKMF nodes or globally within the DKMF ArchSSV™ cluster. Non-DKMF actors may also leverage analytics in a non-automated fashion to generate reports, diagnostics, and metrics as needed. Supporting these predictive, prescriptive, and cognitive analytics functions is challenging within a P2P environment as performance and feedback data may have to be processed either locally or globally (or both) depending on the nature of the analytics to be performed (e.g., taxonomy learning via cognitive analytics is typically handled at the global level within the ArchSSV™ cluster) and the amount of data at hand. This results in having to sync performance and feedback node data with node clusters that can handle big data and cognitive analytics in a reliable, scalable, and efficient manner to also leverage the global knowledge available at the DKME level. Descriptive, diagnostic, predictive, and cognitive analytics are generally used within the DKME to facilitate the enablement of business decisions and bring it to a point where humans can intervene and do what is necessary to make decisions (e.g., discover a pattern of business solution behavior that requires optimization and initiate a solution update accordingly). Cognitive analytics techniques make it possible to generate insights from unstructured data by learning how to recognize patterns within large quantities of such data. They are specifically used to drive ontology learning as new requests are suggested by end-users or new solutions are being described. The predictive, prescriptive, and cognitive algorithms that leverage "big data" are trained at the global level via ArchKBM™ and ArchSSV™ clusters nodes.

The DKME includes a traditional descriptive analytics function that helps figure out what happened in the past and explore such happenings. This feature enables the generation of reports at the local nodes level (i.e., via the DKMF node management console) pertaining to (selected subsets) of end users' requests, taxonomy/solution matches characteristics, business solutions events (e.g., traditional malfunctions such as errors or warnings), solutions users' feedback on needs understanding (i.e., taxonomy availability), and solutions availability and suitability characteristics. Reports can also be generated at the global level via the DKMF ArchKBM™ cluster's portal. In that case, reports can be generated for (selected subsets) of the above information and feedback data as well as for (selected subsets of) data maintained at the global storage level and including DKME solutions usage (e.g., usage of solutions per industry, specific components used within nodes, maturity rating of components in use, components implementation status and versions, and other comments), and satisfaction feedback (e.g., benefits rating, and other comments) logs across the global P2P constellation that may include digital ecosystem feedback sources such as social media and social review sites). These reports may be useful to non-DKMF actors to track historical events and the (intended) usage of solutions per individual DKME actors and locations.

The DKME includes a traditional diagnostic analytics function to help uncover why something happened. This feature currently provides node diagnostics and recommendations that pertain to the handling of certain events that are logged by internal DKMF functions. For example, the ArchTrk™ cluster keeps track of the P2P network performance and aims at improving the speed of peer discovery. Diagnostics and recommendations are supported for this feature and available to DKME users at the global level via the ArchTrk™ portal. Diagnostics and recommendations are also available to help handle business solutions erratic behavior such as errors, warning, or other events of the same nature. Diagnostics and recommendations are supported for this feature and available to DKMF users at the local level via the DKMF management console. The diagnostic analytics feature is generally meant to help address issues with business solutions that may not function well. As diagnostic analytics require the ability to provide recommendations, their current support is limited to the existing error handling capabilities within the DKMF. In the near term, the following additional diagnostic support will be provided at the local and global levels to obtain recommendations about specific issues with DKMF-based business solutions that need attention (e.g., failing end users' requests, taxonomy/solution acute mismatches, other business solutions malfunctions such as issues with automated update mechanisms malfunctions and out of date solutions, taxonomy availability issues, and solutions availability and suitability issues). Furthermore, additional diagnostic analytics support will be provided at the global level in the near term to obtain recommendations about specific issues that require attention at the DKME level (e.g., issues with specific components used within nodes, components implementation status and versions mismatches, feedback sources issues). These reports may be useful to non-DKMF actors to diagnose events and help optimize the usage of solutions per individual DKME actors and locations.

The DKME includes a predictive analytics function that uses insights to predict/forecast what will happen. This feature currently provides analytics that leverage the performance and feedback data that the DKME collects (e.g., knowledge management data pertaining to business request types and solutions usage/suitability) for third party marketing and advertisement purposes. For example, the ArchNav™ knowledge search engine tool provides insights that are used by third parties and Archemy™ itself to advertise or market their products or services in relation to certain types of related knowledge that could be of service at some point in the future to DKMF business solutions end-users. For example, the frequency of certain business requests handled by DKMF-based solutions may suggest recommending the use of specific business solution components stored in the Archemy™ Assets Catalog and suggest the use of such at various levels of abstraction (e.g., full solution components, candidate architecture, building blocks or patterns). Another example would be a health metering business solution that is being evolved to include a certain set of monitoring and diagnostic components. In that case, it would beneficial to manufacturers of pharmaceutical products to advertise medications related to these components within the ArchNav™ knowledge classification and search engine. This approach provides the type of advertisement or marketing capabilities displayed by mainstream information search engines on the market today (e.g., Google, Bing). Another core area where predictive analytics are applied is to process DKMF data that pertains to the availability of suitable taxonomies to understand end-user's requests and the availability and suitability of corresponding solutions to handle these requests. More generally, predictive analytics computations are performed by the DKMF active and/or autonomously at the local (i.e., via the DKMF metrics manager module) and global level (i.e., via ArchKBM™ and ArchSSV™) on DKME performance and feedback data that pertains to end users' requests, taxonomy/solution matches characteristics, business solutions logs (e.g., traditional malfunctions such as errors or warnings), solutions users' feedback on needs understanding (i.e., taxonomy availability), and solutions availability and suitability characteristics. Predictive analytics computations are also performed active and/or autonomously at the global level (i.e., via ArchKBM™ and ArchSSV™) on informational data that pertains to DKME solutions usage (e.g., usage of solutions per industry, specific components used within nodes, maturity rating of components in use, components implementation status and versions, and other comments), and satisfaction feedback (e.g., benefits rating, and other comments) logs across the global P2P constellation that may include digital ecosystem feedback sources such as social media and social review sites). Predictive analytics used by the DKMF context make it possible to derive insights and predict needs that can be used as metrics by DKMF-based intelligent active and/or autonomous solutions to obtain more precise taxonomies to describe solution components and better equip DKMF nodes as a result. Predictive analytics are also used by non-DKMF actors to derive insights about the performance of all DKME processes to help optimize the various DKME functions as a result per individual DKME actors and locations.

The DKME includes a prescriptive analytics function which provides insight into how entities (e.g., intelligent active and/or autonomous business solutions) may behave in the future, recommends one or more courses of actions, and shows the likely outcome of each decision. The DKME prescriptive analytics function uses a predictive model and leverages DKME actionable data (e.g., availability of ontology and related taxonomy) as well as the DKME feedback system that tracks feedback produced as a result of action taken (e.g., ability to understand user requests when using available taxonomies). Using this approach, it is possible for the DKMF to prescribe a given set of action (e.g., request taxonomy upgrade from DKME and interconnected components to understand certain new keywords in user requests). Prescriptive analytics are used across the board within the DKMF to gain insight into how the architecture, ontologies and related taxonomies, and business solutions may behave in the near term and take actions to adjust them accordingly. Intelligent active and/or autonomous business solutions architectures (including the DKMF framework) rely on an EAF meta-framework and are designed to align with certain key performance indicators (KPIs) in mind, which drive the choice and use of certain recommended patterns. Feedback on business solutions architecture performance adequacy obtained via detection of log anomalies in solution components' generated logs (e.g., event handler logs, KMP history logs) can help improve the choice of structural or process patterns used to assemble intelligent active and/or autonomous business solutions. For example, feedback pertaining to business solutions' node manager agent's effectiveness in addressing business solutions gaps may lead to refactoring the design of the KMP state machine. Prescriptive analytics techniques are also used, as noted earlier, to help adapt taxonomies and refine them on an ongoing basis based on feedback that pertains to the correlation of contextual and historical usage of taxonomy keywords to their semantic meaning. This approach is used by the DKMF node manager within intelligent active and/or autonomous applications to address a perceived history of gaps in business problems or business solutions knowledge based on the current taxonomy (when used in a given context and at a given time). As a result, the taxonomy management agent is able to predict end-users' needs and provide more precise taxonomies to describe solution components to best serve the functional needs of its end users and is then able to apply several criteria matching algorithms to identify candidate matching solutions to best serve these needs. These taxonomy adaptations may sometimes be handled, as discussed in Section V.2, by manipulating weights in the taxonomy hierarchy without requiring taxonomy updates. Prescriptive analytics techniques are also used across the board to help adapt business solutions and tune the application of reuse, integration and composition, and agent technology as needed. The general model used in this context aims at optimizing availability and suitability of business solutions and related components. Lack of solutions availability drives demand for new services and lack of solutions suitability drives the need for a more precise semantic description of services to optimize suitability feedback (e.g., improved maturity). The DKMF provides APIs to several tools (e.g., EAMTk™, ArchNav™, ArchDoc™, and ArchViz™) that are used to locate the most suitable solutions available in order to address end users' needs based on actionable data and feedback massaged via prescriptive analytics techniques. As we delve into the core functionality of the DKMF, prescriptive analytics techniques are used by the DKMF to manage its planned reuse approach. As it is the norm for software factories and as eluded to in Section V.3, the systematic and formal practice of reuse, guidelines and procedures for reuse are all defined and actionable based on feedback being collected to assess reuse performance. The DKME is therefore well positioned to be able to measure the effects of reuse via feedback provided through the DKMF and ensure that reuse is leveraged reliably and safely. The DKME is also well positioned to measure the benefit of reuse (e.g., impact on productivity and quality). Reusable components are traceable to goals specified via the URN GRL notation in ArchCMP™ and reuse may also be measured via proximity to catalogued requirements sets, scenarios, or software cases. In this case, traceability and proximity are used as feedback to prescribe improvements to the DKMF reuse methods. Other types of feedback used to manage reuse focus on the adherence to reuse type classification measures, reuse library metrics, cost benefit measures, maturity assessment measures, amounts of reuse metrics, failure modes measures, and reusability assessment measures. Another core DKMF solutions management functionality that leverages prescriptive analytics techniques is the underlying BPM and service integration and composition approach. BPMN processes must adhere to KPIs that are injected by the ArchBPM™ tool and used as a way to provide feedback as to the health of processes at execution time. The DKMF active and/or autonomous components composition and integration approach leverages the ArchWSSL™ service specification language and a related framework that integrates support for QoS via feedback-driven services matchmaking and selection mechanisms. Prescriptive analytics techniques in this case make it possible to optimize processes so they operate within their KPI boundaries as well as optimize the choice of services to maximize QoS. The last core area of the DKMF where prescriptive analytics techniques are applied is the functionality that ensures intelligent active and/or autonomous agents behavior suitability within the DKMF node manager's business solutions management module. As mentioned in Section V.3, the DKMF node manager exhibits social ability by interacting with other intelligent active and/or autonomous business solutions nodes to obtain taxonomy and business solutions updates as well as propagate metrics updates to other nodes' agents. These node agents are in fact prescriptive analytics driven learning agents that use feedback based on taxonomy and business solutions availability measures as well as business solutions suitability measures to determine how the performance element of the business solution should be modified to do better in the near term. It is also the case that agents are guided by prescriptive analytics techniques that analyze performance feedback (e.g., availability and suitability of solutions) gathered by the DKME and the global P2P constellation. Furthermore, the communication and collaboration between agents and as it relates to context is also managed via prescriptive analytics to help suggest new patterns of collaboration as needed (e.g., mediation, delegation, master-slave interaction) and optimize communication effectiveness. More generally, prescriptive analytics computations are performed by the DKMF active and/or autonomously at the local (i.e., via the DKMF metrics manager module) and global level (i.e., via ArchKBM™ and ArchSSV™) using business solutions logs' data (e.g., traditional malfunctions such as errors or warnings), solutions users' feedback on needs understanding (i.e., taxonomy availability), and data from solutions availability and suitability logs. Prescriptive analytics computations are also performed active and/or autonomously at the global level (i.e., via ArchKBM™ and ArchSSV™) using solutions usage (e.g., usage of solutions per industry, specific components used within nodes, maturity rating of components in use, components implementation status and versions, and other comments), and satisfaction feedback (e.g., benefits rating, and other comments) logs across the global P2P constellation that may include digital ecosystem feedback sources such as social media and social review sites). Prescriptive analytics used by the DKMF make it possible to uncover operational insights as to how end-users and intelligent active and/or autonomous business solutions may behave in the future, recommend one or more courses of actions, and show the likely outcome of each decision. Prescriptive analytics are also used by non-DKMF actors to provide insights to individual DKME actors into how the DKME may behave in the future at given locations, recommend one or more courses of actions, and show the likely outcome of each decision.

The DKME includes a cognitive analytics function which generate insights from unstructured data and learns how to recognize patterns within large quantities of such data. That function uses a number of learning techniques such as deep learning and machine learning. Again, the end goal in a DKME context is to optimize the availability and suitability of taxonomies that can precisely qualify end-users' request and describe business solutions and related components. The cognitive analytics capability is also used to equip intelligent active and/or autonomous business solutions that are developed by (affiliate) Archemists with plug-in modules that handle NLT, face and speech recognition, or other types of capabilities that require deep and/or reinforced learning. When applied within the DKME framework, cognitive analytics generates insights that help understand the full context of what is being revealed in the feedback data (e.g., user comments, sentences contexts) and learn how to recognize related patterns using an approach like the one used in WordNet. These insights and associated learnings are then used to recommend one or more courses of actions. Cognitive analytics techniques are also used as a means to an end to power other analytics methods (i.e., predictive and prescriptive analytics) that are described earlier in this sub-section. For example, enhancing the availability of ontologies and related taxonomies to better understand users' (new) requests is achieved by plugging new keywords in an existing ontology to provide a larger related context. Cognitive analytics algorithms are then used to perform ontology learning and discover the meaning of the new keywords in that larger context. Using this approach, it is possible for the DKMF to prescribe a given set of actions (e.g., provide insights to the DKME and its interconnected components to evolve an existing taxonomy in order to understand certain new keywords in user requests and propagate the learnings to other interested nodes within the DKME). Cognitive analytics are used in a similar way across the board within the DKMF to identify ontology and related taxonomy gaps between user needs and business solutions architectures, and take actions to adjust them accordingly. As noted earlier, intelligent active and/or autonomous business solutions architectures (including the DKMF framework) rely on an EAF meta-framework and are designed to align with certain key performance indicators (KPIs), which drive the choice and use of certain recommended patterns. The ongoing application of cognitive analytics techniques to the growing pool of feedback on business solutions architecture performance adequacy obtained via detection of log anomalies in solution components' generated logs (e.g., event handler logs, KMP history logs) helps uncover gaps linked to the choice of structural or process patterns used to assemble intelligent active and/or autonomous business solutions. For example, cognitive analytics techniques applied to feedback pertaining to business solutions' node manager agent's effectiveness in addressing business solutions gaps leads to explaining architectural gaps that are then addressed by refactoring the design of the KMP state machine. Cognitive analytics techniques are also used, as noted earlier, to help adapt taxonomies and refine them on an ongoing basis by uncovering correlations between the contextual and historical usage of taxonomy keywords and their semantic meaning. Also, when new end-users' requests come in, they are analyzed in a larger context to revise the ontologies and associated taxonomies in use and make it possible to understand the new requests by driving ontology learning from the problem description side. This approach is used by the DKMF node manager, along with other analytics techniques, to learn about and address a perceived history of gaps in business problems or business solutions knowledge based on the current taxonomy (when used in a given context and at a given time). As a result, the taxonomy management agent is able to react to end-users' needs and provide more precise taxonomies to describe solution components that best serve the functional needs of its end users and is then able to apply several criteria matching algorithms to identify candidate matching solutions that best serve these needs. As noted elsewhere in this sub-section, resulting taxonomy adaptations may sometimes be handled, as discussed in Section V.2, by manipulating weights in the taxonomy hierarchy without requiring taxonomy updates. Cognitive analytics techniques are also used across the board to help adapt business solutions and tune the application of reuse, integration and composition, and agent technology as needed. The general end goal in this context aims at optimizing availability and suitability of business solutions and related components. Cognitive analytics help intelligent active and/or autonomous solutions learn how to support new needs based on insights and learning about new taxonomy inputs provided by solutions' users and/or real-time discovery of availability and suitability gaps via the application of cognitive analytics techniques to the performance and feedback data gathered on an ongoing basis by the ecosystem and its interconnected elements. Associated learnings are used to generate more precise taxonomies so that more suitable business solutions can be selected to handle end-users' needs. Cognitive analytics techniques are also applied to mine new reusable components in large pools of available software (e.g., open source and GitHub community) to uncover more suitable components based on the large pool of problem descriptions that are typically handled by the DKME. This approach helps increase the ability of solutions to handle end-users' requests and helps adapt taxonomies to become more precise and able to characterize a larger number of reusable components. This is priceless as it applies to the DKME since the lack of solutions availability drives demand for new services and the lack of solutions suitability drives the need for a more precise semantic description of services to optimize suitability feedback (e.g., improved maturity). The backend support provided via cognitive analytics techniques makes it possible for the DKMF to locate the most suitable solutions available in order to address end users' needs. The DKMF provides APIs to several tools (e.g., EAMTk™, ArchNav™, ArchDoc™, and ArchViz™) that are used to facilitate the discovery of such solutions. As we delve into the core functionality of the DKMF, cognitive analytics techniques are used by the DKMF to help manage its planned reuse approach. For example, insights on the meaning of end users' feedback buried in unstructured comments that relate to productivity and quality help measure the benefit of reuse and/or its effects and ensure that reuse is leveraged reliably and safely. Similar learnings may help uncover and address traceability gaps between reusable components functional requirements and goals specified via the URN GRL notation, and proximity gaps between reusable components and catalogued requirements sets, scenarios, or software cases. Again, plunging new information into a larger knowledge pool helps uncover the meaning of this information thanks to the larger context. Resulting insights help drive reasoning about software cases via learning similarities between requirements and design artifacts and software cases in the knowledge base that are applicable to end-users' requests. Again, this is all priceless in a DKME context since it is the norm for software factories to ensure systematic and formal practice of reuse and guidelines and procedures for reuse must be defined and actionable based on feedback being collected to assess reuse performance. Similarly, cognitive analytics techniques are applied to other types of feedback pools that focus on the adherence to reuse type classification measures, reuse library metrics, cost benefit measures, maturity assessment measures, amounts of reuse metrics, failure modes measures, and reusability assessment measures. In that case, learnings help discover gap patterns that need to be addressed to improve the overall effectiveness of reuse. Another core DKMF solutions management functionality that leverages cognitive analytics techniques is the underlying BPM and service integration and composition approach. BPMN processes must adhere to KPIs that are injected by the ArchBPM™ tool and used as a way to provide feedback as to the health of processes at execution time. The DKMF active and/or autonomous components composition and integration approach leverages the ArchWSSL™ service specification language and a related framework that integrates support for QoS via feedback-driven services matchmaking and selection mechanisms. In this case, cognitive analytics techniques make it possible to discover feedback anomalies that help optimize processes so they operate within their KPI boundaries as well as optimize the choice of services to maximize QoS. The last core area of the DKMF where cognitive analytics techniques are applied is the functionality that ensures intelligent active and/or autonomous agents behavior suitability within the DKMF node manager's business solutions management module. As mentioned in Section V.3, the DKMF node manager exhibits social ability by interacting with other intelligent active and/or autonomous business solutions nodes to obtain taxonomy and business solutions updates as well as propagate metrics updates to other nodes' agents. These learning agents use a combination of cognitive and prescriptive analytics to discover gaps in taxonomy and business solutions availability and suitability. Related insights also help determine how the performance element of the business solution should be modified to do better in the near term. hi general, DKMF intelligent active and/or autonomous business solutions are guided by a combination of cognitive and prescriptive analytics techniques that analyze performance feedback (e.g., availability and suitability of solutions) gathered by the DKME and the global P2P constellation. Furthermore, the communication and collaboration between agents and as it relates to context is also managed via a combination of cognitive and prescriptive analytics to help suggest new patterns of collaboration as needed (e.g., mediation, delegation, master-slave interaction) and optimize communication effectiveness. More generally, cognitive analytics computations are performed by the DKMF active and/or autonomously at the local (i.e., via the DKMF metrics management module) and global levels (i.e., via ArchKBM™ and ArchSSV™) to uncover insights and learning from business solutions logs' data (e.g., traditional malfunctions such as errors or warnings), solutions users' feedback on needs understanding (i.e., taxonomy availability), and solutions availability and data from suitability feedback logs. Analytics techniques conducted locally help uncover operational end users and solutions insights using a combination of predictive, prescriptive, and cognitive machine learning techniques. Cognitive analytics computations are also performed active and/or autonomously at the global level (i.e., via ArchKBM™ and ArchSSV™) to uncover insights and learnings from operational data detailing solutions usage (e.g., usage of solutions per industry, specific components used within nodes, maturity rating of components in use, components implementation status and versions, and other comments), and satisfaction feedback (e.g., benefits rating, and other comments) across the global P2P constellation that may include digital ecosystem feedback sources such as social media and social review sites. Generally, cognitive analytics techniques make it possible to generate insights from unstructured data and learn how to recognize patterns within large quantities of such data. They are specifically used to drive ontology learning as new requests are suggested by end-users or new solutions are being described. The resulting learning outcomes are used by the DKMF to improve the behavior of intelligent active and/or autonomous business solutions. However, contrary to the popular belief, cognitive computing approaches and technologies are also developed as project-distinct and largely independent of the "big dataness" of the analytics environment. This is typically the mindset that Archemists adopt when developing cognitive analytics-powered plugin modules for their intelligent active and/or autonomous applications. Finally, cognitive analytics techniques are also used by non-DKMF actors (i.e., via the DKMF or ArchKBM™ management console) to generate insights from unstructured DKME data and learn how to recognize patterns to advise individual DKME actors about DKME conditions and suggest corresponding courses of actions.

While Archemy™ clearly builds on the collective knowledge that relates to metrics management and analytics, it also helps extend it going forward in many ways via the novel capabilities described in the above. These novel capabilities can be summarized as follows:

1. The DKMF implements a novel capability designed to augment new or existing business solutions with the ability to manage knowledge and adapt their behavior as needed under the guidance of metrics generated via big data and cognitive analytics.

2. The DKME provides a novel ecosystem that makes is possible to gather (from many sources) a wide variety and a large volume of performance and feedback data that results from monitoring and rating the performance of intelligent active and/or autonomous business solutions across their lifecycle.

3. The DKME implements a novel well-defined set of metrics management processes that make it possible to monitor and rate the performance of intelligent active and/or autonomous business solutions across their lifecycle.

4. The DKME leverages analytics in a novel context to provide human-like semi real-time performance to intelligent active and/or autonomous business solutions and help learn an evolve ontologies and related taxonomies that can be used to precisely qualify user requests and make it possible to identify suitable business solutions and related components to handle these requests.

5. The DKMF provides a novel framework to build analytics-driven intelligent active and/or autonomous business solutions and it also provides mechanisms to extend its metrics management framework to leverage built-in functionality.

6. The DKME implements a novel reliable, scalable and efficient feedback data replication protocol to enable analytics processing at a global level within a HPC-driven cluster and distribute resulting recommendations to local nodes in semi real-time.

7. The DKME provides a novel way to combine machine learning predictive, prescriptive, and cognitive algorithms to analyze feedback and enable business solutions learning agents to determine how the performance element of the DMKF taxonomy and business solutions management should be enhanced to do better in the future.

8. The DKMF automates the use of combinations of predictive, prescriptive, and cognitive algorithms in a novel way to power various business solutions' internal functions in active and/or autonomous intelligent business solutions.

9. The ArchNav™ knowledge classification and search engine tool provides innovative insights management capabilities that can be used by third parties and Archemy™ itself to advertise or market their products or services in relation to certain types of related knowledge that could be of service at some point in the future to DKMF business solutions end-users.

10. The DKMF uses prescriptive analytics in a novel way to gain insight into how intelligent active and/or autonomous business solutions architectures may behave in the near term and take actions to adjust them accordingly. This information helps improve the choice of structural or process patterns used to assemble intelligent active and/or autonomous business solutions.

11. The DKMF uses prescriptive analytics in a novel way to gain insight into how the ontologies and related taxonomies may behave in the near term and take actions to adjust them accordingly. This information helps adapt taxonomies and refine them on an ongoing basis.

12. The DKMF uses prescriptive analytics in a novel way to gain insight into how the business solutions may behave in the near term and take actions to adjust them accordingly. This information is used to tune the application of reuse, integration and composition, and agent technology as needed in an innovative way.

13. The DKMF uses cognitive analytics in a novel way to generate insights that help understand the full context of what is being revealed in intelligent active and/or autonomous business solutions architectures' performance and feedback data logs. This information helps improve the choice of structural or process patterns used to assemble intelligent active and/or autonomous business solutions.

14. The DKMF uses cognitive analytics in a novel way to generates insights that help understand the full context of what is being revealed in intelligent active and/or autonomous business solutions ontology and related taxonomy performance and feedback data logs. The resulting guidance obtained via ontology learning are used to enhancing the availability of ontologies and related taxonomies that better understand users' (new) requests.

15. The DKMF uses cognitive analytics in a novel way to generate insights that help understand the full context of what is being revealed in intelligent active and/or autonomous business solutions' performance and feedback data logs. This information is used to tune the application of reuse, integration and composition, and agent technology as needed in an innovative way.

16. The DKMF leverages hyperscale computing and other innovative technology enablers in an innovative way to facilitate near real-time updates to intelligent active and/or autonomous business solutions' components.

There are at least seven reasons why the novel capabilities mentioned above add tremendous value by applying metrics management predictive, prescriptive, and cognitive analytics methods in the DKME context. First, this approach makes it possible to create a testbed and a growing pool of knowledge that can be leveraged to seed future learning in various areas that relate to enabling intelligent active and/or autonomous business solutions that operate using insights generated via big data and cognitive analytics. Second the development of metrics management processes for intelligent active and/or autonomous business solutions and their automation via cognitive analytics techniques is a major step towards the standardization of methods of development and plug-ins that use analytics to power software solutions. Third, the creation of a framework that facilitate the implementation of modules that support the creation of business solutions while leveraging a combination of analytics techniques and an underlying reliable, scalable, and efficient infrastructure adds a lot of value in today's context where analytics solutions can be created in a variety of ways using many different tools and little is available in terms of enabling their integration within complete solutions (that are either new or being migrated). Fourth, the ability to leverage analytics in a myriad of business contexts as part of a P2P marketplace powered by intelligent active and/or autonomous business solutions add a lot of value to the current state of P2P marketplaces that has been developing at a fast pace. This will help accelerate the widespread use of embedded big data and cognitive analytics as part of business solutions. Fifth, being able to advertise products of services in knowledge browsers is a novel concept that has tremendous potentials. Sixth, leveraging big data and cognitive analytics to help improve architectures, ontologies and related taxonomies, and business solutions on-demand adds a lot of value to both the industry and the research communities. And seventh, the special focus on using analytics techniques to manage reuse, components compositions and integration, and learning agents also adds tremendous values to both the industry and research community.

Continued work towards developing and promoting metrics management and analytics is inherent to Archemy's current focus as it comes to consulting, training, business solutions management, and products development activities. As we move forward with these activities, we plan to continue growing our DKME ecosystem and offer it as a testbed and pool of knowledge that can be leveraged by the industry and research community to help develop intelligent active and/or autonomous business solutions. We also plan to work with standards committees to help standardize the development of methods and plug-ins that facilitate the use of analytics techniques to power mainstream software solutions. We will keep hardening, improving, supporting, and maintaining our DKMF framework. We will also keep working with our many customers to help them use our framework to accelerate transformations towards next-generation digital technologies powered by the full spectrum of big data and cognitive analytics. As part of our commitment to the long-term support of the DKMF, we will keep focusing on enabling on-demand capabilities to improve business solutions architectures, ontologies and related taxonomies, and business solutions' components. We will also keep developing analytics techniques to manage reuse, components compositions and integration, learning agents, and P2P node churn within the DKMF P2P network. We are dedicated to advancing the state of P2P marketplaces and look at them as the next generation of collaborative interconnected businesses powered by intelligent active and/or autonomous business solutions. We also plan to work closely with our affiliates and customers to make it possible for them to use our knowledge classification and search engine platform to advertise and market their products and services in relation to recommendations learned from knowledge gathered via the DKME. Finally, we are working on several papers and presentations that will be published very soon. These papers and presentations relate to the specific big data and cognitive analytics modules that we are developing to power various DKMF applications in several industries.

This concludes our coverage of the theoretical rationale and value added by the DKMF approach as it pertains to metrics management. This section provided a wealth of details on the theoretical framework that supports the various capabilities provided via the DKME and DKMF. It also aimed at demonstrating the strong basis and best practices on which our technology is built and its focus on combining state of the art technologies in an innovative way to facilitate the creation and management of intelligent active and/or autonomous business solutions in various business contexts. All the technologies and techniques that are mended together by the DKMF draw from many years of research in various areas of computer science including enterprise and solution architectures, knowledge management, intelligent active and/or autonomous agents and artificial intelligence. Our focus in this section has been on explaining how Archemy™ builds on and helps extend the collective knowledge that relates to these various areas. To summarize, we have explained the choices made to design the DKMF to align it with accepted architecture best practices in software engineering and Enterprise Architecture Management (EAM). We have also described the core aspects of the DKMF approach and explained the theoretical rationale and value added by our approach as it pertains to taxonomy management, active and/or autonomous business solutions management, and metrics management.

In the next section, we delve into the current practical state of our DKME technology and all related implementation details.

VI. Archemy's DKMF Implementation

Figure 57:
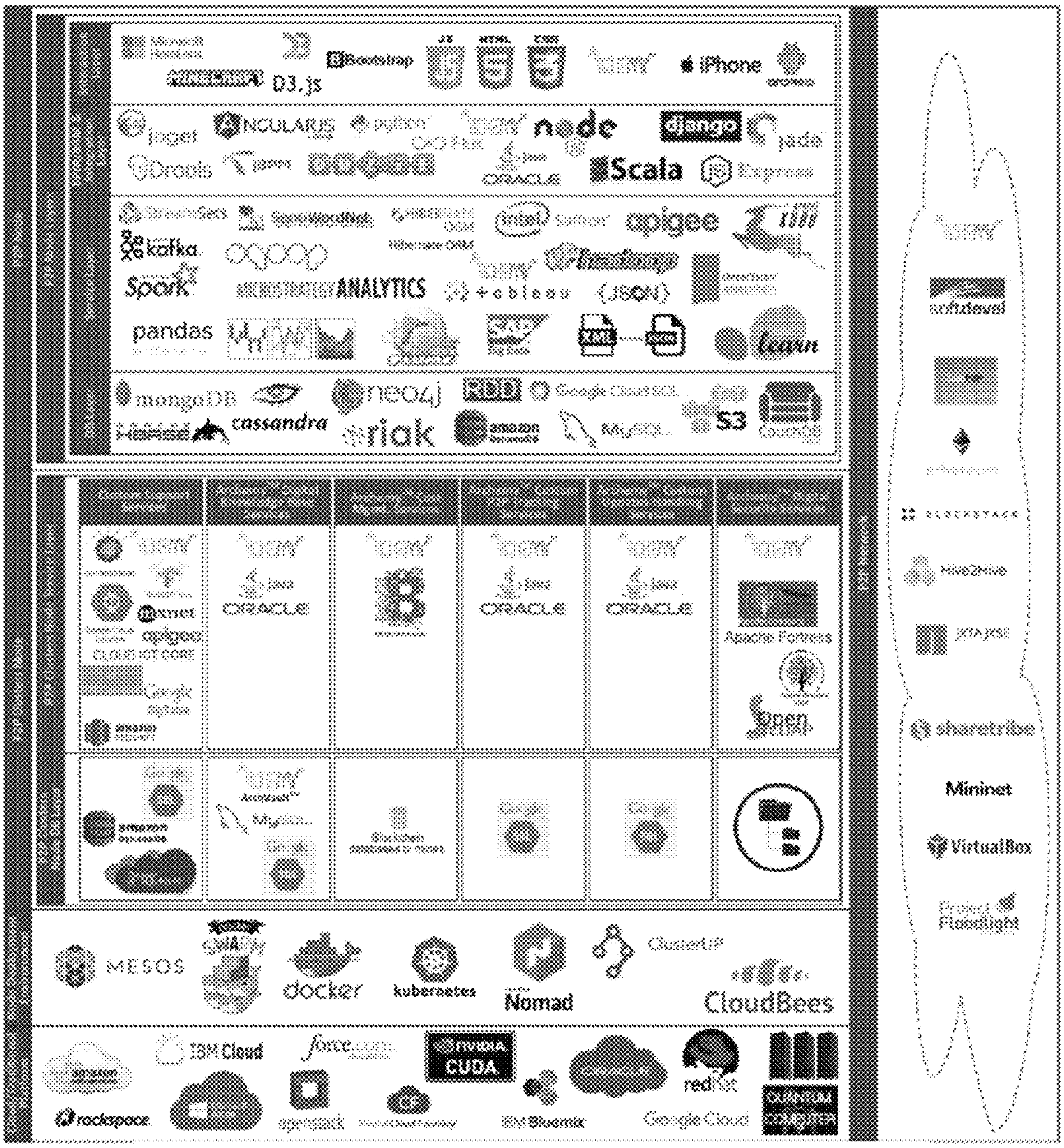
FIG. 57 is a diagram showing a DKMF implementation stack, according to some embodiments.

So far, our focus has been on introducing the context that motivated the creation of the DKME. We stated our vision and introduced DKME concepts. We then delved into describing the DKME's business and technical architecture and explained the theoretical underpinnings that motivated the current design of the DKME and its associated DKMF framework. In this section, we provide a brief description of the current DKMF implementation including the P2P network implementation architecture, the P2P node implementation architecture, the P2P clusters services implementation architecture, the DKMF development environment, the DKMF deployment environment, the DKMF physical architecture, and the DKMF digital knowledge base seeding approach. To start with, FIG. 57 illustrates the DKMF implementation stack, which includes the various candidate technologies that were identified to build the DKMF. We are providing a lot of figures and diagrams in this sub-section to help illustrate the various implementation aspects in detail. Since "a picture is worth a thousand words", we are willfully limiting the textual description of implementation details to a minimum. The purpose of this section if not to provide detailed specification and information about the current implementation of the DKME and its associated DKMF. These specifications and test suites are available via Archemy™ under an intellectual property agreement. We hope that this section will help clarify the design and implementation of the DKME ecosystem and its associated DKMF framework.

FIG. 57 includes candidate technologies for both the P2P nodes and the P2P clusters nodes. It also includes candidate technologies for the P2P network implementation, and the underlying P2P (clusters) nodes platforms as applicable. The deployment environment candidate technologies are also included in FIG. 57. Parts of the DKMF core framework functionalities are implemented in Java and take advantage of the standard module system that was recently included in the Java SE9 (see openidk.java.net/projects/jigsaw).

The P2P nodes' technologies are shown at the top of FIG. 57 and split into various layers as per the DKMF nodes logical architecture illustrated in FIG. 28 and as explained in detail in Section III.2 and IV of the present disclosure. The interaction layer technology enables the creation of custom interactive user interfaces. Archemy's ArchNav™ knowledge (mobile) classification and search engine support is built into the base framework and optional (mobile) interfaces to EAMTk™, ArchDoc™, and ArchViz™ may also be included subject to separate licensing or subscription agreements. The BPM/BRM and integration layer provides built-in support for process and node management capabilities. The node manager operates as the intelligent active and/or autonomous brain capability for DKMF nodes. The service layer is used to implement local services using custom or mainstream technologies as needed. Optional Archemy™ (cognitive) services and visualization widgets are available via Archemy's Assets Catalog (e.g., face recognition, speech recognition, natural language translation). P2P nodes may operate their own local structured and/or unstructured databases as shown in the DB layer. The base framework uses a portable local knowledge base manager and repository as well as a local operational database. P2P nodes may or may not be Cloud-based depending on the context of the business applications that they are meant to support and their implementation requirements.

The P2P clusters nodes' technologies are shown towards the middle of FIG. 57 in two separate layers that focus on the service layer and the database layer. The DKMF built-in P2P clusters' node operate on all main big Cloud platforms that are in use today as indicated at the bottom of FIG. 57. DKMF P2P nodes may also operate on top of legacy platforms or a mix of Cloud and legacy platforms as applicable. Additional clusters may be built or migrated to P2P clusters nodes and may operate on traditional or Cloud platforms depending on the context of the business applications that they are meant to support and their implementation requirements.

Archemy's P2P nodes and P2P clusters nodes are currently deployed on all major Cloud platforms. P2P nodes leverage a local database that uses various structured and unstructured databases. The base framework's P2P nodes require similar database capabilities that may be hosted on either a traditional or a Cloud platform.

The framework's built-in P2P clusters nodes services are shown within the P2P clusters node service layer in the center portion of FIG. 57 and match the list or services illustrated in FIG. 29. The digital security services provide full decentralized registration, identification, communication, audit, and compliance capabilities for intelligent active and/or autonomous business solutions. DKMF-based intelligent active and/or autonomous business solutions are administered using a Role Based Access Control (RBAC) approach. A user can be added with single or multiple roles (e.g., administrator, general user). The assignment of individual roles provides access to different technologies and dashboards as required for the individual area of expertise as defined in the underlying framework introduced in the present disclosure. There are different levels of Administrative Users that can configure and modify all relevant aspects of the platform. In addition to the built-in security services, DKMF business solutions builders may leverage third party solutions for decentralized registration, identification, communication and audit (e.g., Talla's botchain). As mentioned earlier, the framework includes a cost management services cluster that leverages Blockchain 2.0 and Ethereum. Furthermore, the framework provides additional built-in support and knowledge base services with associated management consoles and dashboards as described in section III and IV of the present disclosure. Additional clusters nodes services are provided as part of the framework for internal platform management purpose (e.g., custom P2P tracking and updates handling services). All the clusters nodes services provided with the base framework can be customized by business solutions builders as needed. Archemy™ provides consulting and support services to implement DKMF-based intelligent active and/or autonomous business solutions and deploy them on the DKME.

The DKMF P2P network technologies are indicated on the right side of FIG. 57. All P2P (clusters) nodes operate on the DKMF P2P network and use it to communicate between each other as well as with the underlying Cloud or traditional platform(s) as illustrated in FIG. 27.

Finally, the layer located above the bottom layer on FIG. 57 includes the various technologies used by the P2P (clusters) nodes deployment environment (i.e., container deployment, orchestration, management, and monitoring).

The next sub-section provides implementation details related to the DKMF P2P Network.

VI.1. P2P Network Implementation Architecture

The DKMF includes a P2P mesh network implementation that supports high-speed real-time messaging between connected DKMF P2P (clusters) nodes. A DKMF P2P node can communicate with any other node in real-time via bidirectional and encrypted links. Individual DKMF P2P (clustered) nodes can determine the fastest route for each message. For this purpose, the individual connections between the nodes are monitored. If a link breaks down, the nodes re-route the message to the fastest of the remaining connections. The DKMF P2P network is optimally prepared for use in the Cloud. Nodes are platform independent (e.g., Linux, Windows™). The memory and CPU requirements of DKMF P2P nodes depend on the workload. Cloud-based nodes are ideal for integrating clients and branch networks into the DKMF P2P network. The structure of the DKMF P2P network and the distribution of P2P (clusters) node services in the network are completely flexible. P2P node managers' agent technology may (by choice) operate on the same P2P network as the one used to access services or may use its own separate P2P network to handle asynchronous messaging between node manager agents depending on the business solutions' specific requirements.

DKMF P2P (clusters) node services can be accommodated in the Cloud as well as behind firewalls. P2P (clusters) node service descriptions are provided in XML and serve as APIs for end-users or service providers. P2P (clusters) node services are monitored (i.e., registration, de-registration, and usage) and propagate notifications. An internal DKMF service catalog is used by DKMF P2P (clusters) nodes to locate services within the DKMF P2P network. Clients can also network with each other over the DKMF P2P network and workgroups can be connected spontaneously. Redundant nodes, links and microservices are implemented on top of the DKMF P2P network to implement a fail-safe network. This allows scaling of the various functions in the DKMF P2P network without restriction.

Figure 58:
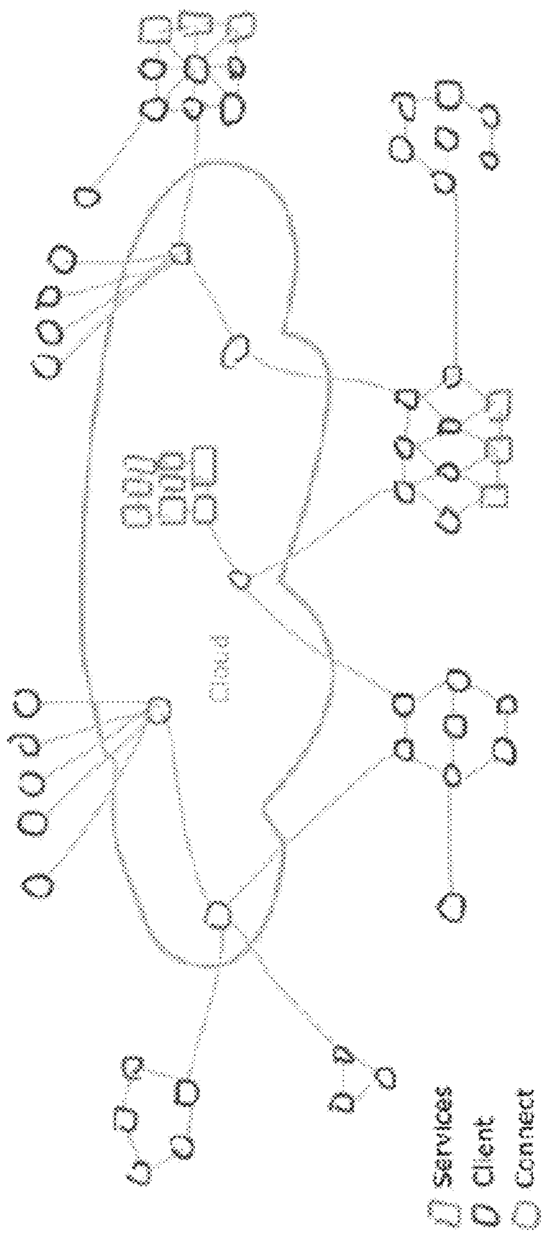
FIG. 58 is a diagram showing a P2P network implementation architecture, according to some embodiments.

The DKMF P2P network provides full control and security of messaging. Messages may be acknowledged automatically if desired, which always occurs in the event of an error (e.g., recipient not found, processing exception). Messages are compressed and encrypted using point-to-point asymmetric encryption. Rights are assigned by TCP port and a gate service monitors the message inbox. Only messages that are explicitly allowed can pass the gate. In combination with the RSA key assigned to the port, this enables finely grained rights management. Messages that are not allowed are rejected and logged with an error code. FIG. 58 illustrates the implementation of the DKMF P2P network.

The diagram in FIG. 58 illustrates some P2P nodes that offer services (red squares) and other P2P nodes (blue circles) that facilitate connections to nodes that provide services. It also shows how end-user (green circles) can communicate with each other.

Figure 59:
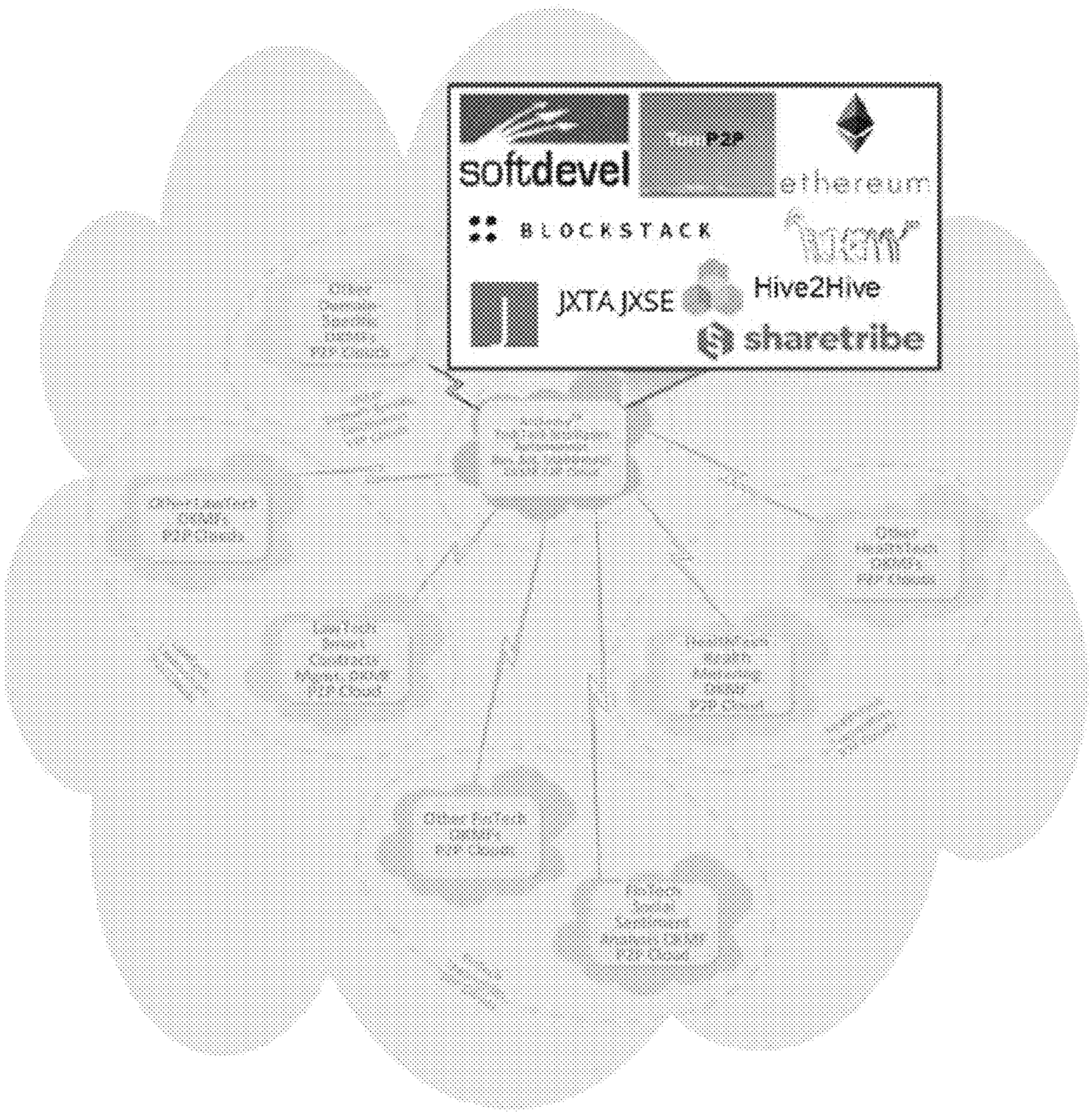
FIG. 59 is a diagram showing a P2P network implementation stack, according to some embodiments.

The technology stack used to implement the P2P network logical architecture shown in FIG. 27 is provided in FIG. 59. It provides a list of candidate technologies that were selected to support the P2P network implementation. These technologies meet the best practice guidelines set forth by Archemy™ and its affiliates.

The next sub-section provides implementation details related to the P2P node implementation architecture and some of the Archemy™ tools that operate within P2P nodes.

VI.2. P2P Node Implementation Architecture

Figure 60:
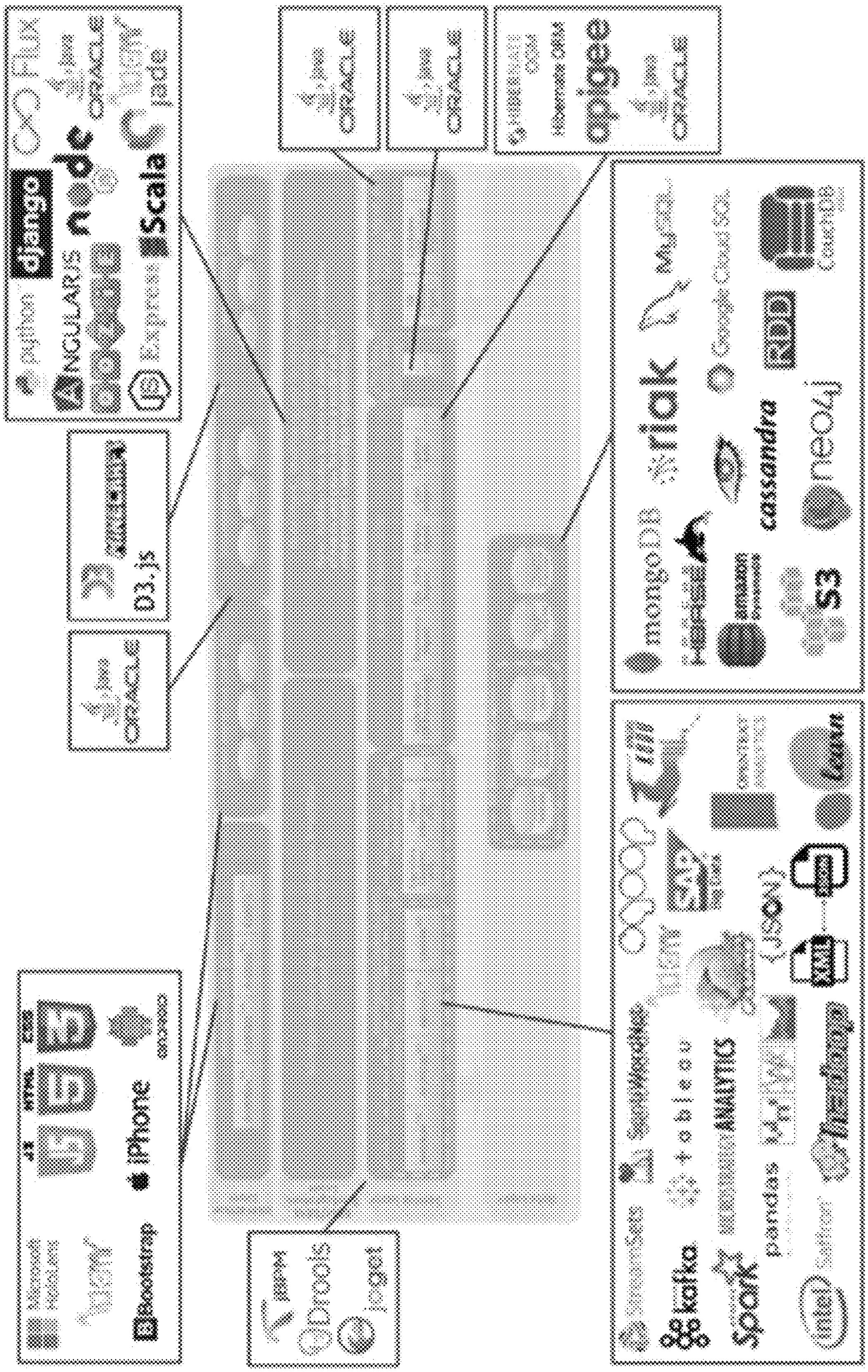
FIG. 60 is a diagram showing a P2P node implementation stack, according to some embodiments.

FIG. 60 provides a list of candidate technologies that were selected to support the P2P node implementation architecture illustrated in FIG. 28. These technologies meet the best practice guidelines set forth by Archemy™ and its affiliates. The various components of the P2P nodes architecture are described in detail in Section IV.2 under "DKMF Nodes Logical Architecture." We refer the reader to that section of the paper for further details.

Figure 61:
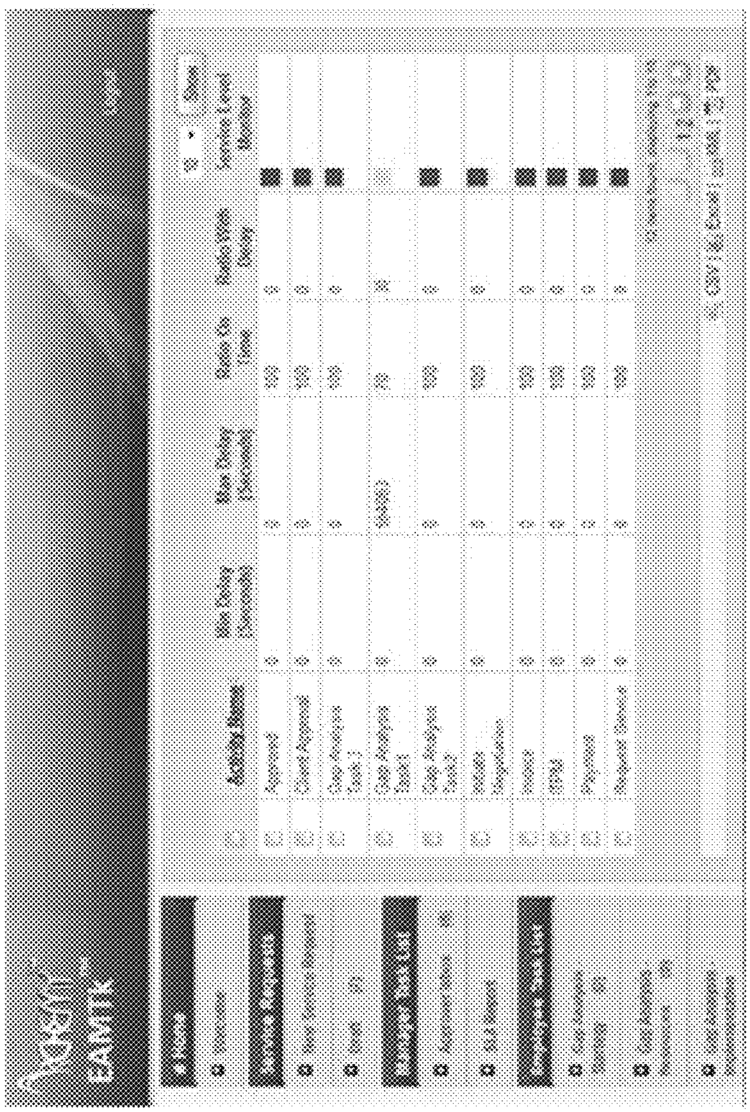
FIG. 61 shows an EAMTk tool interface, according to some embodiments.

FIG. 61 illustrates the user interface of the Archemy™ EAMTk™ tool, which is available as an option in P2P (clusters) nodes under a separate license or a subscription agreement. EAMTk™ is mentioned in various parts of the present disclosure and described in detail in Section IV.1 under "DKMF Business Solutions Management Services"

and Section IV.2 under "DKMF Nodes Logical Architecture." We refer the reader to these sections of the paper for further details about EAMTk™.

Figure 62:
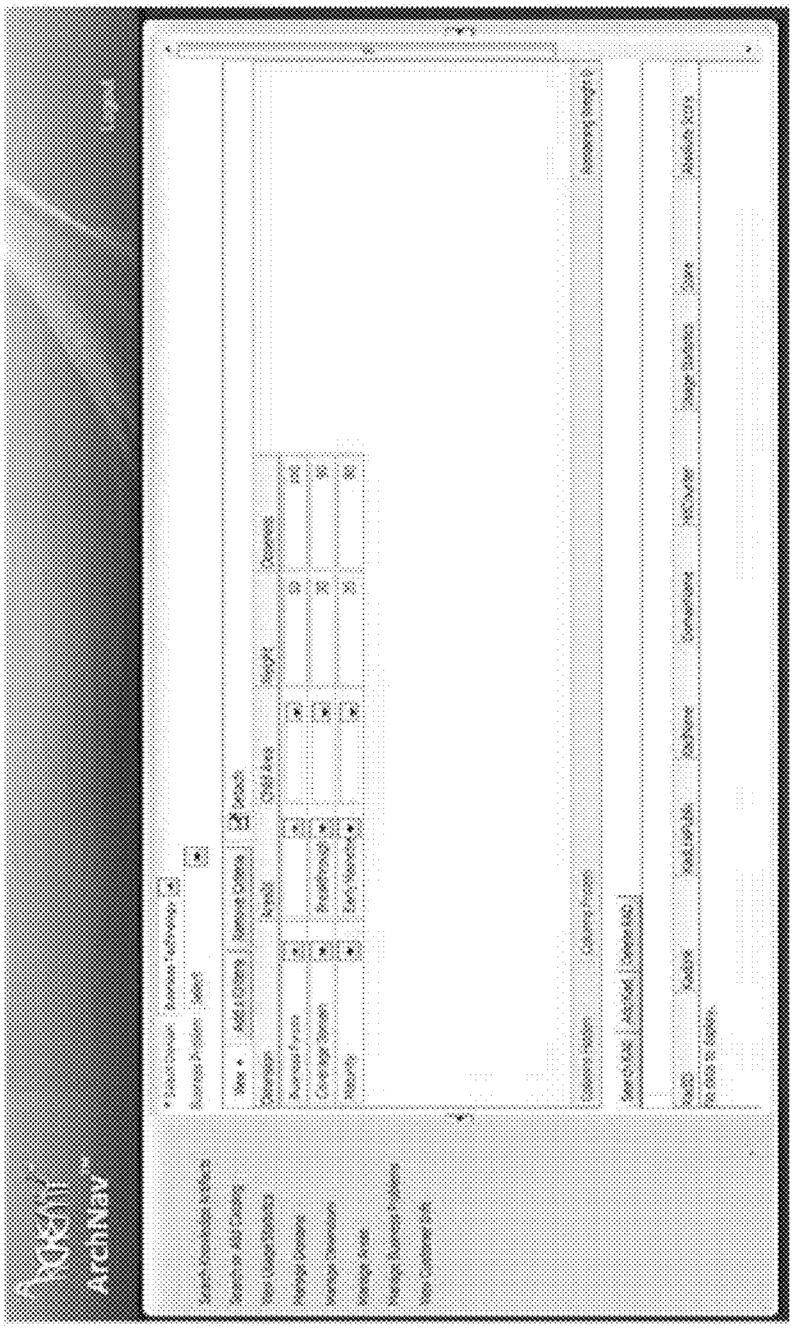
FIG. 62 shows an ArchNav tool interface, according to some embodiments.

FIG. 62 illustrates the user interface of the Archemy ArchNav™ knowledge classification and search engine, which is integrated as a standard component in all P2P (clusters) nodes. ArchNav™ is mentioned in various parts of the present disclosure and described in detail in Section IV.1 under "DKMF Business Solutions Management Services" and Section IV.2 under "DKMF Nodes Logical Architecture." We refer the reader to these sections of the paper for further details about ArchNav™.

Figure 63:
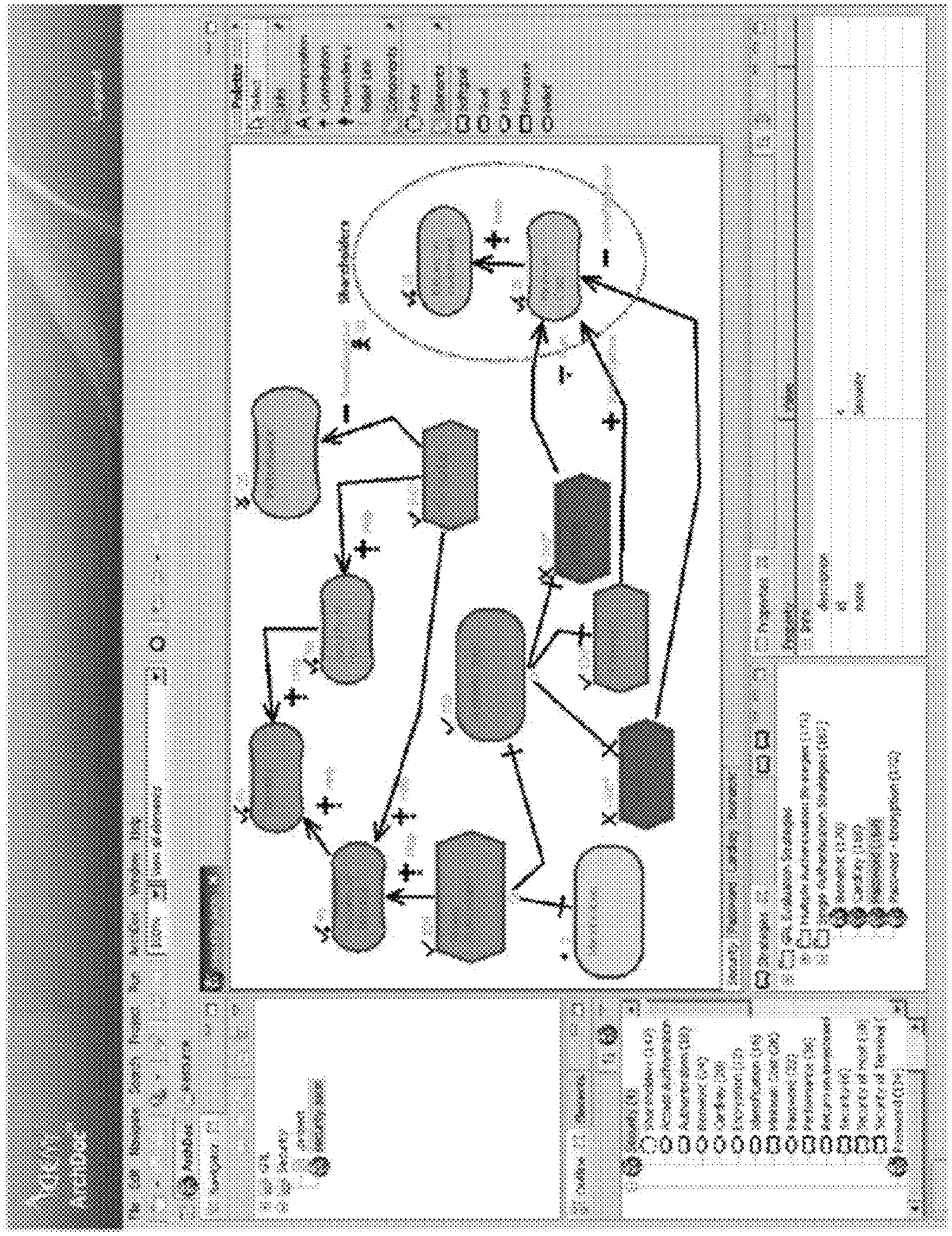
FIG. 63 shows an ArchDoc tool interface, according to some embodiments.

FIG. 63 illustrates the user interface of the Archemy™ ArchDoc™ tool, which is available as an option in P2P (clusters) nodes under a separate license or a subscription agreement. ArchDoc™ is referred to in various parts of the present disclosure and described in more detail in Section IV.1 under "DKMF Business Solutions Management Services" and Section IV.2 under "DKMF Nodes Logical Architecture." We refer the reader to that section of the paper for further details about ArchDoc™

Figure 64:
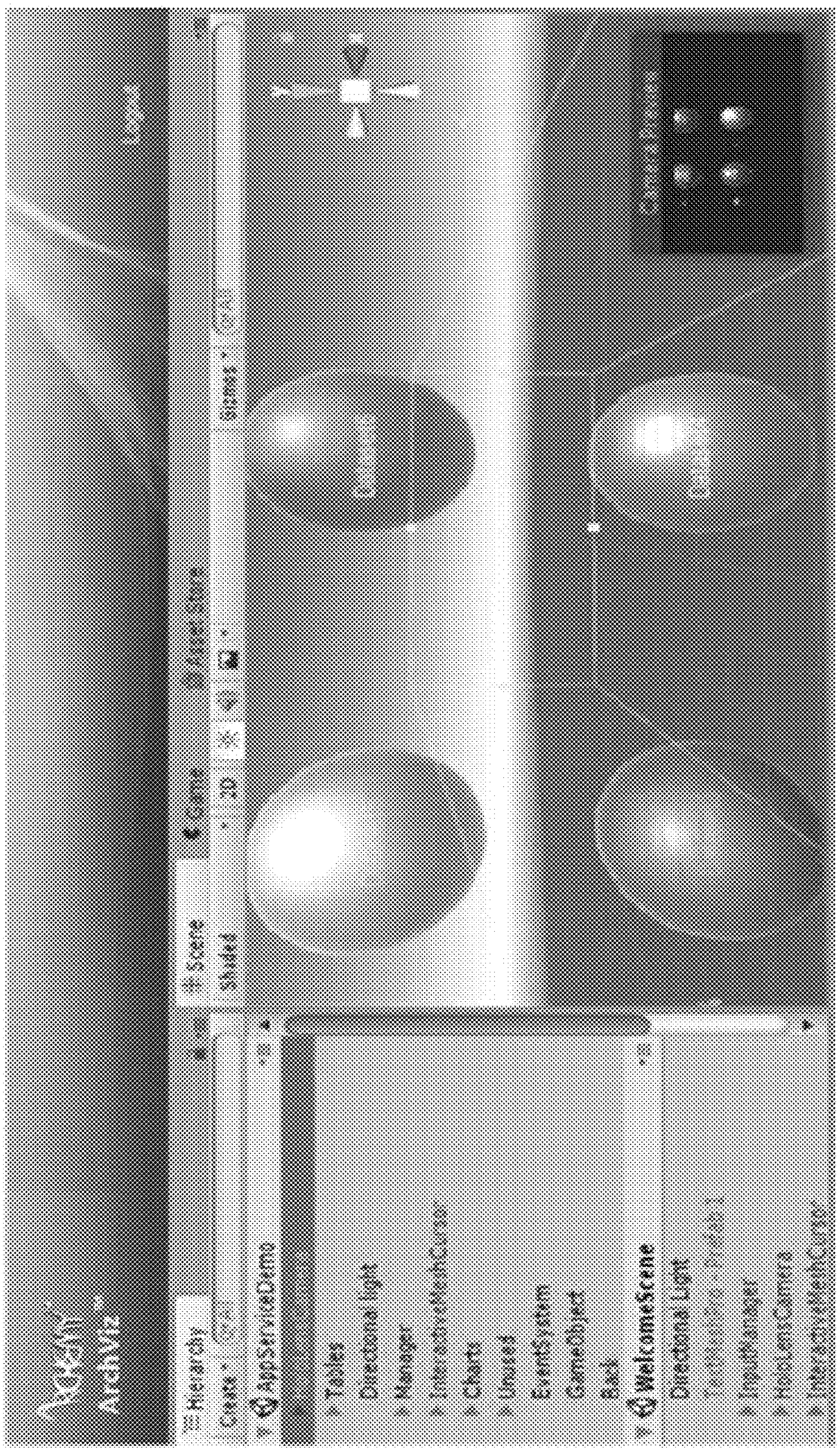
FIG. 64 shows an ArchViz tool interface, according to some embodiments.

FIG. 64 illustrates the user interface of the Archemy™ ArchViz™ tool, which is available as an option in P2P (clusters) nodes under a separate license or a subscription agreement. ArchViz™ is mentioned in various parts of the present disclosure and described in detail in Section IV.1 under "DKMF Business Solutions Management Services" and Section IV.2 under "DKMF Nodes Logical Architecture." We refer the reader to these sections of the paper for further details about ArchViz™.

Figure 65:
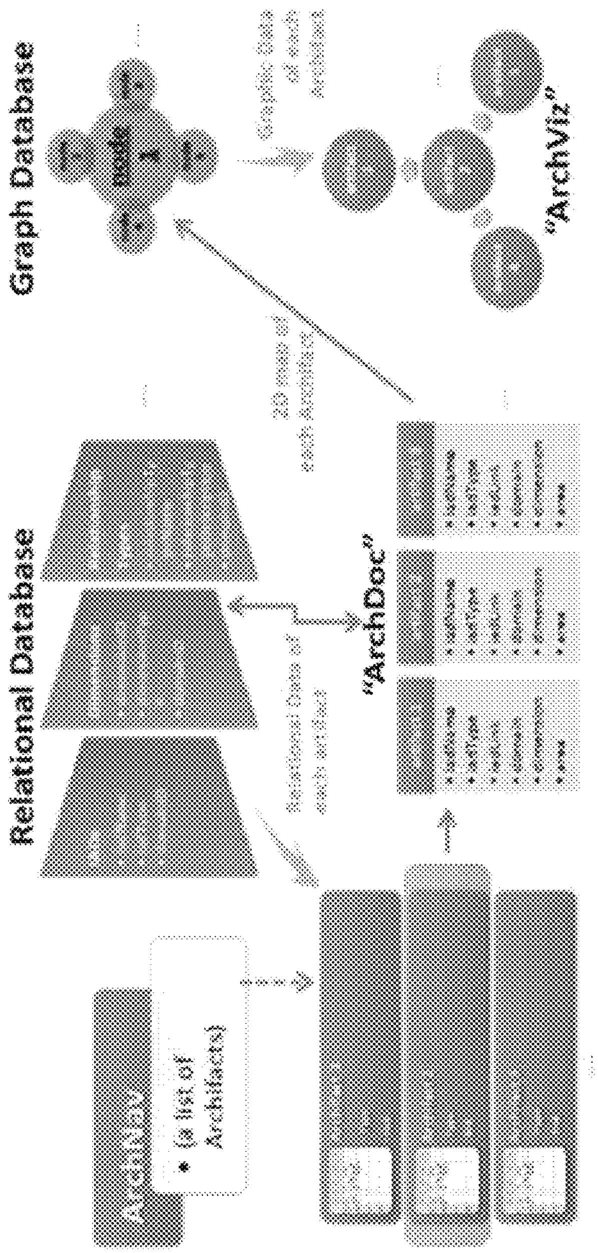
FIG. 65 is a diagram showing ArchDoc and ArchViz integration, according to some embodiments.

FIG. 65 illustrates the integration of the ArchDoc™ and ArchViz™ tools. As described in Sections IV.2, ArchDoc™ is used to capture the methodology, approach, and specific steps that are followed to develop reusable business solutions components. It also captures the deliverables that result from every step along with the specific tools that are used and other relevant details. This information is reviewed to assess conformance to best practices, and determine whether these components should be offered via the Archemy™ Assets Catalog. It also helps recommend the selection and integration of these reusable components in intelligent active and/or autonomous business solutions. ArchViz™ is an interactive AR visualization tools that facilitates the browsing of reusable solution components within the knowledge base (a.k.a., Assets Catalog). It leverages a graph database that allows the exploration of reusable assets and their inter-relationships. ArchNav™ also leverages the knowledge captured by ArchDoc™. APIs to ArchDoc™ and ArchViz™ are used within the node manager to make use of these tools in a semi-automated fashion.

The next sub-section provides implementation details related to the P2P Clusters services' implementation architecture.

VI.3. P2P Clusters Services Implementation Architecture

Figure 66:
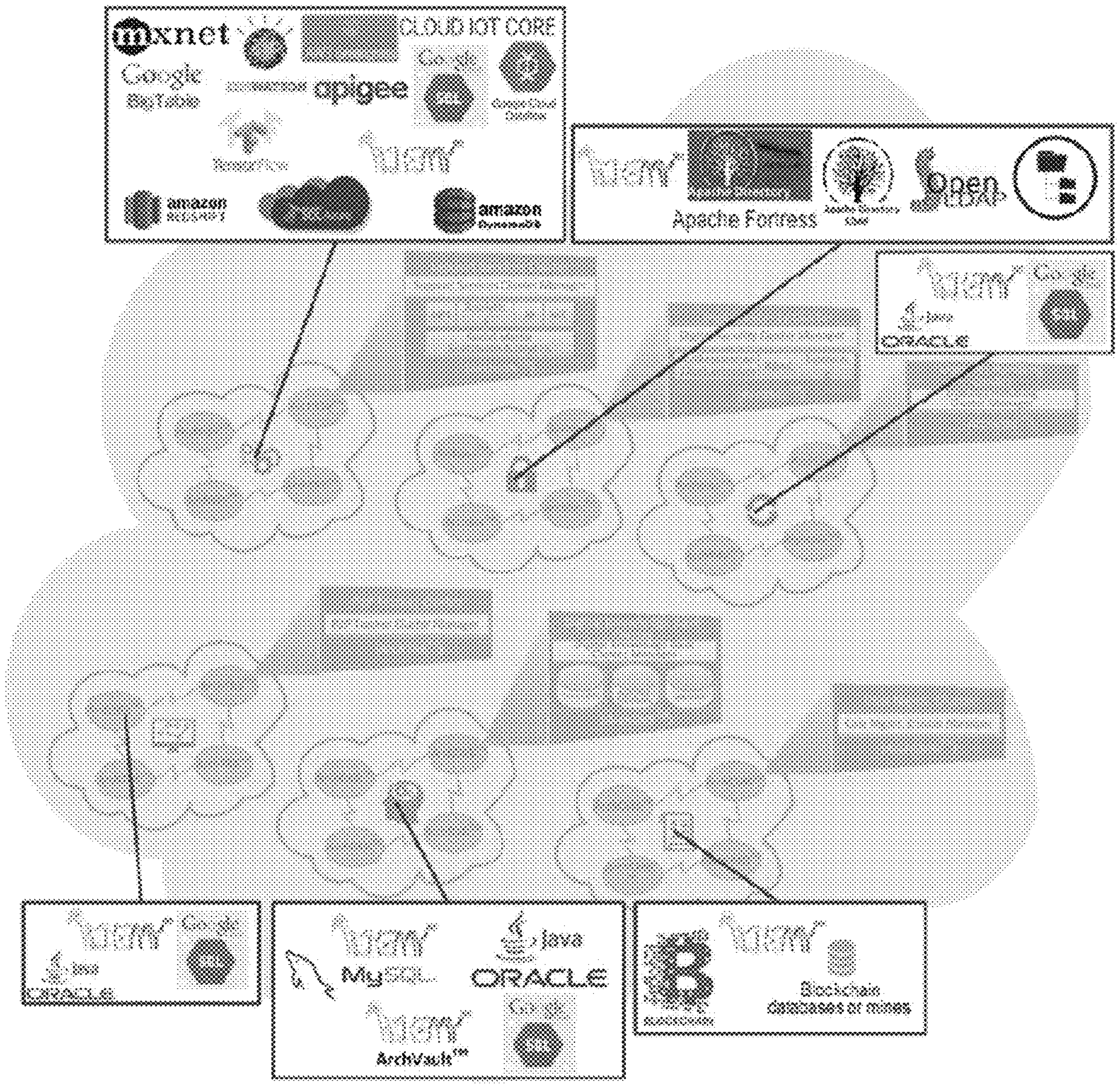
FIG. 66 is a diagram showing a P2P clusters service implementation architecture, according to some embodiments.

FIG. 66 provides a list of candidate technologies that were selected to support the P2P clusters services implementation architecture illustrated in FIG. 29. These technologies meet the best practice guidelines set forth by Archemy™ and its affiliates. The various components of the P2P clusters nodes architecture are described in detail in Section IV.2 under "DKMF Clusters Cloud Logical Architecture." We refer the reader to that section of the paper for further details.

The next sub-section provides details related to the DKMF development environments for P2P (clusters nodes).

VI.4. DKMF Development Environment

The DKMF development environment is designed to support end-to-end-development of DKMF-based intelligent active and/or autonomous business solutions. It is aligned with Archemy's KAEAM product development approach, which is detailed in Section III.2 and illustrated in FIG. 12.

Figure 67:
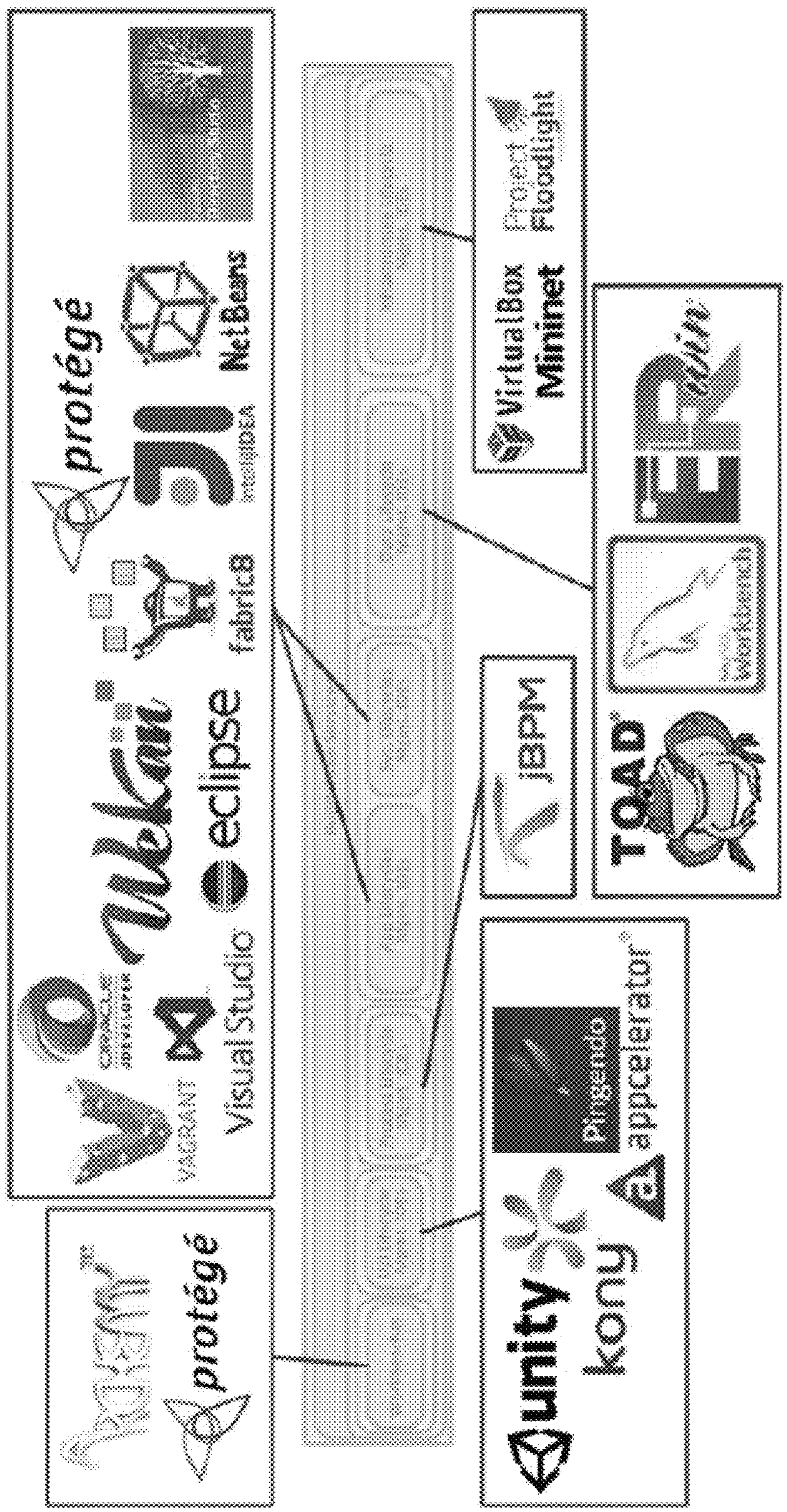
FIG. 67 is a diagram showing a DKMF nodes development environment stack, according to some embodiments.

As explained earlier in the present disclosure, intelligent active and/or autonomous business solutions semi-automate the discover, reuse/adapt, and deploy phases of the KAEAM approach to evolve their behavior at run-time. As explained in Section IV.1, the KAEAM approach is typically applied to the implementation roadmap that is created using Archemy's more general Agile Enterprise Architecture Management (AEAM) approach. The AEAM approach applies the ArchDev™/DevOps methodology and ArchDev's AELC Architecture Evolution Lifecycle. P2P nodes development requires the use of various IDEs and tools to support the development of various components including interactive U/Is, executable business processes and integrated services, applications, services, databases, and infrastructure capabilities. FIG. 67 illustrates the various IDEs and tools that are used by DKMF developers to implement intelligent active and/or autonomous business solutions P2P nodes.

Other than enforcing architectural best practices (e.g., uses of adequate architectural styles, patterns, and related technology enablers) and development best practices (e.g., DevOps), DKMF-based business solutions development does not constrain the creation of complex architectures for P2P nodes and DKMF developers may decide to expand the set of IDEs and tools they use to build them. In addition to the various IDEs and tools, Archemy™ provides a workbench that includes a panoply of tools described earlier in the present disclosure (e.g., EAMTk™, ArchNav™, ArchDoc™, and ArchViz™) and illustrated in FIGS. 61-64. These tools are used at build-time by solutions developers and their functionality is also accessed at run-time via APIs by intelligent active and/or autonomous business solutions. As explained in Section IV.1, DKMF-based solutions semi-automate the KAEAM discover, reuse/update, and deploy phases as part of their built-in framework-driven "manage" function illustrated in FIG. 16. In essence, some of the internal features of intelligent active and/or autonomous business solutions that pertain to taxonomy, business solutions, and metrics management keep being augmented at run-time by the solutions themselves. This behavior is triggered based on metrics derived from constant internal analysis of performance and feedback data via big data and cognitive analytics algorithms.

Figure 68:
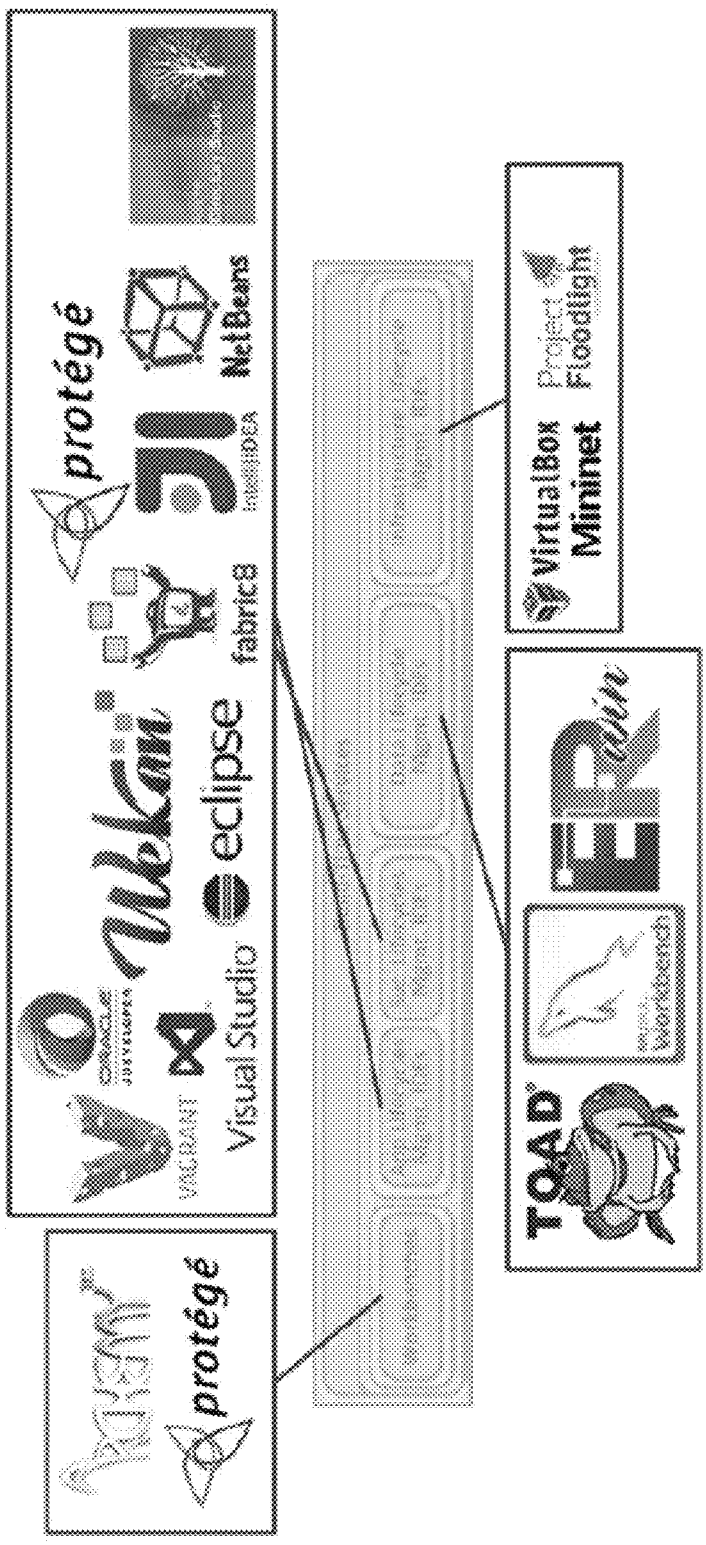
FIG. 68 is a diagram showing a DKMF clusters service development environment stack, according to some embodiments.

Development activities for DKMF clusters nodes emphasizes the creation of services. However, the use of the DKMF framework does not limit architectural choices when developing clusters nodes and these nodes may include custom interactive interfaces, executable processes, and applications in addition to the standard components that are included in the base framework. FIG. 68 illustrates the various IDEs and tools that are typically used by DKMF developers to implement intelligent active and/or autonomous business solutions P2P clusters nodes. The development of additional interactive interfaces, executable processes, and applications components for clusters nodes is facilitated via the same IDEs and tools as the ones illustrated in FIG. 67. Again, DKMF-based business solutions development does not constrain the creation of complex architectures for P2P clusters nodes and DKMF developers may decide to expand the set of IDEs and tools they use to build them.

Figure 69:
FIG. 69 shows a DKMF source management and version control interface, according to some embodiments.

With respect to development and operation, DKMF-based solutions developers adhere to DevOps practices and manage their code using GitLab and GitHub (for example) as version control repository and source code management tools. They also follow best practices for collaboration, and perform peer review before each code merge as illustrated in FIG. 69.

Figure 70:
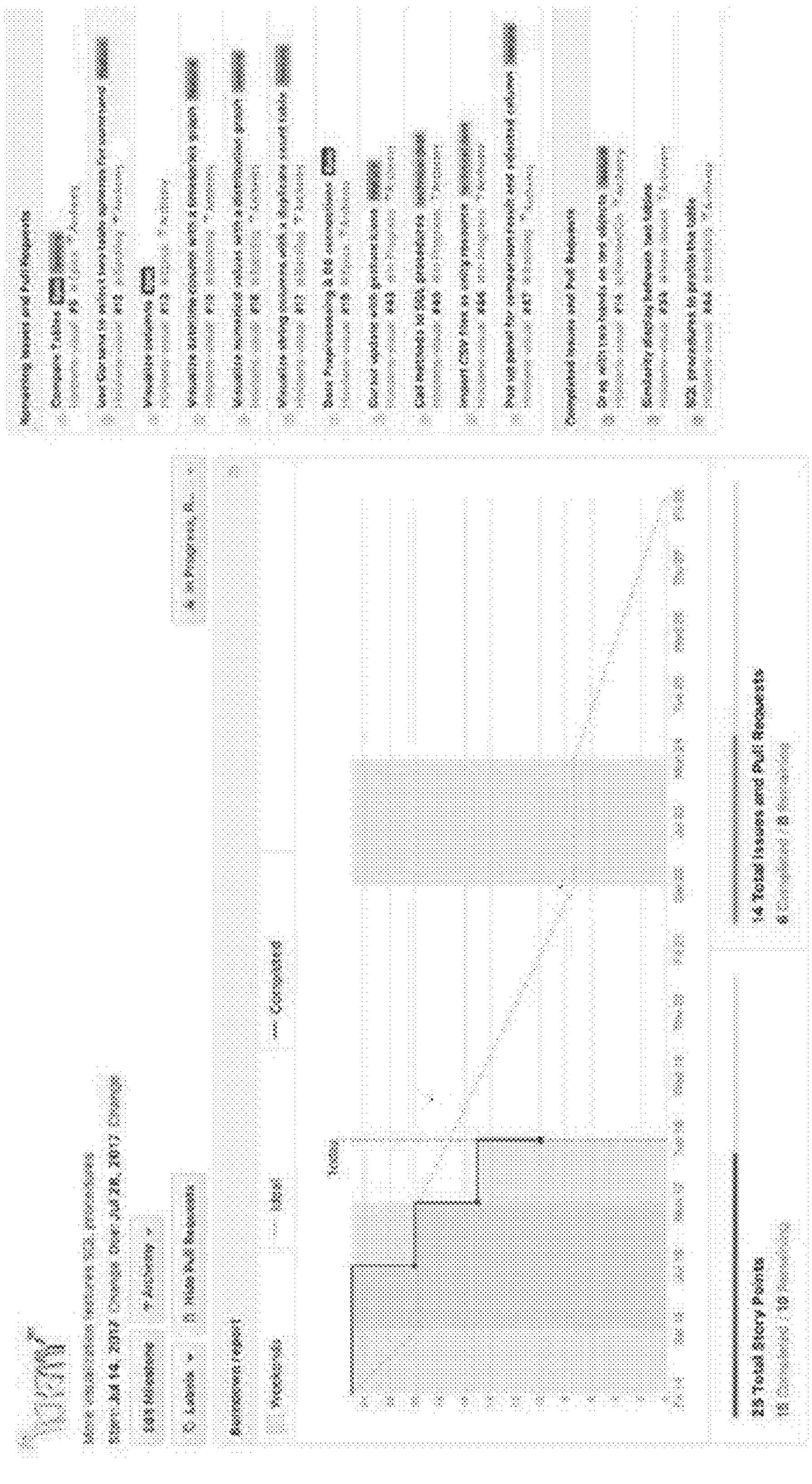
FIG. 70 shows a DKMF development progress tracking interface, according to some embodiments.

DKMF-based solutions developers adhere to project management and tracking best practice and use Zenhub (i.e., Kanban board), as an example, for tracking progress as illustrated in FIG. 70. In this case, Zenhub is integrated with GitLab or GitHub. Weekly & daily progress update meetings are also held on an ongoing basis and in alignment with agile software engineering best practices.

Figure 71:
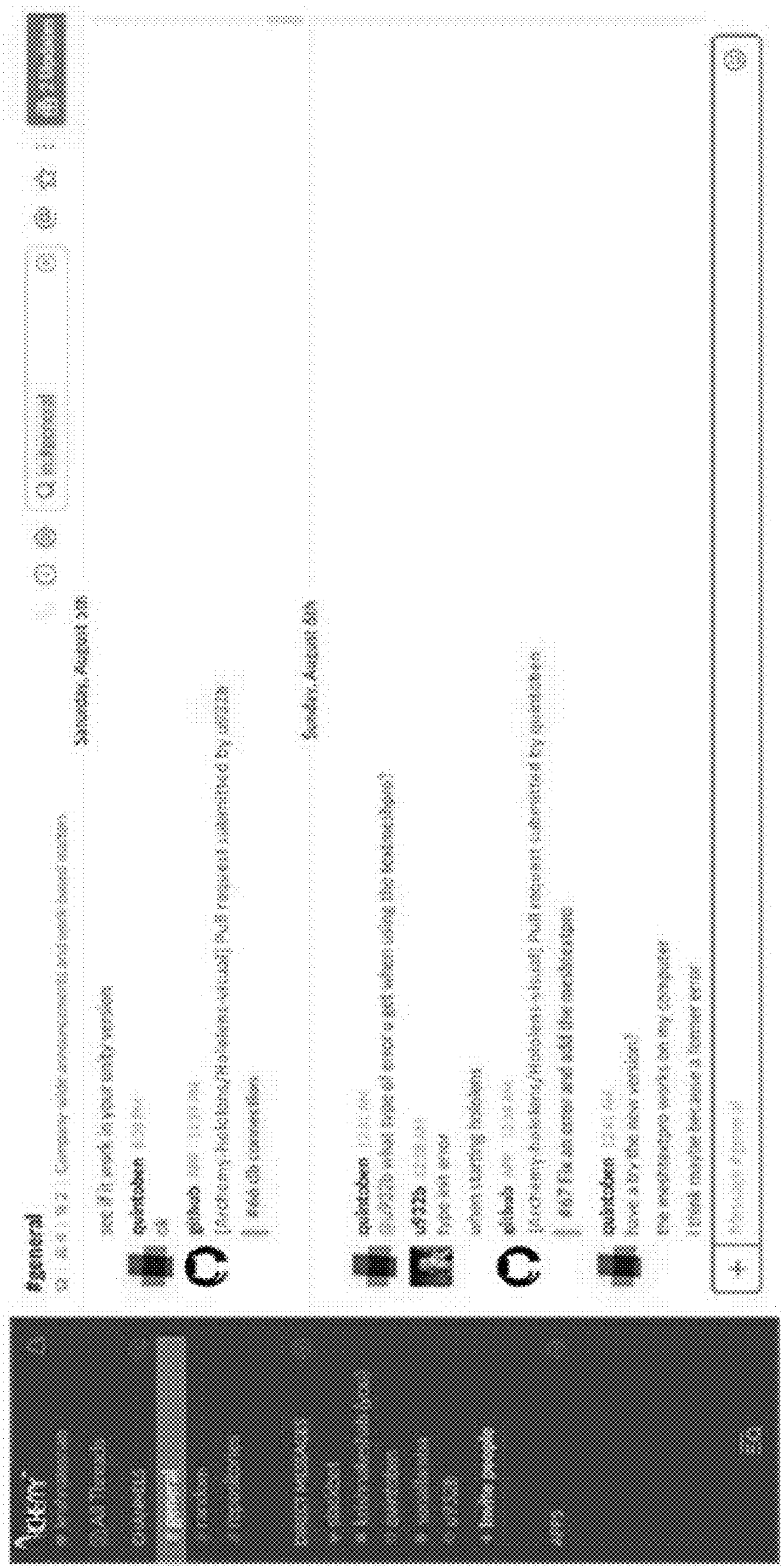
FIG. 71 shows a DKMF project collaboration channel interface, according to some embodiments.

DKMF-based project collaboration is ensured via proper handling of notifications and comments. FIG. 71 illustrates the use of a slack channel integrated with GitHub or GitLab for notification and comments.

While ArchDev™ and AEAM/KAEAM ensure adherence to architectural best practices, using DevOps practices along with continuous integration and continuous deployment guarantees faster DKMF business solutions lifecycles, shorter QA sessions, and many more deployments. Large-scale DKMF business solutions built via DevOps are typically deployed to production multiple times per day. DKMF developers deploy and scale individual business solutions into the solution mesh, leaving the operations teams run and scale the mesh. It is the role of the operations team to deploy and maintain an automated, on-demand application service (e.g., container cluster) as explained in the next sub-section.

The next sub-section provides details related to the DKMF deployment environments for P2P (clusters nodes).

VI.5. DKMF Deployment Environment

Figure 72:
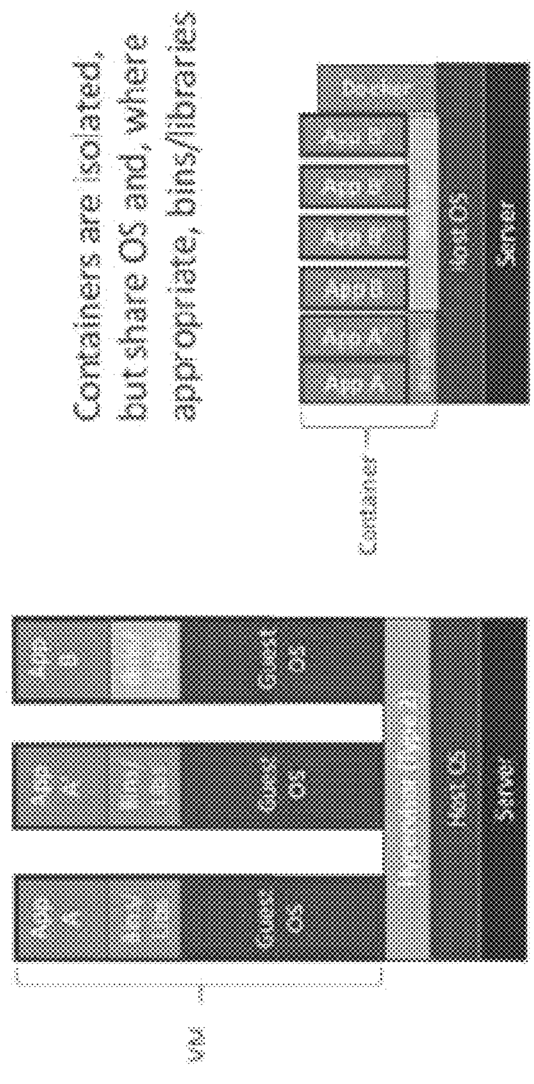
FIG. 72 is a diagram comparison of containers and virtual machines (VMs), according to some embodiments.

As eluded to in the previous section, a container-as-a-service platform/ecosystem must be used to have the ability to deploy and scale individual DKMF P2P (clusters) nodes that implement intelligent active and/or autonomous business solutions and their related components. Containers provide a way to package P2P (clusters) nodes software along with binaries and settings required to run in isolation while sharing the operating system as illustrated in FIG. 72. While GitLab/GitHub give DKMF developers an open environment to share code with one another and collaborate easily, containers management ecosystems (e.g., Docker) facilitate collaboration between development and operations staff (e.g., sysadmins) and makes it easier to handle infrastructure deployment and management. There are many benefits achieved via the use of containers:

1. Environment consistency: DKMF-based business solutions components running on containers behave consistently in different environments. This eliminates environmental inconsistencies and makes testing and debugging less complicated and less time-consuming.

2. Faster deployment: A container is lightweight and starts and stops in less than a second, as it does not require any operating system boot. That eventually helps achieve faster deployment of DKMF-based business solutions and high availability.

3. Isolation: Containers running on the same machine using the same resources are isolated from each other. So, if one P2P (clusters) node component crashes, it will not impact the P2P (clusters) nodes that run DKMF-based business solutions components.

4. Portability: A major benefit of containers is their portability. A container wraps up a DKMF business solution component with everything it needs to run, like configuration files and dependencies. This enables DKMF developers to easily and reliably run business solutions components on different environments, such as local desktops, physical servers, virtual servers, testing/staging/production environments, and public or private clouds. This portability grants organizations a great amount of flexibility, speeds up the development process, and makes it easier to switch to another Cloud environment or provider if need be.

5. Scalability: A major benefit of containers is that they offer the possibility of horizontal scaling, meaning that developers can add more identical containers within a cluster to scale out. Smart scaling only runs the containers needed in real time and helps reduce resource costs and accelerate return on investment.

Figure 73:
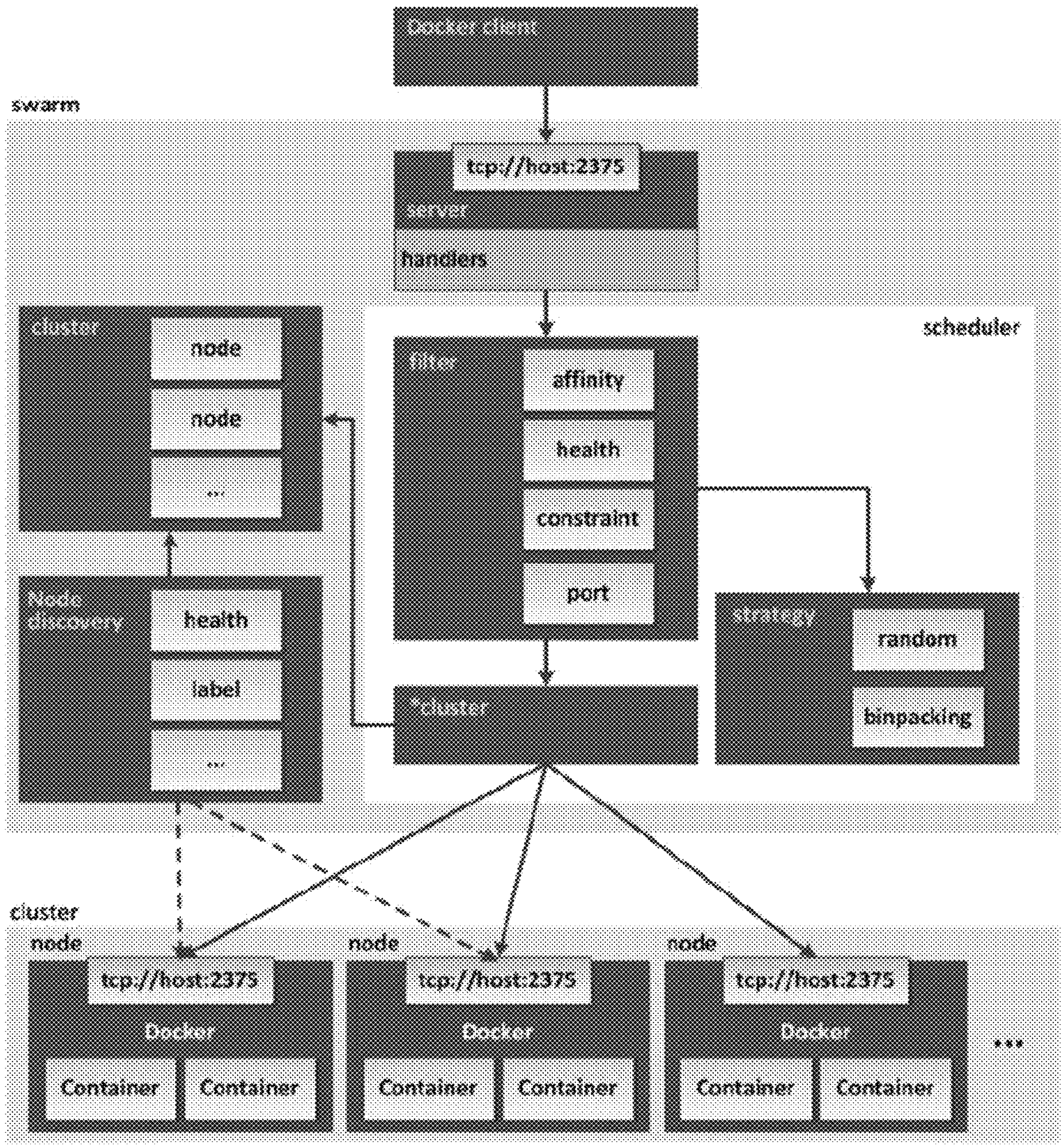
FIG. 73 is a diagram showing DKMF business solution deployment, according to some embodiments.

Three areas should be considered when applying containers to deploy DKMF-based business solutions components. First, it is desirable to manage multiple containers. Second, the traffic from multiple hosts should be distributed across multiple containers. Third, multiple containers should communicate in isolation. Using a microservice architecture for business solutions components (e.g., services) makes it possible to run components in their own containers and scale them in and out independently. Then, running multiple containers of the same component image achieves high availability. Cross-container management and communication when using multiple containers is facilitated by giving each container its own set of virtual network devices and a unique IP address. These various areas are managed by container orchestration engines (e.g., Kubernetes, Docker Swarm, Amazon ECS). For example, AWS Auto Scaling can manage the scaling, and AWS load balancer can manage the load and ensure high availability. In summary, running DKMF microservices with containers helps achieve true scaling, low cost, faster deployment, and consistency. Furthermore, in a microservice-based approach, each microservice owns its model and data so that it is active and/or autonomous from a development and deployment point of view. However, since DKMF node support executable processes composed of multiple services, multiple containers or services comprising a single DKMF business solution also need to be deployed as a distributed system. Again, the container orchestrator helps achieve a production-ready and scalable multi-container DKMF business solution. In summary, each service instance uses one container, images/containers are "units of deployment", a container is an instance of an image, and a host (VM/server) handles many containers. FIG. 73 illustrates deployment into a cluster of a DKMF-based intelligent active and/or autonomous business solution composed of multiple microservices (containers).

The deployment approach illustrated in FIG. 73 handles load-balancing, routing, and orchestrating of composed DKMF-based business solutions. Basically, container orchestration manages multiple containers deployed on multiple hosts. It provides a management platform that automatically starts containers, scales-out containers with multiple instances per image, suspends them or shuts them down when needed, and ideally also controls how they access resources like the network and data storage. It is therefore a requirement to use an orchestration and clustering platform to support the deployment or complex enterprise-level intelligent active and/or autonomous business solutions with microservices. When scaling out DKMF business solutions across many hosts, it is critical to be able to manage all those hosts as a single cluster by abstracting the complexity of the underlying platform. That is what the container clusters and orchestrators provide. As noted in FIG. 57, examples of orchestrators are Azure Service Fabric, Kubemetes, Docker Swarm and Mesosphere DC/OS. The last three open-source orchestrators are available in Azure through the Azure Container Service. FIG. 73 illustrates the use of a scheduler that gives the ability to an administrator to launch containers in a cluster via a scheduling user interface. The cluster scheduler enables the use of the cluster's resources efficiently. It also sets the constraints provided by the user to efficiently load-balance containers across nodes or hosts, and be robust against errors while providing high availability. FIG. 74 summarizes the benefits of microservices containerization.

The various container deployment capabilities shown in FIG. 57 include Kubernetes, Docker Swarm, Mesosphere, and Service Fabric. Kubernetes is an open-source product that provides functionality that ranges from cluster infrastructure and container scheduling to orchestrating capabilities. It supports the automation of deployment, scaling, and the operations of DKMF business solutions components containers across clusters of hosts. Kubemetes provides a container-centric infrastructure that groups application containers into logical units for easy management and discovery. While Kubemetes is quite mature in Linux, it is less mature in Windows. Docker Swarm handles the clustering and scheduling of Docker containers. By using Swarm, it is possible to turn a pool of Docker hosts into a single, virtual Docker host. Clients can make API requests to Swarm the same way they do to hosts, meaning that Swarm makes it easy for applications to scale to multiple hosts. Mesosphere Enterprise DC/OS (based on Apache Mesos) is a production-ready platform for running containers and distributed applications. DC/OS works by abstracting a collection of the resources available in the cluster and making those resources available to components built on top of it. Marathon is usually used as a scheduler integrated with DC/OS. While DC/OS is quite mature in Linux, it is less mature in Windows. Service Fabric is a Microsoft microservices platform for building applications. It is an orchestrator of services and creates clusters of machines. Service Fabric can deploy services as containers or as plain processes. It can even mix services in processes with services in containers within the same application and cluster. Service Fabric provides additional and optional prescriptive Service Fabric programming models like stateful services and Reliable Actors. While Service Fabric is quite mature in Windows, it is less mature in Linux. Both Linux and Windows containers are supported in Service Fabric.

The next sub-section provides implementation details related to the DKMF physical architecture.

VI.6. DKMF Physical Architecture Implementation

Figure 75:
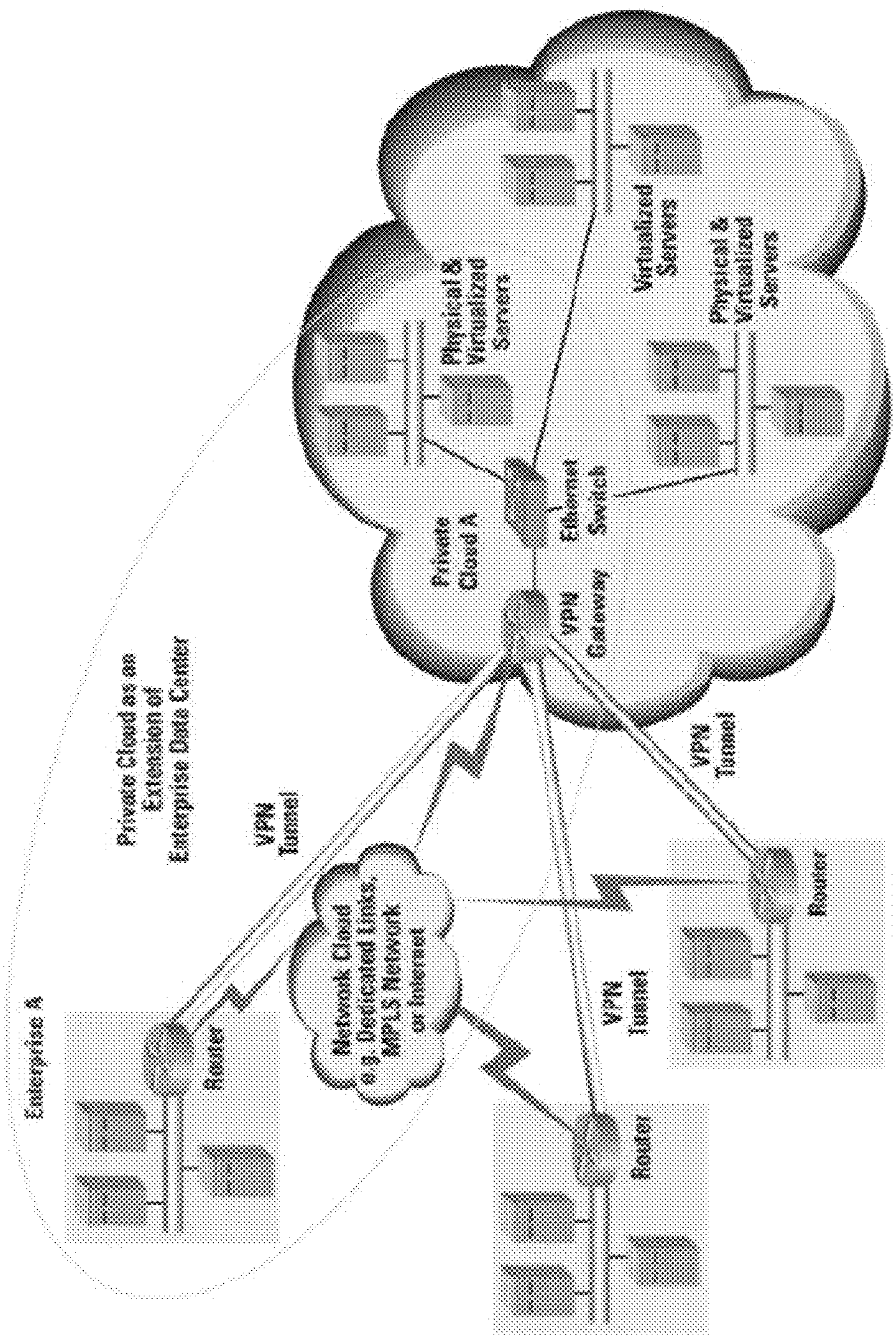
FIG. 75 is a diagram showing a DKMF physical architecture, according to some embodiments.

As explained in previous sections, DKMF P2P (clusters) nodes can be deployed through containers on different physical environments, such as local desktops, physical servers (i.e. traditional platforms), virtual servers, testing/staging/production environments, and public or private clouds. The actual physical architecture implementation depends on the target platform. FIG. 75 illustrates a generic physical architecture for a typical enterprise environment. DKMF node containers could be deployed in this case on physical and virtualized servers within a private cloud environment or on public clouds as applicable.

Figure 76:
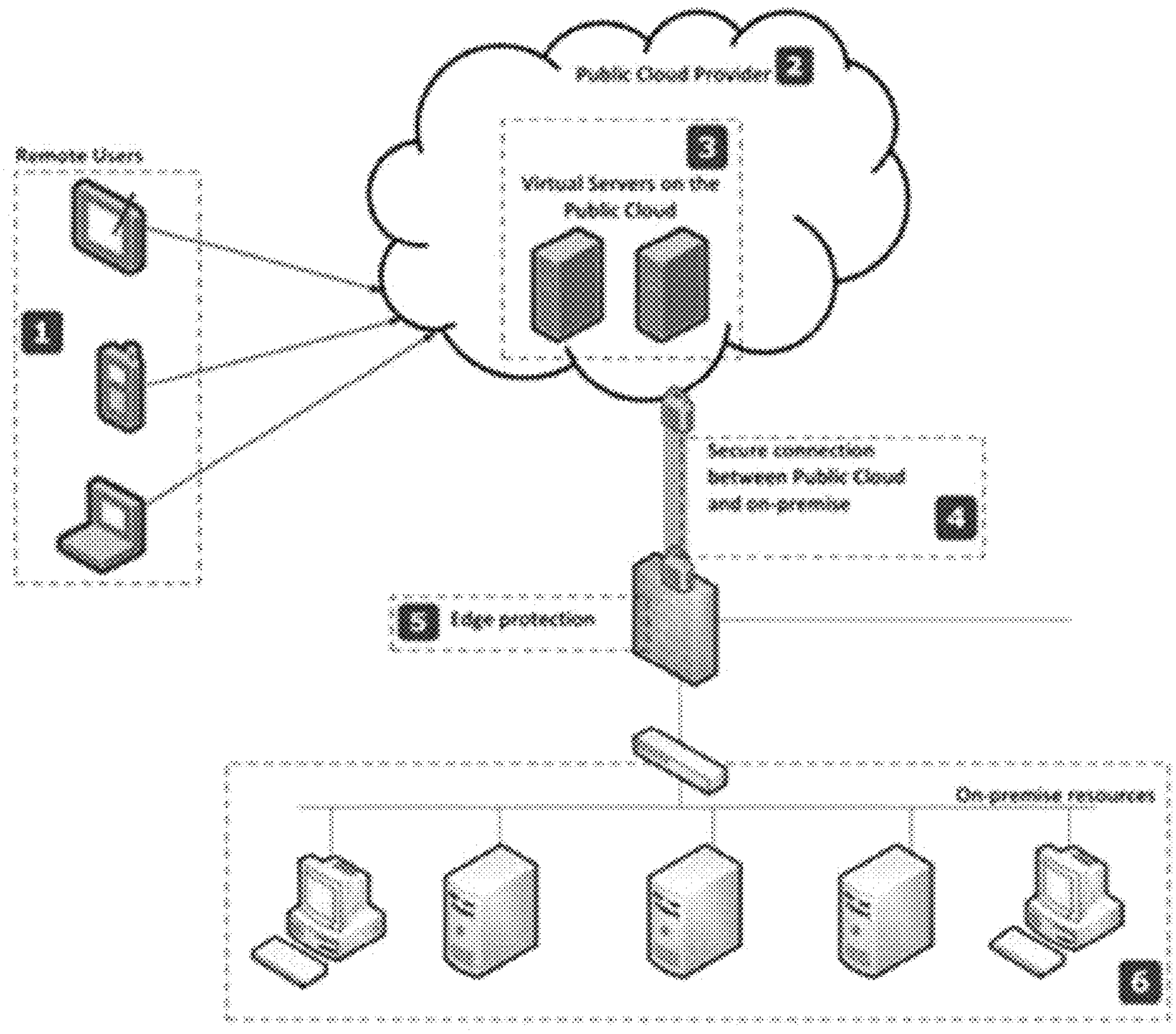
FIG. 76 is a diagram showing edge protection in a physical architecture, according to some embodiments.

FIG. 76 illustrates how remote users would access virtual servers on a public Cloud hosted by one of the big Clouds providers. A secure connection needs to be established between the public Cloud and on-premise resources via an edge protection device. This allows remote users to gain access to on-premise resources via the edge protection layer. All big Cloud providers maintains security and patching of the host OS environments. These providers also provide services that are powered by virtual machines and may be used within P2P (clusters) nodes. If such services are used in DKMF projects, it is the responsibility of the DKMF development and deployment teams to keep the VM operating system and business solutions' services up to date with the latest security patches. Big Cloud providers' networks are linked to most ISPs in the world to help improve the security of data in transit by limiting hops across the public Internet. Cloud edge protection (e.g., Google Cloud Interconnect) and managed VPN allow enterprises to create encrypted channels between their private IP environment on premises and the Cloud network. This allows enterprises to keep instances completely disconnected from the public internet while still reachable from their own private infrastructure as illustrated in FIG. 76.

The next sub-section explains how the DKMF digital knowledge base (available through the DKMF framework as a clusters' node) is seeded on an ongoing basis with existing taxonomies and reusable business components.

VI.7. Digital Knowledge Base Seeding Approach

Figure 77:
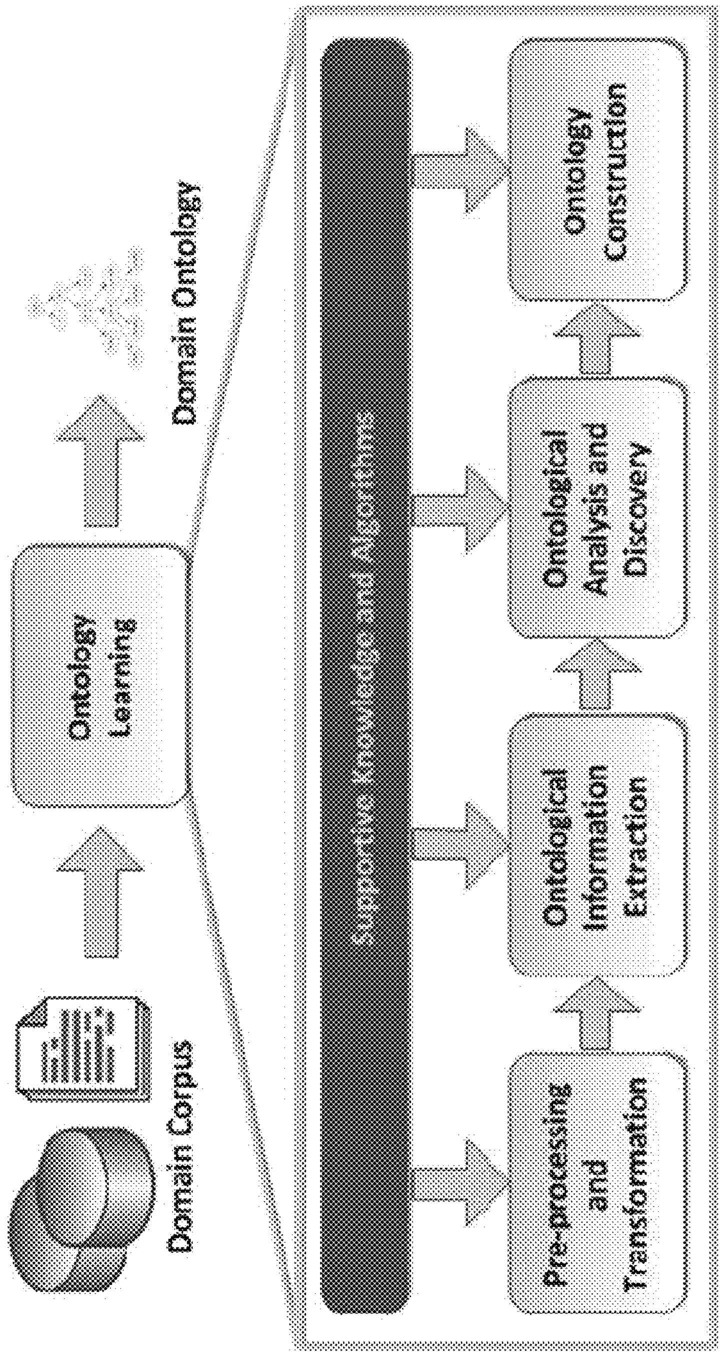
FIG. 77 is a diagram showing an ArchVault business solution seeding approach, according to some embodiments.

As mentioned in Section III and IV of the present disclosure, the DKME leverages a digital knowledge base of ontologies and related taxonomies, and reusable business solutions and associated components. These taxonomies are used to precisely qualify business domain problems and business solutions that address these problems. As new problems and business solutions are added to the knowledge base either through the Archemy™ tools user interfaces or via their APIs, it becomes necessary to understand the meaning of new qualifying keywords. For example, a DKMF-based business solution may need to interpret a user request that contains new keywords. The meaning of these keywords needs to be understood by the intelligent active and/or autonomous business solution in order to process the end-user request. The general approach that is used by the DKMF to perform ontology learning is to plunge the new keywords in a larger taxonomy pool obtained by augmenting a base knowledge pool (e.g., WordNet) with domain corpus-based taxonomies (e.g., OBO). In this case the base taxonomy is seeded with pre-existing standard taxonomies to create a repository of semantic knowledge that can be used to provide a larger context for new keywords and be able to derive relationships with existing keywords so that the meaning of the new keywords can be derived. FIG. 77 illustrates the general architecture of the ontology seeding component implemented by the DKMF within its digital knowledge base cluster. This functionality is used by the DKMF node manager to perform ontology learning at run-time. It is also used by DKME actors to qualify new keywords as they manually add new business problems and solutions to the knowledge base.

Figure 78:
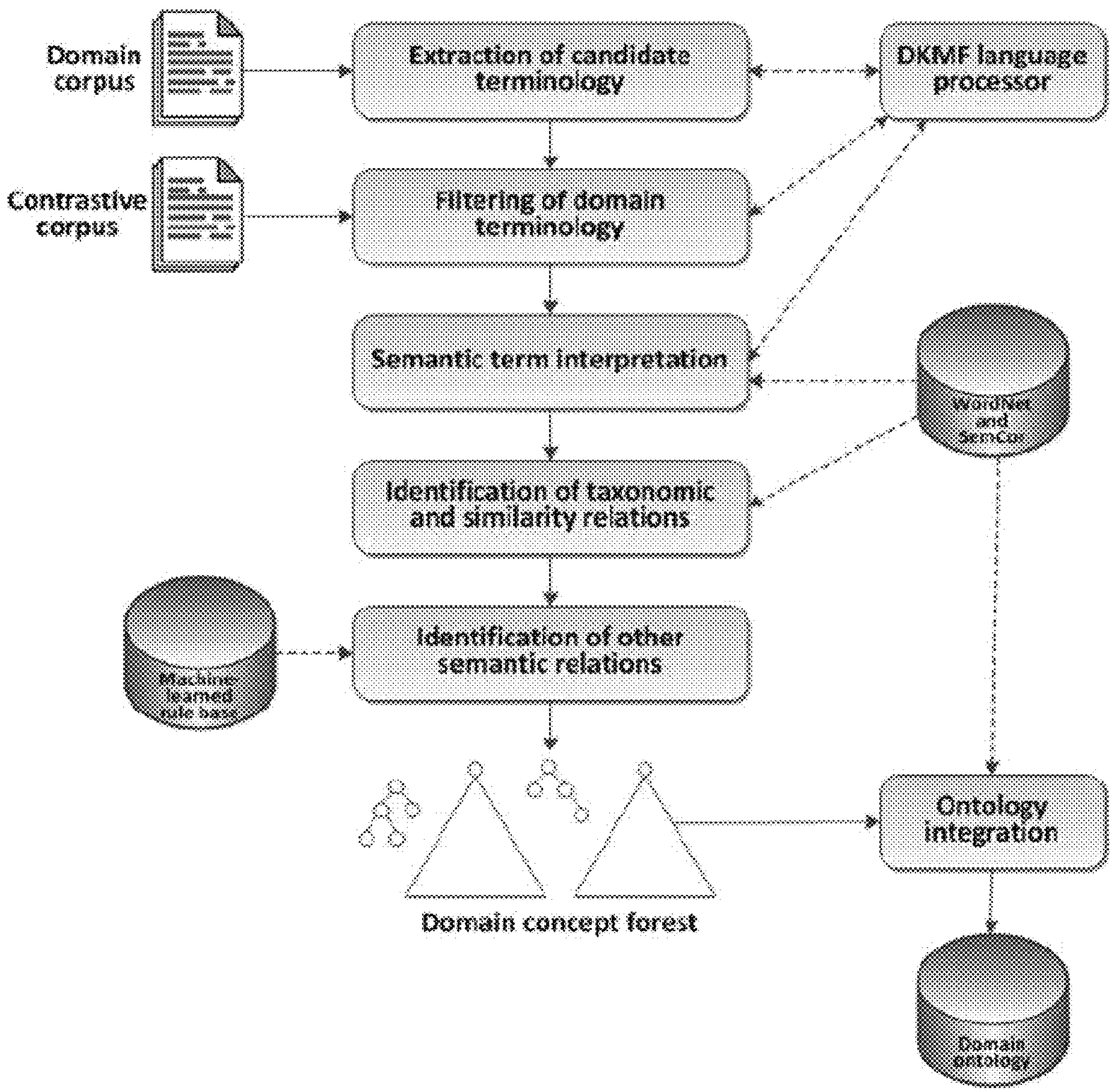
FIG. 78 is a diagram showing an ArchVault taxonomy seeding approach, according to some embodiments.

FIG. 78 illustrates further how ongoing taxonomy seeding is performed within ArchVault™ using domain corpus data and how new terms are analyzed to identify taxonomic and similarity relations with existing terms in order to generate a more complete domain ontology (via ontology learning) that covers new terms as they come up in end-users' requests. ArchVault™ is the DKMF digital knowledge base repository that includes ontologies/taxonomies, business solutions, and metrics. It is a subset of ArchDKB™, which also include local databases used by P2P nodes to maintain operational data for both the DKMF and the associated intelligent active and/or autonomous business solutions.

As noted in Section V.4, ontology learning uses cognitive analytics techniques. An example of such a technique is noun phrase chunking, a method that identifies key topics in a corpus and uses them to learn associations between data. This technique creates more data points, high accuracy, and confidence that output data is trustworthy. While the process is necessarily probabilistic, it is also underwritten by extensive corpus-based processing. In a business context, it would take a long—and typically prohibitively expensive—amount of time for a human to pull up these kinds of intelligent insights from large corpuses of natural language or other unstructured data. In this case, cognitive analytics mimics capabilities, like reasoning and judgment, that enable human brains to generate intelligent insights, and then deploys these capabilities at a scale much greater than a human is capable. The ontology learning module accesses a vast store of historical data and applies machine learning algorithms to discover the connections and correlations across all those information nuggets. It then uses the resulting knowledge as a basis for discovery, decision support, and deep/reinforced learning. This cognitive analytics approach can deliver insights as to what is right in a given situation (i.e., the right answer at the right time in the right context). A similar approach is used in the IBM Watson system and generally consists of "educating" a cognitive system rather than programming it by providing a large set of training examples.

The taxonomy seeding approach described in the above is used within the DKME to understand new keywords via ontology learning and create more precise taxonomies to quality new business domain problems and business solutions that address these problems. There is wide variety of sources that can provide business domain problems. While we mentioned WordNet and standard domain ontologies as seeding resources in the above, these resources are only the tip of the iceberg in terms of the available resources. Open source information available on the internet such as regulatory and patent information, census data and social media posts are a valuable part of the information ecosystem. Adding in Internet of Things (IoT) type of data from sensors provides a level of complexity that is both a challenge and an opportunity when it comes to ontology learning.

Figure 79:
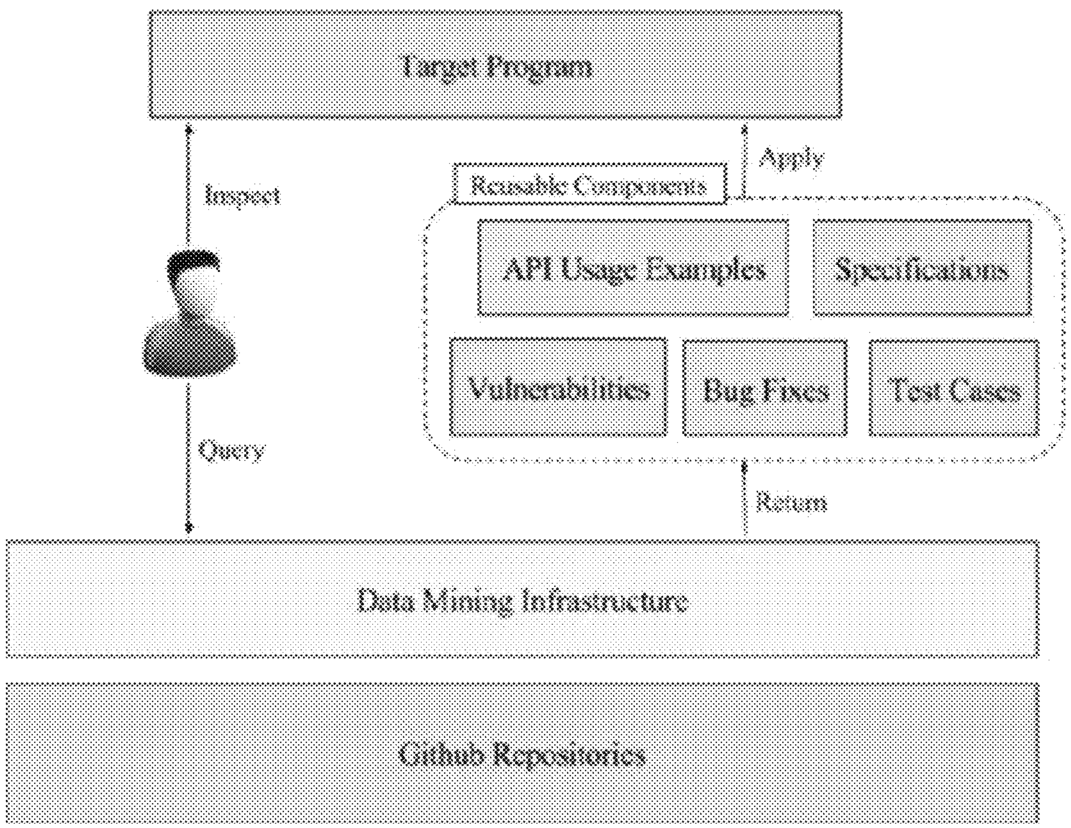
FIG. 79 is a diagram showing an ArchVault business solution seeding approach, according to some embodiments.

As noted before, the Archemists community is one of the sources of reusable business solutions. In addition, source code repositories like GitLab/GitHub or software components repositories like webcomponent.org, or the open source software communities provide a mining pool for reusable components descriptions and associated reusable software. These sources are used to seed the DKMF repository of reusable business solutions and associated components. FIG. 79 illustrates the ArchVault™ business solutions seeding approach just described.

This concludes the description of the current practical status of our solution and related implementation details. Our current implementation is built on a selected set of technologies that follow the best development practices we believe in. The resulting platform combines existing state-of-the-practice technologies with new components in an innovative way to facilitate the creation and management of intelligent active and/or autonomous business solutions in various business contexts.

In the next section, we provide several examples of practical intelligent active and/or autonomous applications that use of the DKMF today to support the needs of users in various business domains.

VII. Sample DKMES at Work

Figure 80:
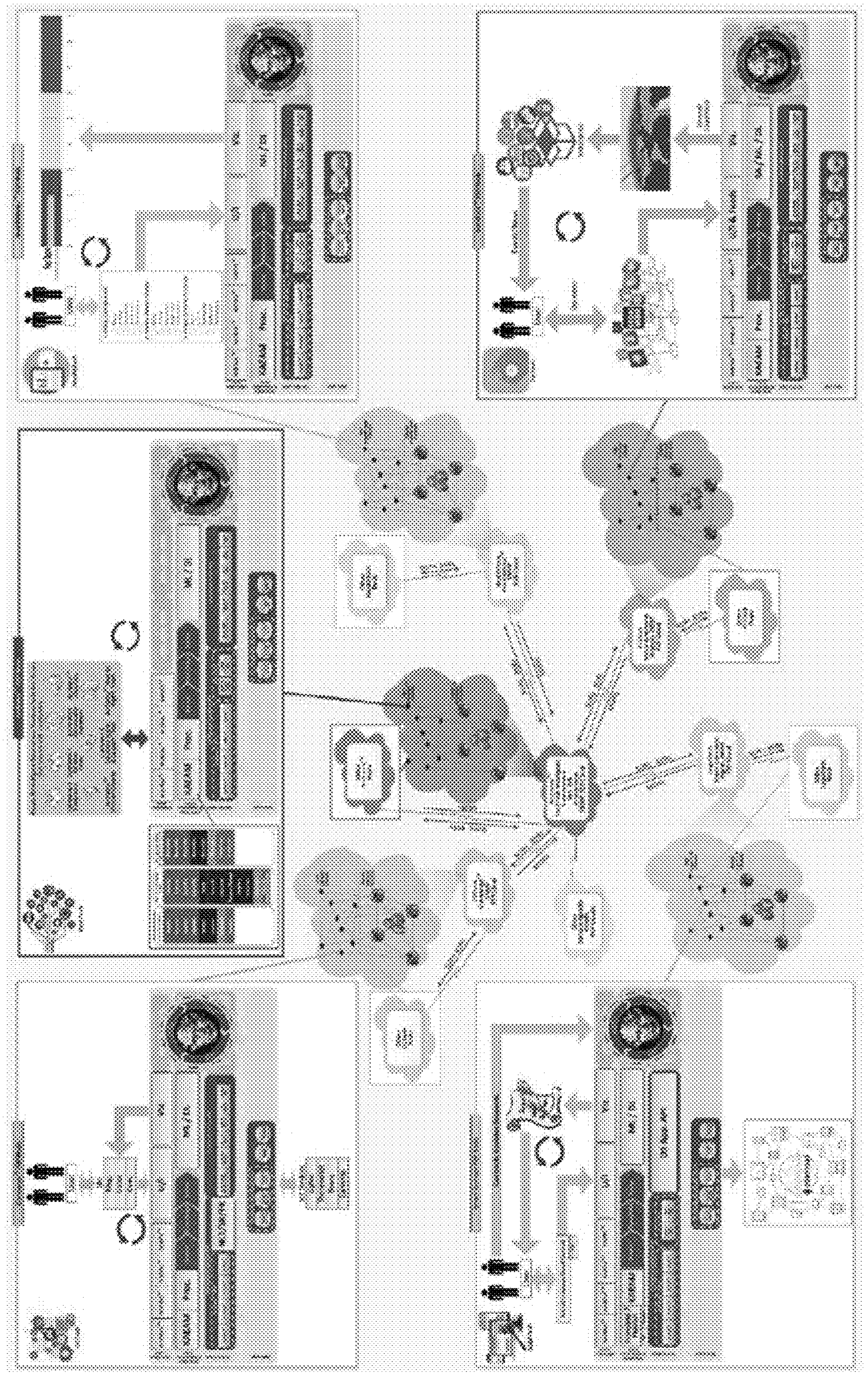
FIG. 80 is a diagram showing interoperation of DKME nodes, according to some embodiments.

In this section, we provide a brief description of several intelligent active and/or autonomous business solutions. These solutions connect to the DKME marketplace and are in various state of development and deployment. To illustrate the breadth of possible applications of the DKME and its associated DKMF, we have selected solutions that target different industries including technology, healthcare, legal, financial, and consumer goods. The technology solution presented in sub-section VII.1 focuses on Archemy's marketplace of connected intelligent active and/or autonomous business solutions. This product provides a dynamic environment that aims at facilitating the end to end lifecycle of connected intelligent active and/or autonomous business solutions. The healthcare HealthMeter™ solution presented in sub-section VII.2 provides a dynamic and innovative connected environment to monitor an extensible set of medical conditions. The legal Baanda™ solution presented in sub-section VII.3 provides a dynamic and connected environment to create and manage and extensible set of multi-party smart contracts that are safeguarded using the Blockchain 2.0 Ethereum platform. The financial services' Sentilizer™ solution presented in sub-section VII.4 provides a dynamic and connected environment to manage sentiment generated in reaction to events of news that may have financial impact. The environment can be deployed within an enterprise to monitor employee's sentiment or it may be used to analyze broad sentiment on the market. While the environment was developed for the financial industry, it may also be used in other industries. Finally, the iConcierge™ consumers goods solution provides a dynamic and innovative connected environment to monitor and manage facilities via intelligent active and/or autonomous concierges. It may be used in a home, apartment complex, commercial environment, or vehicle and aims at providing an extensible set of concierge-like monitoring and support functions at various interconnected locations. FIG. 80 illustrates how these various solutions are inter-connected to operate on the DKME marketplace ecosystem. Again, we are providing lots of figures and diagrams in this section to illustrate the various aspects of our solutions' implementations. As a result, we have limited discussions about implementation details to a minimum. We hope that this section will help clarify the purpose, usefulness, and ease of implementation and deployment of new intelligent active and/or autonomous business solutions when using the DKME ecosystem and its associated DKMF framework.

VII.1. TechTech Archemy™ Business Solutions Marketplace DKME

Due to the lack of standardized knowledge management methods to classify business problems and related business solutions, new business solutions constantly have to be re-developed and sometimes need to coexist with existing business solutions. This trend has been accelerated over the past few years as new innovative technologies keep disrupting the ability for businesses to compete in their market. As a result, new business solutions keep proliferating, take time to develop, lack integration with existing solutions, and increase the cost and burden of doing business. The Archemy™ business solutions marketplace addresses these ongoing business difficulties by harnessing knowledge to assist businesses by semi-automating business platforms transformations hereby allowing business people to perform rather than transform (e.g., be digital rather than become digital). Resulting business solutions can leverage augmented intelligence provided by a dynamic and connected ecosystem and an associated framework which are based on the DKME and DKMF respectively. Intelligent active and/or autonomous business solutions constantly act as transformation assistants that focus on delivering real-time answers to business problems while optimizing the reuse and adaptation of existing business solutions' components and integrating the use of innovative technologies. In essence, the Archemy™ business solutions marketplace provides a learning platform that rethinks, re-invents, and rewires business platforms on an ongoing basis behind the scenes. The Archemy™ business solutions marketplace is powered by AI's big data and cognitive analytics, and other technology breakthroughs that result from years of research and development in ontology management, business solutions reuse, software components composition and integration, and intelligent active and/or autonomous agents.

Figure 81:
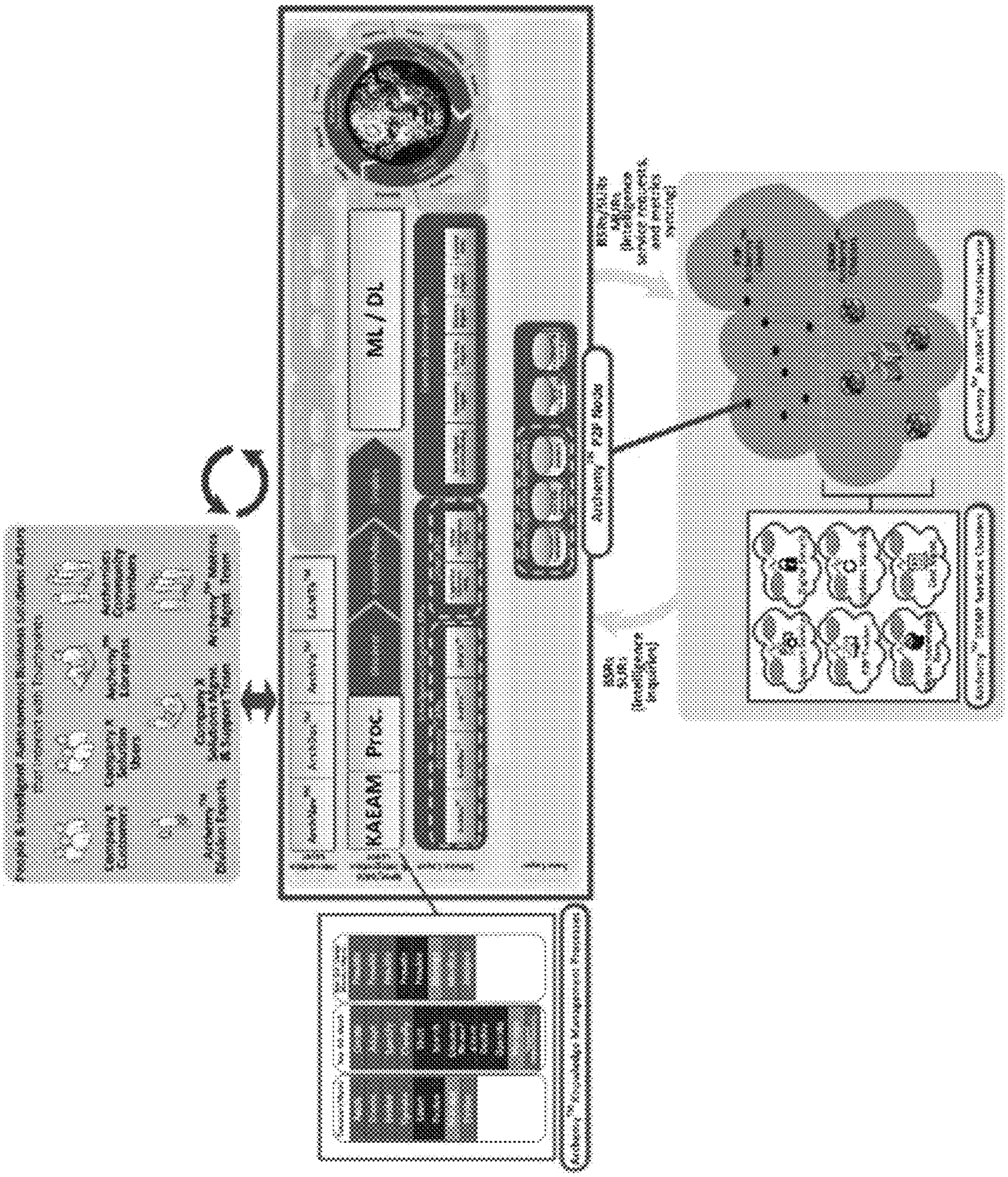
FIG. 81 is a diagram showing an Archemy conceptual business architecture, according to some embodiments.

FIG. 81 details the conceptual business architecture of the Archemy™ DKMF-based intelligent active and/or autonomous business solution. It is an excerpt from FIG. 80 and it focuses on details specific to the Archemy™ DKMF-based P2P node. FIG. 81 illustrates how the DKME actors shown in FIG. 8 (Section III.2) interact with the Archemy™ DKMF-based P2P node. It also illustrates how the built-in DKMF KAEAM-based knowledge management processes and related BPM capabilities as well as the DKMF services clusters shown in FIG. 8 are being leveraged by the Archemy™ DKMF-based P2P node. The KAEAM approach is discussed in detail in Section III.2. This DKMF built-in functionality helps implement the Archemy™ dynamic environment aimed at facilitating the end-to-end lifecycle of connected intelligent active and/or autonomous business solutions that power the DKME marketplace. Some of the built-in functionalities provided by the DKMF are greyed out since they are not used by the Archemy™ business solution. The Archemy™ DKMF-based P2P node also leverages the DKMF node manager built-in process (Proc.) and its underlying taxonomy, business solutions, and metrics management activities. Some of these activities leverage machine learning (ML) and more specifically deep learning (DL), and reinforcement learning (RL).

Figure 82:
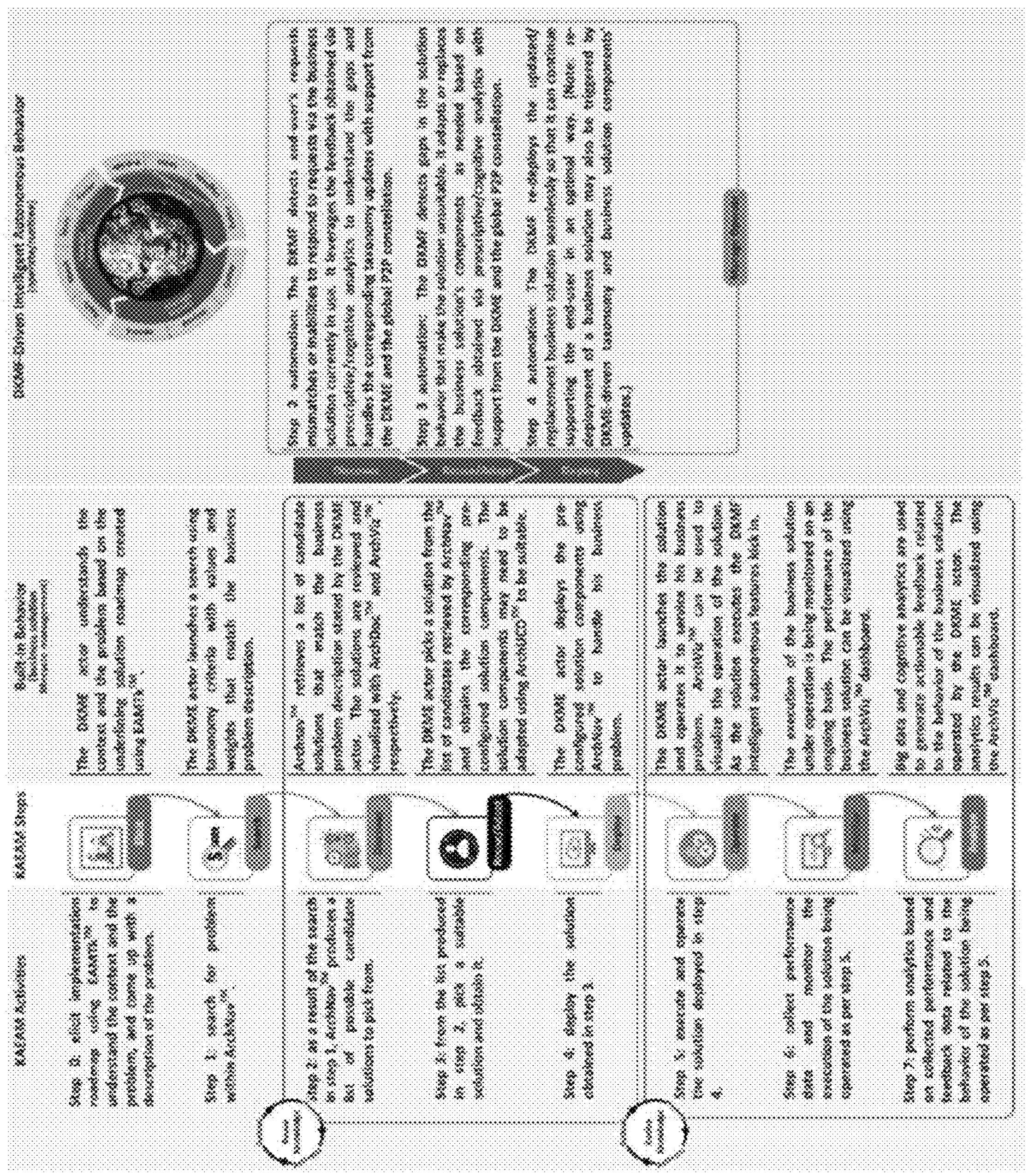
FIG. 82 is a diagram showing an Archemy DKMF storyboard, according to some embodiments.

FIG. 82 uses a storyboard to provide more details about the implementation of the KAEAM-driven processes within the Archemy's DKMF-based P2P node shown on FIG. 81. It first summarizes the KAEAM activities and steps within the left two columns respectively, as previously defined in section III.2 and illustrated in FIGS. 12 and 13. These two columns illustrate how KAEAM manages the reuse of business problems and solutions knowledge to help evolve business solutions and make them more available and suitable to business users. The two columns on the right of FIG. 82 focus on describing the behavior that is specific to the Archemy™ DKMF-based business solution. The built-in behavior column outlines the expected outcome of the various KAEAM steps as they are applied using several Archemy™ tools (e.g., EAMTk™, ArchNav™ ArchDoc™, and ArchViz™) available via the Archemy™ P2P node user interface. The intelligent active and/or autonomous behavior provided by the DKMF automates the execution of KAEAM's steps 2, 3, and 4 as part of the DKMF manage function, as explained earlier in Section III.2 and IV.1 and illustrated in FIGS. 13, 16 and 17. These automated steps aim at optimizing the availability and suitability of taxonomies and business solutions' components that are used to address end-users' requests.

Figure 83:
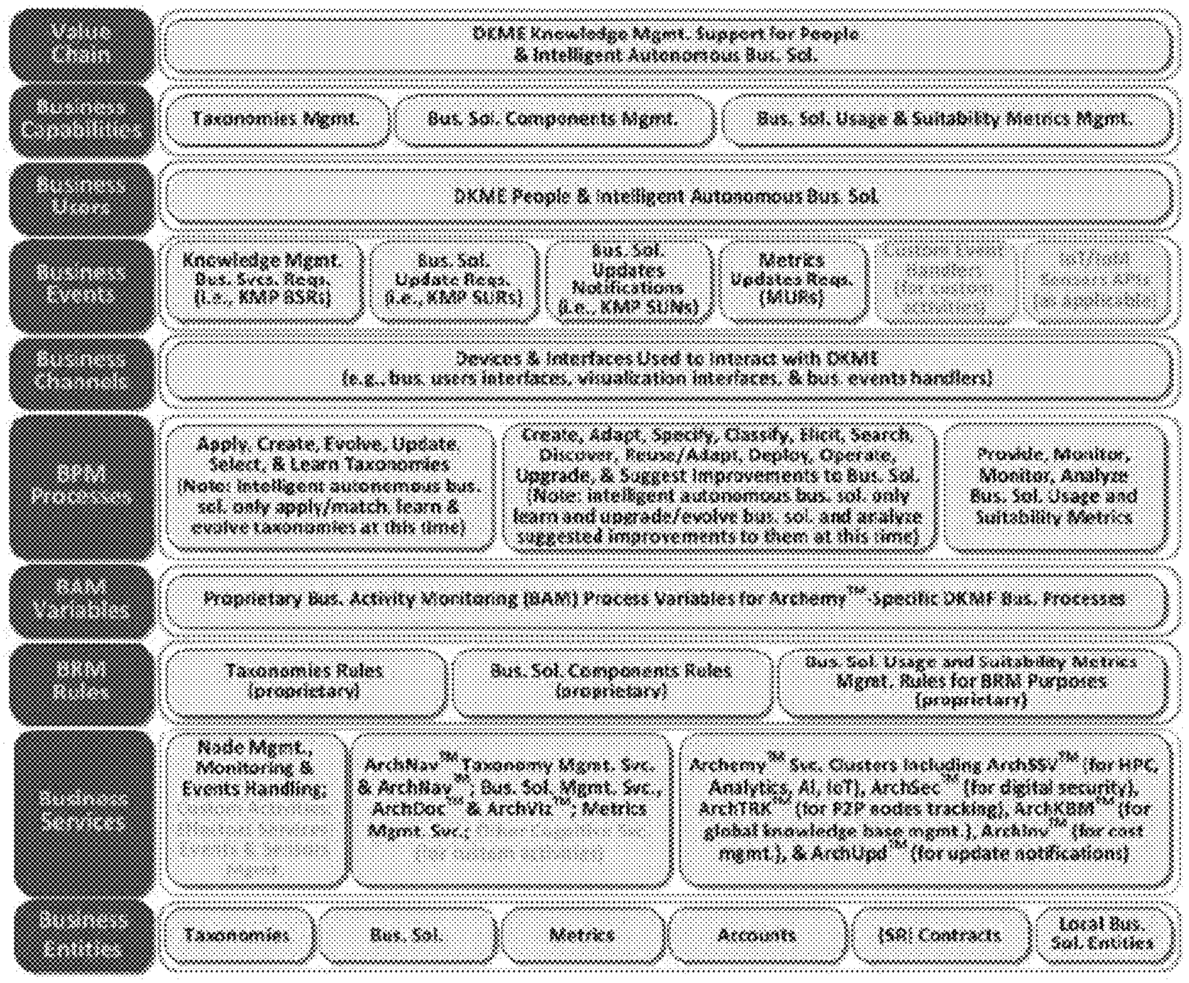
FIG. 83 is a diagram showing an Archemy DKMF business architecture, according to some embodiments.

FIG. 83 illustrates the business architecture elements that are supported by the Archemy™ business solution. It is based on the framework introduced earlier in Section III.2 and the DKMF business architecture shown in FIG. 17. In this case, the DKMF business architecture framework elements that are not provided via the Archemy™ DKMF-based business solution have been greyed out.

Figure 84:
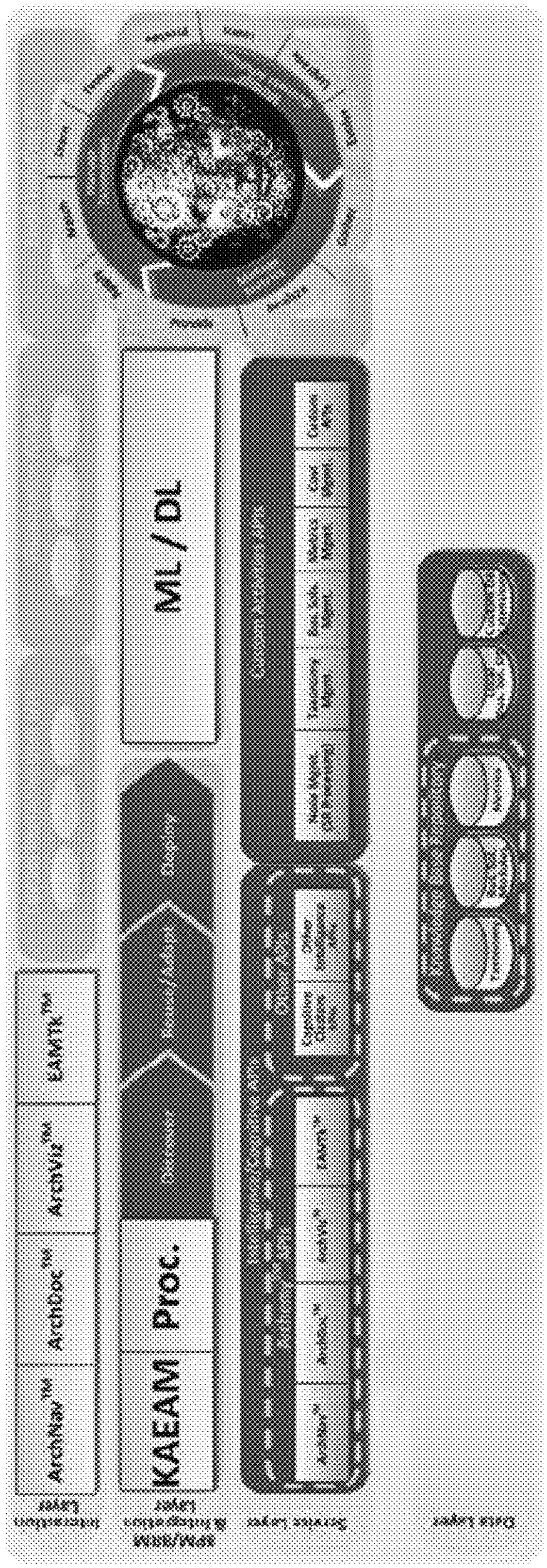
FIG. 84 is a diagram showing an Archemy P2P node logical architecture, according to some embodiments.

FIG. 84 illustrates the Archemy™ P2P node logical architecture. It is based on the DKMF P2P node logical architecture introduced in Part IV.2 and shown on FIG. 28. However, the node logical architecture has been augmented to include functionalities that are specific to the Archemy™ DKMF-based business solutions marketplace as discussed earlier in this section.

Figure 85:
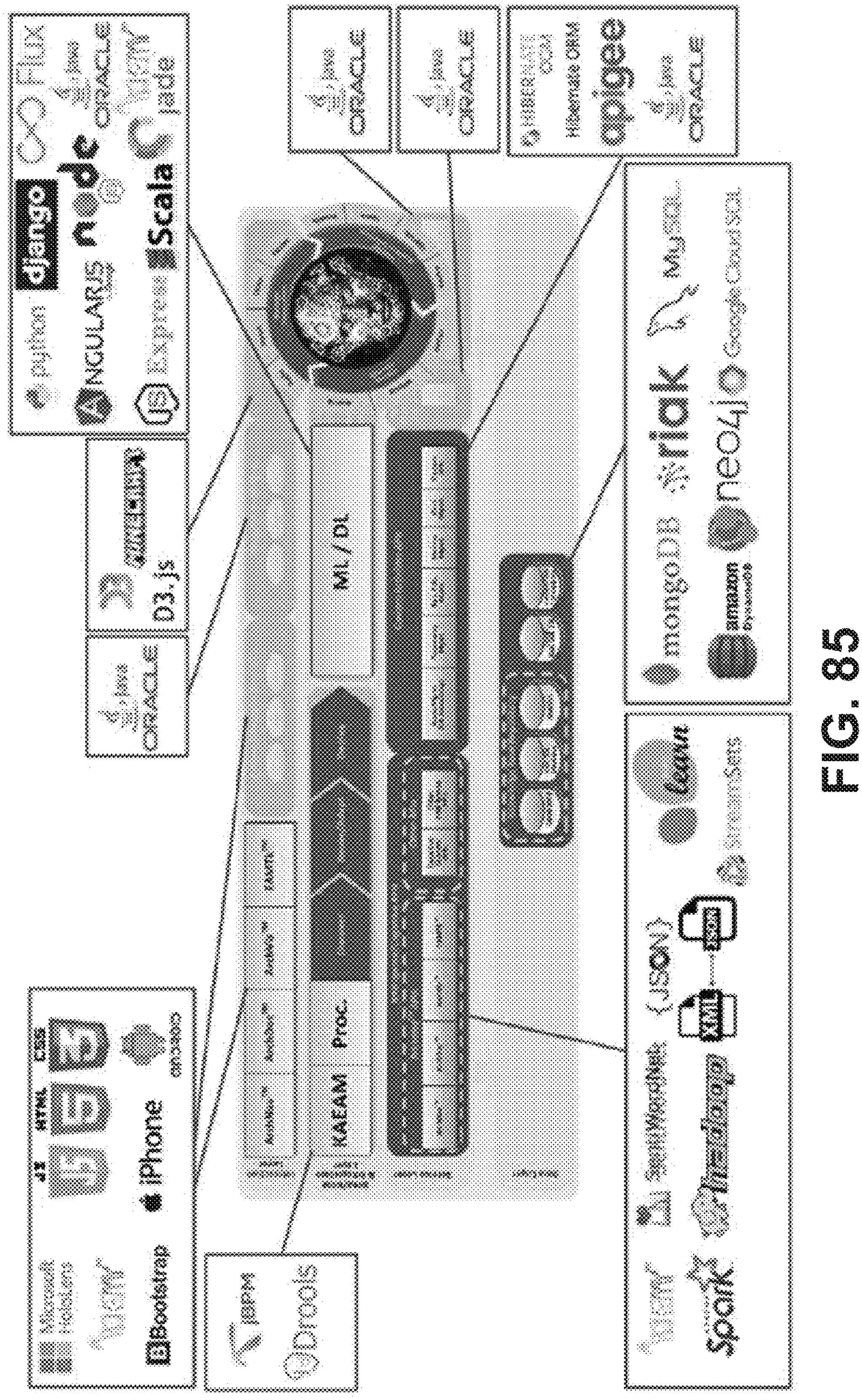
FIG. 85 is a diagram showing an Archemy P2P node implementation stack, according to some embodiments.

FIG. 85 illustrates the specific technologies that are currently used as part of the implementation of Archemy™ P2P nodes. These technologies are a subset of the candidate technologies introduced earlier in Section VI and illustrated in FIG. 60.

Figure 86:
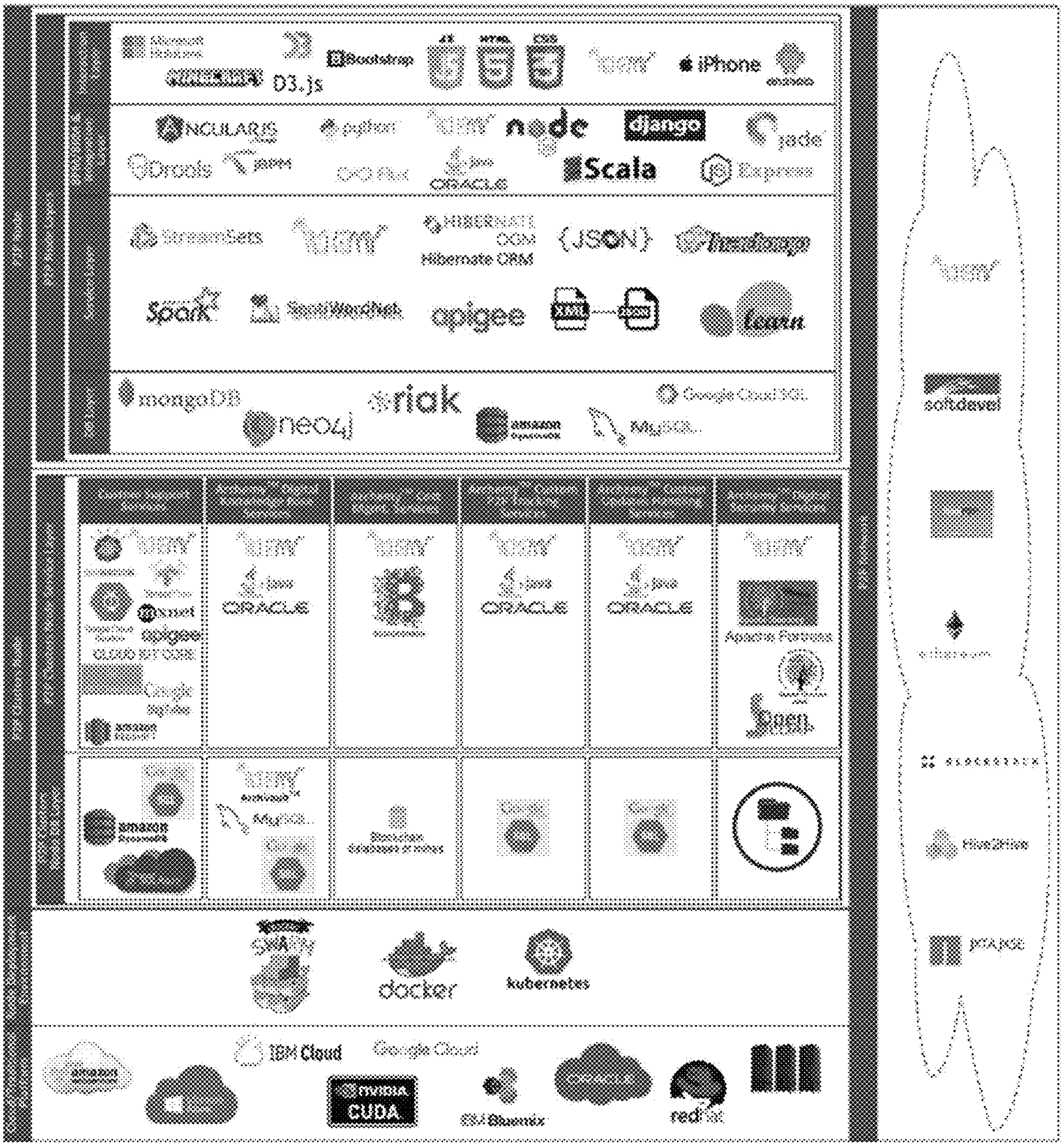
FIG. 86 is a diagram showing an Archemy DKMF technology stack, according to some embodiments.

FIG. 86 illustrates the specific set of technologies currently used as part of the implementation of the Archemy™ DKMF-based business solution. These technologies are a subset of the candidate technologies introduced earlier in Section VI and illustrated in FIG. 57.

As noted earlier, it is not our goal in this section to delve into the implementation details of all the Archemy™ business solutions. Detailed specifications and test suites are available separately via Archemy™ and its affiliates under intellectual property agreements. Therefore, our focus in this section is to provide enough information to clarify the design and implementation of the Archemy™ DKMF-based business solution and explain how it leverages the DKME ecosystem and its associated DKMF framework.

In the next sub-section, we describe the design and implementation of HealthMeter™, a HealthTech solution that leverages the Archemy™ DKME and its associated DKMF.

VII.2. HealthTech HealthMeter™ DKME

Figure 87:
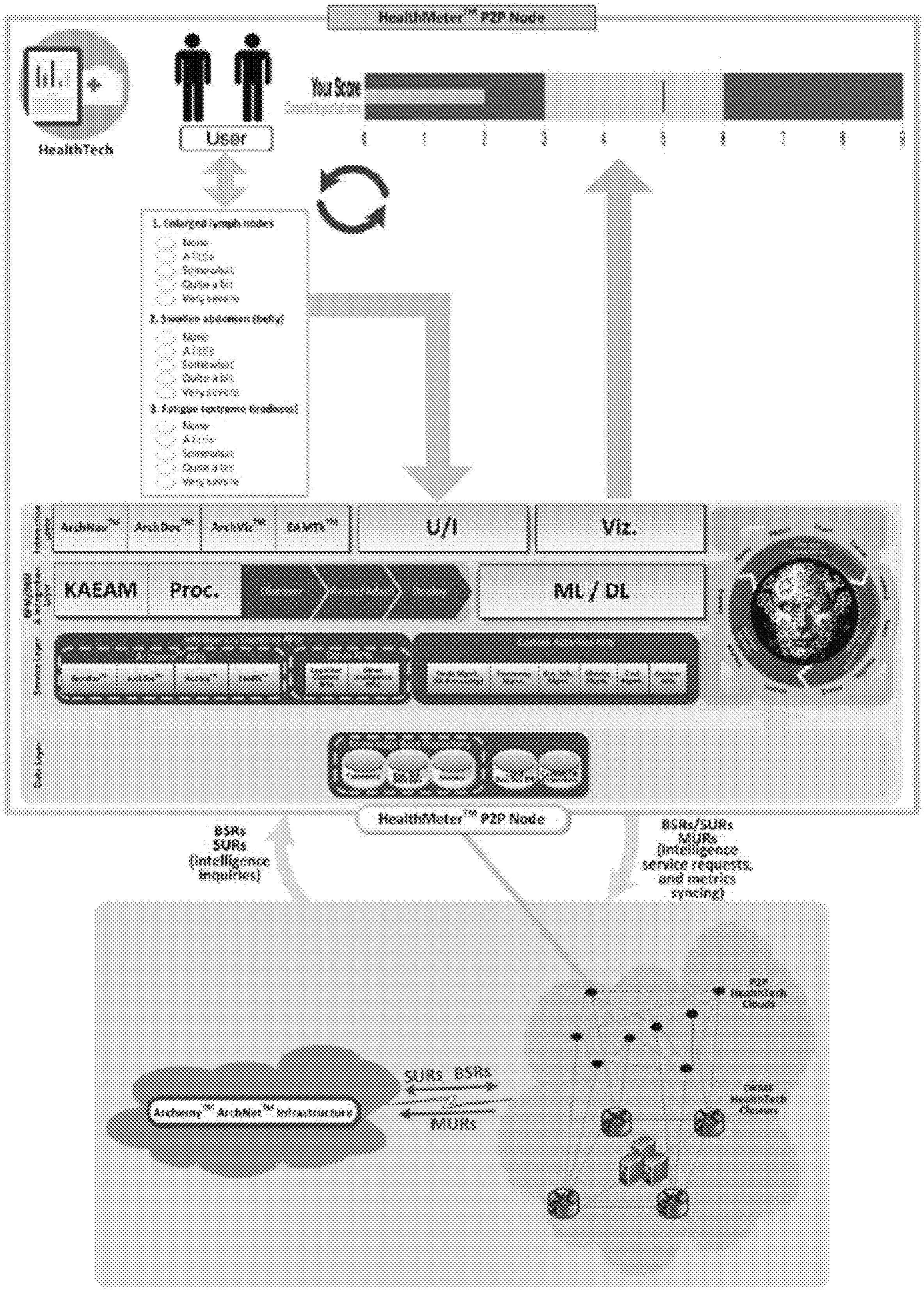
FIG. 87 is a diagram showing a HealthMeter conceptual business architecture, according to some embodiments.

Due to the lack of standardized methods to diagnose diseases and catalog the various sets of symptoms associated with them, it is crucial for the healthcare industry to be able to handle different sets of symptoms and apply analytics to gain insight as to how treatment cycles can be improved and costs can be reduced. The HealthTech HealthMeter™ business solution addresses this crucial need. FIG. 87 details the conceptual business architecture of the HealthTech HealthMeter™ DKMF-based intelligent active and/or autonomous business solution. It is an excerpt from FIG. 80 and it focuses on details specific to the HealthMeter™ solution.

FIG. 87 illustrates how healthcare DKME actors (e.g., patients, healthcare providers and doctors) interact with a HealthMeter™ DKMF-based P2P node by providing a set of symptoms and specifying their current state. The HealthMeter™ solution uses machine learning and deep learning algorithms as needed to categorize the patients that exhibits symptoms in three (or more) risk-zones associated with the probability of developing the disease being monitored (e.g., green or safe if no risk, yellow or warning if low risk, red or danger for high risk). The HealthMeter™ DKMF-based business solution is a real-time, web-based and mobile-enabled service, which provides information about patient's health status based on symptoms provided via its user interface. The mobile service is accessible via tablets and mobile devices with privileged access management that can be easily used within a hospital environment. The resulting solution makes tracking medical conditions and managing treatment plans economical and convenient. The HealthMeter™ DKMF-based business solution can be used by patients, healthcare providers and doctors to track the status and progress of various diseases. For example, patients may want to know the status of their medical condition and what the medical condition status would be if that condition did not get treated for another five years. The HealthMeter™ solution is user-friendly, secure, and efficient. The precision (e.g., improved risk-zones readings) of the diagnosis depends on the amount and quality of the data sets provided to perform internal machine learning analytics. Ongoing collection and processing of data is performed behind the scenes via the HeatlthMeter™ DKMF ArchSSV™ cluster.

The HealthMeter™ solution leverages built-in functionality provided by the Archemy™ DKMF framework to implement a dynamic and innovative connected environment that is able monitor an extensible set of medical conditions within a healthcare DKME. Some of the functionalities of the DKMF shown on FIG. 87 are greyed out since they are not currently used by the HealthMeter™ business solution. The HealthMeter™ solution implements KAEAM knowledge management processes that are specific to the health metering context by leveraging the DKMF P2P node's BPM capabilities. The KAEAM approach is discussed in detail in Section III.2. The HealthMeter™ solution also leverages the DKMF node manager built-in processes and its underlying taxonomy, business solutions, and metrics management activities. As noted earlier, some of these activities leverage machine learning (ML) and more specifically deep learning (DL), and reinforcement learning (RL). The built-in DKMF functionality makes it possible for HealthMeter™ to adapt its functionality to handle ongoing changes in sets of symptoms (or other learnings) and reconfigure its analytics processing algorithms and visualization widgets accordingly. In addition to the built-in DKMF capabilities, the HealthMeter™ provides its own BPM-driven process and related activities to facilitate diagnostic steps by applying analytics algorithms to a given set of symptoms and associated states and generating a snapshot of the resulting diagnostics using a visualization widget (e.g., risk-zones visualization).

Figure 88:
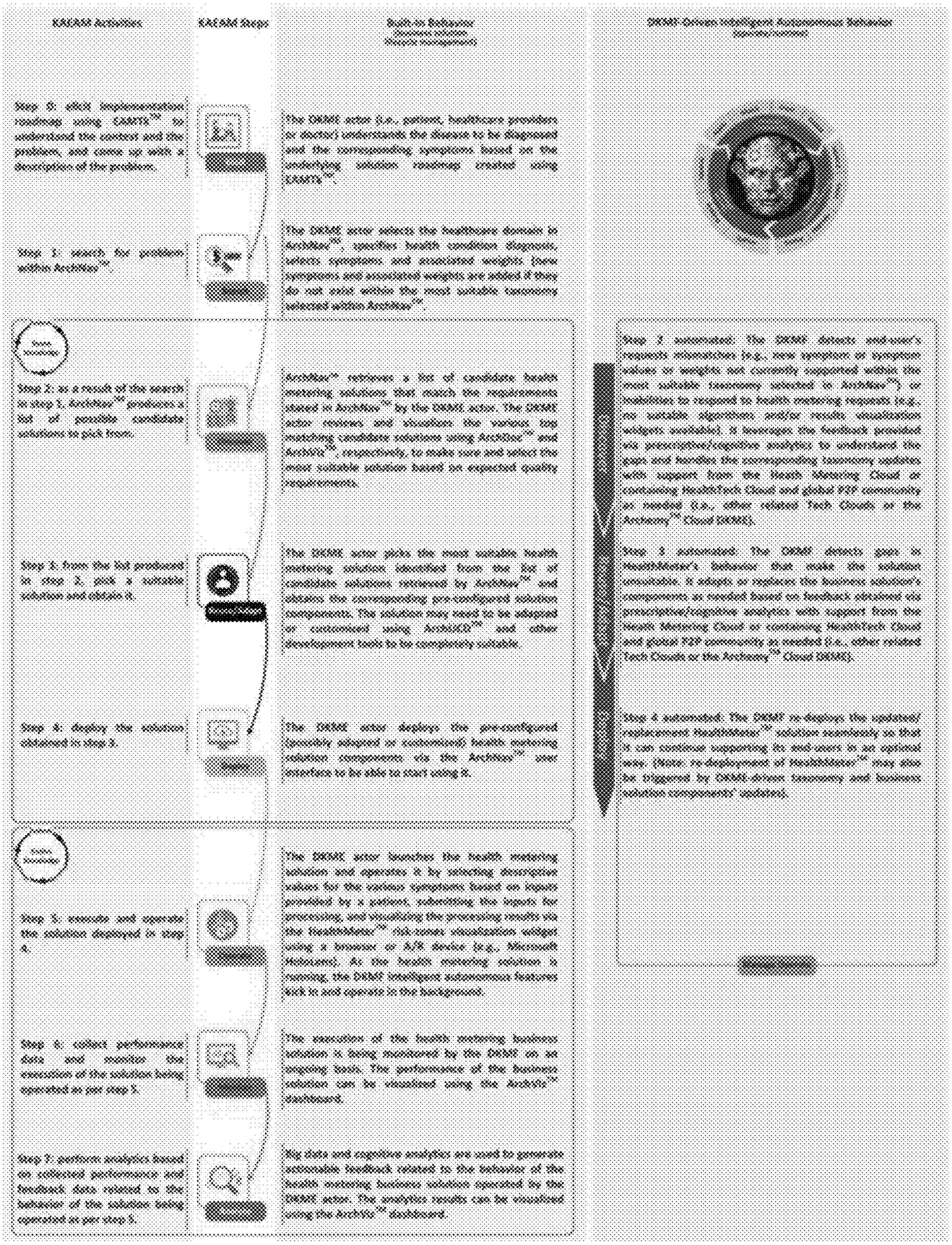
FIG. 88 is a diagram showing a HealthMeter DKMF storyboard, according to some embodiments.

FIG. 88 uses a storyboard to provide more details about the health metering context-specific implementation of the KAEAM processes within the HealthMeter™ DKMF-based P2P node shown on FIG. 87. It first summarizes the KAEAM activities and steps within the left two columns respectively, as previously defined in section III.2 and illustrated in FIGS. 12 and 13. These two columns illustrate how KAEAM manages the reuse of business problems and solutions knowledge to help evolve business solutions and make them more available and suitable to business users. The two columns on the right of FIG. 88 focus on describing the behavior that is specific to the HealthMeter™ DKMF-based business solution. The built-in behavior column outlines the expected outcome of the various KAEAM steps as they are applied using several Archemy™ tools (e.g., EAMTk™, ArchNav™, ArchDoc™, and ArchViz™) available via the HealthMeter™ P2P node user interface. These steps select appropriate disease-related symptom taxonomies and configure the internal analytics algorithms and visualization widgets to enable disease specific diagnosis. The intelligent active and/or autonomous behavior provided by the DKMF automates the execution of KAEAM's steps 2, 3, and 4 as part of the DKMF manage function, as explained earlier in Section III.2 and IV.1 and illustrated in FIGS. 13, 16 and 17. These automated steps aim at optimizing the availability and suitability of taxonomies and business solutions' components that are used to address end-users' requests. As noted earlier, this built-in intelligent active and/or autonomous DKMF functionality makes it possible for the HealthMeter™ solution to adapt its functionality to handle ongoing changes in sets of symptoms (or other learnings) and re-configure its "plugins" (e.g., analytics processing algorithms and visualization widgets) accordingly.

Figure 89:
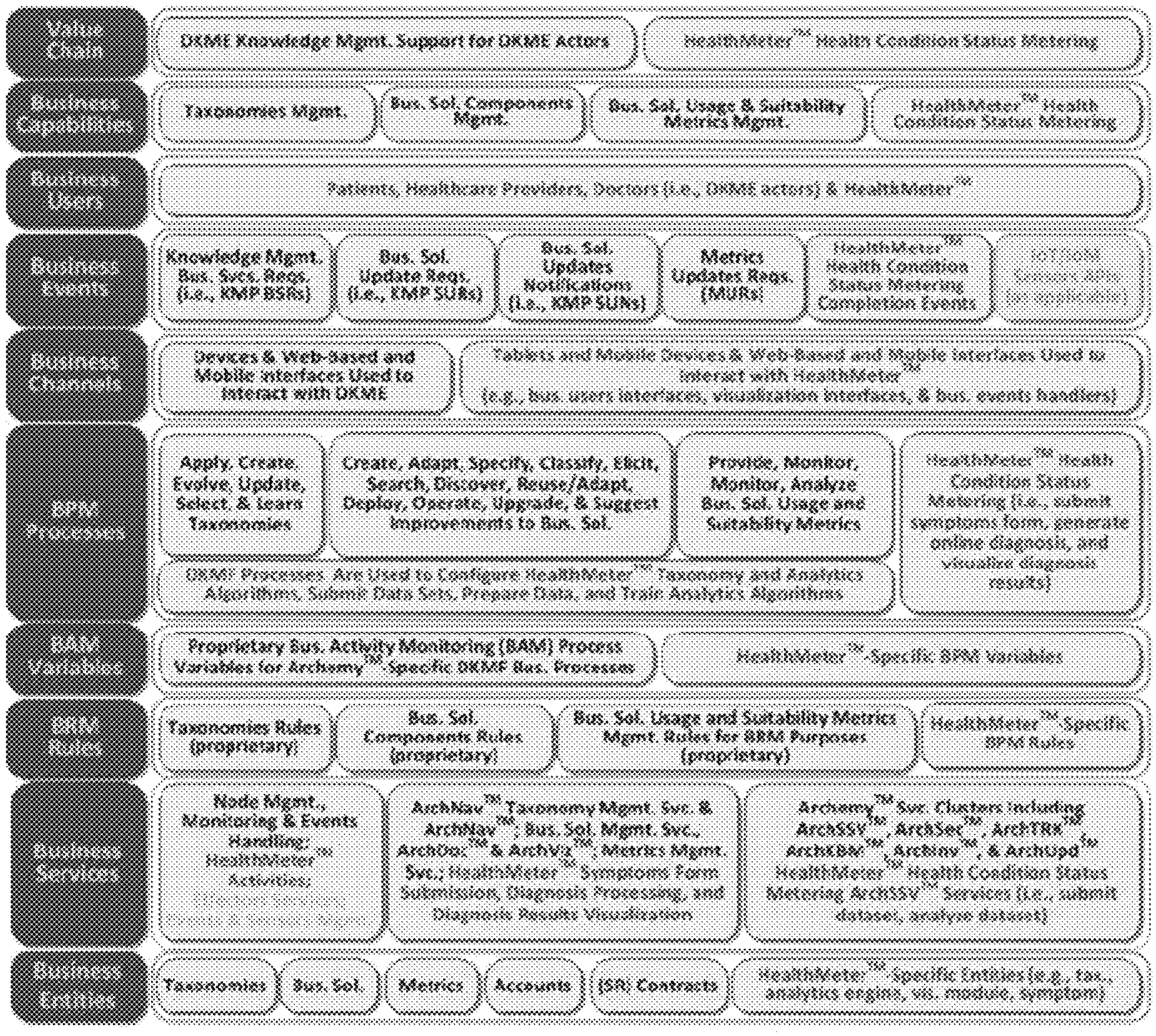
FIG. 89 is a diagram showing a HealthMeter DKMF business architecture, according to some embodiments.

FIG. 89 illustrates the business architecture elements that are supported by the HealthMeter™ business solution. It is based on the framework introduced earlier in Section III.2 and the DKMF business architecture shown in FIG. 15. In this case, the DKMF business architecture framework elements that are not provided via the HealthMeter™ DKMF-based business solution have been greyed out.

Figure 90:
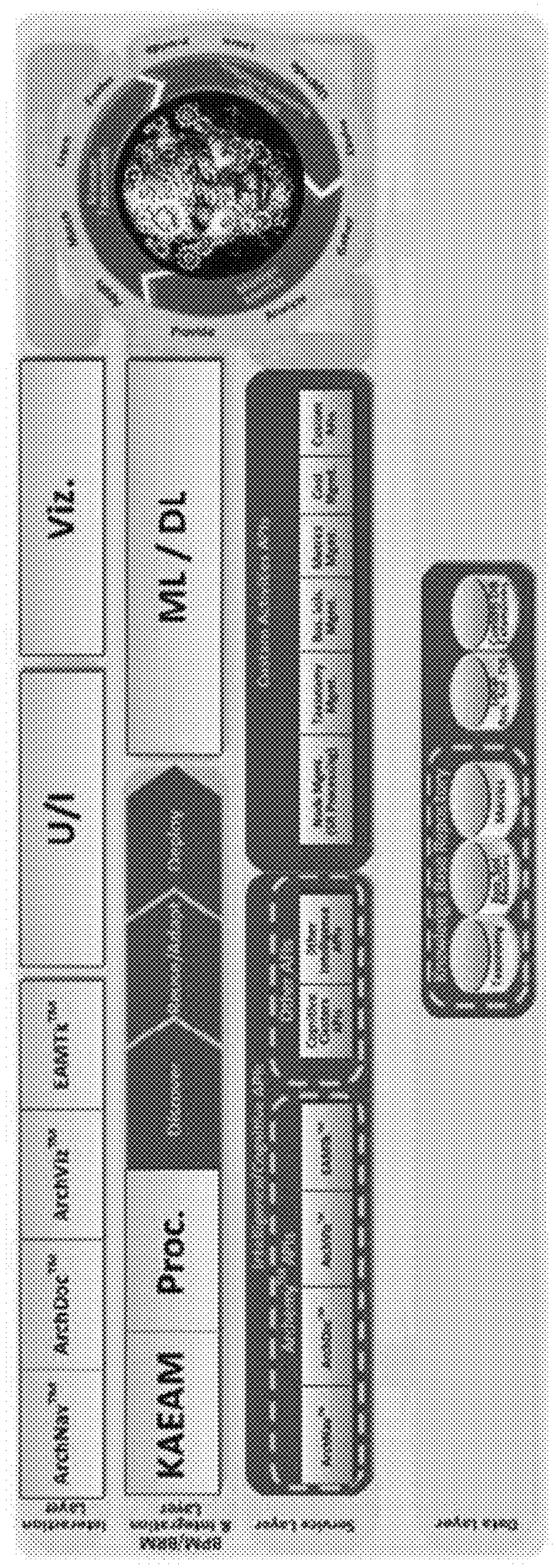
FIG. 90 is a diagram showing a HealthMeter P2P node logical architecture, according to some embodiments.

FIG. 90 illustrates the HealthMeter™ P2P node logical architecture. It is based on the DKMF P2P node logical architecture introduced in Part IV.2 and shown in FIG. 28. However, the node logical architecture has been augmented to include functionalities that are specific to the HealthMeter™ DKMF-based business solution as discussed earlier in this section.

Figure 91:
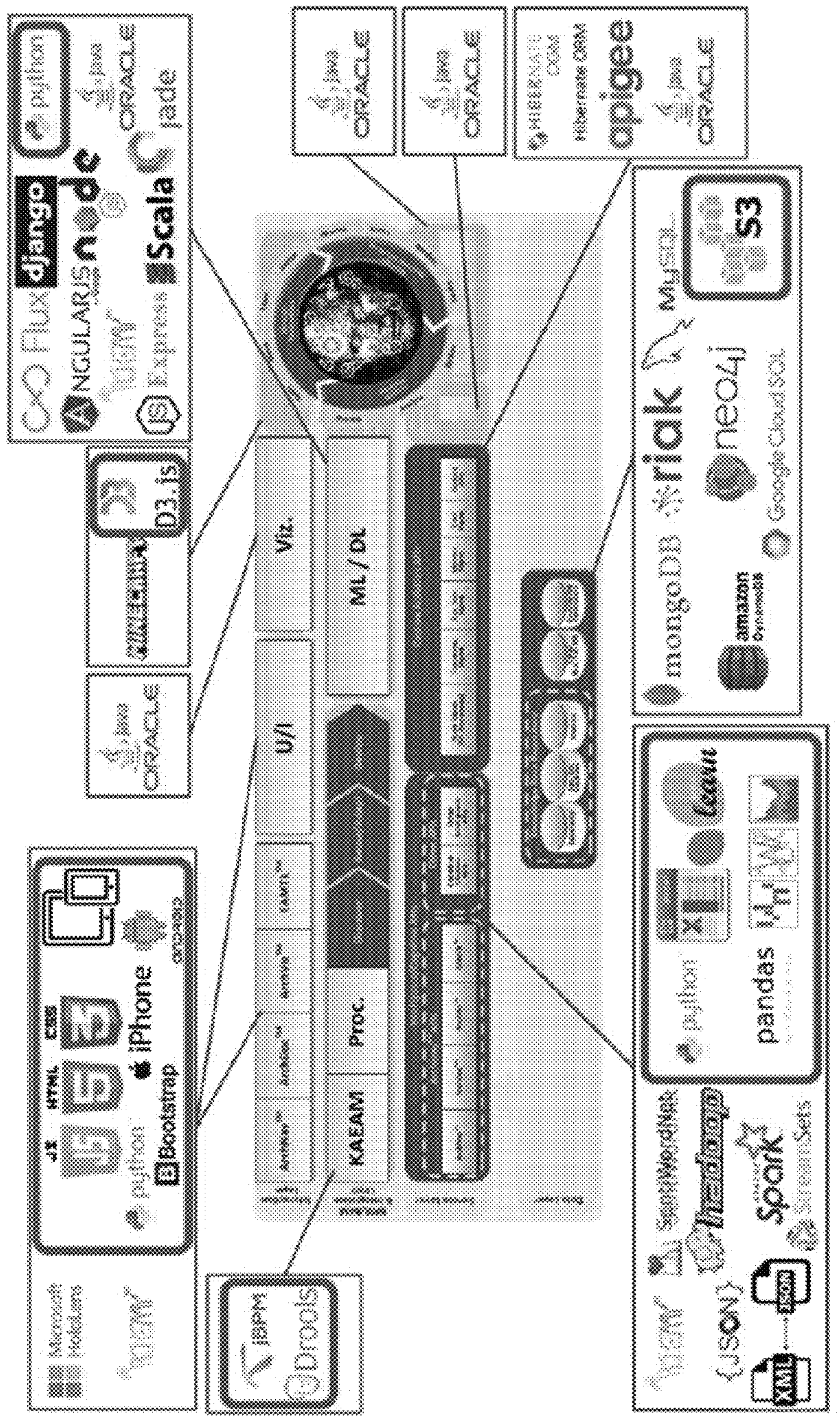
FIG. 91 is a diagram showing a HealthMeter P2P node implementation stack, according to some embodiments.

FIG. 91 illustrates the specific technologies that are currently used as part of the implementation of HealthMeter™ P2P nodes. These technologies include a subset of the candidate technologies introduced earlier in Section VI and illustrated in FIG. 60 as well as new technologies, outlined in red in FIG. 91) used specifically by the HealthMeter™ solution. The HealthMeter™ solution currently leverages MS-Excel and Python, as part of preparatory steps, to mine the historical supervised patient data and build a classification model. The Scikit-leam machine learning platform and Pandas frame are used to implement a classification algorithm. The HealthMeter™ solution generates a user-friendly and efficient web- and/or mobile-based symptom form enabled via Bootstrap (i.e., HTML5, CSS3, and JavaScript) and custom mobile iPhone and Android applications. A symptom capture form is generated based on a set of symptoms provided by DMKE actors. The analytics algorithms are invoked via PHP upon submission of symptom statuses via the web form. The analytics algorithms leverage the Pandas Python library and Scikit-Learn. Intuitive visualizations of information obtained via machine learning predictive and deep learning algorithms are provided via select widgets from the D3.js JavaScript library.

Figure 92:
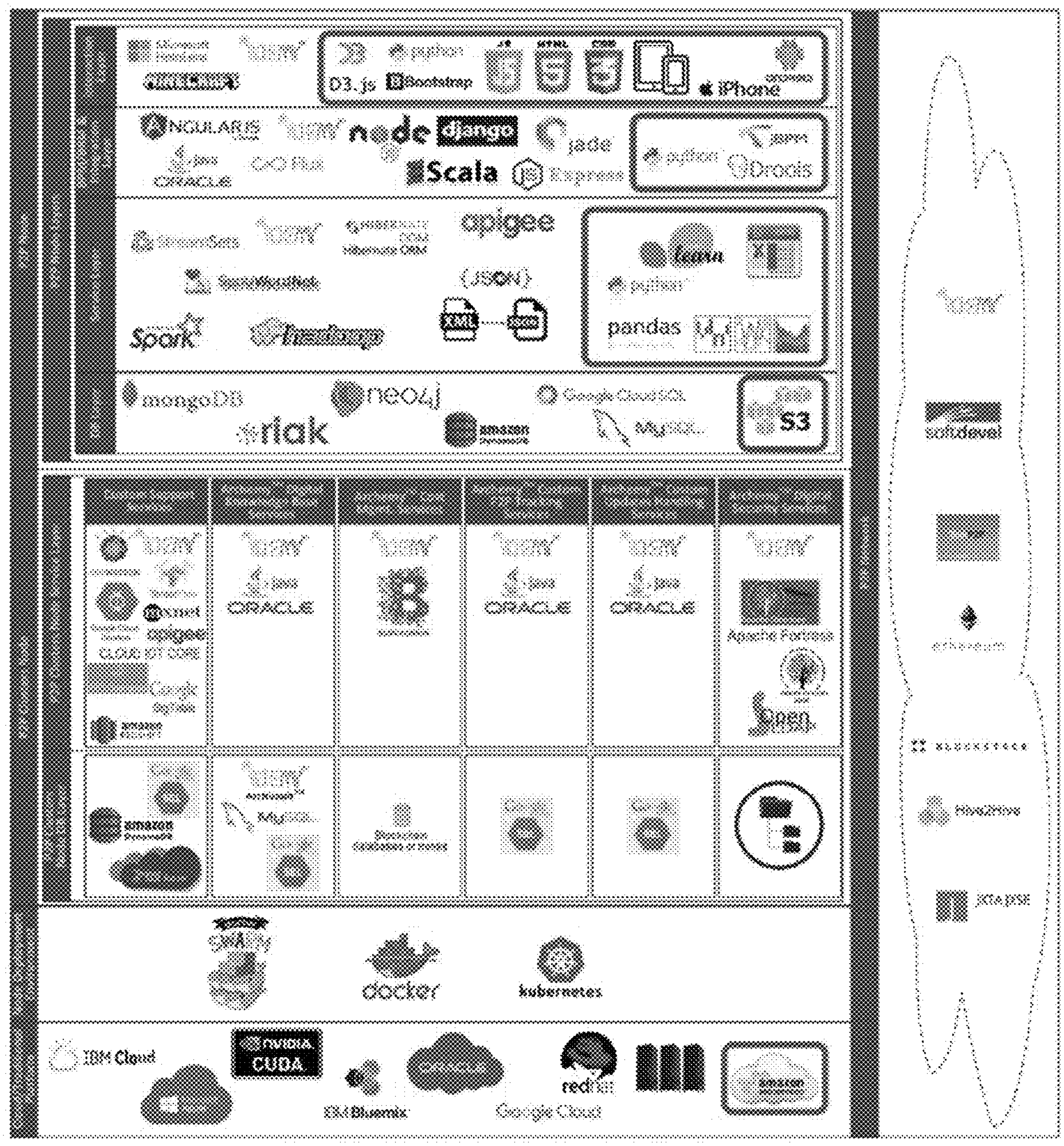
FIG. 92 is a diagram showing a HealthMeter DKMF technology stack, according to some embodiments.

FIG. 92 illustrates the specific set of technologies currently used as part of the implementation of the HealthMeter™ DKMF-based business solution. These technologies include a subset of the candidate technologies introduced earlier in Section VI and illustrated in FIG. 57 as well as new technologies (outlined via red squares in FIG. 92) used specifically by the HealthMeter™ solution. The HealthMeter™ solution has been successfully applied by a large hospital to track the status and progress of Lymphedema. Statistics show that over thirty percent of cancer patients and approximately 3.1 million of breast cancer survivors in the USA tend to develop Lymphedema because of cancer treatments. Lymphedema is a condition caused by a blockage in the lymphatic system. It is most commonly caused by lymph node removal or damage due to cancer treatment. The main symptom is swelling in an arm or leg that may be accompanied by pain or discomfort. At present, there are no surgical or medical interventions that can cure lymphedema. The HealthMeter™ solution was used in this context in combination with datasets collected for three groups of patient studies that captured various features (e.g., BMI, pre-operation and post-operation limb volume change, limb swelling, fatigue, limitation in movement). A limb volume change comparison (i.e., usually a 2-cm increase in limb girth or swelling greater than 200-mL or 10%) as well as the top twenty-five symptoms (e.g., limb weakness, seroma formation, breast swelling, chest wall swelling) were used as part of the training dataset. Limb volume change is detected using different techniques like water displacement, sequential circumference limb tape measurement, and infra-red perimeter. Data-oversampling techniques were used to improve the classification rate for the dataset. Finally, various target risk-zones were defined for the dataset using contextual research results provided by the DKME actors. The HealthMeter™ solution is able to provide information about patients' lymphedema condition based on real-time processing of symptomatic statuses via machine-learning algorithms that provide insights as to the potential future condition of new patients. This information helps scope out treatment plans and limit deterioration in condition. The HealthMeter™ solution is quite helpful as timely precision detection paired with timely and precise intervention can reduce the chance of lymphedema progressing to a chronic or severe stage.

Our focus in this section is to provide enough information to clarify the design and implementation of the HealthMeter™ DKMF-based business solution and explain how it leverages the DKME ecosystem and its associated DKMF framework.

In the next sub-section, we describe the design and implementation of Baanda™, a LegalTech solution that leverages the Archemy™ DKME and its associated DKMF.

VII.3. LawTech Baanda™ Smart Contracts DKME

Figure 93:
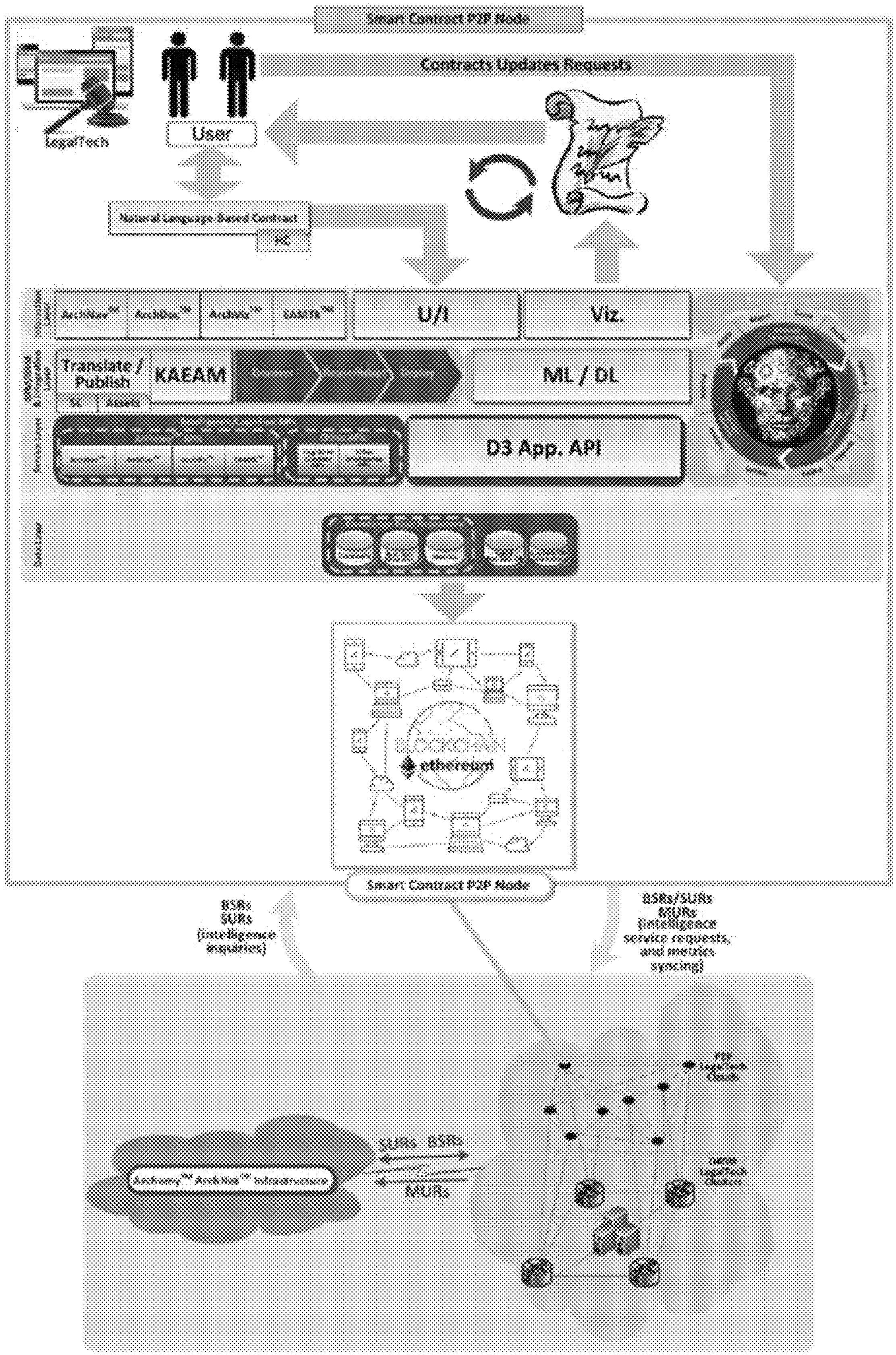
FIG. 93 is a diagram showing a smart contracts conceptual business architecture, according to some embodiments.

Forging legal contracts today requires legal knowledge and/or the intervention of costly qualified attorneys throughout the process. Smart contracts attempt to address this issue but they still require knowledge of programming and the ability to deal with underlying technological complexities (e.g., Blockchain 2.0). The Baanda™ business solution facilitates the use of Smart Contracts by implementing a translator that enables people to author and publish Smart Contracts and other digital artifacts in a natural language (NL), such as English, while leveraging accepted evolving legal taxonomies maintained via a knowledge management ecosystem. The intention is to usher in a true peer-to-peer (P2P) society where two or more people, or entities, can forge contracts between or among themselves without any (legal) knowledge or exposure to technology. Baanda's overarching vision is to enable people around the world to self-organize and collaborate without the aid of existing centralized trust bodies such as governments, banks, corporations and so on. FIG. 93 details the conceptual business architecture of the LegalTech Baanda™ DKMF-based intelligent active and/or autonomous business solution. It is an excerpt from FIG. 80 and it focuses on details specific to the Baanda™ solution.

FIG. 93 illustrates how DKME actors who need to forge contracts between or among themselves (e.g., contract parties) interact with a Baanda™ DKMF-based P2P node by negotiating contract terms based on inputs provided by the contract parties in a natural language, such as English. The Baanda™ solution captures the ongoing trail of negotiations from the various parties who may communicate remotely via video conferencing, voice over IP, or text messages. The Baanda™ solution uses machine learning and deep learning algorithms to understand the meaning of the contract terms being negotiated. It normalizes the terminology used by the various DKME actors by aligning it with an evolving core of accepted legal taxonomies maintained via a knowledge management ecosystem. The DKME actors can review the contract under development using web browsers and/or mobile devices. The resulting "humanoid" contract (HC) is then translated by Baanda™ into a Smart Contract. In the process, ancillary components are generated to make it possible to publish the various generated assets into a Blockchain 2.0 Web3 decentralized application (DApp). The Baanda™ DApp has its backend code running on the Ethereum decentralized peer-to-peer network. (rather than on traditional centralized servers). The Baanda's DApp frontend code and user interfaces are operated via a DKMF P2P node that make calls to the DApp backend. Once published, the Smart Contract becomes immutable within the Blockchain 2.0 P2P network and the Ethereum DApp is used to handle contract updates and chain contract revisions to the original contract. Baanda's mobile service is accessible via mobile devices with privileged access management that can be securely used in any environment. The Baanda™ solution provides a convenient, and economical way to create contracts between DKME actors. It can be used by anyone and does not require technology knowledge or the use of intermediaries. Nevertheless, the contracts that are generated follow accepted legal practices and are monitored and updated (via events built into the Ethereum contract implementation) as needed during the lifecycle of the agreement stated in the contract. Additional, possible contract extensions may be learned and suggested by Baanda™ as a result of ongoing cognitive analytics. The Baanda™ solution handles the "why", "what", and "how" that enable parties to author contracts in a natural language and transform them into formal code, compile them as necessary and inject them into the right Blockchain 2.0 P2P nodes. The Baanda™ solution is user-friendly, secure, and efficient, and it can be used by any age group. The specificity of the terms used in the contract simply depends, as it does in any legal contract, on the amount of time invested by the parties in developing the contract and negotiating. The legal quality of the Smart Contract purely relies on the core of accepted legal taxonomies and ecosystem that Baanda™ leverages to perform internal machine learning analytics via the DKMF ArchSSV™ cluster. Furthermore, the Baanda™ translator keeps learning and evolving in real-time as it services new contract needs or contract updates and benefits from collective inputs being gathered from the larger DKME community and marketplace that Baanda™ connects to.

The Baanda™ solution leverages built-in functionality provided by the Archemy™ DKMF framework to implement a dynamic and connected environment to create and manage and extensible set of multi-party smart contracts that are immutable and safeguarded using the Blockchain 2.0 Ethereum platform. Some of the functionalities of the DKMF shown in FIG. 93 are greyed out since they are not currently used by the Baanda™ business solution. The Baanda™ solution implements KAEAM knowledge management processes that are specific to the legal contract negotiation context by leveraging the DKMF P2P node's BPM capabilities. The KAEAM approach is discussed in detail in Section III.2. The Baanda™ solution also leverages the DKMF node manager built-in processes and its underlying taxonomy, business solutions, and metrics management activities. As noted earlier, some of these activities leverage machine learning (ML) and specifically deep learning (DL), and reinforcement learning (RL). The built-in DKMF functionality makes it possible for the Baanda™ solution to adapt its functionality to handle ongoing changes in the legal focus of the contracts and/or the set of legal terms that come up during contracts negotiations, and reconfigure its analytics processing algorithms and Smart Contract generation steps accordingly. In addition to the built-in DKMF capabilities, the Baanda™ solution provides its own BPM-driven process and related activities to facilitate the capture of the ongoing trail of negotiations, the analysis, normalization, and translation of the humanoid contract into a Smart Contract, the iterative review of the humanoid contract by the DMKE actors, and the publishing of the contract to the Blockchain 2.0 Ethereum platform.

Figure 94:
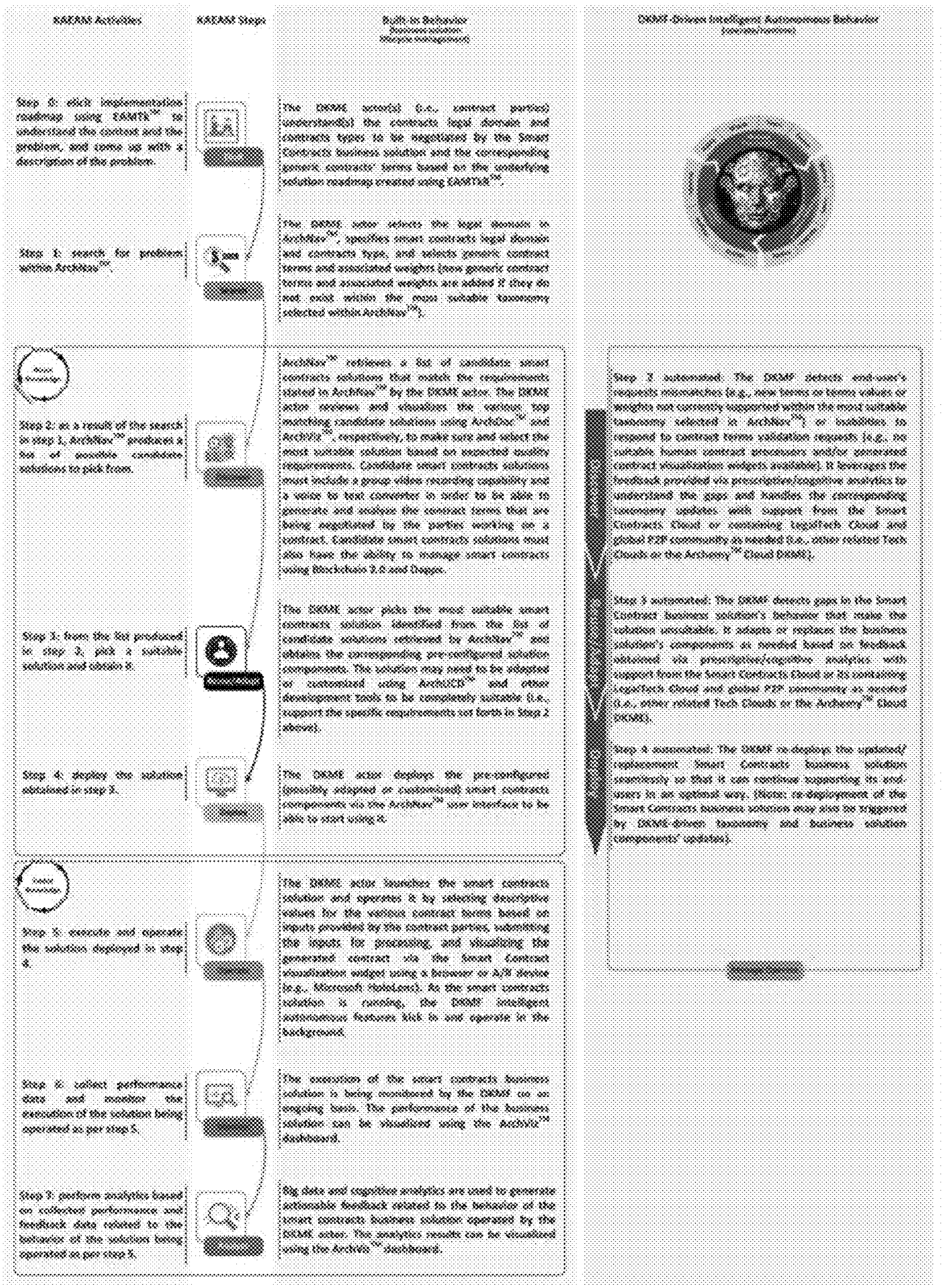
FIG. 94 is a diagram showing a smart contracts DKMF storyboard, according to some embodiments.

FIG. 94 uses a storyboard to provide more details about the Smart Contract management context-specific implementation of the KAEAM processes within the Baanda™ DKMF-based P2P node shown in FIG. 93. It first summarizes the KAEAM activities and steps within the left two columns respectively, as previously defined in section III.2 and illustrated in FIGS. 12 and 13. These two columns illustrate how KAEAM manages the reuse of business problems and solutions knowledge to help evolve business solutions and make them more available and suitable to business users. The two columns on the right of FIG. 94 focus on describing the behavior that is specific to the Baanda™ DKMF-based business solution. The built-in behavior column outlines the expected outcome of the various KAEAM steps as they are applied using several Archemy™ tools (e.g., EAMTk™, ArchNav™, ArchDoc™, and ArchViz™) available via the Baanda™ P2P node user interface. These steps select appropriate legal contracts' taxonomies and configure the internal analytics algorithms to enable the forging of appropriate legal terminology by the parties throughout contracts negotiations. The intelligent active and/or autonomous behavior provided by the DKMF automates the execution of KAEAM's steps 2, 3, and 4 as part of the DKMF manage function, as explained earlier in Section III.2 and IV.1 and illustrated in FIGS. 13, 16 and 17. These automated steps aim at optimizing the availability and suitability of taxonomies and business solutions' components that are used to address end-users' requests. As noted earlier, this built-in intelligent active and/or autonomous DKMF functionality makes it possible for the Baanda™ solution to adapt its functionality to handle ongoing changes in legal domains and legal terms that arise during contracts negotiations and re-configure its analytics processing algorithms accordingly.

Figure 95:
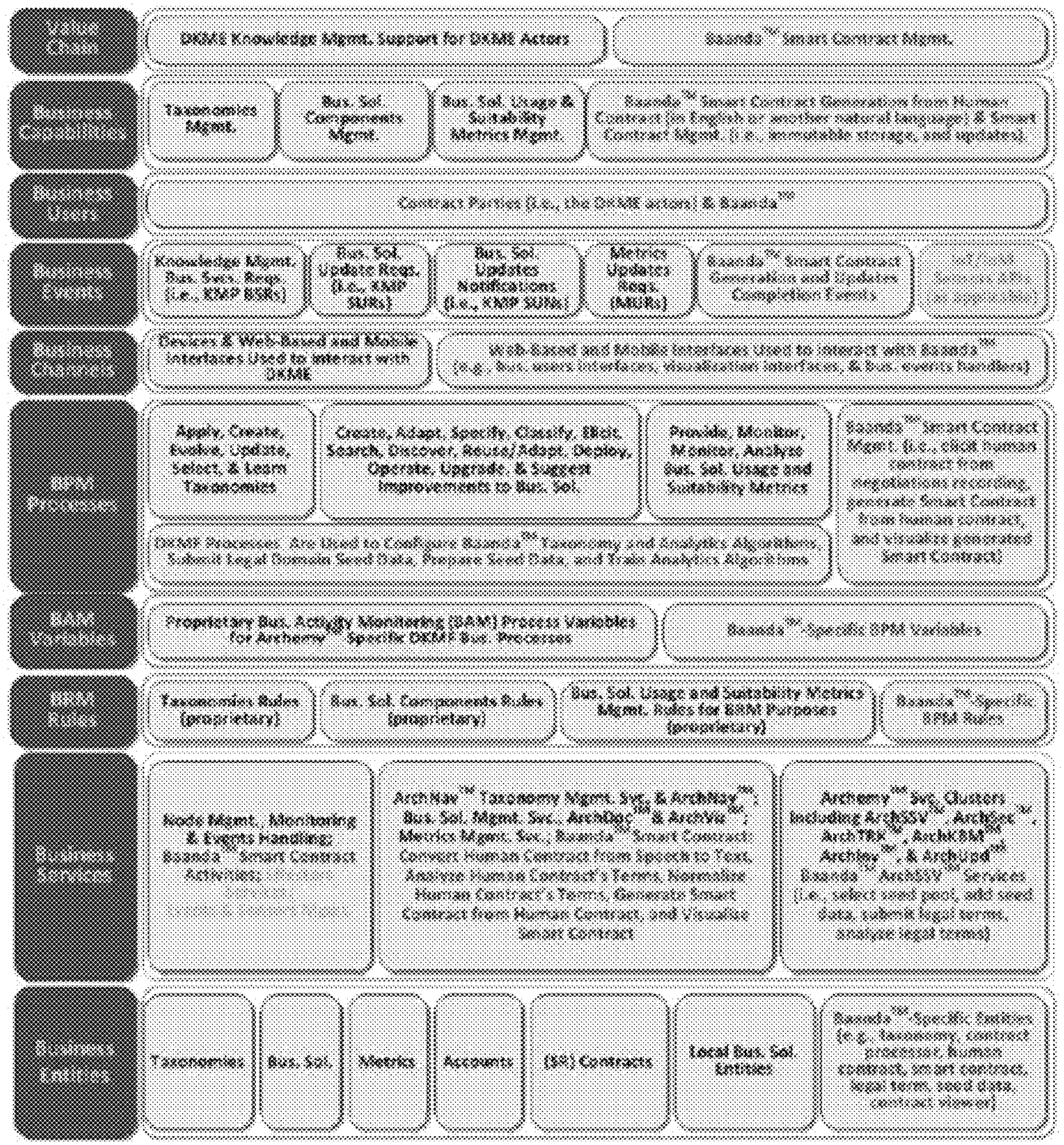
FIG. 95 is a diagram showing a smart contract DKMF business architecture, according to some embodiments.

FIG. 95 illustrates the business architecture elements that are supported by the Baanda™ business solution. It is based on the framework introduced earlier in Section III.2 and the DKMF business architecture shown in FIG. 15. In this case, the DKMF business architecture framework elements that are not provided via the Baanda™ DKMF-based business solution have been greyed out.

Figure 96:
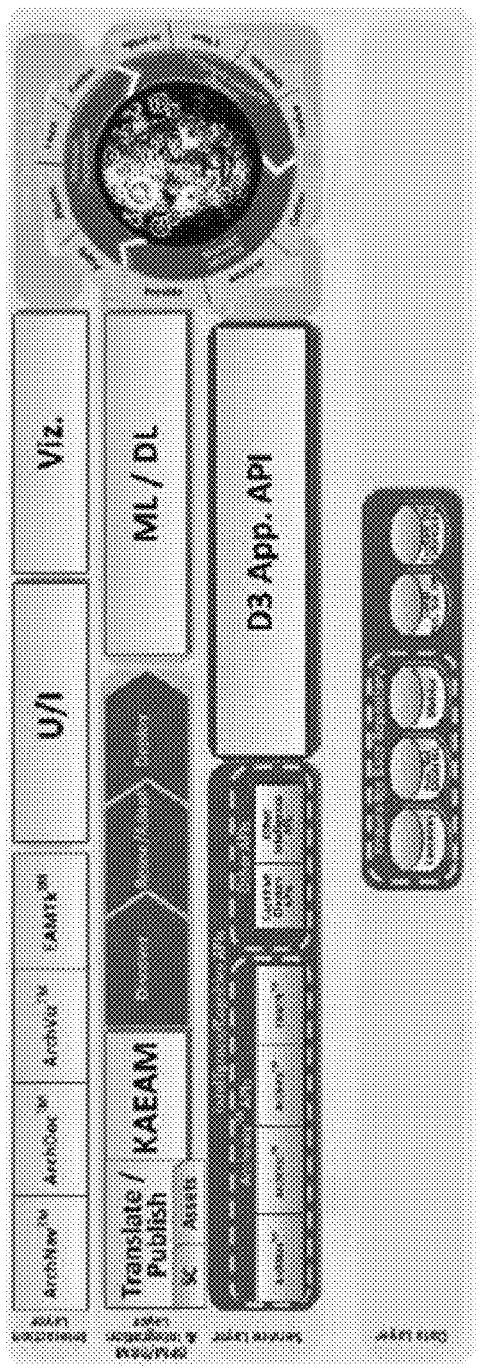
FIG. 96 is a diagram showing smart contracts P2P node logical architecture, according to some embodiments.

FIG. 96 illustrates the Baanda™ P2P node logical architecture. It is based on the DKMF P2P node logical architecture introduced in Part IV.2 and shown in FIG. 28. However, the node logical architecture has been augmented to include functionalities that are specific to the Baanda™ DKMF-based business solution as discussed earlier in this section.

Figure 97:
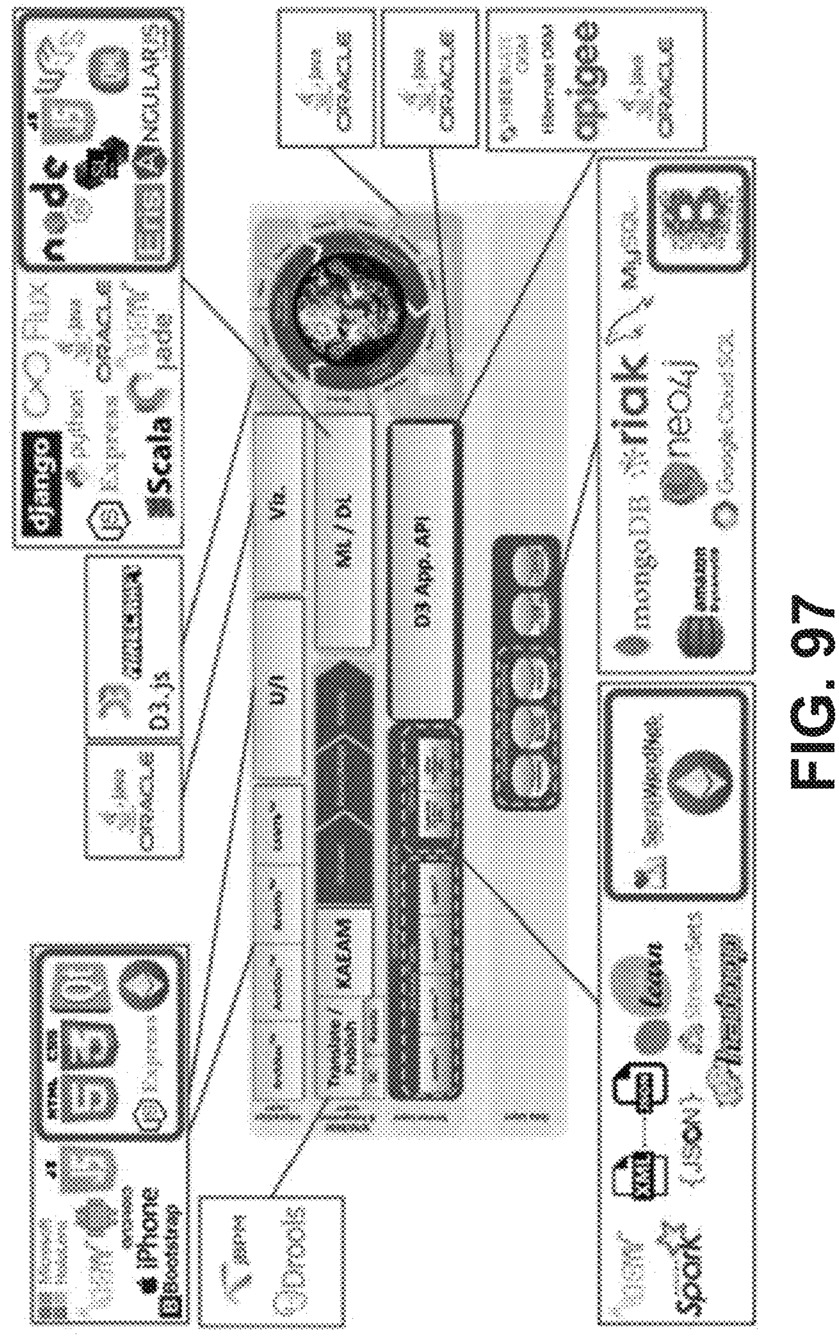
FIG. 97 is a diagram showing a smart contracts P2P node implementation stack, according to some embodiments.

FIG. 97 illustrates the specific technologies that are currently used as part of the implementation of Baanda™ P2P nodes. These technologies include a subset of the candidate technologies introduced earlier in Section VI and illustrated in FIG. 60 as well as new technologies (outlined in red in FIG. 97) used specifically by the Baanda™ solution. The Baanda™ solution currently leverages the Ethereum network and stores Smart Contracts in Blockchain 2.0. It uses the "geth" Ethereum client software to publish Smart Contract into the Blockchain 2.0 Ethereum platform. WordNet and other DKMF machine learning technologies are used to analyze DMKE actors' terminology and normalize it to abide to accepted evolving legal taxonomies. jBPM, Drools, Angular.js and Node.js are used within the BPM and integration layer along with the web3.js and crisis libraries. Core programming in that layer involves JavaScript and QML to facilitate the generation of a Smart Contract in the Blockchain 2.0 Solidity language. The Baanda™ solutions provides a user-friendly and efficient web- and/or mobile-based user interface to review contracts that is enabled via Bootstrap (i.e., HTML5, CSS3, and JavaScript) and custom mobile iPhone and Android applications. The Mist Ethereum GUI is also used to interact visually with the Ethereum DApp. Other technologies used in the interaction layer include QTQuick and Express.js. As part of its development environment, the Baanda™ solution uses the Truffle framework and Eris sol-unit for testing.

Figure 98:
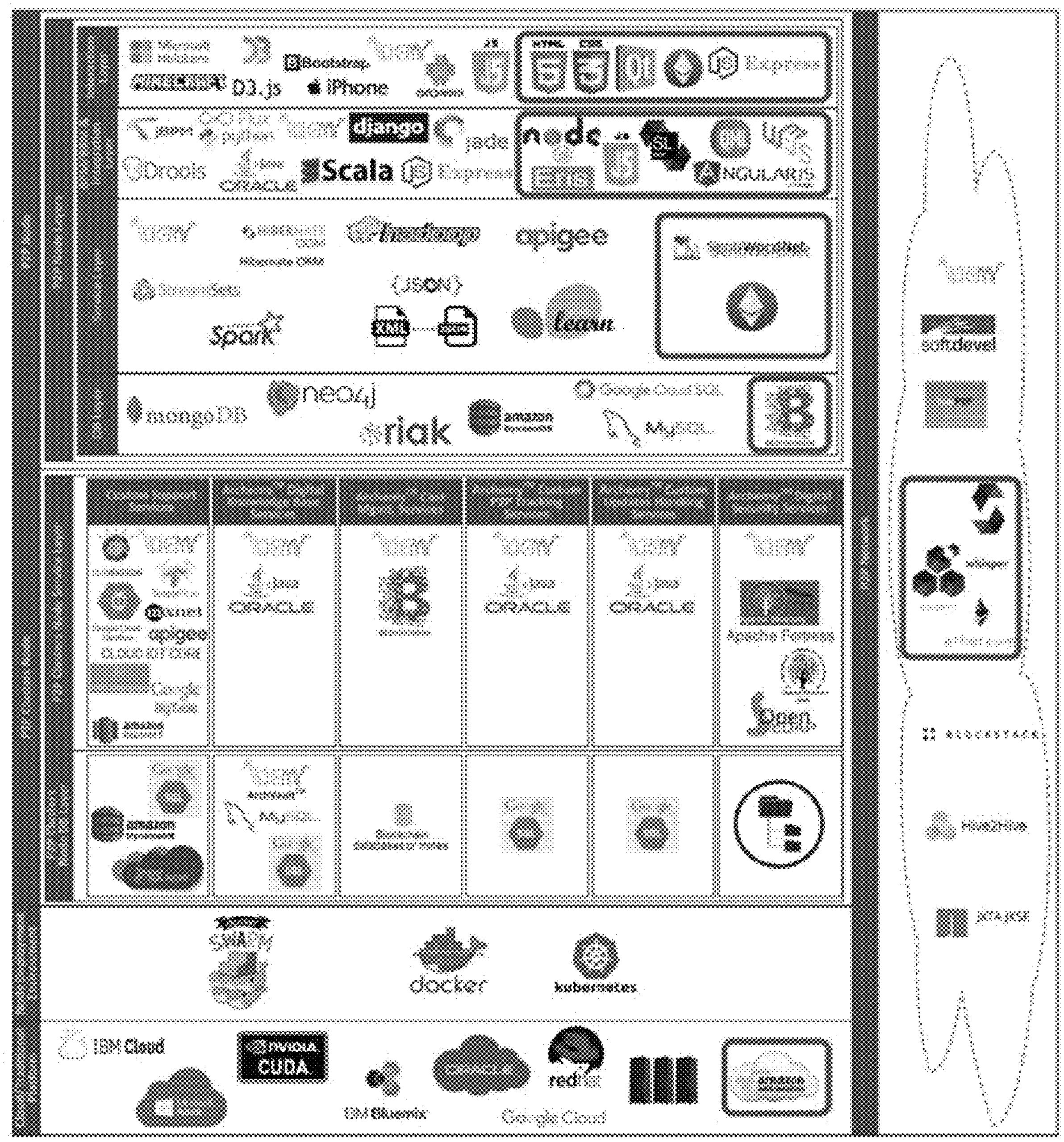
FIG. 98 is a diagram showing a smart contracts DKMF technology stack, according to some embodiments.

FIG. 98 illustrates the specific set of technologies currently used as part of the implementation of the HealthMeter™ DKMF-based business solution. These technologies include a subset of the candidate technologies introduced earlier in Section VI and illustrated in FIG. 57 as well as new technologies (outlined in red in FIG. 98) used specifically by the Baanda™ solution.

To date, the Baanda™ solution has been successfully applied to assist with micro funding and enable a group of women to start a cooperative local business in Bangladesh. A co-housing group in Barcelona has used Baanda™ to forge an immutable and yet, amendable agreement. Baanda™ has enabled crowdfunding for an aspiring young baker in Kenya. A startup in Los Angeles uses Baanda™ to create a contract among five co-founders.

As noted earlier, it is not our goal in this section to delve into the implementation details of all the Archemy™ business solutions. Detailed specifications and test suites are available separately via Archemy™ and its affiliates under intellectual property agreements. Therefore, our focus in this section is to provide enough information to clarify the design and implementation of the Baanda™ DKMF-based business solution and explain how it leverages the DKME ecosystem and its associated DKMF framework.

In the next sub-section, we describe the design and implementation of Sentilizer™, a FinTech solution that leverages the Archemy™ DKME and its associated DKMF.

VII.4. FinTech Sentilizer™ DKME

As social media became a platform where many people share their opinions, banking and financial services companies tend to be interested in understanding how these opinions relate to the financial industry and motivate the creation of new competitive solutions for their customers. Some of these companies may also be interested in using social platforms internally to understand the opinions of their employees. In that case, they expect that by analyzing the posts and receiving an instant feedback from employees, management can make better decisions and improve the cohesion among employees. The Sentilizer™ business solution supports this endeavor and provides a reusable framework for real-time analytics of social datasets within (or outside) the enterprise. When used within a corporate environment, Sentilizer™ can integrate with enterprise social platforms, subscribe to internal and external data feeds, and help evaluate how people as well as different business and enterprise systems need to adjust based on the results of real-time analysis of employee's social sentiment. To achieve this, Sentilizer™ publishes events/news onto an existing internal messaging channel (e.g., Enterprise Service Bus or ESB) where subscriber(s) can consume, process, and visualize analytics results to help better understand people's opinions. Sentilizer™ can also be used to analyze people sentiment from Internet sources.

Figure 99:
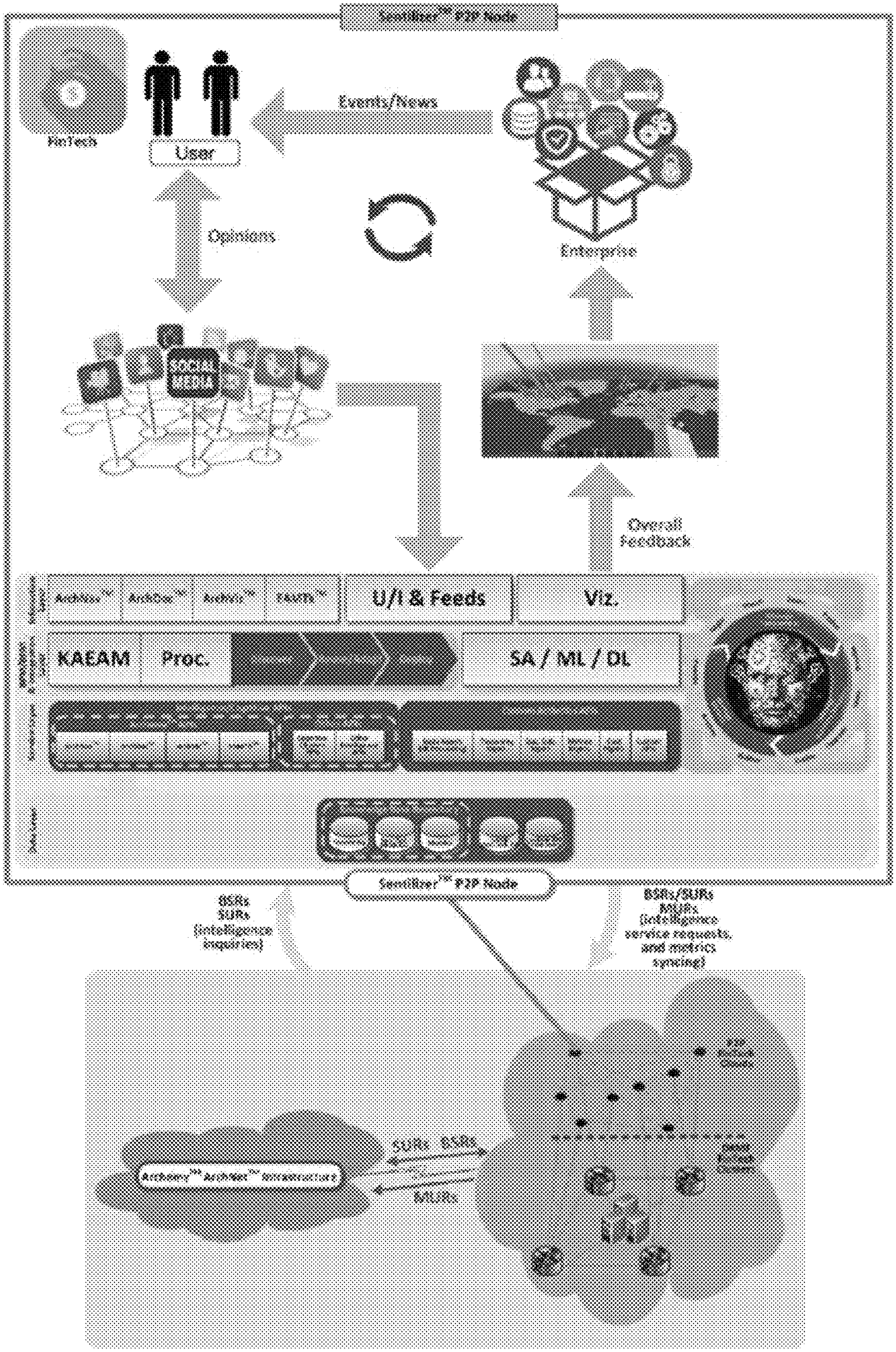
FIG. 99 is a diagram showing a Sentilizer conceptual business architecture, according to some embodiments.

The financial services' Sentilizer™ solution provides a dynamic and connected environment to manage sentiment generated in reaction to events of news that may have a financial impact. The environment can be deployed within an enterprise to monitor employee's sentiment or it may be used to analyze broad sentiment on the market. While the environment was developed for the financial industry, it may also be used in other industries. FIG. 99 details the conceptual business architecture of the FinTech Sentilizer™ DKMF-based intelligent active and/or autonomous business solution. It is an excerpt from FIG. 80 and it focuses on details specific to the Sentilizer™ solution.

FIG. 99 illustrates how banking and financial services DKME actors (e.g., financial institution staff) interact with a Sentilizer™ DKMF-based P2P node by monitoring social sentiment prescriptive feedback. This feedback results from opinions (i.e., social sentiment) expressed by employees in response to events or news postings on enterprise social platforms. The Sentilizer™ solution collects sentiment data in real-time from various sources, performs sentiment analysis on it to classify the sentiment into five categories of opinions (i.e., neutral, positive, very positive, negative and very negative). It then outputs the results of the analysis for ongoing visualization or use in enterprise systems. Sentilizer™ uses machine learning and deep learning algorithms as needed to gain insight as to what decision management should make and prescribe adaptation to business and enterprise systems to address the collective sentiment of employees on certain topics that were posted as events or news. The Sentilizer™ DKMF-based business solution is a real-time, web-based and mobile-enabled service, which provides information about people sentiments based on the opinions they posted on social media platforms. The mobile service is accessible via mobile devices with privileged access management that can be used securely within a corporate environment. The resulting solution facilitate management decisions as it pertain to improving employees' satisfaction and collaboration. It is user-friendly, secure, and efficient, and it can be used by any age group. The adequacy of the feedback provided depends on the amount and quality of the sentiment information used to perform internal machine learning analytics. Ongoing collection and processing of sentiment data is performed behind the scenes via the Sentilizer™ DKMF ArchSSV™ cluster.

The Sentilizer™ solution leverages built-in functionality provided by the Archemy™ DKMF framework to implement a dynamic and connected environment to manage sentiment generated in reaction to events of news that may have financial impact. As mentioned earlier, the environment can be deployed within an enterprise to monitor employee's sentiment or it may be used to analyze broad sentiment on the market. While the environment was developed for the financial industry, it may also be used in other industries. Some of the functionalities of the DKMF illustrated in FIG. 99 are greyed out since they are not currently used by the Sentilizer™ business solution. The Sentilizer™ solution implements KAEAM knowledge management processes that are specific to sentiment analysis context by leveraging the DKMF P2P node's BPM capabilities. The KAEAM approach is discussed in detail in Section III.2. The Sentilizer™ solution also leverages the DKMF node manager built-in processes and its underlying taxonomy, business solutions, and metrics management activities. As noted earlier, some of these activities leverage machine learning (ML) and specifically deep learning (DL), and reinforcement learning (RL). The built-in DKMF functionality makes it possible for Sentilizer™ to adapt its functionality to handle gaps in the ability of the solution to understand or perform certain types of sentiment analysis and/or provide suitable prescriptive feedback. In those cases, Sentilizer™ is able to re-configure its analytics processing algorithms and visualization widgets accordingly. In addition to the built-in DKMF capabilities, the Sentilizer™ solution provides its own BPM-driven process and related activities to facilitate the collection, and analysis of opinions, visualize sentiment analysis results, and prescribe management decisions and changes to business and/or enterprise systems.

Figure 100:
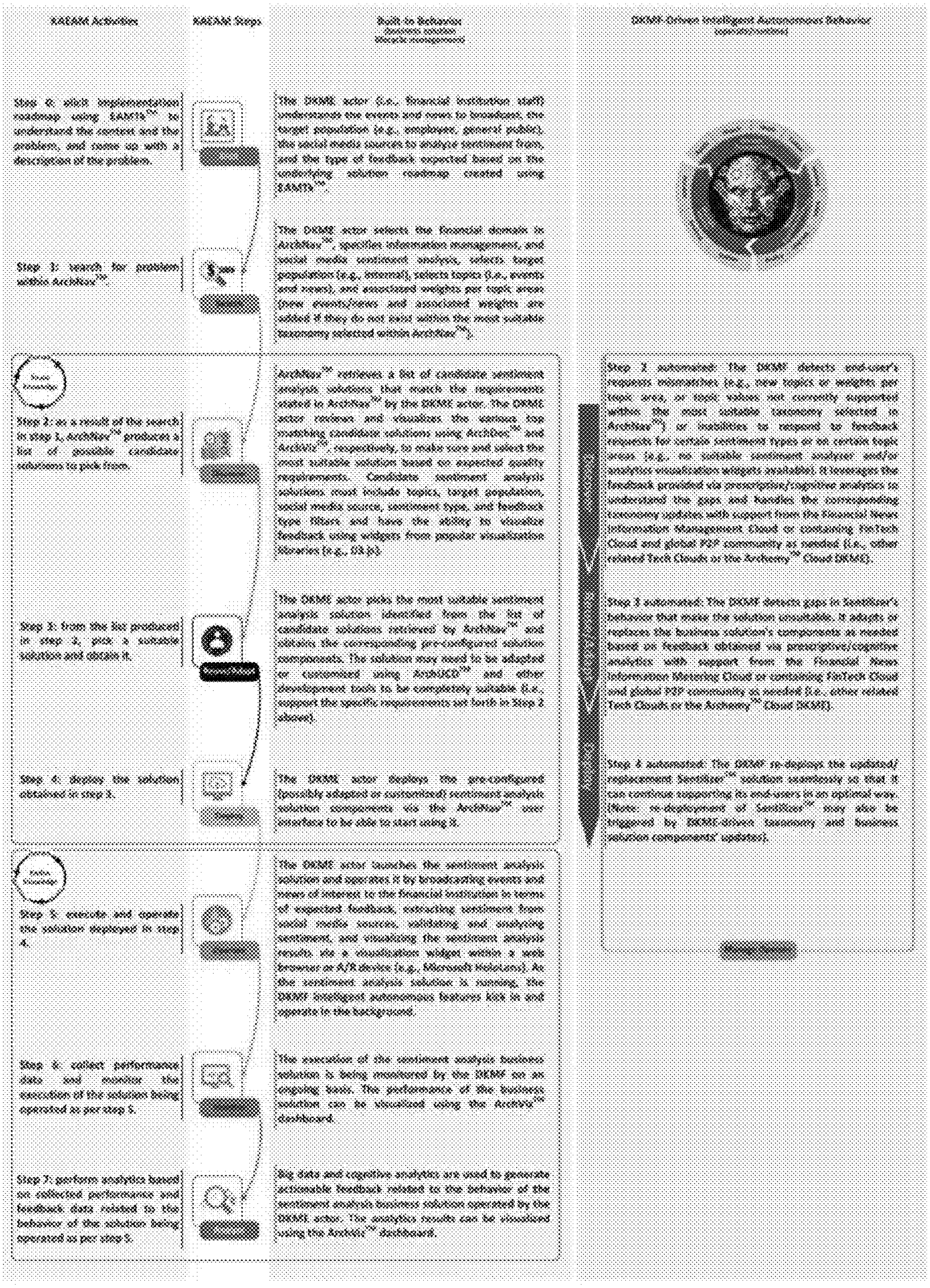
FIG. 100 is a diagram showing a Sentilizer DKMF storyboard, according to some embodiments.

FIG. 100 uses a storyboard to provide more details about the sentiment analysis context-specific implementation of the KAEAM processes within the Sentilizer™ DKMF-based P2P node shown in FIG. 99. It first summarizes the KAEAM activities and steps within the left two columns respectively, as previously defined in section III.2 and illustrated in FIGS. 12 and 13. These two columns illustrate how KAEAM manages the reuse of business problems and solutions knowledge to help evolve business solutions and make them more available and suitable to business users. The two columns on the right of FIG. 100 focus on describing the behavior that is specific to the Sentilizer™ DKMF-based business solution. The built-in behavior column outlines the expected outcome of the various KAEAM steps as they are applied using several Archemy™ tools (e.g., EAMTk™, ArchNav™, ArchDoc™, and ArchViz™) available via the Sentilizer™ P2P node user interface. These steps select appropriate sentiment and business/enterprise systems management corporate taxonomies and configure the internal analytics algorithms and visualization widgets to enable specific prescriptive feedback in terms of suggested management decisions and business or enterprise systems adaptations. The intelligent active and/or autonomous behavior provided by the DKMF automates the execution of KAEAM's steps 2, 3, and 4 as part of the DKMF manage process, as explained earlier in Section III.2 and IV.1 and illustrated in FIGS. 13, 16 and 17. These automated steps aim at optimizing the availability and suitability of taxonomies and business solutions' components that are used to address end-users' requests. As noted earlier, this built-in intelligent active and/or autonomous DKMF functionality makes it possible for the Sentilizer™ solution to adapt its functionality to handle gaps in the ability of the solution to understand or perform certain types of sentiment analysis and/or provide suitable prescriptive feedback. In those cases, the Sentilizer™ solution re-configures its analytics processing algorithms and visualization widgets accordingly.

Figure 101:
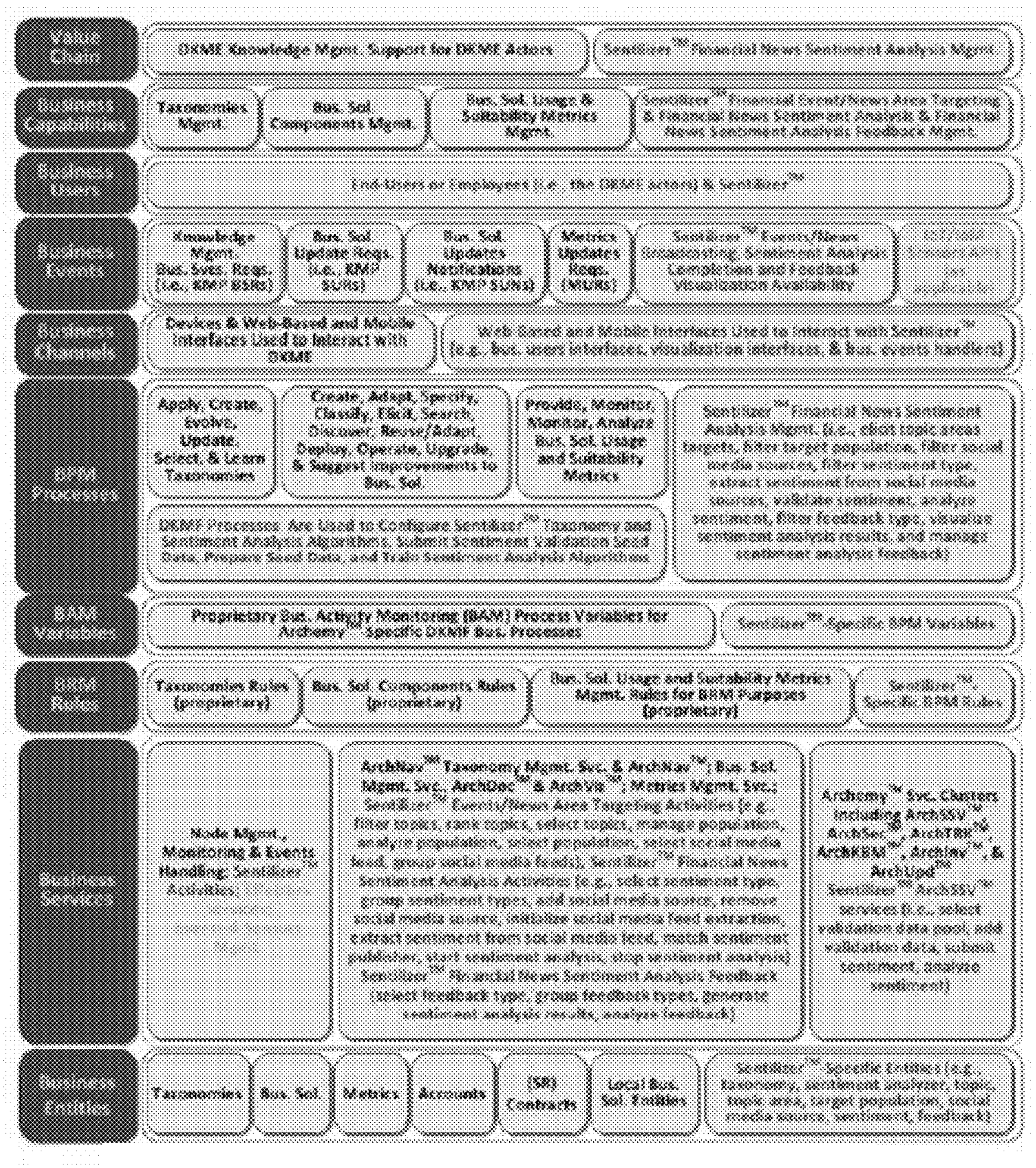
FIG. 101 is a diagram showing a Sentilizer DKMF business architecture, according to some embodiments.

FIG. 101 illustrates the business architecture elements that are supported by the Sentilizer™ business solution. It is based on the framework introduced earlier in Section III.2 and the DKMF business architecture shown in FIG. 15. In this case, the DKMF business architecture framework elements that are not provided via the Sentilizer™ DKMF-based business solution have been greyed out.

Figure 102:
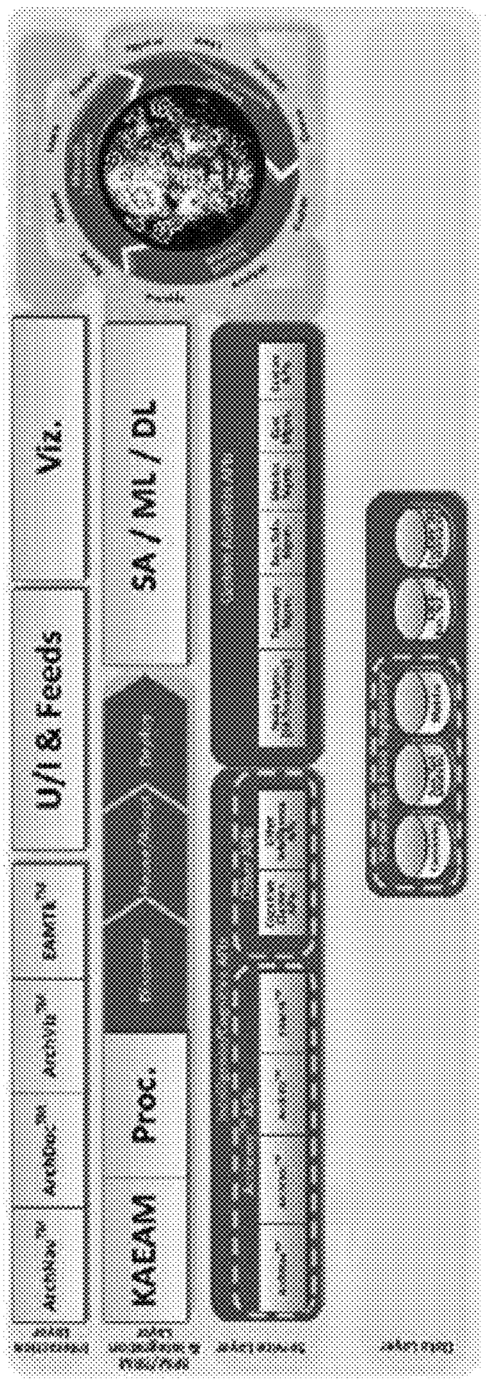
FIG. 102 is a diagram showing a Sentilizer P2P node logical architecture, according to some embodiments.

FIG. 102 illustrates the Sentilizer™ P2P node logical architecture. It is based on the DKMF P2P node logical architecture introduced in Part IV.2 and shown in FIG. 28. However, the node logical architecture has been augmented to include functionalities that are specific to the Sentilizer™ DKMF-based business solution as discussed earlier in this section.

Figure 103:
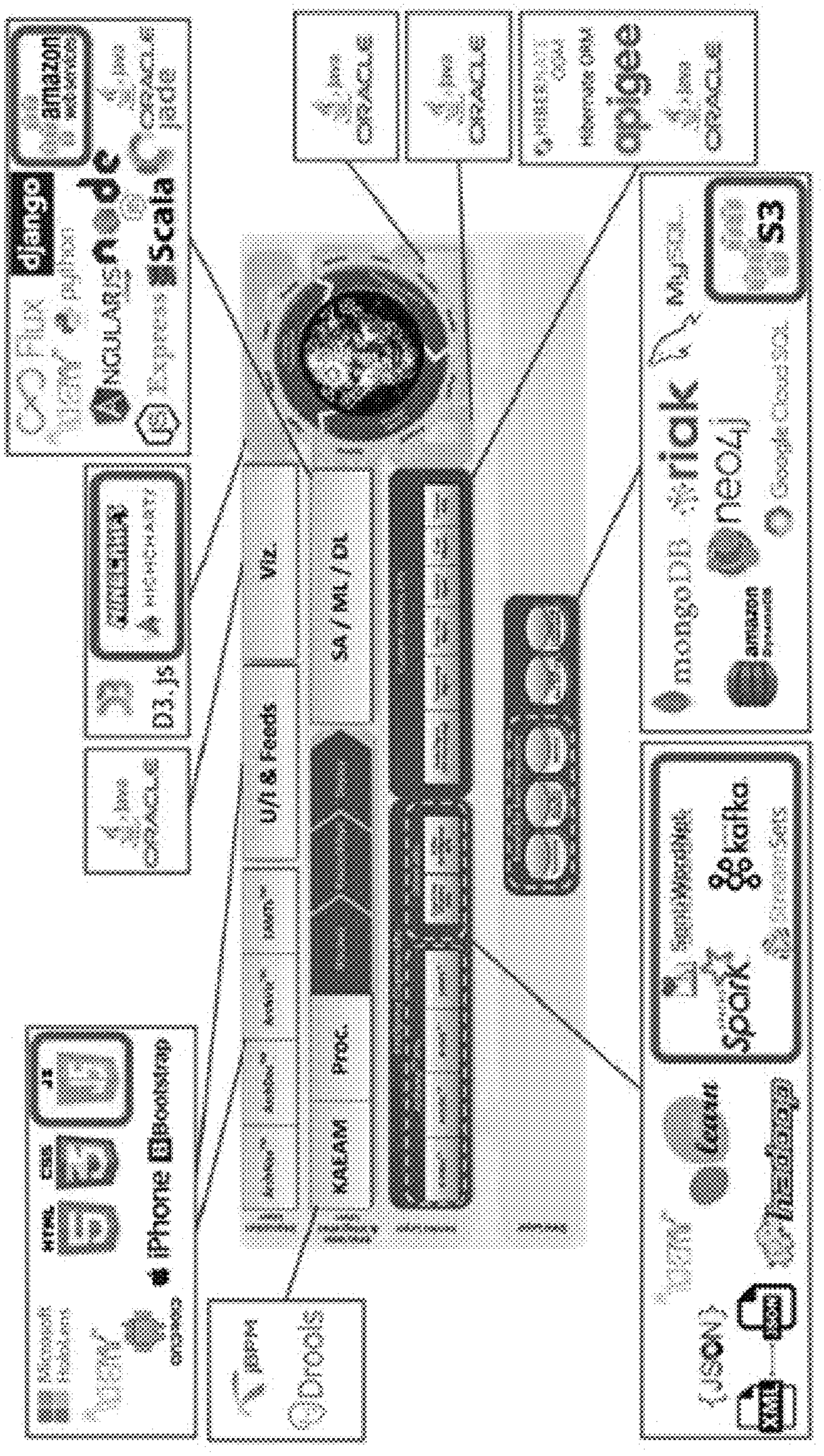
FIG. 103 is a diagram showing a Sentilizer P2P node implementation stack, according to some embodiments.

FIG. 103 illustrates the specific technologies that are currently used as part of the implementation of Sentilizer™ P2P nodes. These technologies include a subset of the candidate technologies introduced earlier in Section VI and illustrated in FIG. 60 as well as new technologies (outlined in red in FIG. 103) used specifically by the Sentilizer™ solution. The Sentilizer™ solution currently leverages the various technologies used to operate the Archemy™ DKMF framework. Sentilizer™ P2P nodes run on the AWS EC2 platform and use the Amazon S3 storage service as their local database. The DKMF BPM platform facilitates the integration with enterprise ESBs.

Figure 104:
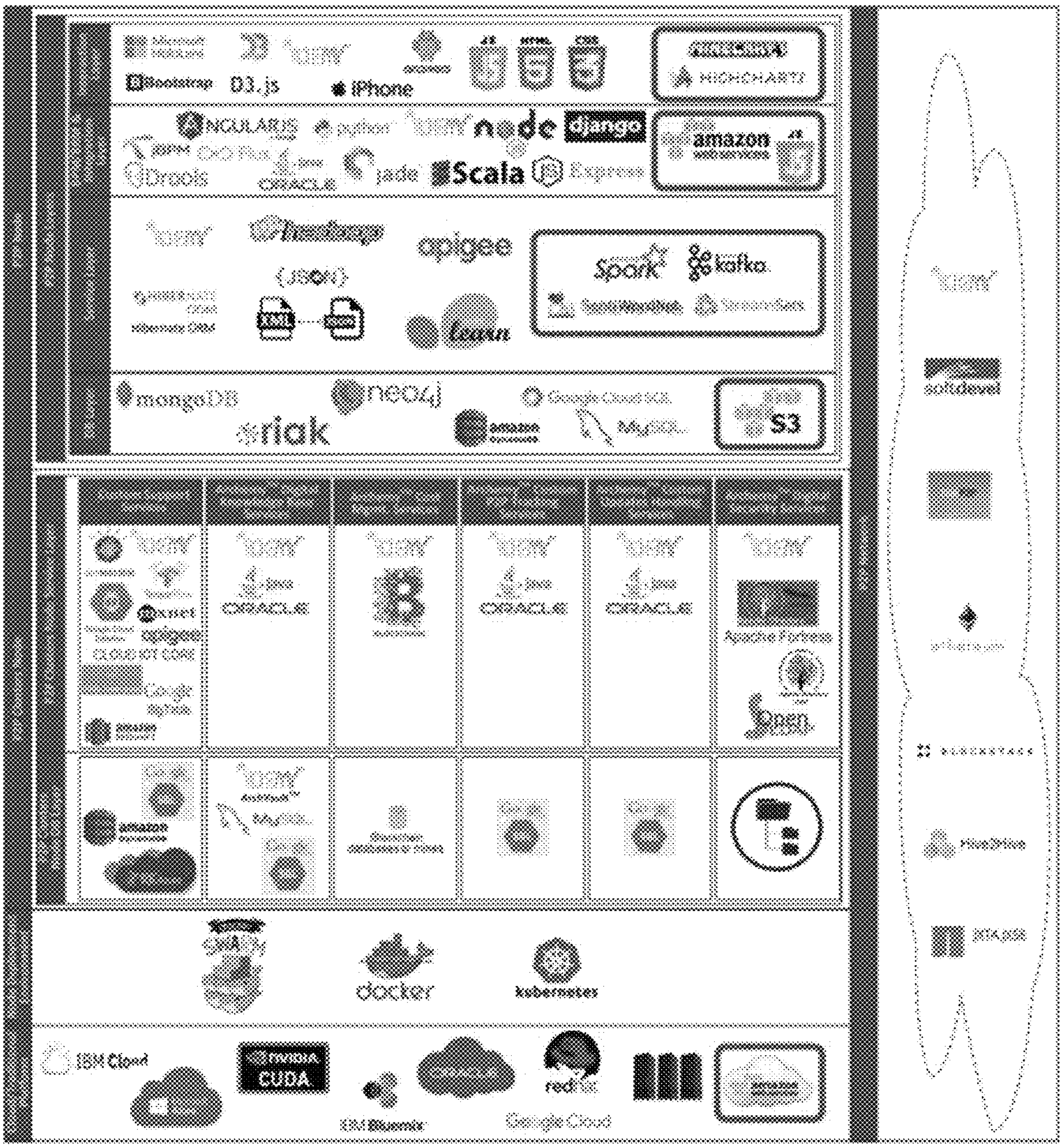
FIG. 104 is a diagram showing a Sentilizer DKMF technology stack, according to some embodiments.

Sentilizer™ uses one StreamSets pipeline to collect data from the data sources (e.g., Twitter API) and send it to Spark for analysis. The second StreamSets pipeline is used to receive data from Spark Streaming and direct it to visualization tools or storage. Collected data flows through ETL filters to remove redundant fields and validate the remaining fields. Kafka is used in the first pipeline to handle data transfers among nodes in the cluster. Different data sources can use different topic names to distinguish themselves from others. Kafka is also used to consume data from Spark Streaming in the second pipeline and post-ETL filtering is applied to remove (i.e., clean) additional fields from Kafka JSON objects and validate remaining fields. Minecraft is used as the visualization destination and AWS S3 is used as the storage destination. Sentiment analysis is performed on Kafka JSON objects by executing sentiment scoring and location parsing. For sentiment scoring, a tweet is first cleaned by removing punctuations, and digits, and then split into words. These words are looked up in the SentiWordNet database and each word is assigned a sentiment score using five different sentiment levels as mentioned earlier. The tweet is then categorized into one sentiment level by summing the scores. Location parsing is first handled by searching through geo-location information databases. Finally, the sentiment level and the geo-location pair are added to the Kafka JSON object. Records are sent from Kafka to the Minecraft Kafka consumer that maps the sentiment level to a block color (e.g., yellow block for positive opinion and grey block for negative opinion) and transforms the latitude and longitude into a coordinate in a Minecraft map, and it then drops the block at the coordinate. JavaScript and the AWS SDK for JavaScript library are used to visualize data stored in S3 using the Highcharts library. The charts are refreshed regularly to plot the latest data. Finally, Sentilizer's combined use of traditional sentiment analysis along cognitive analytics addresses some of the typical accuracy issues faced in traditional sentiment analysis FIG. 104 illustrates the specific set of technologies currently used as part of the implementation of the Sentilizer™ DKMF-based business solution. These technologies include a subset of the candidate technologies introduced earlier in Section VI and illustrated in FIG. 57 as well as new technologies (outlined in red in FIG. 104) used specifically by the Sentilizer™ solution.

The Sentilizer™ solution has been successfully applied by a large bank to analyze customers and employees' real-time sentiment generated in reaction to events and news published on social media platforms. The solution helps the bank improve its business in three ways. First, it helps keep up with trends and make fast related decisions by supplying insight and prescriptive feedback pertaining to competitive offerings, and promotions. Sentiment analysis provides valuable information pertaining to customer trends and faster decisions can be made as a result to better suit customers. Second, it helps the bank detect errors made within the organization instantly. In general, real-time insight into errors helps companies react quickly to mitigate the effects of an operational problem. This can keep an enterprise from falling behind or failing completely and it can save customers from having to stop using a company's products. Third, the bank is able to immediately identify new competitor's strategies. In general, real-time big data and cognitive analytics allows companies to stay one step ahead of their competition or get notified the moment their competitors are changing strategies or lowering their prices for example.

As noted earlier, it is not our goal in this section to delve into the implementation details of all the Archemy™ business solutions. Detailed specifications and test suites are available separately via Archemy™ and its affiliates under intellectual property agreements. Therefore, our focus in this section is to provide enough information to clarify the design and implementation of the Sentilizer™ DKMF-based business solution and explain how it leverages the DKME ecosystem and its associated DKMF framework.

In the next sub-section, we describe the design and implementation of iConcierge™, a CGTech digital concierge solution that leverages the Archemy™ DKME and its associated DKMF.

VII.5. TechTech iConcierge™ DKME

Figure 105:
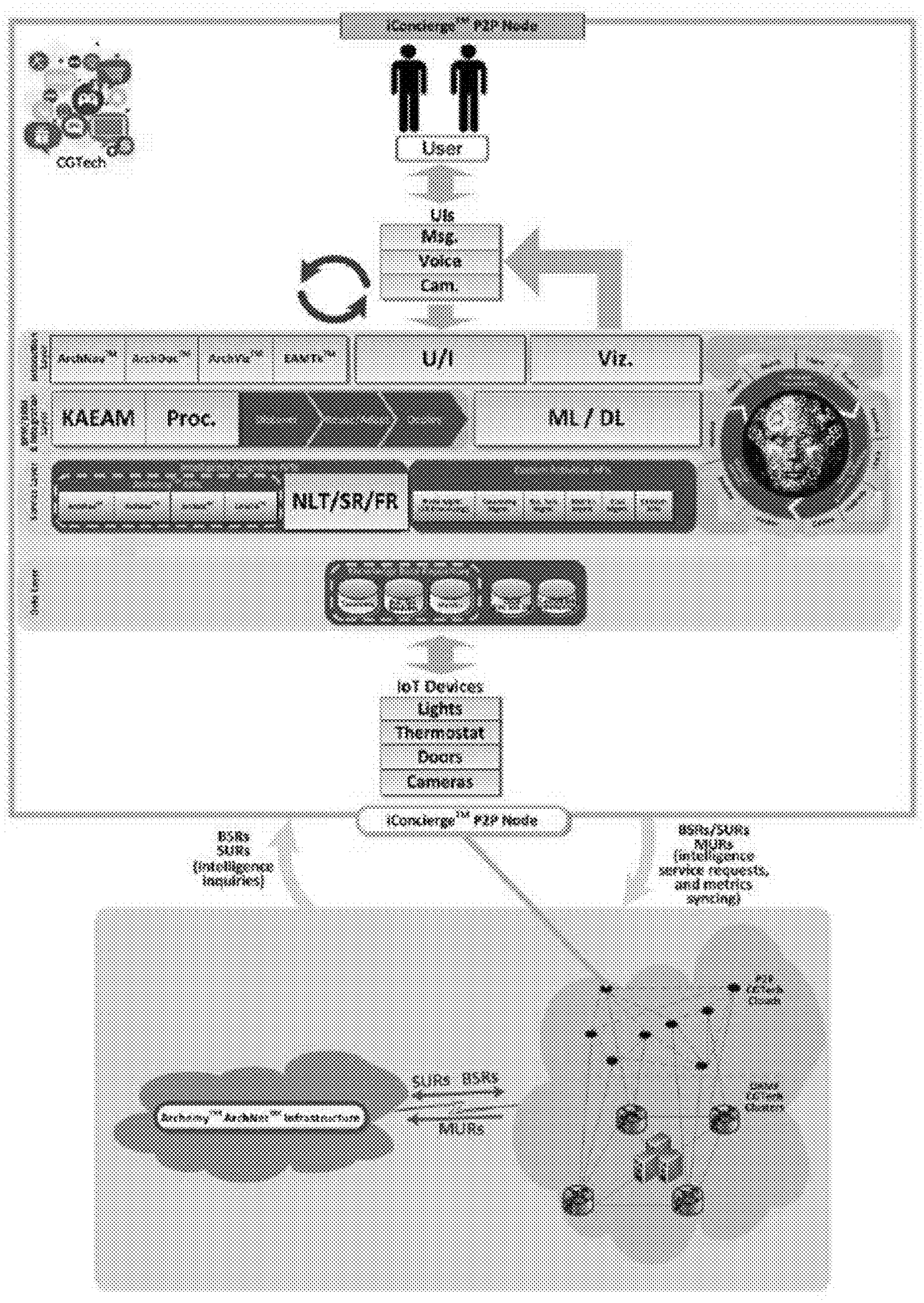
FIG. 105 is a diagram showing an iConcierge conceptual business architecture, according to some embodiments.

Due to the lack of standards and integration methods for information capture and monitoring devices, it is difficult to streamline the creation of integrated facilities monitoring and management solutions. This comes to the delight of integrated solutions providers who charge a premium to develop custom technology platforms to suit the facilities monitoring and management needs of their customers. The CGTech active and/or autonomous intelligent digital concierge (iConcierge™) addresses this very gap. FIG. 105 details the conceptual business architecture of the iConcierge™ DKMF-based intelligent active and/or autonomous business solution. It is an excerpt from FIG. 80 and it focuses on details specific to the iConcierge™ solution. The solution may be applied to homes, apartment complexes, commercial environments, or vehicles and aims at providing an extensible set of concierge-like monitoring and support functions at various interconnected locations.

FIG. 105 illustrates how DKME actors (e.g., homeowners, business owners, visitors, custom technology integrators) interact with a iConcierge™ DKMF-based P2P node by communicating their needs via text messages, voice, or video (e.g., turn on lights, increase room temperature, override security). The iConcierge™ solution uses machine learning and deep learning algorithms as needed to analyze the message, voice, and video inputs and decide as to whether various requests provided via these channels should be granted. The iConcierge™ DKMF-based business solution is a real-time, device-enabled services, which monitors and manages facilities based on their current status (e.g., temperature too warm) or upon requests as noted above. The solution also provides a web-based and mobile-enabled service accessible via mobile devices to gain access to monitoring and management control functions. This service is provided with privileged access management and can be used securely within any environment. The resulting solution makes monitoring and managing facilities turn-key, economical and convenient. The iConcierge™ DKMF-based business solution is user-friendly, secure, and efficient, and it can be used by any age group. The ability of the solution to make decisions depends on the amount and quality of the data sets provided to perform internal machine learning analytics. Ongoing collection and processing of data is performed behind the scenes via the iConcierge™ DKMF ArchSSV™ cluster.

The iConcierge™ solution leverages built-in functionality provided by the Archemy™ DKMF framework to implement a dynamic and innovative connected environment to monitor and manage facilities via intelligent active and/or autonomous concierges. Some of the functionalities of the DKMF illustrated in FIG. 105 are greyed out since they are not currently used by the iConcierge™ business solution. The iConcierge™ solution implements KAEAM knowledge management processes that are specific to the health metering context by leveraging the DKMF P2P node's BPM capabilities. The KAEAM approach is discussed in detail in Section III.2. The iConcierge™ solution also leverages the DKMF node manager built-in processes and its underlying taxonomy, business solutions, and metrics management activities. As noted earlier, some of these activities leverage machine learning (ML) and specifically deep learning (DL), and reinforcement learning (RL). The built-in DKMF functionality makes it possible for iConcierge™ to adapt its functionality to better understand requests and re-configure its analytics processing algorithms and devices accordingly. In addition to the built-in DKMF capabilities, the iConcierge™ business solution provides its own BPM-driven process and related activities to monitor and manage its user interfaces and IoT devices. It makes it possible to implement AI-driven decentralized digital concierge solutions with nodes at various locations. It is then possible to talk to these nodes via phone or computer to control geographically distributed facilities and operate their lights, temperature, appliances, music and security. iConcierge™ solutions leverage cognitive computing algorithms and can go as far as learning people tastes and patterns, learning new words and concepts, and entertaining people as needed. iConcierge™ leverages a variety of artificial intelligence techniques, including natural language processing, speech recognition, face recognition, and reinforcement learning. As compared to Facebook's Jarvis, iConcierge™ is a hardened solution that is meant to function in any environment and can be scaled to handle the monitoring and management of facilities for businesses that are distributed across the globe and would like to take a connected approach to managing their global environment to leverage learnings and become better at providing concierge-like services globally.

Figure 106:
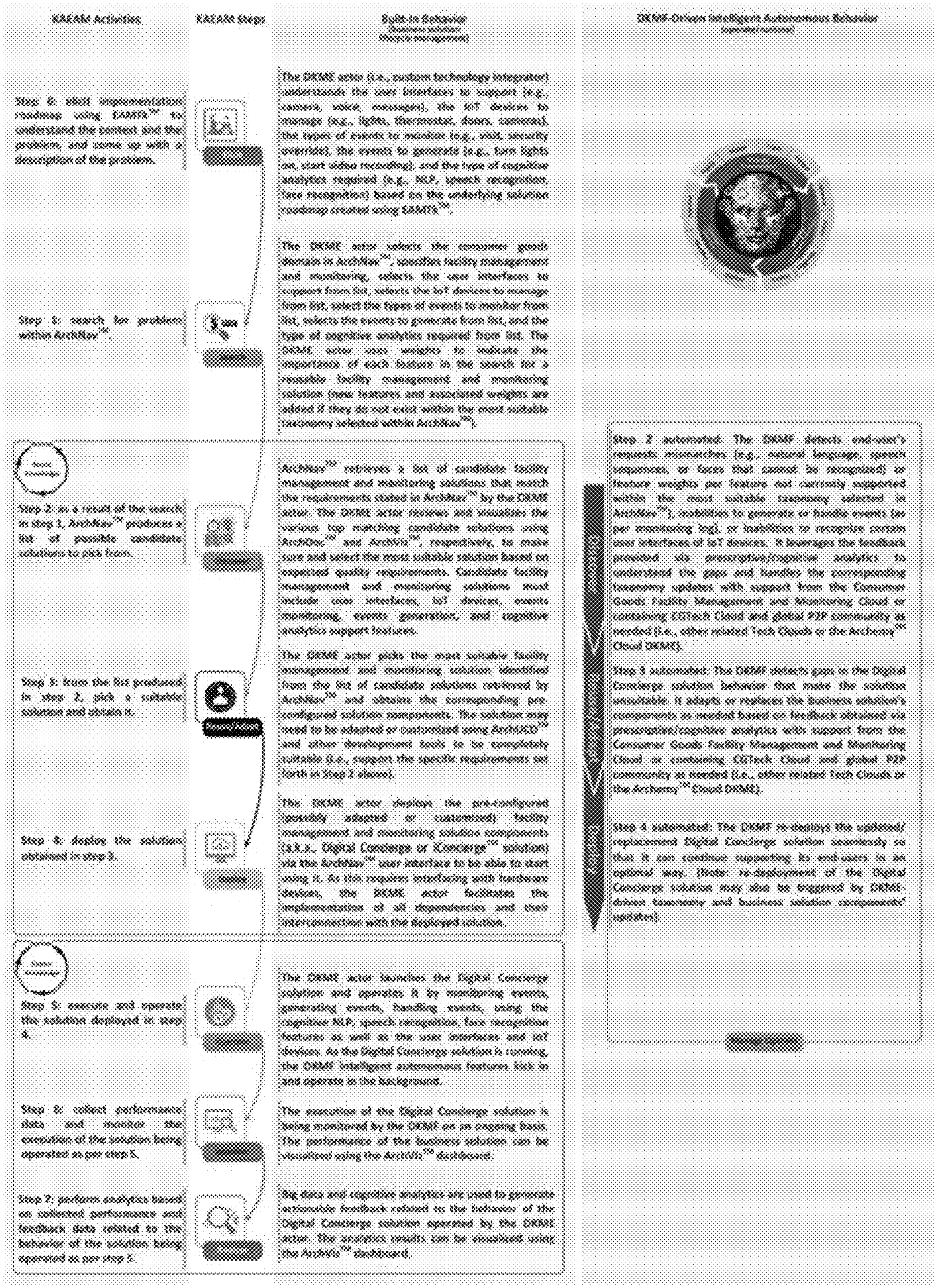
FIG. 106 is a diagram showing an iConcierge DKFM storyboard, according to some embodiments.

FIG. 106 uses a storyboard to provide more details about the facility monitoring and management context-specific implementation of the KAEAM processes within the iConcierge™ DKMF-based P2P node shown in FIG. 105. It first summarizes the KAEAM activities and steps within the left two columns respectively, as previously defined in section III.2 and illustrated in FIGS. 12 and 13. These two columns illustrate how KAEAM manages the reuse of business problems and solutions knowledge to help evolve business solutions and make them more available and suitable to business users. The two columns on the right of FIG. 106 focus on describing the behavior that is specific to the iConcierge™ DKMF-based business solution. The built-in behavior column outlines the expected outcome of the various KAEAM steps as they are applied using several Archemy™ tools (e.g., EAMTk™, ArchNav™, ArchDoc™, and ArchViz™) available via the iConcierge™ P2P node user interface. These steps select appropriate facility monitoring and management and concierge-like requests taxonomies and configure the internal analytics algorithms and devices to enable concierge-like facilities monitoring and management capabilities. The intelligent active and/or autonomous behavior provided by the DKMF automates the execution of KAEAM's steps 2, 3, and 4 as part of the DKMF manage function, as explained earlier in Section III.2 and IV.1 and illustrated in FIGS. 13, 16 and 17. These automated steps aim at optimizing the availability and suitability of taxonomies and business solutions' components that are used to address end-users' requests. As noted earlier, this built-in intelligent active and/or autonomous DKMF functionality makes it possible for the iConcierge™ solution to adapt its functionality active and/or autonomously to handle gaps in the taxonomies used to interact with end-users and understand other specifics about these end-users to better serve them.

Figure 107:
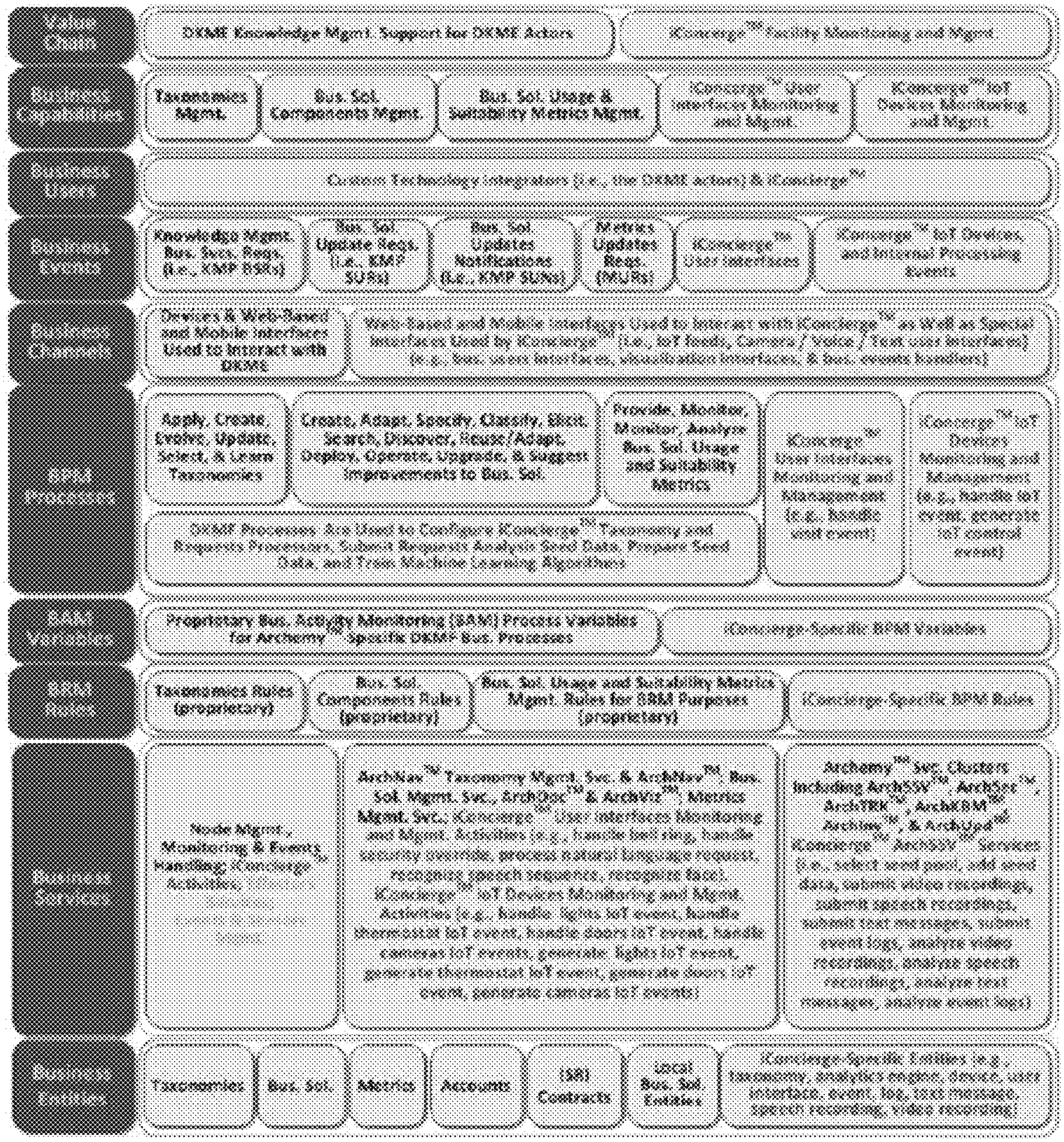
FIG. 107 is a diagram showing an iConcierge DKMF business architecture, according to some embodiments.

FIG. 107 illustrates the business architecture elements that are supported by the iConcierge™ business solution. It is based on the framework introduced earlier in Section III.2 and the DKMF business architecture shown in FIG. 15. In this case, the DKMF business architecture framework elements that are not provided via the iConcierge™ DKMF-based business solution have been greyed out.

Figure 108:
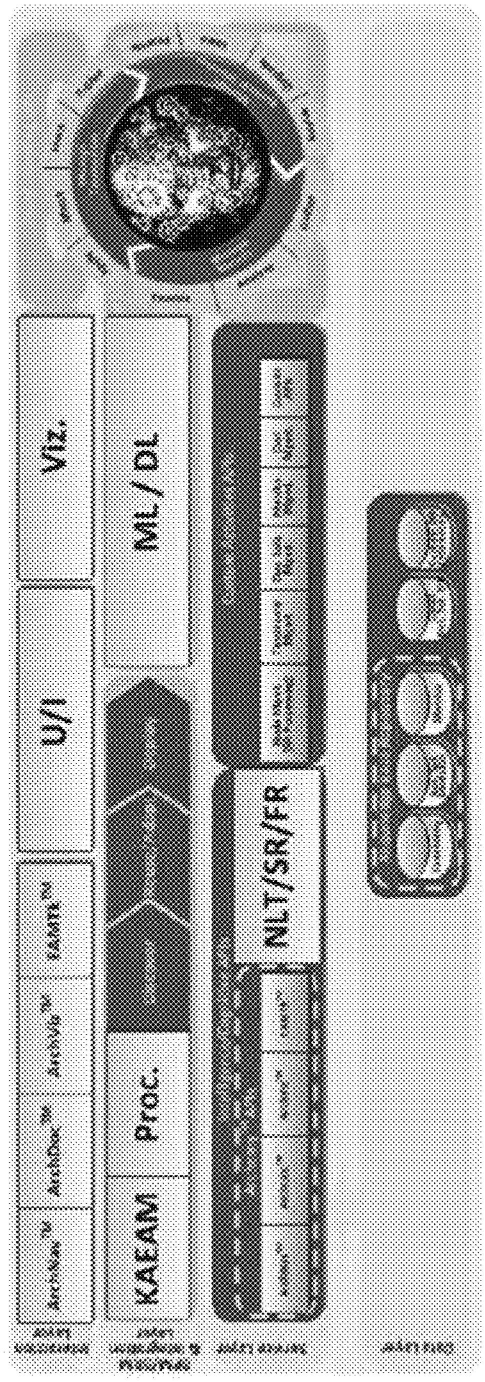
FIG. 108 is a diagram showing an iConcierge P2P node logical architecture, according to some embodiments.

FIG. 108 illustrates the iConcierge™ P2P node logical architecture. It is based on the DKMF P2P node logical architecture introduced in Part IV.2 and shown in FIG. 28. However, the node logical architecture has been augmented to include functionalities that are specific to the iConcierge™ DKMF-based business solution as discussed earlier in this section.

Figure 109:
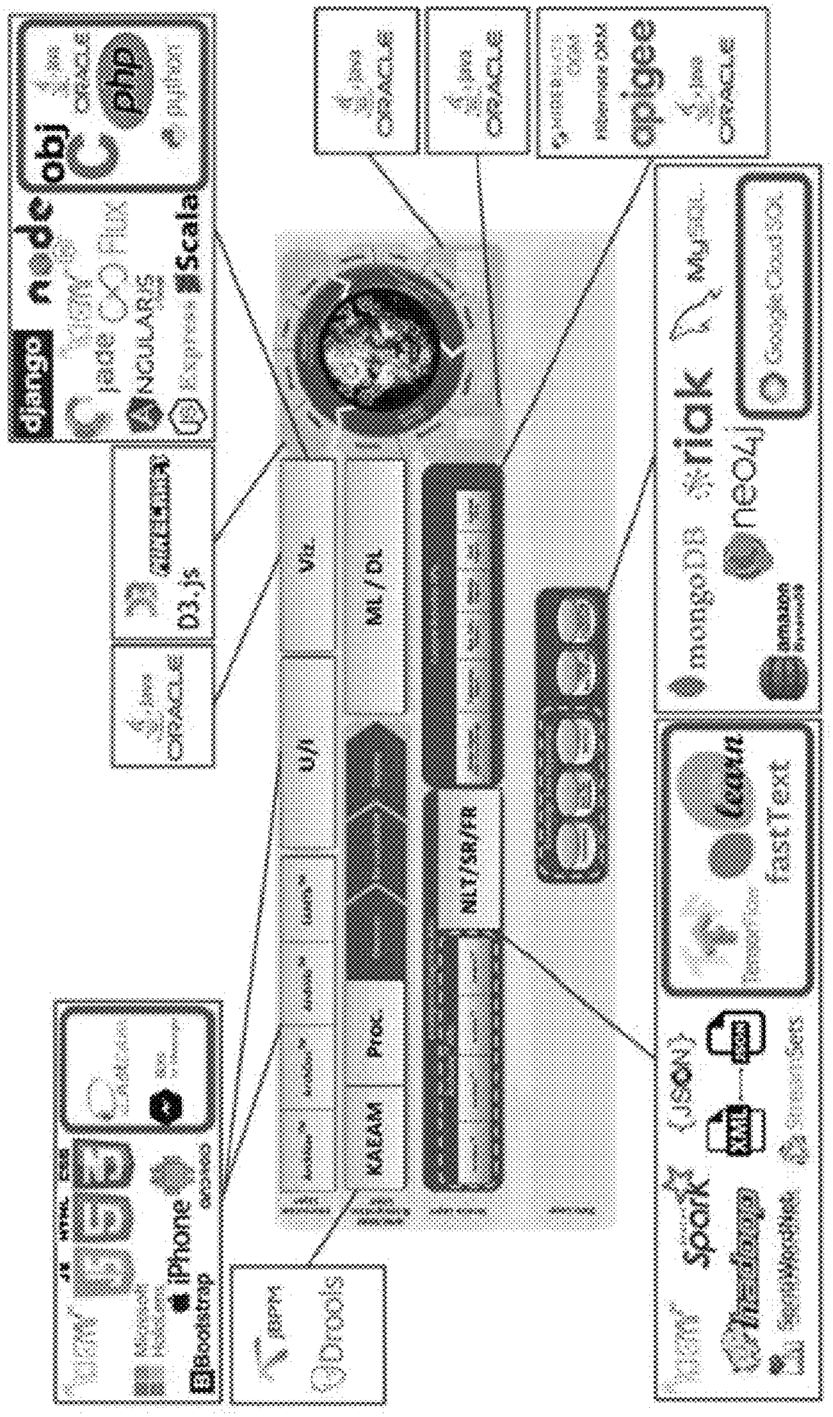
FIG. 109 is a diagram showing an iConcierge P2P node implementation architecture, according to some embodiments.

FIG. 109 illustrates the specific technologies that are currently used as part of the implementation of iConcierge™ P2P nodes. These technologies include a subset of the candidate technologies introduced earlier in Section VI and illustrated in FIG. 60 as well as new technologies (outlined in red in FIG. 109) used specifically by the iConcierge™ business solution. The iConcierge™ solution currently operates on Google Cloud, IBM Cloud, and Amazon EC2 and uses Cloud database services provided on these platforms to manage local P2P node data. Google's TensorFlow, FastText, and the Scikit-learn machine learning platforms are used to implement the cognitive analytics algorithms used for natural language translation, speech recognition, and face recognition. The iConcierge™ solution also leverages some of the technologies provided via the Facebook Research GitHub repository. Various add-ons are available to control lights, thermostats, doors, audio system, and home theaters via third party devices. The iConcierge™ solution provides a user-friendly and efficient web- and/or mobile-based monitoring dashboard and management interface. This feature is enabled via Bootstrap (i.e., HTML5, CSS3, and JavaScript) and custom mobile iPhone and Android applications. The integration layer uses Python, PhP, and Java to facilitate access to the various analytics algorithms Intuitive visualizations and information obtained via machine and deep learning are provided via the D3.js JavaScript library as part of the monitoring dashboard.

Figure 110:
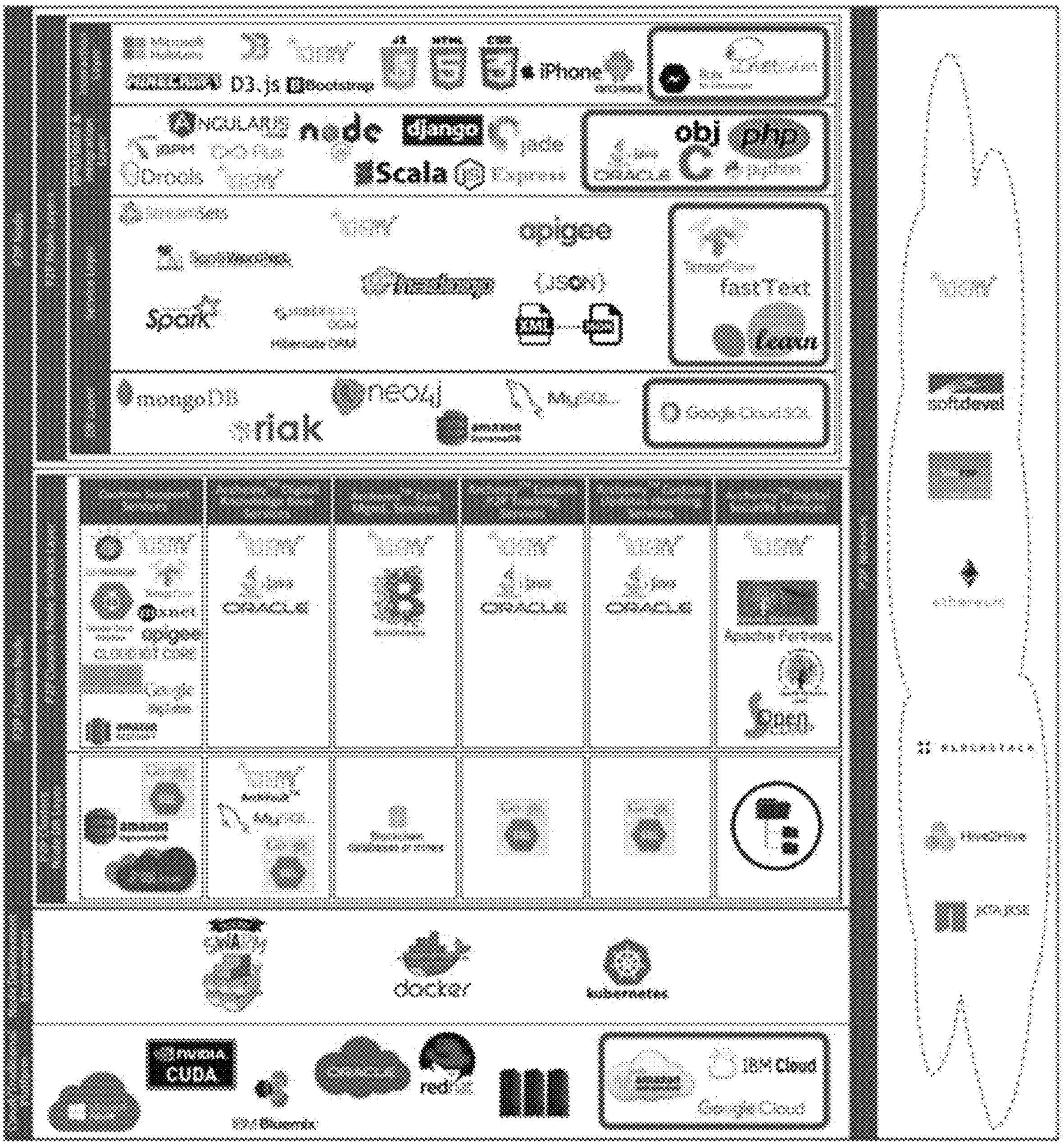
FIG. 110 is a diagram showing an iConcierge DKMF technology stack, according to some embodiments.

FIG. 110 illustrates the specific set of technologies currently used as part of the implementation of the iConcierge™ DKMF-based business solution. These technologies include a subset of the candidate technologies introduced earlier in Section VI and illustrated in FIG. 57 as well as new technologies (outlined in red in FIG. 110) used specifically by the iConcierge™ solution.

The iConcierge™ solution has been successfully applied by various custom technology integrators in large home settings. The solution has generated a lot of interest and new cognitive features are being developed on an ongoing basis to extend the learning and adaptive concierge-like capabilities that differentiate this solution along with its ability to scale and address the facilities monitoring and management needs of large global businesses.

As noted earlier, it is not our goal in this section to delve into the implementation details of all the Archemy™ business solutions. Detailed specifications and test suites are available separately via Archemy™ and its affiliates under intellectual property agreements. Therefore, our focus in this section is to provide enough information to clarify the design and implementation of the iConcierge™ DKMF-based business solution and explain how it leverages the DKME ecosystem and its associated DKMF framework.

This concludes our presentation of several examples of practical intelligent active and/or autonomous business solutions that make use of the DKME ecosystem and its associated DKMF framework today. These solutions support the needs of users in various business domains and were built using a select set of technologies that follow the best practices that Archemy™ and its affiliates believe in. The resulting solutions combines existing state of the practice technologies with new components in an innovative way to facilitate the creation and management of intelligent active and/or autonomous business solutions in various business contexts. All the solutions presented in this section were developed by extending the DKMF framework. They can be connected to the DKME constellation of business marketplaces. The set of DKMF-based business solutions presented in the present disclosure was picked to illustrate the wide range of possible applications of the Archemy™ DKME and its associated DKMF. There are myriads of other possible applications of the DKMF in many industries. We are currently working with affiliates in fields as diverse as art or music, and science. Solutions that facilitate research in music performance modeling using rule-based engines can be implemented by extending the DKMF framework to also leverage cognitive analytics. Furthermore, a large variety of commercial business solutions can be migrated or created to leverage next-generation digital capabilities by using the DKME ecosystem and its associated DKMF framework.

As we are now concluding the present disclosure, we look forward to sharing progress updates related to our current and future ventures in subsequent papers. In the next section, we briefly summarize the various aspects of our solutions that were covered in the present disclosure.

VIII. Summary

In the present disclosure, we introduced an ecosystem and framework that enable businesses in various domains to create, identify and leverage intelligent self-learning active and/or autonomous business solutions that power a connected business marketplace. These intelligent active and/or autonomous business solutions leverage built-in framework capabilities to identify gaps in the taxonomies they use to interact with end-users and update their capabilities active and/or autonomously to optimize the handling of (new) customer requests. The underlying framework technology uses augmented intelligence, various state of the art technology enablers, and a combination of big data and cognitive analytics to ensure the availability and suitability of taxonomies and business solutions' components and support semi real-time updates. The ecosystem and platform described in the present disclosure are based on the vision, concepts, architecture, theoretical underpinnings, and implementation details covered in the various sections of the present disclosure. They enable a new generation of connected active and/or autonomous business solutions that support a level of knowledge and learning abilities comparable to that of humans. The paper also described a handful of business solutions that are powered by the framework today and used to address practical mainstream business needs in an innovative way.

As discussed above, Archemy™ provides a framework and ecosystem that facilitate the active and dynamic implementation of business solutions to networked compute nodes. Business solutions achieved using Archemy™ can evolve intelligently, autonomously, and collaboratively by adapting their functionality (i.e., applicable features) and qualities (e.g., suitability) based on perceived, detected, and/or received indications of user needs. The Archemy™ framework leverages a searchable repository of curated reusable solution components that can be used to evolve business solutions as needed. The Archemy™ ecosystem (i.e., DKME) provides the assisted(/amplified/augmented) intelligence that facilitates obtaining or creating necessary adaptations. Archemy™ active business solutions can be interconnected via a business solutions network that permits DKMF intelligent agents to gain controlled access to the underlying Archemy™ ecosystem via a knowledge management protocol (i.e., KMP). Archemy™ systems are applicable for use in healthcare applications such as active Lymphedema monitoring, during which new symptoms can be supported as desired, condition metering can be managed, and management accuracy can be increased. The Archemy™ active CollectorCoin™ product line provides intelligent autonomous and collaborative services that are proactively aligned with the ongoing/evolving needs of collectors. The CollectorCoin™ product line can provide services to collectors of various items, and promote the use of a coin similar to bitcoin but backed by a percentage of participation in a service meant to improve the value of a collectible item. For example, Collector Coin can be used by owners of collectible "project" cars to obtain funding that can be applied towards the restoration of their collectible "project" automobile so it can be sold later at auction. The value gains generated using the Collector Coin platform can also result in increasing the value of the "Collector Coin," making it a more and more valuable currency. The Archemy™ iConcierge™ product provides intelligent autonomous and/or active collaborative concierge services for hotel chains, retirement homes, and businesses with global facilities. Archemy™'s core technology and product lines can leverage a repository of solution components that use the latest technologies including AI, IoT, Blockchain, and Cloud. Archemy™ can use consulting and agile solution engineering methodologies (e.g., ArchDev™) and approaches (e.g., AEAM™, KAEAM™) to develop active product lines. In some embodiments, Archemy™ nodes use IoT to monitor events at various geolocations as needed.

In some embodiments, software components are selected and adapted/modified by establishing and optimizing the "binding" between the functionalities and qualities associated with a given solution (i.e., the currently-desired system capability) and the prior knowledge of vetted component assemblies that accomplished similar capabilities/functionalities in the past. The combination of taxonomies and namespaces associated with component assemblies and their bindings can be considered as analogous to a "DNA" structure, in that they provide the instructions for assembly and evolution of Archemy™ active business solutions. Furthermore, while compute nodes deployed within the Archemy™ compute node network can collaborate to leverage their respective and/or collective autonomous intelligence capabilities, they can also leverage the assisted(/amplified/augmented) intelligence provided by the underlying Archemy™ DKME to address situations that may involve manual human intervention.

To generate and evolve active business solutions, Archemy™ can bind capability requests to prior knowledge in an intelligent, autonomous and collaborative fashion (i.e., it helps create and evolve network-connected compute nodes hosting application software units that are applicable and suitable to business needs. The Archemy™ platform can facilitate the creation, maintenance and refinement of the various bindings and related solutions. The Archemy™ platform can also use AI capabilities to generate and leverage the knowledge for retrieving and combining vetted software components to assemble new compute nodes for the network, as desired and/or indicated.

Repositories of the present disclosure can include one or more of: precise/detailed descriptions of software application components, customer profiles, and business needs; data component taxonomies, usage location taxonomies, and infrastructure taxonomies. The precise/detailed descriptions of software application components can include data associated with the binding across six representative facets, together with a description of the architecture of the component, given its current maturity, to capture design, implementation, and deployment details as needed. Domain-specific or industry-specific information can also be included in the repositories, for example to further describe software components (e.g., disease symptoms captured via a user interface can be specified using a standard healthcare-centric taxonomy). To maintain the binding accuracy, the monitoring and scoring of applicability (i.e., functional fitness) and/or suitability (i.e., Quality of Service, and Quality of Experience as a whole) can also be implemented. To clarify, "applicability" measures the ability of a solution to solve problems that solution users have, and "suitability" measures the accuracy of the solution in solving user problems.

Once "bindings" between active information and desired system capabilities (or the applicable application software units) are established, product line applicability and suitability changes can be automatically maintained by the Archemy™ platform. The platform can react to (i.e., take action in response to), for example, business, data, application, or network driven changes, to ensure that information is collected in an optimal way and that needs are optimally met. For example, the addition of new symptoms via the LymphMeter™ user interface is an example of a business-triggered change. The addition of new symptoms in the NYU Meyer's symptoms set, or the addition of new patient exercises, or the availability of new patient data are all examples of data-triggered changes that need to be handled via LymphX™ solutions. The availability of new components for LymphX-like solutions is an example of an application-triggered change. Finally, the need for more network efficient bindings via ArchNt™ is an example of a network-triggered change.

In addition to the above capabilities, Archemy™ can use various types of algorithms (e., fuzzy matching, distance-vector based, and ML) to search its knowledge repository. Archemy™ can also use machine learning and/or artificial intelligence methods to perform intelligent autonomous component adaptations (a.k.a., transmutations) in real-time. Alternatively or in addition, Archemy™ can use one or more "scrubbing algorithms" to semi-automate the harvesting of reusable assets (i.e., application software units or software components) that are available in public repositories (e.g., Github, GitLab, webcomponents.org, ConsenSys and Amazon Ethereum Marketplace). It can include a reusable asset gathering toolset (i.e., via EAMTk™) that: (1) encourages users to share events and/or data that are geolocation-centric, company-centric, or individual-centric (i.e., the toolset captures "who" has "what" information, "where," and "why," "when," and/or "how" did the information get there); and (2) encourages users to share solutions (e.g., Apps Wallet) that they currently have, or to express desired system capabilities that they do not currently have, for example by referencing specific locations, companies, and/or individuals. In other words, the toolset can capture "who" has "what" need "where," and "why," "when," and/or "how" is there such a need.

In some implementations, Archemy™ can use Ethereum blockchain technology for billing and usage audit tracking purposes, and/or to provide rewards (e.g., cryptographic coins, which may be product line specific) to knowledge/asset contributors. Alternatively or in addition, Blockchain can be used to generate/maintain contracts between various solution components' providers.

EXAMPLE IMPLEMENTATIONS

Example Implementation #1: NYU Meyer Hospital shares Lymphedema symptoms sets and patients data sets. Many Hospitals need to treat Lymphedema. The Archemy™ platform is used to bind the need to the information and it powers the active LymphX™ family of business solutions that help treat patients' lymphedema conditions. LymphX™ is an Archemy™-powered solution set that includes three sub-components namely LymphMeter™, LymphCoach™, and LymphTrack™. The LymphMeter™ component is an online metering solution used to diagnose a patient with respect to the extent of his/her Lymphedema condition. Patients with an acute condition are advised to report to the nearest hospital for treatment. The LymphCoach™ component is used to train patients before they are released from the hospital, so they become able to perform a specific set of exercises to cure or maintain their Lymphedema condition. The LymphTrack™ component is used to monitor patients as they exercise at home to ensure that they exercise regularly and correctly.

Example Implementation #2: Collectors (e.g., classic car collectors) often share information about specific collectibles and related information such as the value and condition of these collectibles. Car collectors and restoration shops need to fund restoration projects. The Archemy™ platform is used to bind the need to the information and powers the CollectorCoin active business solution that allows car collectors to fund the restoration of their project cars.

Example Implementation #3: Hotel chains, retirement homes, or global companies with multiple global locations often share the monitoring information they collect at their facilities via security videos or other IoT devices. There is a need to constantly analyze this information using AI algorithms to detect or predict incidents. The Archemy™ platform binds the need to the information by powering an iConcierge™ active business solution that enables such a service.

Example Implementation #4: Individuals can share information about specific locations, companies, and individuals. Insurance companies want to know about accidents occurring at various locations to minimize their risk. The Archemy™ platform binds the need to the information by powering the iTracker™ active business solution that provides a risk analysis and management platform for the insurance industry.

Example Implementation #5: Individuals can share information about events and locations using their mobile phones, and often use a variety of software applications to help manage their day-to-day life. Archemy™ can bind desired capabilities of individuals to the relevant information by powering the ArchemyLife™ active business solution that enables people to better manage their day-to-day life (i.e., it increases change awareness and ensures that the applications used to manage day-to-day life are constantly optimized to tackle these changes).

Throughout the foregoing description, wherever a "user" takes an action (e.g., sending a request), it is to be understood that such actions can instead be made or initiated in an autonomous or automated manner (e.g., via intelligent automation) by a compute node.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A non-transitory processor-readable medium storing code representing instructions to cause a processor to:

convert a text description of at least one system capability request into a normalized description of the at least one system capability request;

query a repository via a query, using a search algorithm of the processor, to identify a plurality of candidate solution units, each candidate solution unit from the plurality of candidate solution units including at least one of software or hardware, the repository stored in a memory operably coupled to the processor, the query referencing the normalized description of the at least one system capability request;

send a signal to cause display of a representation of each candidate solution unit from the plurality of candidate solution units to a user;

receive a user selection of a candidate solution unit from the plurality of candidate solution units, the user selection made by the user; and cause deployment of the user-selected candidate solution unit to at least one remote compute device in response to receiving the user selection.

2. The non-transitory processor-readable medium of claim 1, wherein the code further represents instructions to cause the processor to:

identify, via the processor, a plurality of weightings, each weighting from the plurality of weightings associated with a candidate solution unit from the plurality of candidate solution units, the signal to cause display of the plurality of solution units also causes display of at least a subset of the plurality of weightings to the user.

3. The non-transitory processor-readable medium of claim 1, wherein the code further represents instructions to cause the processor to:

identify, via the processor, a plurality of weightings, each weighting from the plurality of weightings associated with a candidate solution unit from the plurality of candidate solution units, the signal to cause display of the plurality of candidate solution units causes display of the plurality of candidate solution units in an order based on the plurality of weightings.

4. The non-transitory processor-readable medium of claim 1, wherein the code further represents instructions to cause the processor to:

detect, during execution of the user-selected candidate solution unit, a deficiency in the user-selected candidate solution unit; and in response to detecting the deficiency, active and/or autonomously trigger a service request to cause one of an update to or a replacement of the user-selected candidate solution unit.

5. The non-transitory processor-readable medium of claim 4, wherein the instructions to cause the processor to detect the deficiency include instructions to cause the processor to detect the deficiency based on a user input.

6. The non-transitory processor-readable medium of claim 4, wherein the instructions to cause the processor to detect the deficiency include instructions to cause the processor to detect the deficiency based on an automated, real-time cognitive analysis.

7. The non-transitory processor-readable medium of claim 1, wherein the search algorithm includes one of a classification search, a distance vector, or a machine learning algorithm.

8. The non-transitory processor-readable medium of claim 1, wherein the code further represents instructions to cause the processor to:

detect, during execution of the user-selected candidate solution unit, a deficiency in the user-selected candidate solution unit;

in response to detecting the deficiency:

(i) update a taxonomy associated with the plurality of candidate solution units, and (ii) one of modify or replace the user-selected candidate solution unit with a replacement solution unit; and in response to (i) or (ii), automatically cause deployment of the replacement solution unit to at least one remote compute device without user intervention.

9. The non-transitory processor-readable medium of claim 1, wherein the code further represents instructions to cause the processor to:

detect, during execution of the user-selected candidate solution unit, a deficiency in the user-selected candidate solution unit;

in response to detecting the deficiency:

update a taxonomy associated with the plurality of candidate solution units, and identify a proposed replacement solution unit based on the updated taxonomy;

send a signal to cause display of the proposed replacement solution unit to the user;

receive a signal representing a user acceptance of the proposed replacement solution unit; and cause deployment of the proposed replacement solution unit to the at least one remote compute device.

10. The non-transitory processor-readable medium of claim 1, wherein the plurality of candidate solution units is a first plurality of candidate solution units, the code further representing instructions to cause the processor to:

detect, during execution of the user-selected candidate solution unit, a deficiency in the user-selected candidate solution unit;

in response to detecting the deficiency:

(i) update a taxonomy associated with the plurality of candidate solution units, and (ii) identify a second plurality of candidate solution units based on the updated taxonomy;

send a signal to cause display of the second plurality of candidate solution units to the user;

receive a user selection of a candidate solution unit from the second plurality of candidate solution units; and send the user-selected candidate solution unit from the second plurality of candidate solution units to the at least one remote compute device.

11. The non-transitory processor-readable medium of claim 1, wherein the code further represents instructions to cause the processor to:

detect, during execution of the user-selected candidate solution unit, a modification to at least one candidate solution unit from the plurality of candidate solution units of the repository, or a taxonomy associated with at least one candidate solution unit from the plurality of candidate solution units of the repository; and in response to detecting the modification, sending a signal including data associated with the modification to a public distributed ledger for recording therein.

12. The non-transitory processor-readable medium of claim 1, wherein the code further represents instructions to cause the processor to:

detect, during execution of the user-selected candidate solution unit, usage of the user-selected candidate solution unit; and in response to detecting the usage, sending a signal including data associated with the usage to a public distributed ledger for recording therein.

13. The non-transitory processor-readable medium of claim 1, wherein the instructions to cause the processor to query the repository include instructions to match a criteria of the at least one system capability request with the plurality of candidate solution units based on a taxonomy.

14. The non-transitory processor-readable medium of claim 13, wherein the taxonomy includes a field associated with a facet, the facet defining one of: an idea, a concept, an artifact, a component, a procedure, or a skill.

15. A non-transitory processor-readable medium storing code representing instructions to cause a processor to:

query a repository, using a search algorithm of the processor and in response to receiving system data, to identify a plurality of candidate solution units suitable for addressing at least one system capability request, the query referencing the system data;

automatically select a candidate solution unit from the plurality of candidate solution units; and cause execution of the automatically selected candidate solution unit on at least one remote compute device in response to automatically selecting the candidate solution unit.

16. The non-transitory processor-readable medium of claim 15, wherein the instructions to cause the processor to cause execution of the automatically selected candidate solution unit include instructions to cause the processor to modify a software associated with the automatically selected candidate solution unit based on a taxonomy.

17. The non-transitory processor-readable medium of claim 15, wherein at least one of the identifying the plurality of candidate solution units, or the automatically selecting the candidate solution unit from the plurality of candidate solution units includes one of a deep learning (DL) algorithm or a reinforcement learning (RL) algorithm.

18. A system, comprising:

a plurality of compute nodes, each compute node from the plurality of compute nodes in operable communication with each other compute node from the plurality of compute nodes via a communications network, each compute node from the plurality of compute nodes including a memory storing code representing instructions to cause a processor to:

receive, at a processor of that compute node, a signal representing system data associated with at least one system capability request associated with a system capability;

query a repository, using a search algorithm of the processor of that compute node and in response to receiving the system data, to identify a plurality of candidate solution units suitable for addressing the at least one system capability request, each candidate solution unit from the plurality of candidate solution units including at least one of software or hardware, the query referencing the system data;

automatically select a candidate solution unit from the plurality of candidate solution units; and cause execution of the automatically selected candidate solution on that compute node, in response to automatically selecting the candidate solution unit, such that the automatically selected candidate solution unit is integrated into a software package of that compute node, to define a modified software package that is configured to provide the system capability.

19. The system of claim 18, wherein the plurality of compute nodes is a first plurality of compute nodes, the first plurality of compute nodes associated with a first domain type, the system further comprising:

a second plurality of compute nodes, each compute node from the second plurality of compute nodes in operable communication with each other compute node from the second plurality of compute nodes via a communications network, the second plurality of compute nodes associated with a second domain type different from the first domain type, each compute node from the second plurality of compute nodes including a memory storing code representing instructions to cause a processor to:

receive, at a processor of that compute node, a signal representing system data associated with at least one system capability request associated with a system capability;

query a repository, using a search algorithm of the processor of that compute node and in response to receiving the system data, to identify a plurality of candidate solution units suitable for addressing the at least one system capability request, the query referencing the system data;

automatically select a candidate solution unit from the plurality of candidate solution units; and cause execution of the automatically selected candidate solution on that compute node, in response to automatically selecting the candidate solution unit, such that the automatically selected candidate solution unit is integrated into a software package of that compute node, to define a modified software package that is configured to provide the system capability.

20. The system of claim 19, wherein the instructions to query a repository, stored by each memory of each compute node from the second plurality of compute nodes, include instructions to query at least one of (1) a local repository of that compute node, (2) a repository of another compute node within the second plurality of compute nodes, and (3) a remote repository of a compute node from the first plurality of compute nodes.

* * * * *